(12) United States Patent
Mochizuki et al.

(10) Patent No.: US 12,069,757 B2
(45) Date of Patent: Aug. 20, 2024

(54) COMMUNICATION SYSTEM, USER APPARATUS, AND BASE STATION

(71) Applicant: Mitsubishi Electric Corporation, Tokyo (JP)

(72) Inventors: Mitsuru Mochizuki, Tokyo (JP); Tadahiro Shimoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/146,739

(22) Filed: Dec. 27, 2022

(65) Prior Publication Data
US 2023/0132427 A1     May 4, 2023

Related U.S. Application Data

(63) Continuation of application No. 17/394,529, filed on Aug. 5, 2021, now abandoned, which is a
(Continued)

(30) Foreign Application Priority Data

Aug. 8, 2017 (JP) ................................ 2017-152932

(51) Int. Cl.
*H04W 76/15* (2018.01)
*H04L 5/00* (2006.01)
(Continued)

(52) U.S. Cl.
CPC ............. *H04W 76/15* (2018.02); *H04L 5/001* (2013.01); *H04L 5/0098* (2013.01);
(Continued)

(58) Field of Classification Search
CPC ......... H04L 5/00; H04L 5/0098; H04L 5/001; H04W 16/32; H04W 36/00; H04W 72/04;
(Continued)

(56) References Cited

U.S. PATENT DOCUMENTS

2013/0083661 A1    4/2013  Gupta et al.
2017/0006597 A1    1/2017  Kitazoe et al.
(Continued)

FOREIGN PATENT DOCUMENTS

| JP | 2004-228754 A | 8/2004 |
| KR | 10-2015-0109848 A | 10/2015 |
| WO | WO 2016/028563 A1 | 2/2016 |

OTHER PUBLICATIONS

Office Action issued Jul. 6, 2023, in corresponding Indian Patent Application No. 202248077097 (with English Translation), citing documents 1, 2 and 15 therein, 6 pages.
(Continued)

*Primary Examiner* — Kyaw Z Soe
(74) *Attorney, Agent, or Firm* — PROCOPIO, CORY, HARGREAVES & SAVITCH LLP

(57) ABSTRACT

A communication system includes a user apparatus; and a base station including a distributed unit (DU) configured to wirelessly communicate with the user apparatus and a central unit (CU) connected to the distributed unit. The base station including the CU and the DU supports packet duplication, and the DU notifies the user apparatus of starting the packet duplication.

6 Claims, 48 Drawing Sheets

Related U.S. Application Data continuation of application No. 16/633,307, filed as application No. PCT/JP2018/029566 on Aug. 7, 2018, now Pat. No. 11,116,025.

(51) Int. Cl.
  *H04W 16/32* (2009.01)
  *H04W 36/00* (2009.01)
  *H04W 72/23* (2023.01)
  *H04W 72/56* (2023.01)
  *H04W 88/06* (2009.01)

(52) U.S. Cl.
  CPC ....... *H04W 16/32* (2013.01); *H04W 36/0069* (2018.08); *H04W 72/23* (2023.01); *H04W 72/56* (2023.01); *H04W 88/06* (2013.01)

(58) Field of Classification Search
  CPC ..... H04W 72/10; H04W 88/06; H04W 76/15; H04W 36/0069; H04W 72/042
  See application file for complete search history.

(56) References Cited

U.S. PATENT DOCUMENTS

| | | | | |
|---|---|---|---|---|
| 2020/0205050 | A1* | 6/2020 | Shah | H04W 36/0069 |
| 2021/0112610 | A1* | 4/2021 | Xiao | H04L 1/1614 |

OTHER PUBLICATIONS

Samsung et al.: "PDCP duplication support in high layer functional split", 3GPP Draft; R3-172252, 3rd Generation Partnership Project (3GPP), Mobile Competence Centre; 650, Route Des Lucioles; F-06921 Sophia-Antipolis Cedex; France, vol. RAN WG3, no. Qingdao; Jun. 27, 2017-Jun. 29, 2017, Jun. 20, 2017, XP051307944.
European Patent Office, Extended European Search Report, Application No. EP 23186609.6-1215, dated Oct. 9, 2023, in 10 pages.
Huawei Hisilicon: "Activating and deactivating packet duplication", 3GPP Draft; R2-1703529 Activating and Deactivating Packet Duplication, 3rd Generation Partnership Project (3GPP), Mobile Competence Centre; 650, Route Des Lucioles; F-06921 Sophia-Antipolis Cedex; vol. RAN WG2, no. Spokane, Washington, USA; Apr. 3, 2017-Apr. 7, 2017, Mar. 24, 2017, XP051253983.
Combined Chinese Office Action and Search Report issued Feb. 28, 2023, in corresponding Chinese Patent Application No. 201880050388.2 (with English Translation), 11 pages.
Office Action issued Mar. 31, 2023, in corresponding Indian Patent Application No. 202248077071 (with English Translation), 6 pages.
International Search Report issued Oct. 30, 2018 in PCT/JP2018/029566 filed Aug. 7, 2018, citing document AD therein, 2 pages.
LG Electronics Inc. "Packet duplication with implicit SCell deactivation," Discussion and Decision. 10.3.1.11 (NR_newRAT-Core). 3GPP TSG-RAN WG2 NR AdHoc Qingdao, China, Jun. 27-Jun. 29, 2017, R2-1706867, 4 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Stage 2 (Release 14) 3GPP TS 36.300 V14.3.0 (Jun. 2017), 331 pages.
3GPP SA WG1 ; LS on HNB/HeNB Open Access Mode; Rel-9; EHNB; 3GPP TSG-SA1 #42; Seoul, South Korea, Oct. 13-17, 2008; S1-083461, 2 pages.
3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.814 V9.2.0 (Mar. 2017), 105 pages.
3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.912 V14.0.0 (Mar. 2017), 254 pages.
Fallgren et al., Mobile and wireless communications Enablers for the Twenty-twenty Information Society (METIS); Scenarios, requirements and KPIs for 5G mobile and wireless system; Document No. ICT-317669-METIS/D1.1, 84 pages.
3rd Generation Partnership Project; Technical Specification Group Services and System Aspects; Study on Architecture for Next Generation System (Release 14); 3GPP TR 23.799 V14.0.0 (Dec. 2016), 522 pages.
3rd Generation Partnership Project; Technical Specification Group Radio Access Network; Study on new radio access technology: Radio access architecture and interfaces (Release 14); 3GPP TR 38.801 V14.0.0 (Mar. 2017), 91 pages.
3rd Generation Partnership Project; Technical Specification Group Radio Access Network; Study on New Radio Access Technology Physical Layer Aspects (Release 14); 3GPP TR 38.802 V14.1.0 (Jun. 2017). 144 pages.
3rd Generation Partnership Project; Technical Specification Group Radio Access Network; Study on New Radio Access Technology; Radio Interface Protocol Aspects (Release 14); 3GPP TR 38.804 V14.0.0 (Mar. 2017), 57 pages.
3rd Generation Partnership Project; Technical Specification Group Radio Access Network; Study on New Radio (NR) access technology (Release 14); 3GPP TR 38.912 V14.0.0 (Mar. 2017), 74 pages.
ETSI MCC; Report of 3GPP TSG RAN WG2 AdHoc on NR, Spokane, USA Jan. 17-19, 2017; 3GPP TSG-RAN Working Group 2 meeting #97; Athens, Greece, Feb. 13-17, 2017; R2-1700672, 80 pages.
ETSI MCC; Report of 3GPP TSG RAN WG2 meeting #98 Hangzhou, China May 15-19, 2017; 3GPP TSG-RAN WG2 meeting #99 Berlin, Germany, Aug. 21-25, 2017; R2-1707601, 304 pages.
Vivo; Duplication data in CA; Discussion and Decision; 3GPP TSG-RAN WG2 Meeting #98 Hangzhou, China, May 15-19, 2017; R2-1704578, 3 pages.
ZTE; Consideration on the activation/deactivation of data duplication for CA; Discussion and Decision; 3GPP TSG-RAN WG2 Meeting #98 Hangzhou, China, May 15-19, 2017; R2-1704660, 3 pages.
3rd Generation Partnership Project; Technical Specification Group Radio Access Network; Evolved Universal Terrestrial Radio Access (E-UTRA); Medium Access Control (MAC) protocol specification (Release 14); 3GPP TS 36.321 V14.3.0 (Jun. 2017), 107 pages.
3rd Generation Partnership Project; Technical Specification Group Radio Access Network; Evolved Universal Terrestrial Radio Access (E-UTRA); Radio Link Control (RLC) protocol specification (Release 14); 3GPP TS 36.322 V14.0.0 (Mar. 2017), 45 pages.
ETSI MCC; Report of 3GPP TSG RAN meeting #95Bis, Spokane, USA, Apr. 3-7, 2017; 3GPP TSG RAN meeting #96 Hangzhou, China, May 15-19, 2017 R3-17xxxx, 114 pages.
Huawei, HiSilicon; Configuration and control of packet duplication; Discussion and Decision; 3GPP TSG RAN WG2 NR Ad Hoc Qingdao, China, Jun. 27-29, 2017 R2-1706716, 6 pages.
Huawei, HiSilicon; Interaction between PDCP/RLC/MAC for packet duplication; Discussion and Decision; 3GPP TSG RAN WG2 Meeting #98 Hangzhou, China, May 15-19, 2017 R2-1704836, 3 pages.
Ericsson; Controlling of duplication in case of CA; Discussion, Decision; 3GPP TSG-RAN WG2 #97bis Spokane, USA, Apr. 3-7, 2017 Tdoc R2-1702753, 4 pages.
ETSI MCC; Report of 3GPP TSG RAN meeting #97bis, Spokane, USA Apr. 3-7, 2017; 3GPP TSG-RAN WG2 meeting #98 Hangzhou, China, May 15-19, 2017 R2-1704001, 191 pages.
3rd Generation Partnership Project; Technical Specification Group Radio Access Network; Evolved Universal Terrestrial Radio Access Network (E-UTRAN); X2 application protocol (X2AP) (Release 14) 3GPP TS 36.423 V14.3.0 (Jun. 2017), 242 pages.
3rd Generation Partnership Project; Technical Specification Group Radio Access Network; Evolved Universal Terrestrial Radio Access (E-UTRA); Radio Resource Control (RRC); Protocol specification (Release 14) 3GPP TS 36.331 V14.3.0 (Jun. 2017), 745 pages.
Ericsson; Suspend/resume in LTE-NR interworking scenarios; Discussion, Decision; 3GPP TSG-RAN WG2 #98 Hangzhou, P.R. of China, May 15-19, 2017 Tdoc R2-1704425 (Resubmission of R2-1702704), 3 pages.

(56) References Cited

OTHER PUBLICATIONS

Ericsson; Addition, modification, and release of DRBs in EN-DC; Discussion, Decision; 3GPP TSG-RAN WG2 #98 Hangzhou, P.R. of China, May 15-19, 2017 Tdoc R2-1704420, 3 pages.

Huawei, HiSilicon; Support of Multi-Connectivity in NR; Discussion and Decision; 3GPP TSG-RAN WG2 Meeting #96 Reno, USA, Nov. 14-18, 2016 R2-167583, 5 pages.

3rd Generation Partnership Project; Technical Specification Group Radio Access Network; Evolved Universal Terrestrial Radio Access (E-UTRA) and NR; Multi-connectivity; Stage 2 (Release 15) 3GPP TS 37.340 V0.2.0 (Jun. 2017), 43 pages3rd Generation Partnership Project; Technical Specification Group Radio Access Network; Evolved Universal Terrestrial Radio Access (E-UTRA) and NR; Multi-connectivity; Stage 2 (Release 15) 3GPP TS 37.340 V0.2.0 (Jun. 2017), 43 pages.

3rd Generation Partnership Project; Technical Specification Group Radio Access Network; NG Radio Access Network (NG-RAN); Xn application protocol (XnAP) (Release 15) 3GPP TS 38.423 V0.1.1 (Jun. 2017), 54 pages.

Extended European Search Report issued Mar. 15, 2021 in European Patent Application No. 18844143.0, 13 pages.

Indian Office Action issued Apr. 8, 2022 in Indian Patent Application No. 202047003477, citing documents AO and AX therein, 6 pages.

Samsung, "Discussion on Packet Duplication," 3GPP TSG-RAN WG2 Meeting #98 R2-1705727, May 2017, 3 pages.

Japanese Office Action dated Sep. 13, 2022, issued in Japanese Patent Application No. 2019-535667 (with English translation).

Japanese Patent Office, Office Action, Application No. JP2023-061226, dated Jun. 4, 2024, in 8 pages.

CATT, Consideration on further enhancement for high layer CU/DU split [online], 3GPP TSG RAN#76 RP-171114, Jun. 8, 2017, Internet<URL:http://www.3gpp.org/ftp/tsg_ran/TSG RAN/TSGR_76/Docs/RP-171114.zip >.

\* cited by examiner

F I G. 1
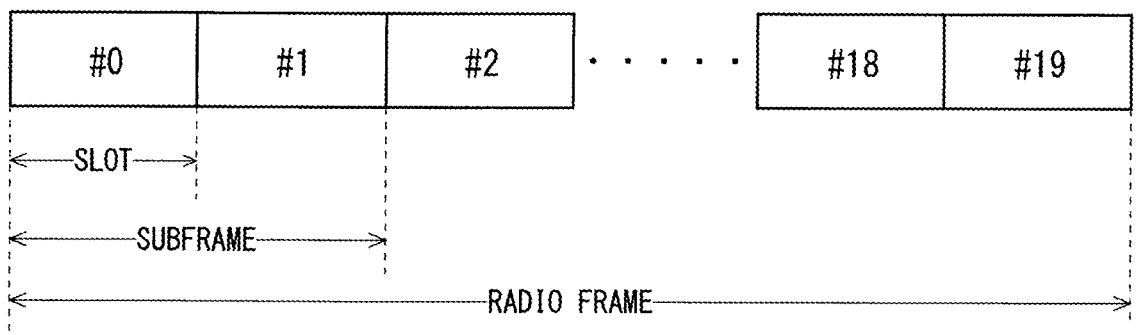

F I G. 5
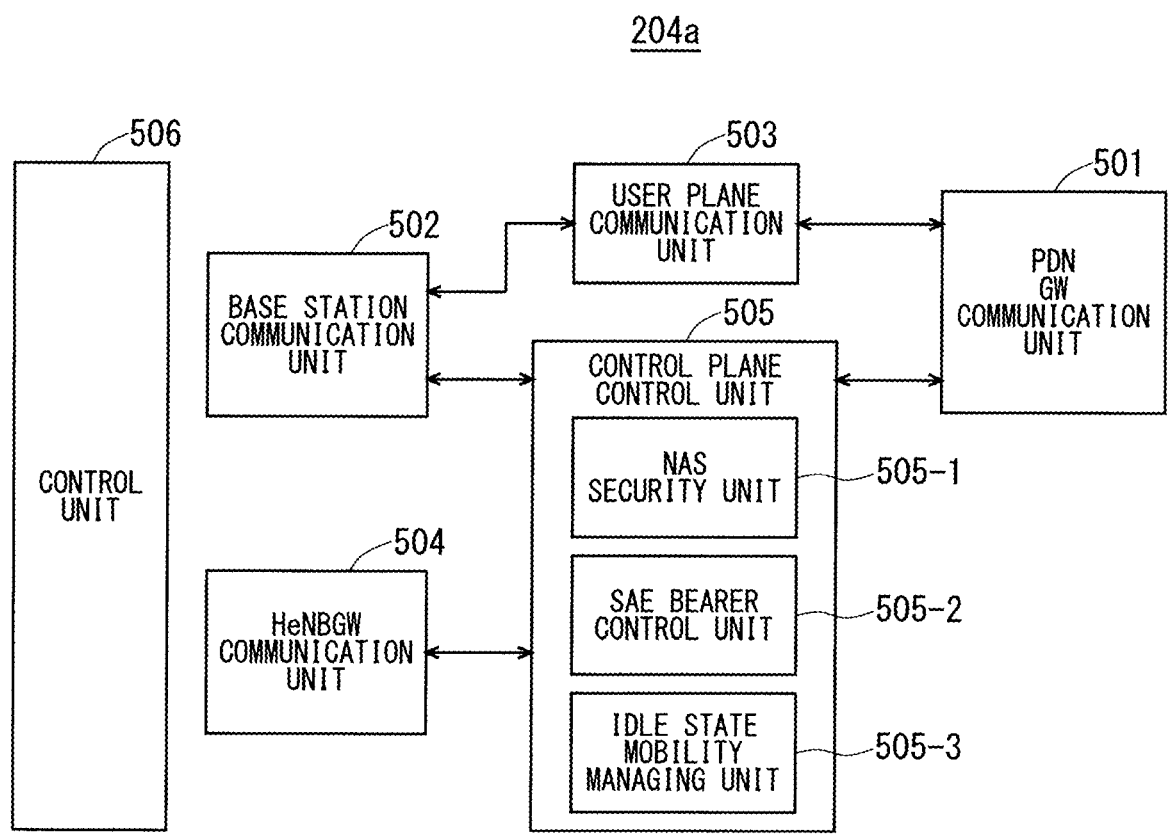

F I G. 6
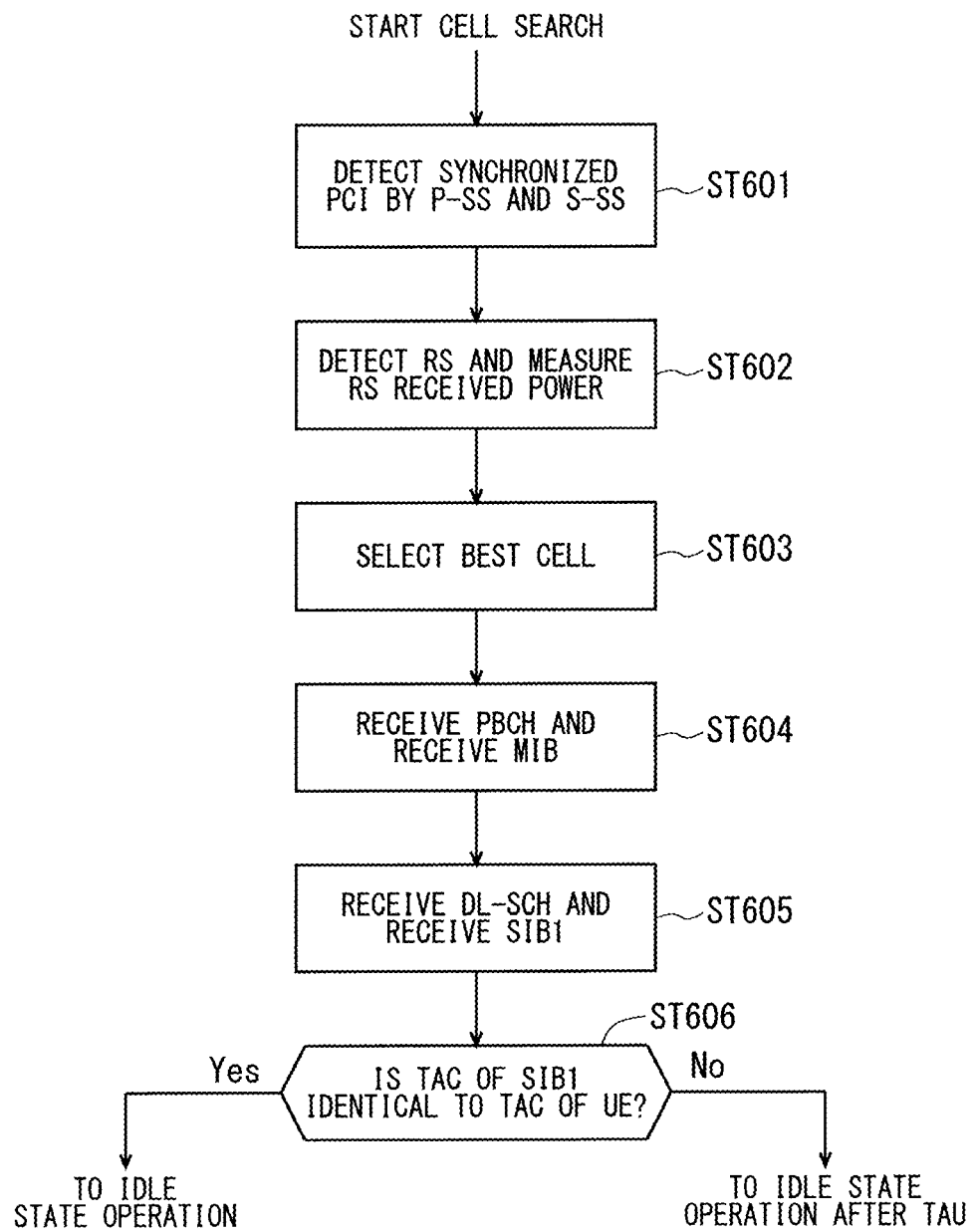

F I G. 8
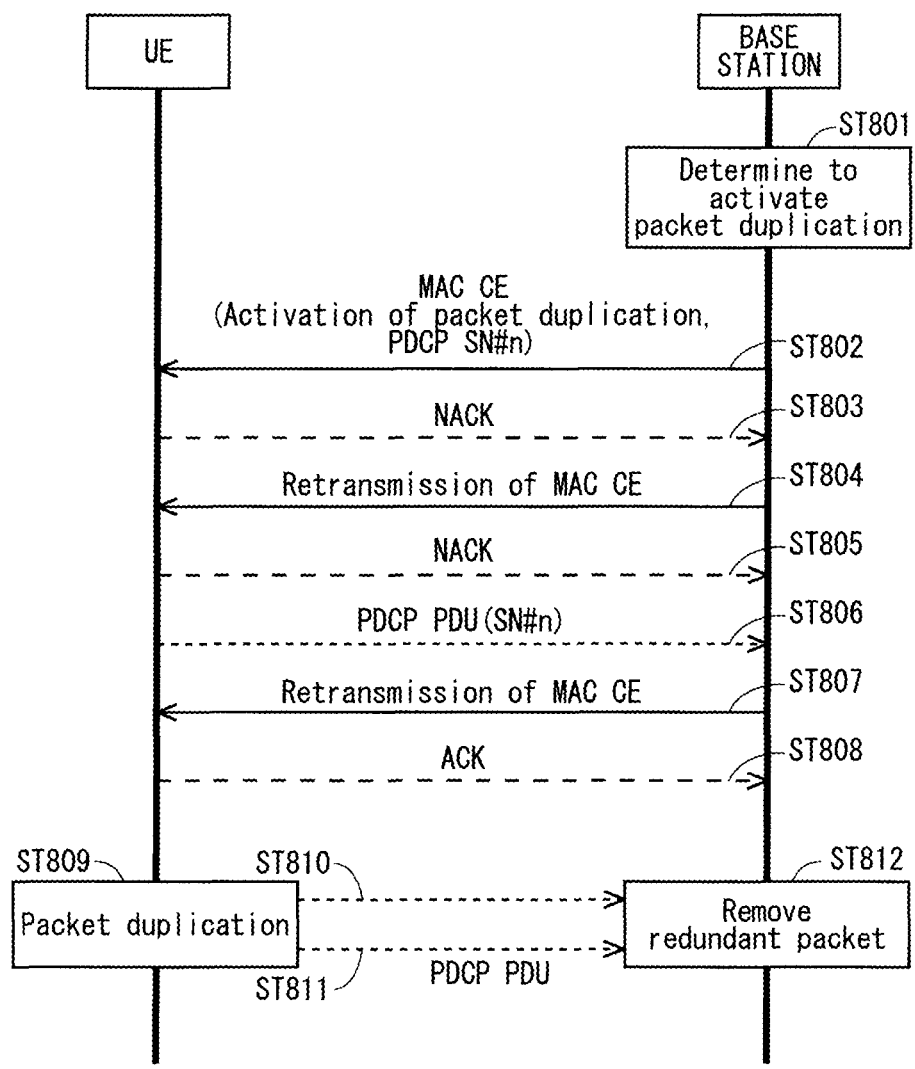

F I G. 9
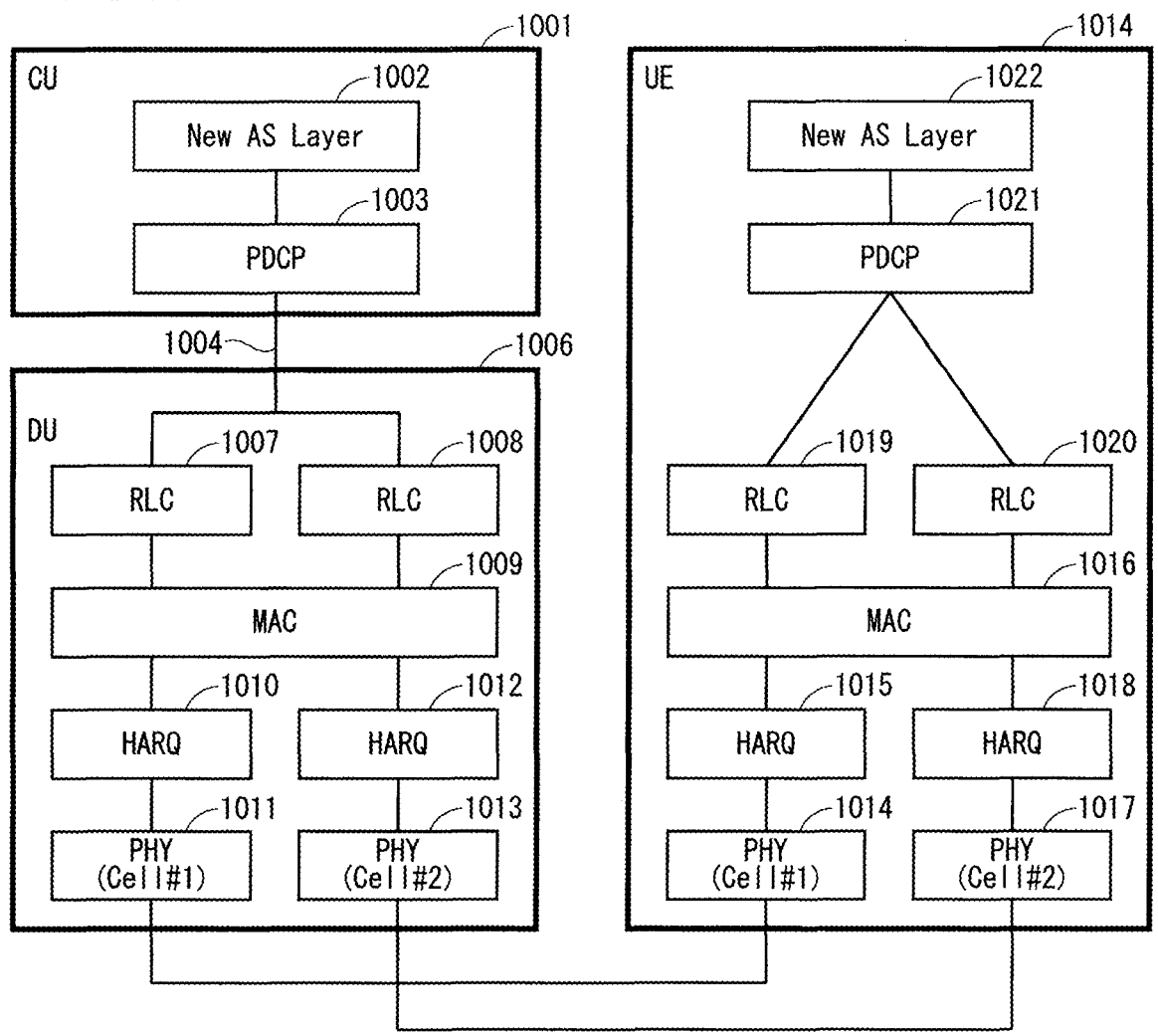

F I G. 2 1
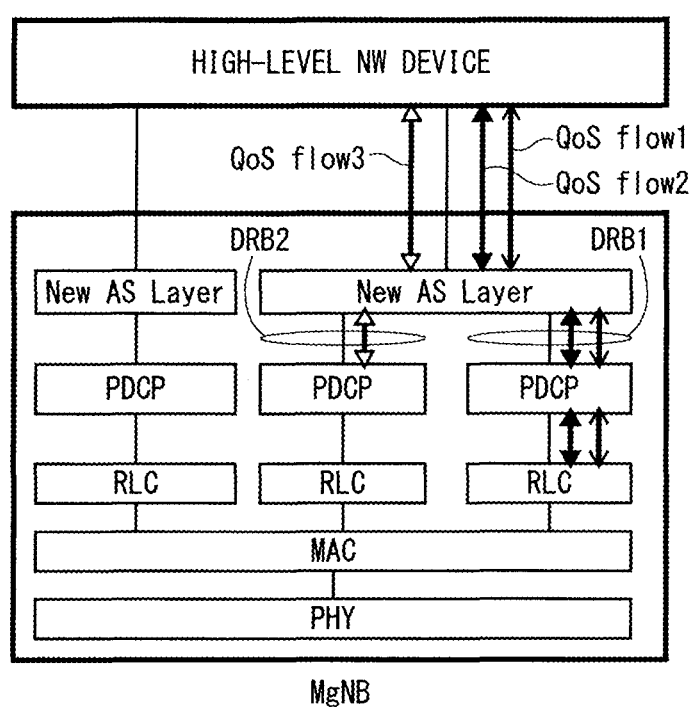

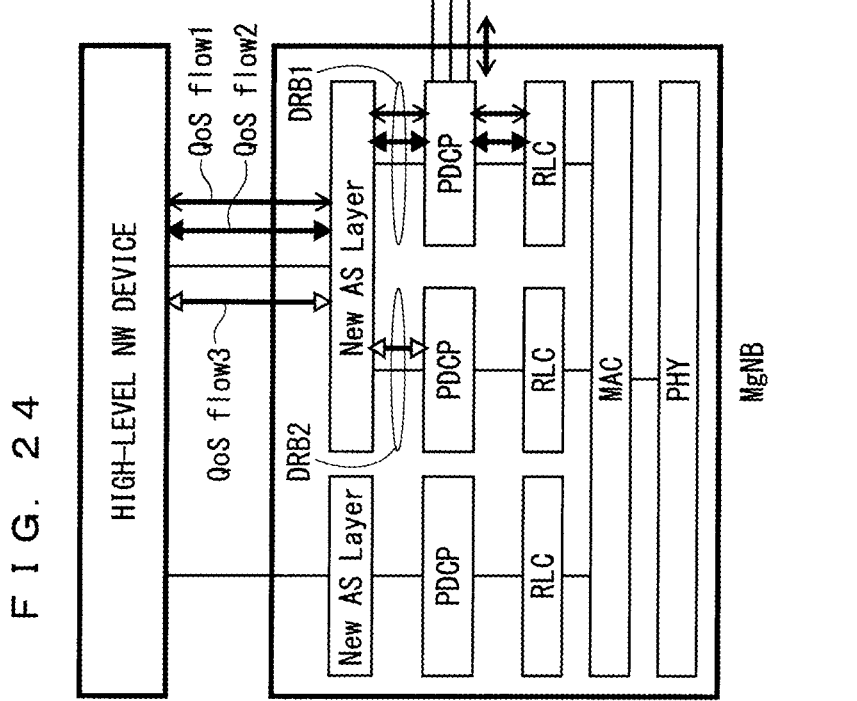
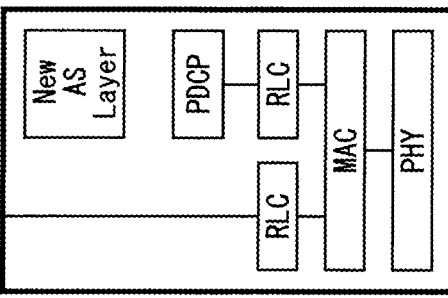
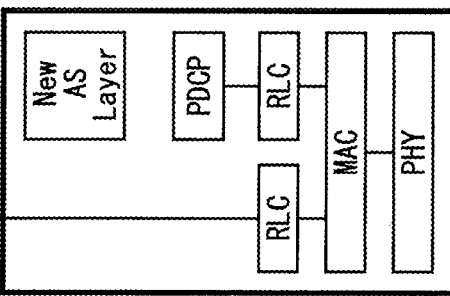
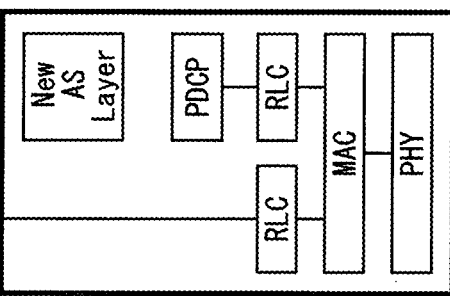
FIG. 24

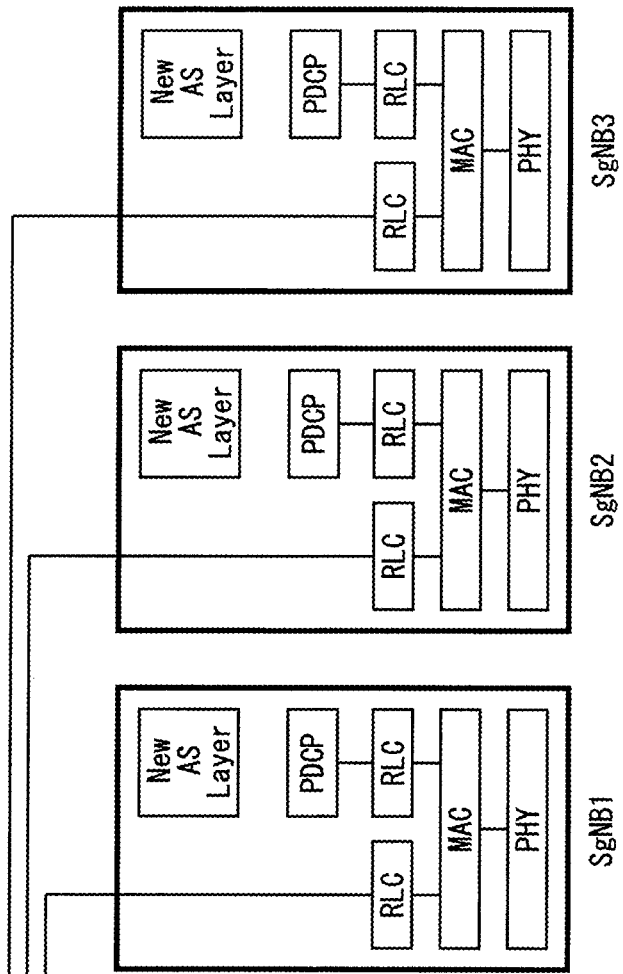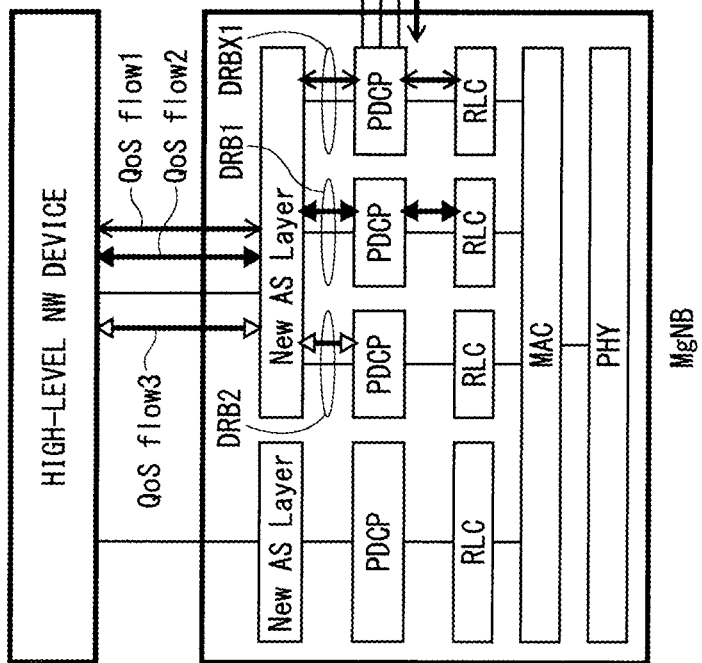
F I G. 2 5

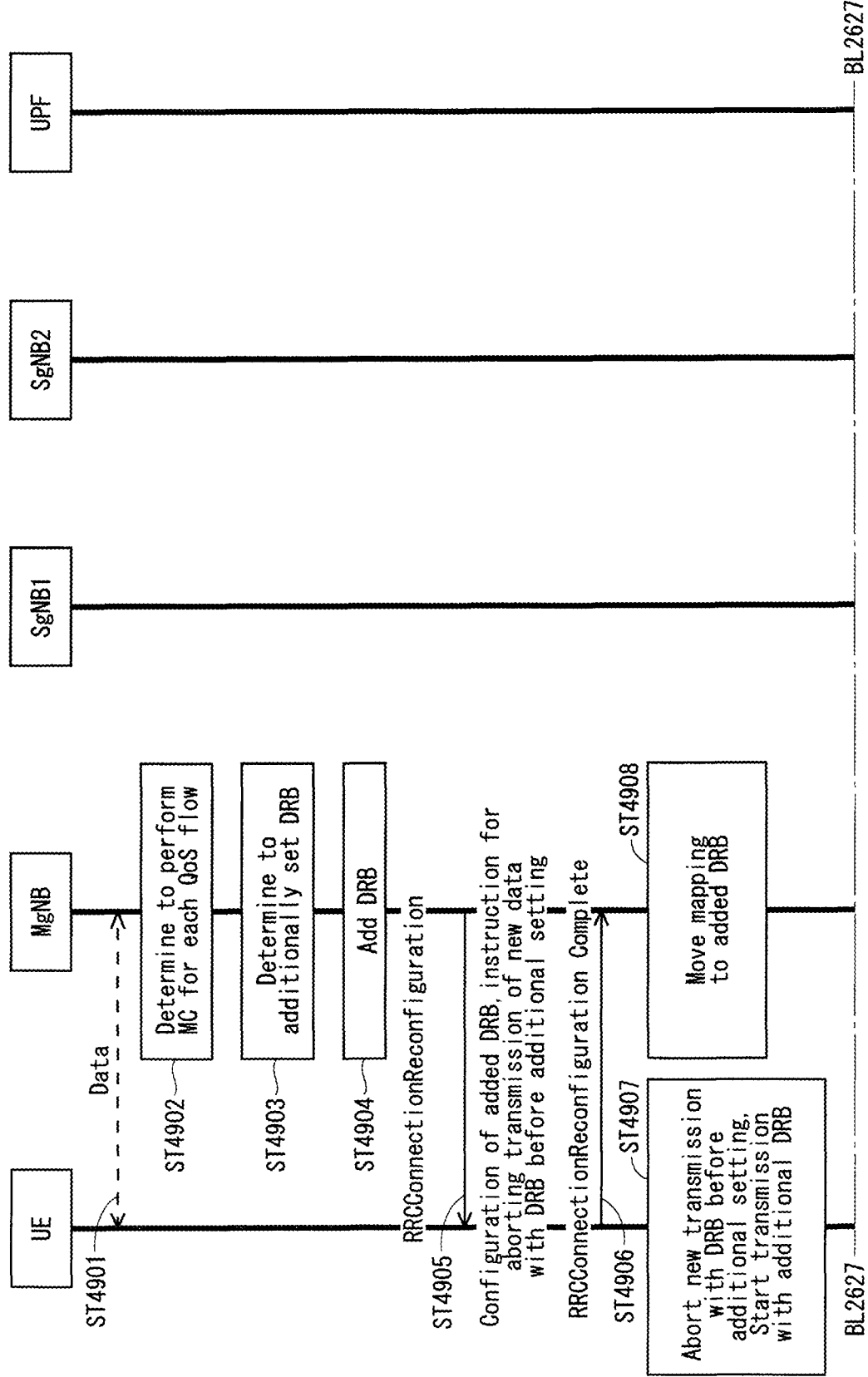

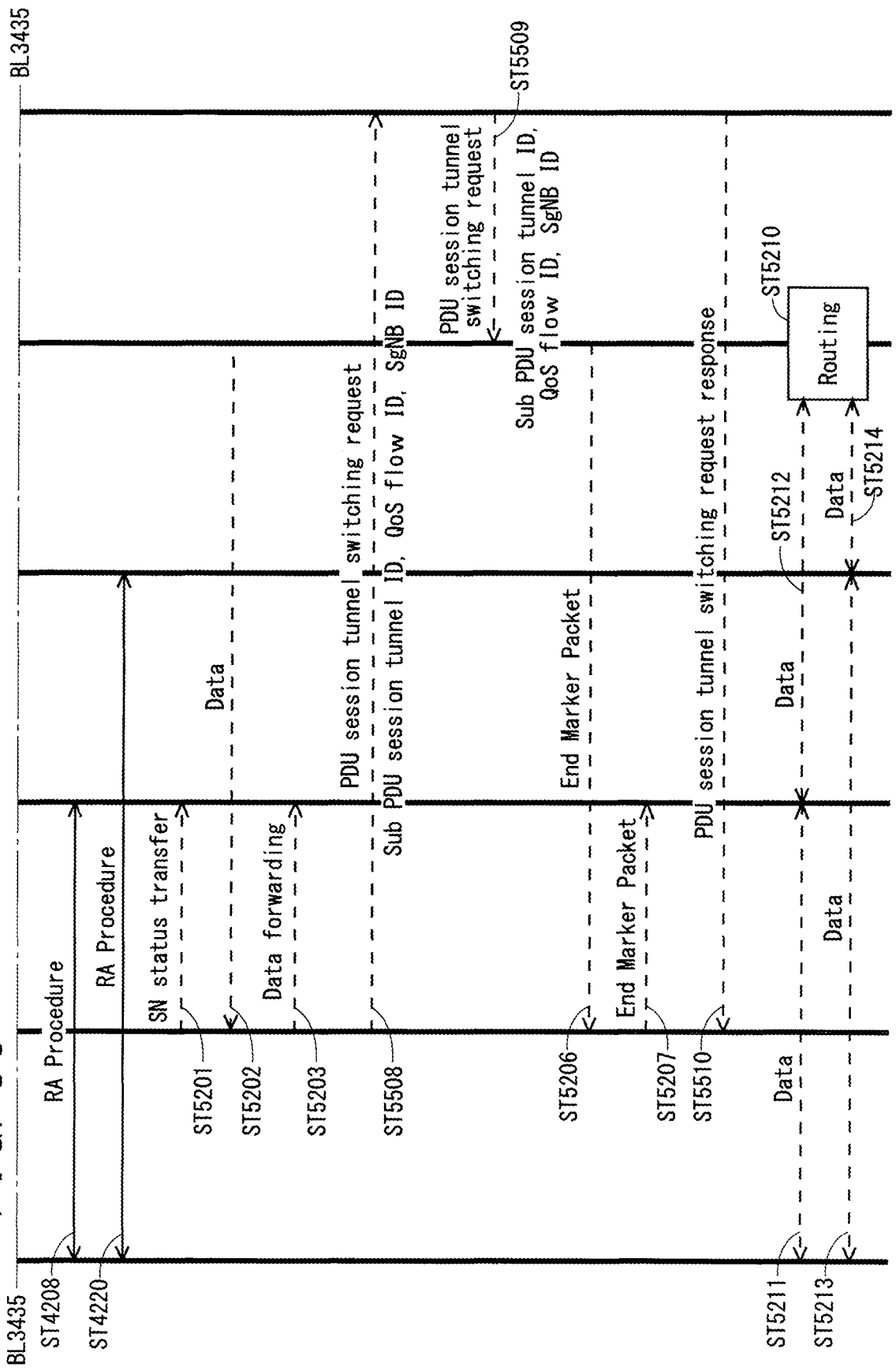
F I G. 35

COMMUNICATION SYSTEM, USER APPARATUS, AND BASE STATION

CROSS-REFERENCE TO RELATED APPLICATIONS

This application is a continuation of and claims the benefit of priority under 35 U.S.C. § 120 from U.S. application Ser. No. 17/394,529 filed Aug. 5, 2021, which is a continuation of U.S. application Ser. No. 16/633,307 (now U.S. Pat. No. 11,116,025) filed Jan. 23, 2020, the entire contents of which are incorporated herein by reference. U.S. application Ser. No. 16/633,307 is a National Stage of PCT/JP2018/029566 filed Aug. 7, 2018, which claims the benefit of priority under 35 U.S.C. § 119 from Japanese Application No. 2017-152932 filed Aug. 8, 2017.

TECHNICAL FIELD

The present invention relates to a communication system, etc., in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursed as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 14 in 3GPP (see Non-Patent Documents 6 to 10). The techniques on 5G radio sections are referred to as "New Radio Access Technology" ("New Radio" is abbreviated as NR), and the several new techniques are being studied (see Non-Patent Documents 11 to 14). Examples of such studies include packet duplication with the DC or multi-connectivity (abbreviated as MC), and split of a gNB into a central unit (CU) and a distributed unit (DU).

PRIOR-ART DOCUMENTS

Non-Patent Documents

Non-Patent Document 1: 3GPP TS36.300 V14.3.0
Non-Patent Document 2: 3GPP S1-083461
Non-Patent Document 3: 3GPP TR 36.814 V9.2.0
Non-Patent Document 4: 3GPP TR 36.912 V14.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.1.0
Non-Patent Document 9: 3GPP TR 38.804 V14.0.0
Non-Patent Document 10: 3GPP TR 38.912 V14.0.0
Non-Patent Document 11: 3GPP R2-1700672
Non-Patent Document 12: Draft Report of 3GPP TSG RAN WG2 meeting #98, Hangzhou, China, 15-19 May, 2017
Non-Patent Document 13: 3GPP R2-1704578
Non-Patent Document 14: 3GPP R2-1704660
Non-Patent Document 15: 3GPP TS 36.321 v14.3.0
Non-Patent Document 16: 3GPP R2-1706867
Non-Patent Document 17: 3GPP TS36.322 v14.0.0
Non-Patent Document 18: 3GPP R3-171412
Non-Patent Document 19: 3GPP R2-1706716
Non-Patent Document 20: 3GPP R2-1704836
Non-Patent Document 21: 3GPP R2-1702753
Non-Patent Document 22: 3GPP R2-1704001
Non-Patent Document 23: 3GPP TS36.423 v14.3.0
Non-Patent Document 24: 3GPP TS36.331 v14.3.0
Non-Patent Document 25: 3GPP R2-1704425
Non-Patent Document 26: 3GPP R2-1704420
Non-Patent Document 27: 3GPP R2-167583
Non-Patent Document 28: 3GPP TS37.340 v0.2.0
Non-Patent Document 29: 3GPP TS38.423 v0.1.1

SUMMARY

Problems to be Solved by the Invention

In NR, a technology on the packet duplication for duplicating a packet to transmit the identical packets has been proposed to implement communication with high reliability and low latency. A method using the CA or the DC has been proposed as a method for implementing the packet duplication. The activation/deactivation of the packet duplication is controlled via the MAC signaling.

As a conventional technology, the MAC signaling for activating/deactivating operations of an SCell to be used for the CA is supported. However, none discloses operations in NR with the CA when the MAC signaling for the packet duplication contends with the MAC signaling for activating/deactivating the SCell. Thus, upon occurrence of the contention, the UE does not know how to perform processes for the packet duplication, and thus may malfunction. As a result, the communication with high reliability and low latency may not be implemented.

In NR, the MC has been proposed as a technology for implementing high-speed communication. Configuring the connection of one UE to one master base station and a plurality of secondary base stations has been discussed as the MC. However, none discloses, in the MC using two or more secondary base stations, an architecture including a high-level NW and a method for setting the MC, for example, how to set the two or more secondary base stations. Thus, the master base station and the secondary base stations cannot configure the MC. Moreover, the UE cannot implement the high-speed communication.

In view of the problems, one of the objects of the present invention is to provide a high-speed communication system with high reliability and low latency, etc., under NR.

Means to Solve the Problems

The present invention provides, for example, a communication system including a communication terminal device, and a base station device configured to perform radio communication with the communication terminal device, wherein the communication terminal device is configured to duplicate a packet and transmit the duplicated packets with carrier aggregation, the base station device is configured to transmit, to the communication terminal device, packet duplication control on packet duplication and secondary cell control on a secondary cell to be used for the carrier aggregation, and the communication terminal device is configured to perform the packet duplication control and the secondary cell control based on priorities defined between the packet duplication control and the secondary cell control.

The present invention also provides, for example, a communication terminal device configured to perform radio communication with a base station device, wherein the communication terminal device is configured to duplicate a packet and transmit the duplicated packets with carrier aggregation, and the communication terminal device is configured to receive, from the base station device, packet duplication control on packet duplication and secondary cell control on a secondary cell to be used for the carrier aggregation, and perform the packet duplication control and the secondary cell control based on priorities defined between the packet duplication control and the secondary cell control.

The present invention also provides, for example, a base station device configured to perform radio communication with a communication terminal device, wherein the communication terminal device is configured to duplicate a packet and transmit the duplicated packets with carrier aggregation, the communication terminal device is configured to perform packet duplication control on packet duplication and secondary cell control on a secondary cell to be used for the carrier aggregation, based on priorities defined between the packet duplication control and the secondary cell control, and the base station device is configured to transmit the packet duplication control and the secondary cell control to the communication terminal device.

Effects of the Invention

The present invention can provide a high-speed communication system, etc., with high reliability and low latency under NR.

The objects, features, aspects and advantages of the present invention become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 5 is a block diagram showing the configuration of an MME according to the present invention.

FIG. 6 is a flowchart showing an outline from a cell search to an idle state operation performed by a communication terminal (UE) in the LTE communication system.

FIG. 8 is a sequence diagram illustrating operations when the UE receives the MAC signaling for activating packet duplication after a specified timing due to occurrence of the HARQ retransmission.

FIG. 9 illustrates a protocol configuration in the packet duplication with the CA to be performed between a gNB with the CU-DU split and the UE according to the first modification of the first embodiment.

FIG. 21 illustrates an architecture and a dataflow when a high-level NW is an NG-CN and a base station is a gNB in NR according to the first modification of the sixth embodiment.

FIG. 24 is a conceptual diagram illustrating a dataflow when the MC is set for each QoS flow according to the first modification of the sixth embodiment.

FIG. 25 is a conceptual diagram illustrating a dataflow in additionally setting a DRB to which the QoS flow, on which the MC is performed, is mapped according to the first modification of the sixth embodiment.

FIG. 26 illustrates an example sequence for setting the MC for each QoS flow according to the first modification of the sixth embodiment.

FIG. 35 illustrates the example sequence for setting the MC with the SCG bearer when the high-level NW is the NG-CN according to the first modification of the seventh embodiment.

DESCRIPTION OF EMBODIMENTS

The First Embodiment

Figure 2:
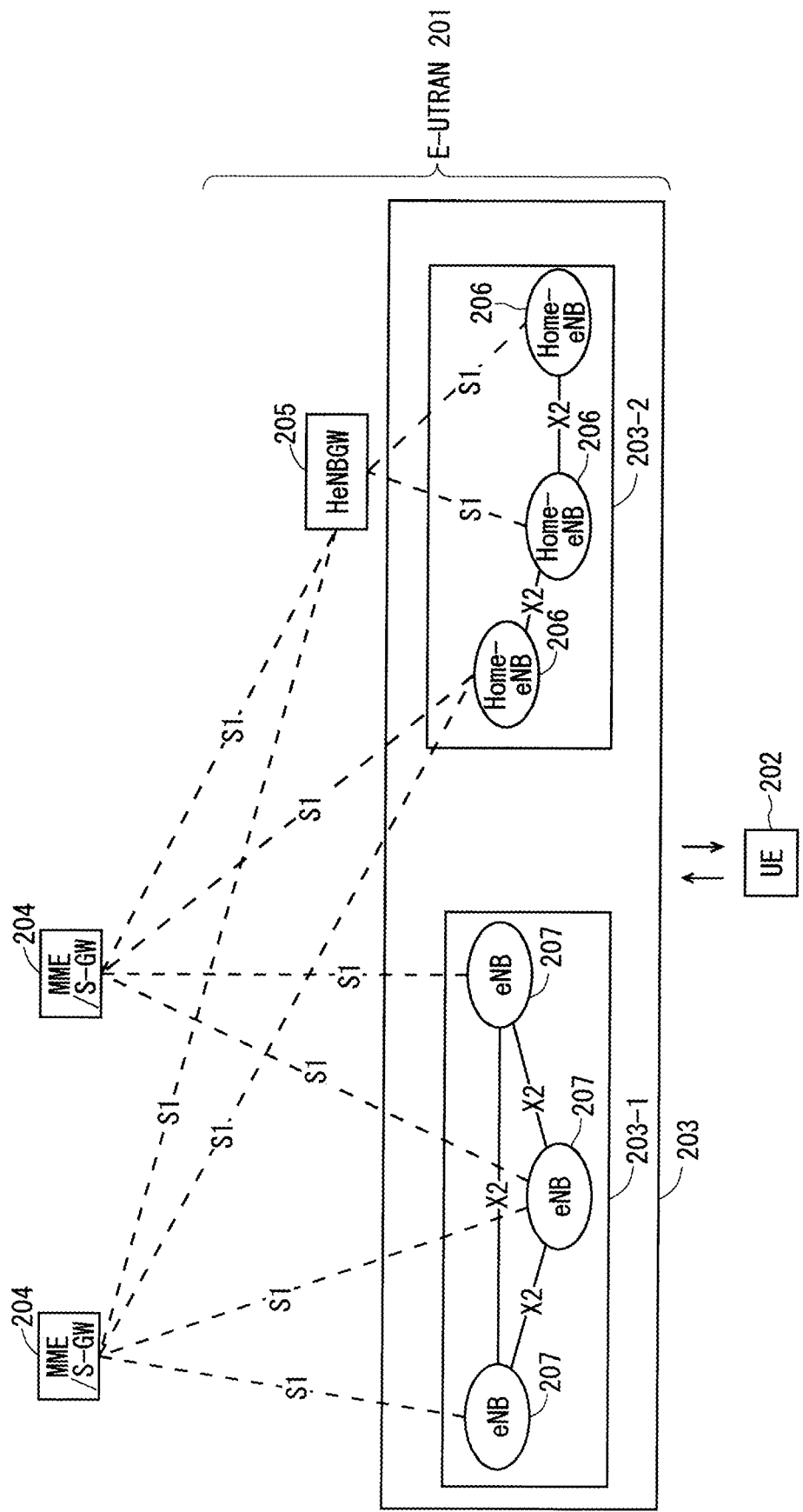
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 is equipped with an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNB s 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Alternatively, the Home-eNB s 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In a case where one base station device 203 configures a plurality of cells, every cell is configured so as to communicate with the user equipment 202.

Figure 3:
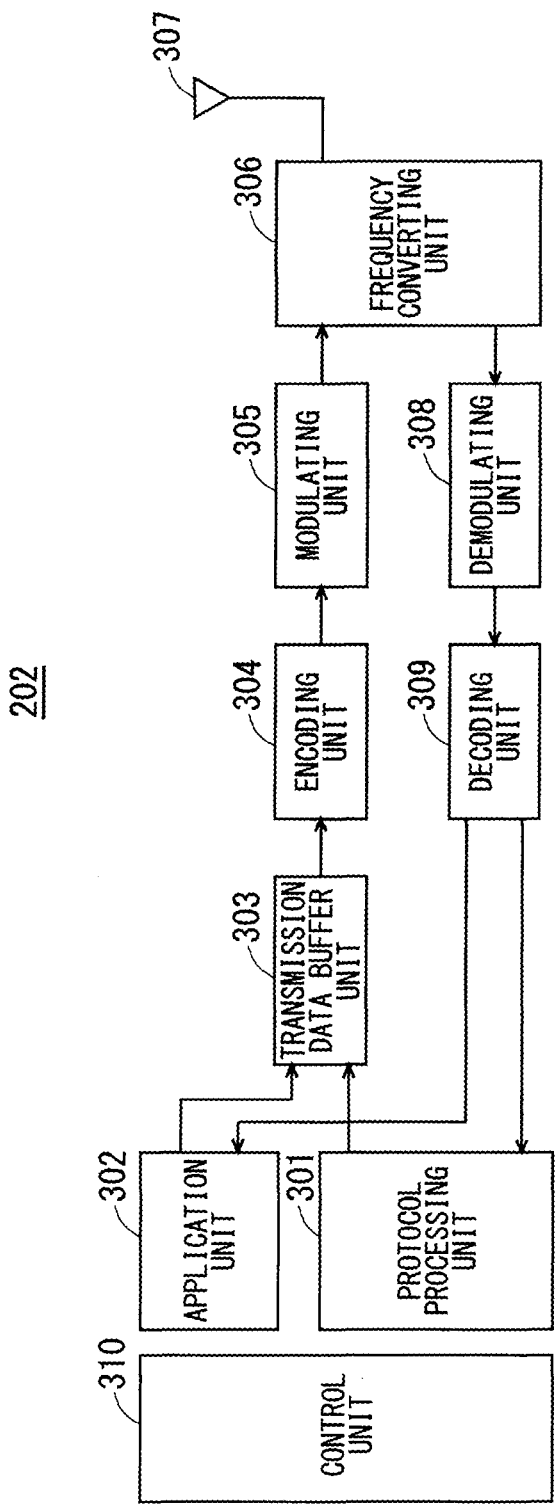
FIG. 3 is a block diagram showing the configuration of a user equipment 202 shown in FIG. 2, which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
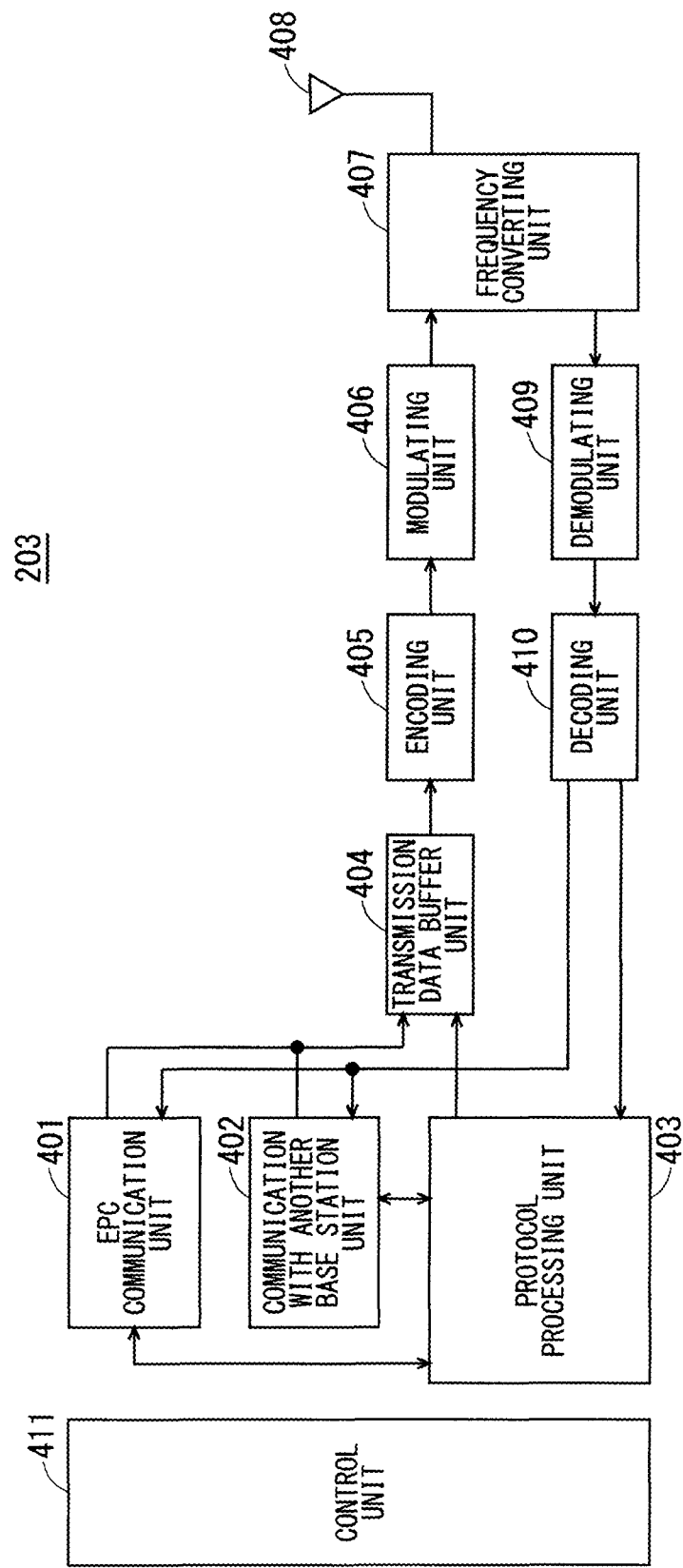
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 is described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
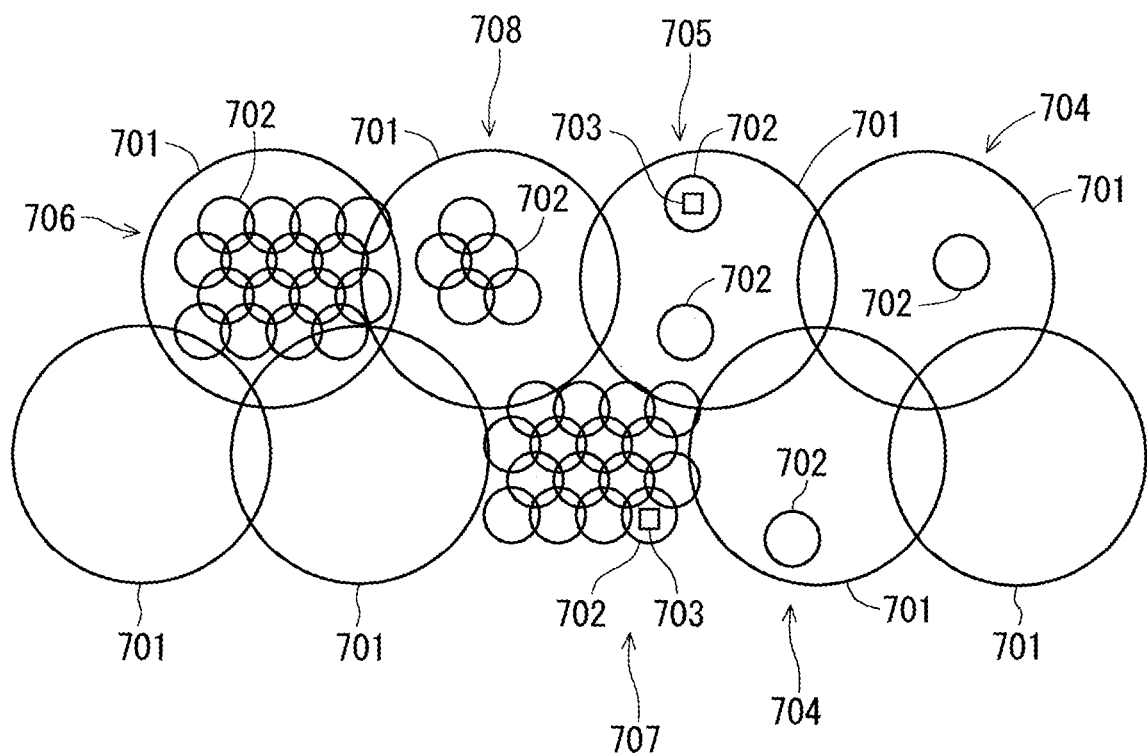
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNB s in a complicated manner.

As indicated by a reference "707", the coverage 701 of the macro cell configured by a macro eNB need not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

One of the services in NR is Ultra Reliability, Low Latency Communication (URLLC) requiring the communication with low latency and high reliability. In the 3GPP standardization meeting, supporting the packet duplication in the PDCP layer has been agreed for satisfying both the low latency and the high reliability (see Non-Patent Document 11 (3GPP R2-1700672)). In NR, the packet duplication is performed using the configuration of carrier aggregation (CA) (see Non-Patent Document 9 (3GPP TR 38.804 V14.0.0)).

In the packet duplication, associating a logical channel through which each of duplicated packets passes with a radio carrier to be used for transmitting each of the packets, based on the setting with the RRC signaling has been agreed in the 3GPP meeting (see Non-Patent Document 12 (Draft Report of 3GPP TSG RAN WG2 meeting #98, Hangzhou, China, 15-19 May, 2017)). Moreover, controlling activation/deactivation of the packet duplication via the MAC signaling has been agreed in the 3GPP meeting (see Non-Patent Document 12).

Including, in the MAC signaling for controlling activation/deactivation of the packet duplication, an identifier of a bearer and a PDCP sequence number for activating/deactivating the packet duplication has been proposed (see Non-Patent Document 13 (3GPP R2-1704578)). Including an identifier of a logical channel in the MAC signaling has also been proposed (see Non-Patent Document 14 (3GPP R2-1704660)).

In the conventional LTE, activation/deactivation of an SCell is supported (see Non-Patent Document 15 (3GPP TS36.321 v14.3.0)). A base station controls the activation/deactivation of the SCell for the UE. The MAC signaling is used for this control. After receiving the MAC signaling, the UE starts or stops transmission and reception using the SCell at a preset timing.

Regarding the packet duplication and the SCell control, preventing the packet duplication by controlling activation of the packet duplication during a deactivated state of the SCell, or performing the packet duplication by activating the SCell has been proposed (see Non-Patent Document 16 (3GPP R2-1706867)). Deactivating the packet duplication through implicit deactivation of the SCell upon expiration of an SCell deactivation timer during an activated state of the packet duplication, or continuing the packet duplication with continuation of activation of the SCell has also been proposed (see Non-Patent Document 16).

However, none discloses details of contention processes, in a contention between the packet duplication and the SCell control which is described in Non-Patent Document 16. Moreover, none discloses operations when the MAC signaling for the packet duplication contends with the MAC signaling for activating/deactivating the SCell. Thus, upon occurrence of the contention, the UE does not know how to perform the processes for the packet duplication, and thus may malfunction.

The following problem may occur, when the MAC signaling for controlling the packet duplication includes a PDCP sequence number and the MAC signaling undelivered from the base station to the UE causes repetition of the HARQ retransmission. In other words, when the UE starts to transmit a PDCP PDU with the PDCP sequence number during the repeated HARQ retransmission, the UE does not know how to perform the processes for the packet duplication after normally receiving the MAC signaling. Thus, the UE may malfunction.

The first embodiment discloses a method for solving such a problem.

Priorities are defined between the packet duplication control and the SCell control. The UE may prioritize the SCell control over the packet duplication control. The SCell control may be the MAC signaling for deactivating the SCell. For example, the UE which is activating the packet duplication may deactivate the packet duplication upon receipt of the MAC signaling for deactivating the SCell. Consequently, the power consumption in the UE and the base station can be reduced.

The deactivation of the packet duplication may be stop of transmission of duplicated packets in a radio section, cancelation of the association between a logical channel and a transmission carrier, or a combination of these two. The timings of these two may be identical or different. The same may apply to the following description according to the present invention.

According to the present invention, the activation of the packet duplication may be start of transmission of the duplicated packets in the radio section, start of the association between the logical channel and the transmission carrier, or a combination of these two. The timings of these two may be identical or different.

The UE may deactivate the packet duplication at the timing to deactivate the SCell. Consequently, the complexity in the control in the UE can be avoided. Alternatively, the UE may deactivate the packet duplication at the time of receiving the MAC signaling for deactivating the SCell. The time of receiving the MAC signaling may be, for example, immediately after receiving the MAC signaling. The resources can be saved. Another example timing to deactivate the packet duplication may be at the completion of transmission of all the PDCP PDUs that are being transmitted at the time of receiving the MAC signaling. This can ensure the reliability in transmitting the PDCP PDUs, and prevent the buffer occupancy occurring when the RLC in the base station cannot receive all the PDCP PDUs.

Alternatively, the base station may notify the UE of the timing to deactivate the packet duplication. This enables flexible operations of the packet duplication. The notification may be included in the MAC signaling for deactivating the SCell. The L1/L2 signaling may be used.

The aforementioned method differs from Non-Patent Document 16 (3GPP R2-1706867) in not implicit deactivation of the SCell but explicit deactivation of the SCell using the MAC signaling.

The deactivation timing may be indicated by a PDCP sequence number. This can prevent the buffer occupancy occurring when the RLC in the base station cannot receive all the PDCP PDUs. Alternatively, the deactivation timing may be a physical timing. Direct control over radio resources can prevent transmission and reception of an unnecessary radio signal. The physical timing may be indicated by, for example, a physical frame number, a subframe number, a slot number, a mini-slot number, or another information representing a timing. Alternatively, the physical timing may be a time up to the deactivation timing. The base station and the UE can appropriately perform processes for deactivating the packet duplication.

The UE may retain an activation/deactivation state of the packet duplication. The UE may retain the state using, for example, a flag for controlling the packet duplication. The state may be retained upon deactivation of the SCell. The UE may activate or deactivate the packet duplication in the retained state. The UE may activate or deactivate the packet duplication, for example, upon activation of the SCell. For example, the UE, which has deactivated the SCell during an activated state of the packet duplication, may resume the activation of the packet duplication upon receiving again the MAC signaling for activating the SCell. This enables, for example, reduction in the amount of the MAC signaling because the MAC signaling to be used for activating/deactivating the packet duplication upon activation of the SCell can be unnecessary.

An initial value may be assigned to the activation/deactivation state of the packet duplication. The initial value may be defined in a standard, or notified from the base station to the UE. The notification may be given via the RRC signaling, for example, the RRC-dedicated signaling.

The UE may determine the PDCP SN in resuming the packet duplication to resume the activation of the packet duplication. For example, after resuming the SCell, the UE may resume the activation of the packet duplication from the PDCP PDU that can be transmitted the earliest. This facilitates the packet duplication control in the UE. Alternatively, the base station may notify the UE of the timing to resume the packet duplication. The notification may include an identifier of a logical channel or a PDCP sequence number. The notification may be information indicating a physical timing. The notification may be included in the MAC signaling for starting (resuming) of the activation of the SCell to be transmitted from the base station to the UE.

The UE may update the activation/deactivation state of the packet duplication. The UE may update the state using the MAC signaling for activating or deactivating the packet duplication. The UE may perform the update in an activated state of the SCell or in a deactivated state of the SCell. This can disperse the MAC signaling for the activation/deactivation of the SCell and the packet duplication. Alternatively, the UE need not update the activation/deactivation state of the packet duplication during a deactivated state of the SCell. Consequently, the complexity in the packet duplication control in the base station and the UE can be avoided.

The UE need not retain the activation/deactivation state of the packet duplication. The memory usage in the UE can be reduced. The UE may deactivate the packet duplication upon start or resumption of the activation of the SCell. The usage of radio resources can be reduced. Alternatively, the UE may activate the packet duplication upon start or resumption of the activation of the SCell. The reliability of communication upon activation of the SCell can be ensured.

The activation/deactivation state of the packet duplication may be set per bearer. This enables flexible operations of the packet duplication.

The UE may prioritize the packet duplication control over the SCell control. The MAC signaling for deactivating the SCell may be used for the SCell control. For example, the UE which is activating the packet duplication may continue the packet duplication even upon receipt of the MAC signaling for deactivating the SCell. Consequently, the reliability in the packet duplication by the UE can be enhanced.

The UE may notify the base station that the deactivation of the SCell is disabled. The UE may give the notification via the MAC signaling or the L1/L2 signaling. The notification may include a cause for being disabled. The cause may be, for example, "during an activated state of the packet duplication". The UE may notify an identifier of a logical channel during an activated state of the packet duplication as well. The UE may notify an identifier of a bearer during an activated state of the packet duplication. Consequently, the base station can perform a smooth control after the deactivation of the SCell is disabled.

The priorities of the packet duplication control and the SCell control may be determined using a packet to be duplicated. The UE may determine whether to deactivate the SCell using information on the packet to be duplicated. This enables flexible control based on the packet to be duplicated.

As an example determination on the priorities using the packet to be duplicated, the priorities may be determined according to a classification of, for example, SRBs or DRBs. For example, the packet duplication may be prioritized for the SRBs, whereas the SCell control may be prioritized for the DRBs. This enables flexible control depending on a type of bearer.

Alternatively, the priorities may be determined for each bearer. For example, the packet duplication may be prioritized for the SRB0 and the SRB1, whereas the SCell control may be prioritized for the SRB2, the SRB3, and the DRBs. For example, regarding the DRB s, the packet duplication may be prioritized for a DRB, whereas the SCell control may be prioritized for other DRBs. This enables more flexible control for each bearer.

The priorities may be determined in a standard, or notified in advance from the base station to the UE via the RRC signaling. The priorities may be notified via the MAC signaling. This enables flexible control.

The UE may notify the base station that the deactivation of the SCell is disabled. The UE may give the notification when a packet for which the packet duplication is prioritized is used, for example, when a bearer for which the packet duplication is prioritized uses the SCell. The notification method and information included in the notification may be identical to those previously described. Consequently, the base station can perform a smooth control after the deactivation of the SCell is disabled.

The priorities between the packet duplication control and the SCell control may be applied when a plurality of packets are communicated using the SCell. The plurality of packets may be, for example, a combination of packets for which the packet duplication is prioritized and packets for which the SCell control is prioritized.

In the aforementioned description, the packet duplication may be prioritized. For example, during an activated state of the packet duplication of the plurality of packets, the MAC signaling for deactivating the SCell may be disabled. In other words, the packet duplication may be continued. This can ensure the reliability in the packet for which the packet duplication is prioritized. The UE may notify the base station that the deactivation of the SCell is disabled. The notification method and information included in the notification may be identical to those previously described. Consequently, the base station can perform a smooth control after the deactivation of the SCell is disabled.

The UE and the base station may deactivate the packet duplication in a part of packets. The part of packets may be, for example, packets for which the SCell control is prioritized. The UE and the base station may continue the packet duplication of a packet for which the packet duplication is prioritized. This facilitates the control over the SCell in the base station.

Alternatively, the UE and the base station need not deactivate the packet duplication in the part of packets. This can ensure the reliability in the communication of the packets.

The UE and the base station may deactivate the SCell when deactivating the packet duplication of the packet for which the packet duplication is prioritized. The power consumption can be reduced. The UE may notify the base station that the deactivation of the SCell is enabled. The notification may include a cause for being enabled. The cause may be, for example, the deactivation of the packet duplication of the packet for which the packet duplication is prioritized. The notification may include information on the packet, for example, an identifier of a bearer.

Alternatively, the UE and the base station need not deactivate the SCell even when deactivating the packet duplication of the packet for which the packet duplication is prioritized. This facilitates the control over the SCell.

The SCell control may be prioritized as another example of the assignment of the priorities between the packet duplication control and the SCell control when a plurality of packets are communicated. For example, during an activated state of the packet duplication of the plurality of packets, the MAC signaling for deactivating the SCell may be enabled. In other words, the SCell may be deactivated. The power consumption can be reduced.

The control of activating the packet duplication may be prioritized over a deactivated state of the SCell as an example assignment of the priorities between the packet duplication control and the SCell control. In other words, the UE may activate the packet duplication. The activation of the SCell should be started. The MAC signaling may be used for controlling activation of the packet duplication. This can ensure the reliability.

Alternatively, the deactivated state of the SCell may be prioritized over the control of activating the packet duplication. In other words, the UE may maintain the deactivation of the SCell.

The UE may notify the base station that the packet duplication is disabled. The UE may give the notification during or upon deactivation of the SCell. The UE may give the notification via the MAC signaling or the L1/L2 signaling. The notification may include a target logical channel identifier. The notification may include the cause why the packet duplication is disabled. The cause may be, for example, "during a deactivated state of the SCell". This enables the base station to appropriately and promptly control the packet duplication.

The UE whose control of activating the packet duplication is disabled may activate the packet duplication using the control for activating the SCell. The control for activating the SCell may be the MAC signaling for instructing activation of the SCell. When the UE activates the packet duplication, the UE may use the activation/deactivation state of the packet duplication. For example, the UE may set the state to "activation" using the control of activating the packet duplication, for example, using the MAC signaling for activating the packet duplication.

The control of deactivating the packet duplication may be prioritized over an activated state of the SCell as another example assignment of the priorities between the packet duplication control and the SCell control. In other words, the UE may deactivate the SCell using the MAC signaling for deactivating the packet duplication. The UE may deactivate the SCell when there is no other bearer for the UE to communicate with the base station using the SCell. This can reduce the power consumption of the UE.

The base station may include, in the MAC signaling for controlling the activation/deactivation of the packet duplication, information indicating the activation/deactivation timing of the packet duplication. The timing may be a physical timing. Direct control of radio resources can prevent transmission and reception of an unnecessary radio signal. The physical timing may be indicated by, for example, a physical frame number, a subframe number, a slot number, a mini-slot number, or another information representing a timing. Alternatively, the physical timing may be a time up to the activation/deactivation timing. The base station and the UE can appropriately perform processes for deactivating the packet duplication.

The UE may activate/deactivate the packet duplication at the activation/deactivation timing. Alternatively, the UE may activate/deactivate the packet duplication from a PDCP PDU boundary that is the earliest since the activation/deactivation timing. This can prevent discontinuous transmission operations of the UE due to the activation/deactivation of the packet duplication. This can also prevent the buffer occupancy occurring when the RLC in the base station cannot receive all the PDCP PDUs.

Another information indicating the activation/deactivation timing may be a PDCP sequence number. This can prevent the buffer occupancy occurring when the RLC in the base station cannot receive all the PDCP PDUs.

The base station need not include, in the MAC signaling for controlling the activation/deactivation of the packet duplication, information indicating the activation/deactivation timing of the packet duplication. The UE may activate/deactivate the packet duplication immediately after receiving the MAC signaling. For example, the UE may activate/deactivate the packet duplication from the timing (e.g., subframe, slot, mini-slot, or TTI) immediately after receiving the MAC signaling. The timing to activate/deactivate the packet duplication may be the next scheduling timing after the UE returns Ack in response to the MAC signaling. Alternatively, the timing to activate/deactivate the packet duplication may be the PDCP PDU boundary that is the earliest since the reception timing of the MAC signaling in the UE. Alternatively, the UE may activate/deactivate the packet duplication after a lapse of a predetermined duration since receipt of the MAC signaling. The predetermined duration may be predefined in a standard, or broadcast from the base station to the UE. The predetermined duration may be notified dedicatedly from the base station to the UE. The dedicated notification may be given via the RRC signaling. This enables reduction in the amount of signaling required at the activation/deactivation timing of the packet duplication.

The base station may include, in the MAC signaling for controlling the activation/deactivation of the packet duplication, information for controlling the activation/deactivation of an SCell to be used for the packet duplication. The UE may activate/deactivate the SCell using the information. This enables the base station to flexibly control the SCell with the packet duplication control.

Conversely, the base station may include, in the MAC signaling for controlling the activation/deactivation of the SCell, information for controlling the activation/deactivation of the packet duplication for communication using the SCell. The UE may activate/deactivate the packet duplication using the information. This enables the base station to flexibly control the SCell with the packet duplication control.

Alternatively, the MAC signaling for controlling the activation/deactivation of the packet duplication and the MAC signaling for controlling the activation/deactivation of the SCell may be integrated into one MAC signaling. The one MAC signaling may be set as a new MAC signaling.

Alternatively, the base station may simultaneously transmit the MAC signaling for controlling the activation/deactivation of the packet duplication and the MAC signaling for controlling the activation/deactivation of the SCell. Both the MAC signalings may be transmitted in the same transport block or different transport blocks. As an example of the transmission in the different transport blocks, the MAC signalings may be transmitted in different carriers. This can expedite the control over both of the SCell and the packet duplication. Alternatively, the MAC signaling for controlling the activation/deactivation of the packet duplication and the MAC signaling for controlling the activation/deactivation of the SCell may be integrated. This can reduce the amount of signaling.

The control of activating the packet duplication may be prioritized over the control of activating the SCell as another example assignment of the priorities between the packet duplication control and the SCell control. For example, the UE may activate the SCell at the timing to activate the packet duplication. The UE may activate the packet duplication. Consequently, the reliability for transmitting a packet from the UE to the base station can be enhanced.

Alternatively, the control of activating the SCell may be prioritized over the control of activating the packet duplication. For example, the UE may activate the packet duplication at the timing to activate the SCell. Consequently, the complexity in the SCell control in the base station and the UE can be avoided.

The UE may notify the base station that activation of the SCell is disabled. The UE may give the notification, for example, when the SCell cannot be activated. The notification may include a cause for being disabled. The cause may be, for example, a fault in a transceiver for carrier frequency of the SCell, or the shortage of resources for the SCell. In response to the notification, the base station may control the activation/deactivation of the other SCells. Consequently, the base station can perform a smooth control after the activation of the SCell is disabled.

The control of activating the packet duplication may be prioritized over the control of deactivating the SCell as another example assignment of the priorities between the packet duplication control and the SCell control. For example, the UE may activate the packet duplication. In other words, the control of deactivating the SCell may be disabled. The operation may be performed, for example, when the SCell operates and the packet duplication is deactivated. This can enhance the reliability for transmitting a packet. The UE may notify the base station that the deactivation of the SCell is disabled. In response to the notification, the base station can appropriately control the radio resources.

Alternatively, the control of deactivating the SCell may be prioritized over the control of activating the packet duplication. For example, the UE may deactivate the SCell. In other words, the control of activating the packet duplication may be disabled. The radio resources can be saved. The UE may notify the base station that the packet duplication is disabled. In response to the notification, the base station can appropriately determine the radio resources to be used for transmission and reception with the UE.

The control of deactivating the packet duplication may be prioritized over the control of deactivating the SCell as another example assignment of the priorities between the packet duplication control and the SCell control. For example, the UE may deactivate the packet duplication at the timing to deactivate the packet duplication. For example, when the timing to deactivate the SCell precedes the timing to deactivate the packet duplication that is indicated by the MAC signaling for deactivating the packet duplication, the UE may wait deactivation of the SCell until the timing to deactivate the packet duplication. This can ensure the reliability for transmitting a packet.

Alternatively, the control of deactivating the SCell may be prioritized over the control of deactivating the packet duplication. For example, the UE may deactivate the packet duplication at the timing to deactivate the SCell. For example, when the timing to deactivate the SCell precedes the timing to deactivate the packet duplication that is indicated by the MAC signaling for deactivating the packet duplication, the UE may deactivate the packet duplication simultaneously with the timing to deactivate the activated SCell. This can ensure the reliability for transmitting a packet.

The UE may determine activation of the packet duplication and activation of the SCell, using the MAC signaling for activating/deactivating the packet duplication and the MAC signaling for activating/deactivating the SCell. For example, the UE may determine to activate the packet duplication, using the MAC signaling for activating the packet duplication or using both of the MAC signaling for activating the packet duplication and the MAC signaling for activating the SCell. The determination using both of the MAC signalings may be obtained by an OR, an AND, or another logical operation of the MAC signalings. Alternatively, for example, the UE may determine to activate the SCell, using the MAC signaling for activating the SCell or using both of the MAC signaling for activating the packet duplication and the MAC signaling for activating the SCell. The determination using both of the MAC signalings may be obtained by an OR, an AND, or another logical operation of the MAC signalings. This enables flexible control over the packet duplication and the activation of the SCell.

A flag on the packet duplication and a flag on the activation of the SCell may replace the MAC signaling for activating/deactivating the packet duplication and the MAC signaling for activating/deactivating the SCell. The flag on the packet duplication may be, for example, a flag retaining the activation/deactivation state of the packet duplication. The flag on the activation of the SCell may, for example, switch its value between the activation and the deactivation according to the MAC signaling for activating/deactivating the SCell. This enables flexible and easy control over the packet duplication and the activation of the SCell.

The UE may duplicate the PDCP PDU in a PDCP layer, regardless of whether the packet duplication is activated/deactivated. The PDCP layer of the UE may transfer the duplicated PDCP PDUs to the RLC layer. The RLC layer may transfer the PDCP PDUs to the MAC layer. The UE may perform the duplicating and/or transferring process using the RRC signaling from the base station. The RRC signaling may be a signaling for associating a logical channel through which each packet to be duplicated passes with a radio carrier to be used for transmitting each packet. The UE may deactivate the duplication and/or transferring, using the RRC signaling from the base station. The RRC signaling may be a signaling for canceling the association between the logical channel through which each packet to be duplicated passes and the radio carrier to be used for transmitting each packet. This enables, for example, the UE to expedite a process of transmitting duplicated packets upon activation of the packet duplication.

The UE may activate/deactivate the packet duplication at the timing of accurately receiving the MAC signaling for controlling activation/deactivation of the packet duplication. The timing of accurately receiving the MAC signaling may be after the timing to activate/deactivate the packet duplication instructed via the MAC signaling. The timing after the timing to activate/deactivate the packet duplication instructed via the MAC signaling may be, for example, the timing when the HARQ retransmission is performed. The timing may be, for example, specified by a PDCP sequence number or a physical timing. The physical timing may be indicated by, for example, a physical frame number, a subframe number, a slot number, or a mini-slot number.

The base station may transmit the MAC signaling to the UE in advance, using a plurality of HARQ processes. All the HARQ processes may be used. This can enhance the reliability in transmission and reception via the MAC signaling.

The base station may stop transmission of the MAC signaling to the UE. The base station may stop transmission of the MAC signaling, for example, upon receipt of Ack from the UE in response to the MAC signaling using the other HARQ processes. This can save the radio resources.

The UE may activate/deactivate the packet duplication using the MAC signaling initially received. The MAC signaling initially received may be, for example, the MAC signaling which the UE has initially received among the MAC signalings transmitted via a plurality of HARQ processes. The UE may ignore or discard the MAC signalings received for the second time and after. This enables the UE to perform a prompt process.

Alternatively, the UE may activate the packet duplication retroactively. The UE may activate the packet duplication by tracing back to the timing to activate the packet duplication instructed via the MAC signaling. The UE may activate the packet duplication using data stored in a buffer of the L2 layer, for example, a buffer of the PDCP layer. This can ensure the reliability of the packet duplication.

Alternatively, the UE may duplicate the packet of data as far as traceable. The UE may perform the operation, for example, when no data up to the timing to activate the packet duplication instructed via the MAC signaling remains. The UE may perform the operation described above when the data up to the timing to activate the packet duplication instructed via the MAC signaling remains. This can ensure the reliability of the packet duplication.

Alternatively, the UE may activate/deactivate the packet duplication at the timing to activate/deactivate the packet duplication instructed via the MAC signaling. The timing to activate/deactivate the packet duplication may be, for example, the timing to activate/deactivate the packet duplication after cycling through all the numbers. For example, upon receiving, from the base station, the MAC signaling for activating the packet duplication from the PDCP PDU sequence number 5 during execution of the process of transmitting the PDCP PDU with the PDCP PDU sequence number 7, the UE may activate the packet duplication from the PDCP PDU with the next PDCP PDU sequence number 5 after cycling through all the PDCP PDU sequence numbers. Consequently, the complexity of design in the UE can be avoided.

FIG. 8 is a sequence diagram illustrating operations when the UE receives the MAC signaling for activating the packet duplication after a specified timing due to occurrence of the HARQ retransmission. Although FIG. 8 illustrates the sequence for activating the packet duplication, it may be applied to deactivation of the packet duplication. Although the PDCP sequence number is used as the specified timing in FIG. 8, a physical timing may be used. The physical timing may be the one previously described.

In Step ST801 of FIG. 8, the base station determines to activate the packet duplication. In Step ST802, the base station notifies the UE of the MAC signaling for activating the packet duplication. The signaling includes an uplink PDCP sequence number n for activating the packet duplication in the UE. In FIG. 8, the UE cannot accurately receive the MAC signaling for activating the packet duplication in Step ST802, and notifies the base station of Nack in Step ST803. Upon receipt of the Nack in Step ST803, the base station retransmits the MAC signaling of Step ST802 to the UE in Step ST804. In FIG. 8, the UE cannot accurately receive the MAC signaling for activating the packet duplication in Step ST804, and notifies the base station of Nack again in Step ST805.

In Step ST806 of FIG. 8, the sequence number of the PDCP PDU at which the UE performs a transmission process reaches n. The UE transmits the PDCP PDU with the sequence number n to the base station without the packet duplication.

In Step ST807 of FIG. 8, the base station performs the second retransmission of the MAC signaling to the UE. In Step ST808, the UE notifies the base station of Ack in response to Step ST807.

In FIG. 8, the UE, which can accurately receive the MAC signaling for activating the packet duplication in Step ST807, activates the packet duplication in Step ST809. In Steps ST810 and ST811, the UE transmits the original packet and the duplicated packet to the base station. In Step ST812, the base station detects identical packets, and removes one of the packets.

The base station may set the RLC layer for duplicated packets. The base station may make the setting immediately after determining to activate the packet duplication. The base station can promptly activate the packet duplication even when the time until the specified timing is short.

The base station may make the setting of the RLC layer for duplicated packets after receiving Ack from the UE in response to the MAC signaling for notifying the UE to activate the packet duplication. This can minimize the time to allocate memory with the RLC setting as necessary.

The PDCP layer of the base station may instruct the RLC layer to initialize the RLC layer. The RLC layer may initialize the RLC in response to the instruction. The PDCP layer may issue the instruction after finishing receiving the PDCP PDUs up to the PDCP sequence number indicating the timing to deactivate the packet duplication. The instruction may include, for example, an identifier of an RLC entity to be initialized, or an identifier of a logical channel that uses the RLC entity. The initialization may be, for example, initialization of a buffer in the RLC PDU, initialization of a variable to be used in the RLC entity which is described in 7.1 of Non-Patent Document 17 (TS36.322 v14.0.0), or a combination of these two. This enables the PDCP layer of the CU to reliably receive the PDCP PDUs up to the PDCP sequence number indicating the timing.

The method described in the first embodiment may be applied to the packet duplication using only the SCell. This extends the flexibility in selecting a carrier in the packet duplication. The method described in the first embodiment may be applied to both the C-Plane and the U-Plane. The malfunctions in the packet duplication can be prevented in both the C-Plane and the U-Plane.

According to the first embodiment, the base station may change a carrier associated with a logical channel in the packet duplication by the UE. In other words, the base station may change a carrier to be used for transmitting a logical channel in the packet duplication by the UE. For example, the MAC layer of the base station may make this change. The tolerance to fluctuation in the radio environment during an activated state of the packet duplication can be increased.

The base station may notify the UE of changing the carrier to be used for transmitting the logical channel. The notification may include combined information of a logical channel and a carrier being used. The base station may give the UE the notification via the MAC signaling. This enables a prompt notification with higher reliability under the HARQ control. Alternatively, the base station may give the UE the notification via the L1/L2 signaling. This enables a further prompt notification. Alternatively, the base station may give the UE the notification via the RRC signaling. Consequently, the complexity in designing a communication system can be avoided.

The UE may enable a signaling for associating a logical channel with a transmission carrier and/or for changing the association which is to be transmitted from the base station. The signaling may be the RRC signaling, the MAC signaling, or the L1/L2 signaling. The UE may enable the signaling when the signaling includes an SCell that is not found in an SCell list to be used by the UE. An SCell that is included in the SCell list may be, for example, an SCell included in an SCell addition/modification list in the signaling for the RRC connection reconfiguration.

The UE may add, to the SCell list, the SCell that is not found in the SCell list. The UE may notify the base station of information on the SCell. The information on the SCell may be, for example, a physical cell ID (PCI) of the SCell, an SCell identifier, for example, SCellIndex, or combined information of these. The UE may assign the SCell identifier to the SCell. The SCell identifier may be identical to an SCell identifier assigned by the base station, or a temporary SCell identifier. The temporary SCell identifier may be defined in a standard, or broadcast or dedicatedly notified from the base station to the UE in advance. The base station may add the Cell to the SCell list to be used by the UE. The base station may notify the UE of information on the added SCell. The information on the added SCell may include an SCell identifier, PCI of the SCell, or both of these. The UE may replace the SCell identifier assigned by its own UE with the SCell identifier notified from the base station.

The UE may use the RRC signaling to notify information on the SCell to the base station. For example, when the signaling for associating a logical channel with a transmission carrier which is to be transmitted from the base station is the RRC signaling, the UE may give the information via the RRC signaling. Sending the signaling and the notification via the same type of signaling facilitates the process for the SCell control in the base station.

Alternatively, the UE may notify the information on the SCell to the base station via the MAC signaling. For example, when the signaling for associating a logical channel with a transmission carrier which is to be transmitted from the base station is the MAC signaling, the UE may notify the information via the MAC signaling. In addition to obtainment of the same advantages as described above, a prompt notification is possible.

Alternatively, the UE may notify the information on the SCell to the base station via the L1/L2 signaling. For example, when the signaling for associating a logical channel with a transmission carrier which is to be transmitted from the base station is the L1/L2 signaling, the UE may notify the information via the L1/L2 signaling. This enables a further prompt notification.

The UE may disable the signaling for associating a logical channel with a transmission carrier and/or for changing the association which is to be transmitted from the base station. The signaling may be identical to that described above. The UE may disable the signaling when the signaling includes the SCell that is not found in the SCell list to be used by the UE. The SCell that is not found in the SCell list may be identical to that described above.

The UE may duplicate the packet with the original setting of the packet duplication. Alternatively, the UE may deactivate the packet duplication. The target packets whose packet duplication is to be deactivated may include all the packets that the UE duplicates and a packet corresponding to the signaling. Alternatively, the UE may delete the setting of the packet duplication of the packet corresponding to the signaling.

The UE may notify the base station that the signaling is disabled. The notification may include the cause why the signaling is disabled. The cause may be, for example, non-existence of the SCell notified via the signaling in the SCell list to be used by the UE. The signaling may include the information on the SCell. The information on the SCell may be, for example, information on the SCell that does not exist in the SCell list to be used by the UE, e.g., the PCI of the SCell. This facilitates the control over the SCell in the base station.

The UE may give the notification via the RRC signaling. For example, when the signaling for associating a logical channel with a transmission carrier which is to be transmitted from the base station is the RRC signaling, the UE may give the notification via the RRC signaling. Sending the signaling and the notification via the same type of signaling facilitates the process for the SCell control in the base station.

Alternatively, the UE may give the notification via the MAC signaling. For example, when the signaling for associating a logical channel with a transmission carrier which is to be transmitted from the base station is the MAC signaling, the UE may notify the information via the MAC signaling. In addition to obtainment of the same advantages as described above, a prompt notification is possible.

Alternatively, the UE may give the notification via the L1/L2 signaling. For example, when the signaling for associating a logical channel with a transmission carrier which is to be transmitted from the base station is the L1/L2 signaling, the UE may notify the information via the L1/L2 signaling. This enables a further prompt notification.

The base station may transmit, to the UE, a signaling for adding the SCell to an SCell list for UE use. The base station may transmit, to the UE, a signaling for associating a logical channel with a transmission carrier. These enables the packet duplication using the SCell. The base station may transmit, to the UE, these signalings simultaneously or at different timings. The signalings may be integrated into one signaling.

The first embodiment can prevent malfunctions in the UE upon occurrence of a contention between the packet duplication and the SCell control. The first embodiment can also prevent the malfunctions in the UE which occur when the timing at which the UE receives the MAC signaling for activating/deactivating the packet duplication from the base station is after the timing instructed via the MAC signaling.

The First Modification of the First Embodiment

The packet duplication with the CA may be applied to a base station in NR (gNB) which is split into two units.

In 3GPP, splitting the base station in NR (may be hereinafter referred to as a gNB) into two units has been proposed (see Non-Patent Document 7). The two units are referred to as the central unit (CU) and the distributed unit (DU). Regarding sharing functions between the CU and the DU in the CU-DU split, the CU has the PDCP, and the DU has the RLC, the MAC, and the PHY (see Non-Patent Document 18 (3GPP R3-171412)).

FIG. 9 illustrates a protocol configuration in the packet duplication with the CA to be performed between the gNB with the CU-DU split and the UE.

A New AS layer 1022 in a UE 1014 receives a packet from an upper layer, for example, an application or the RRC to generate a PDCP-SDU and transmit the PDCP-SDU to a PDCP 1021.

The PDCP 1021 generates a PDCP PDU using the PDCP-SDU, duplicates the PDCP PDU, and transmits the PDCP PDUs to RLCs 1019 and 1020. Each of the RLCs 1019 and 1020 generates an RLC PDU using a corresponding one of the PDCP PDUs, and transmits the RLC PDU to an MAC 1016.

The MAC 1016 generates transport channel data using the RLC PDU received from the RLC 1019, and transmits the transport channel data to a HARQ 1015 for a cell #1. The MAC 1016 generates transport channel data using the RLC PDU received from the RLC 1020, and transmits the transport channel data to a HARQ 1018 for a cell #2.

The HARQ 1015 transmits, to a PHY 1014, the transport channel data generated using the RLC PDU from the RLC 1019. The PHY 1014 performs processes of coding and modulating the transport channel data, and transmits the resulting data to a DU 1006 using the cell #1 as a radio signal. The HARQ 1018 transmits, to a PHY 1017, the transport channel data generated using the RLC PDU from the RLC 1020. The PHY 1017 performs the processes of coding and modulating the transport channel data, and transmits the resulting data to the DU 1006 using the cell #2 as a radio signal.

A PHY 1011 in the DU 1006 receives the signal of the cell #1, performs processes of demodulating and decoding the signal, and transmits the resulting signal to a HARQ 1010 as the transport channel data. The HARQ 1010 transfers the transport channel data to an MAC 1009. A PHY 1013 receives the signal of the cell #2, performs the processes of demodulating and decoding the signal, and transmits the resulting signal to a HARQ 1012 as the transport channel data. The HARQ 1012 transfers the transport channel data to the MAC 1009.

The MAC 1009 generates the RLC PDU using the transport channel data from each of the HARQs 1010 and 1012, and transfers the RLC PDU to a corresponding one of the RLCs 1007 and 1008. The RLC 1007 generates the PDCP PDU using the RLC PDU, and transfers the PDCP PDU to a PDCP 1003 of a CU 1001 through a CU-DU interface 1004. The RLC 1008 generates the PDCP PDU using the RLC PDU, and transfers the PDCP PDU to the PDCP 1003 of the CU 1001 through the CU-DU interface 1004.

The PDCP 1003 in the CU 1001 detects redundancy in the PDCP PDUs from the RLCs 1007 and 1008, and removes the redundant PDCP PDU. The PDCP 1003 generates the PDCP-SDU using the original PDCP PDU, that is, the PDCP PDU that is not removed, and transfers the PDCP-SDU to a New AS layer 1002.

However, it is not clear which of the CU or the DU determines to duplicate the packet in the gNB with the CU-DU split. A signal between the CU and the DU in the packet duplication is not defined. Thus, the UE has a problem of failing to duplicate the packet in the communication with the gNB with the CU-DU split.

The first modification of the first embodiment solves the problem.

The DU determines to activate the packet duplication. The MAC layer may make the determination.

The DU may determine to activate the packet duplication, using a measurement result of an uplink signal. For example, the SRS or an error rate of the uplink signal such as a BER or a BLER may be used as the uplink signal. Alternatively, the DU may determine to activate the packet duplication, using the size of uplink transmission data. For example, an uplink grant to be transmitted from the DU to the UE, or a Buffer Status Report (BSR) to be received from the UE may be used as the size of uplink transmission data. Alternatively, the DU may determine to activate the packet duplication, using a load of each cell. For example, a scheduling state for another UE may be used as a load of each cell. This enables optimization of communication in the whole system.

Non-Patent Document 19 (see R2-1706716) discloses use of the measurement result of the uplink signal, the size of uplink transmission data, and the load of each cell. However, the present invention differs from Non-Patent Document 19 in disclosing specific examples of the measurement result of the uplink signal, the size of uplink signal data, and the load of each cell.

The DU may transmit, to the CU, a notification indicating activation of the packet duplication. The CU may transmit, to the DU, a response to the notification. The response may include information on the timing to activate the packet duplication. The information on the timing to activate the packet duplication may be a PDCP sequence number or information on a physical timing similarly to the first embodiment. The PDCP sequence number may be information on the sequence numbers of the PDCP PDUs received in the PDCP layer of the CU, for example, the largest sequence number of the PDCP PDUs. Information on the PDCP sequence numbers from the CU can be promptly notified. Alternatively, the CU may notify the DU of the PDCP sequence number at which the UE activates the packet duplication. This can reduce the amount of processing in the DU.

The DU may notify the UE of the MAC signaling for activating the packet duplication. The MAC signaling may include information on the timing to activate the packet duplication similarly to the first embodiment.

The response from the CU to the DU need not include information on the timing to activate the packet duplication. The MAC signaling from the DU to the UE need not include information on the timing.

The processing in the UE may be identical to that in the first embodiment. The complexity in the packet duplication which the UE performs for the base station can be avoided.

The DU need not transmit, to the CU, a notification indicating activation of the packet duplication. The CU need not transmit, to the DU, a response to the notification indicating activation of the packet duplication. This can reduce the amount of signaling between the CU and the DU.

Figure 10:
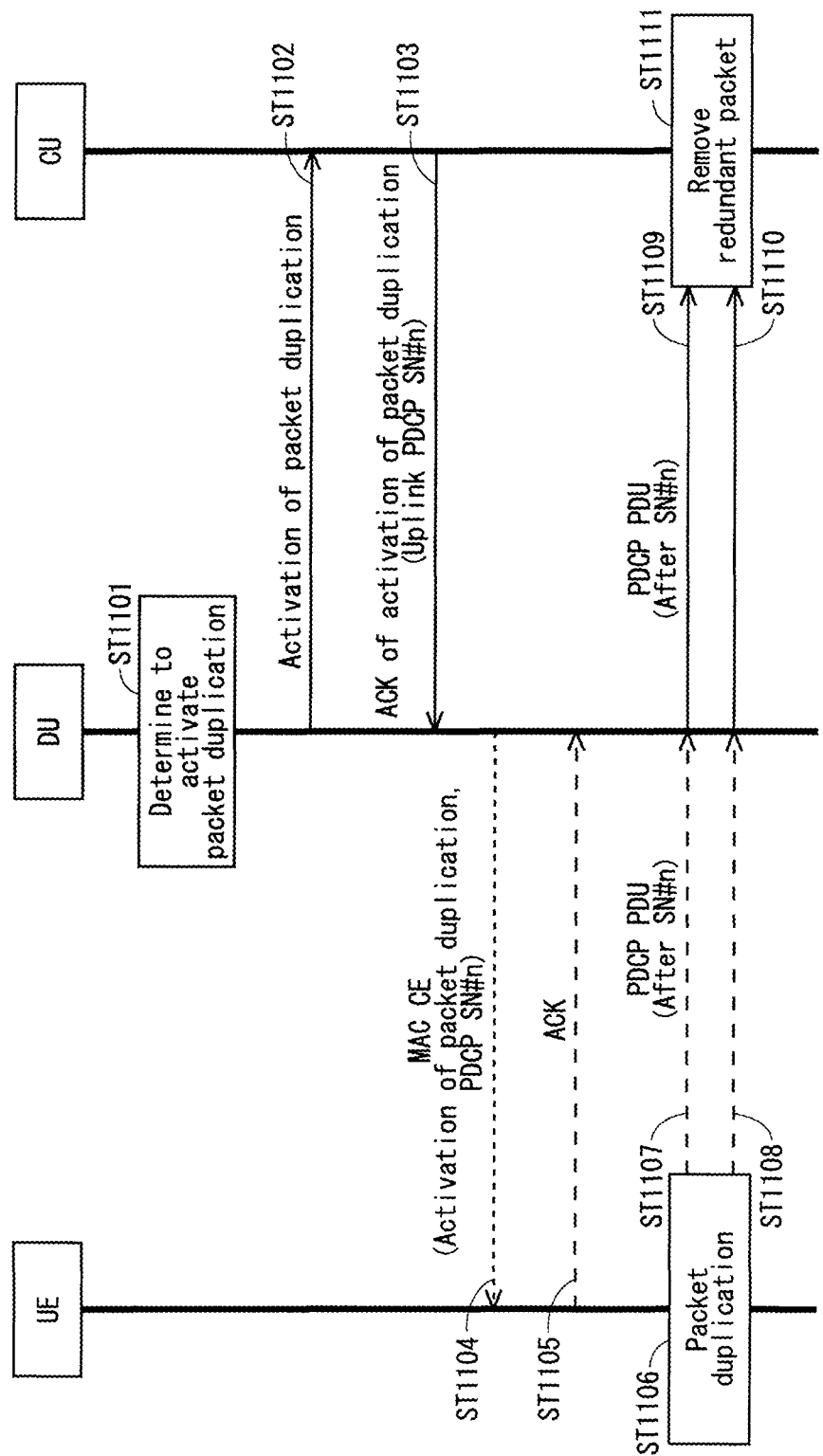
FIG. 10 is a sequence diagram of the packet duplication when the DU determines to activate the packet duplication according to the first modification of the first embodiment.

FIG. 10 is a sequence diagram of the packet duplication when the DU determines to activate the packet duplication. FIG. 10 illustrates an example using the PDCP sequence number n as the timing to activate the packet duplication.

In Step ST1101 of FIG. 10, the DU determines to activate the packet duplication. In Step ST1102, the DU notifies the CU of activation of the packet duplication. In Step ST1103, the CU notifies the DU of acknowledgement of activating the packet duplication. In Step ST1103, the CU may notify information on the timing to activate the packet duplication. In the example of FIG. 10, the CU notifies the DU of the PDCP sequence number n as the information.

In FIG. 10, the DU need not notify the CU of Step ST1102. Step ST1103 need not include the information on the timing to activate the packet duplication. Alternatively, the CU need not notify the DU of Step ST1103. This can reduce the amount of signaling in the interface between the CU and the DU.

In Step ST1104 of FIG. 10, the DU notifies the UE of the MAC signaling for activating the packet duplication. In Step ST1104, the DU may notify the information on the timing to activate the packet duplication. In the example of FIG. 10, the DU notifies the UE of the PDCP sequence number n as the information. In Step ST1105, the UE notifies the DU of Ack in response to Step ST1104.

In Step ST1106 of FIG. 10, the UE activates the packet duplication. In Steps ST1107 and ST1108, the UE transmits the original packet and the duplicated packet to the DU. In Steps ST1109 and ST1110, the DU transmits the PDCP PDUs received in the Step ST1107 and Step ST1108, respectively, to the CU. In Step ST1111, the CU detects identical packets, and removes one of the packets.

In the first modification of the first embodiment, the CU may determine to activate the packet duplication. The RRC layer or the PDCP layer may make the determination.

The DU may notify the CU of information necessary for determining to activate the packet duplication. The information may be the aforementioned information necessary for the DU to determine to activate the packet duplication. The present invention differs from Non-Patent Document 19 (3GPP R2-1706716) in notifying the information from the DU to the CU.

The CU may notify the DU of whether to duplicate the packet. The notification may include the information on the timing to activate the packet duplication. The information on the timing to activate the packet duplication may be identical to the information included in the response to the notification for activating the packet duplication to be transmitted from the CU to the DU. The amount of processing for the UE to determine the timing to activate the packet duplication can be reduced.

The DU may notify the UE of the MAC signaling for activating the packet duplication. The MAC signaling may include information on the timing to activate the packet duplication similarly to the first embodiment.

The response from the CU to the DU need not include the information on the timing to activate the packet duplication. The MAC signaling from the DU to the UE need not include the information on the timing.

The processing in the UE may be identical to that in the first embodiment. The complexity in the packet duplication which the UE performs for the base station can be avoided.

Figure 11:
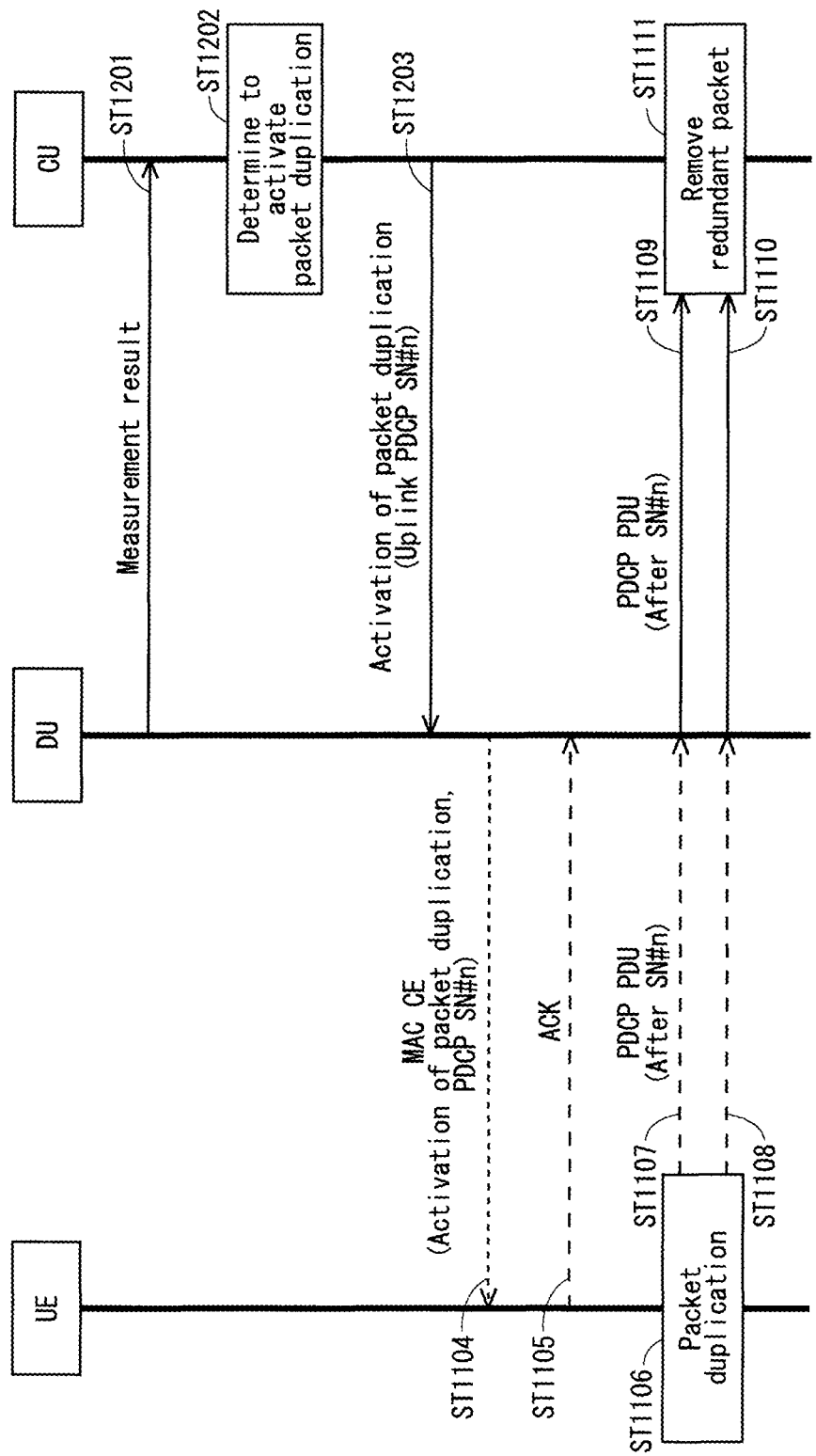
FIG. 11 is a sequence diagram of the packet duplication when the CU determines to activate the packet duplication according to the first modification of the first embodiment.

FIG. 11 is a sequence diagram of the packet duplication when the CU determines to activate the packet duplication. FIG. 11 illustrates an example using the PDCP sequence number n as the timing to activate the packet duplication. Since the sequence illustrated in FIG. 11 includes the same steps as those of the sequence illustrated in FIG. 10, the same step numbers are applied to the same Steps and the common description thereof is omitted.

In Step ST1201 of FIG. 11, the DU notifies the CU of information for the CU to determine the packet duplication. In Step ST1202, the CU determines to activate the packet duplication. In Step ST1203, the CU notifies the DU of activation of the packet duplication. In Step ST1203, the CU may notify the information on the timing to activate the packet duplication. In the example of FIG. 11, the CU notifies the DU of the PDCP sequence number n as the information.

Since Steps ST1104 to ST1111 in FIG. 11 are the same processes as those in FIG. 10, the description thereof is omitted.

Similarly to the first embodiment, the UE may activate/deactivate the packet duplication at the timing of accurately receiving the MAC signaling for controlling activation/deactivation of the packet duplication. The timing of accurately receiving the MAC signaling may be after the timing to activate/deactivate the packet duplication instructed via the MAC signaling. The timing after the timing to activate/deactivate the packet duplication instructed via the MAC signaling may be, for example, the timing when the HARQ retransmission is performed. The operations of the base station according to the first embodiment may be read as the operations in the DU and performed. This can produce the same advantages as those of the first embodiment.

Similarly to the first embodiment, the UE may activate the packet duplication retroactively. Alternatively, the timing for the UE to activate/deactivate the packet duplication may be the packet duplication timing instructed by the MAC signaling for controlling the activation/deactivation of the packet duplication, for example, the timing to activate/deactivate the packet duplication after cycling through all the numbers. This can produce the same advantages as those of the first embodiment.

Figure 12:
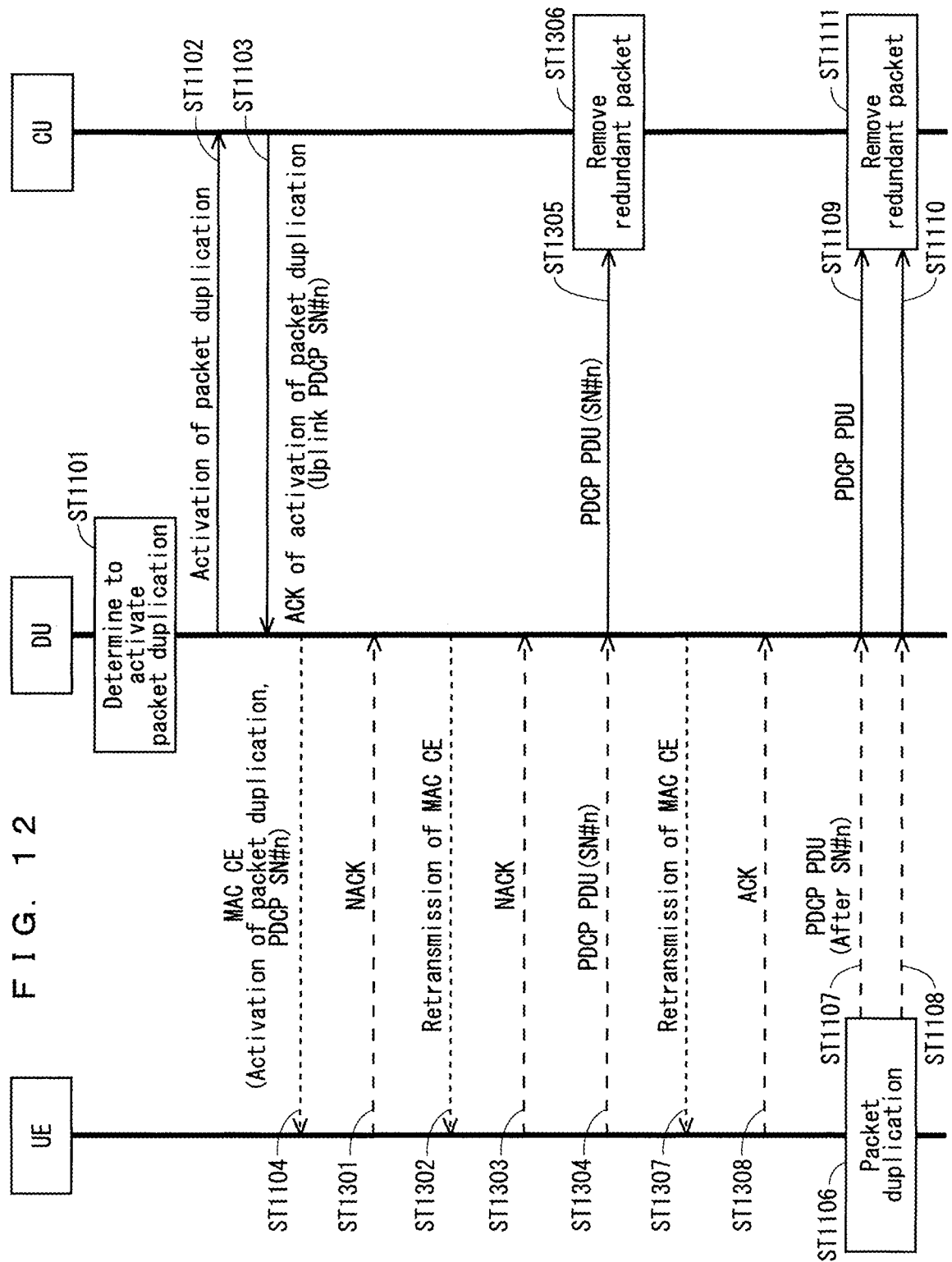
FIG. 12 is a sequence diagram illustrating operations when the UE receives the MAC signaling for activating the packet duplication after a specified timing due to occurrence of the HARQ retransmission according to the first modification of the first embodiment.

FIG. 12 is a sequence diagram illustrating operations in the communication between the UE and the gNB with the CU-DU split when the UE receives the MAC signaling for activating the packet duplication after a specified timing due to occurrence of the HARQ retransmission. FIG. 12 illustrates an example where the DU determines to activate the packet duplication. Since the sequence illustrated in FIG. 12 includes the same steps as those of the sequences illustrated in FIGS. 8 and 10, the same step numbers are applied to the same Steps and the common description thereof is omitted.

Since Steps ST1101 to ST1104 in FIG. 12 are the same as those in FIG. 10, the description thereof is omitted.

Steps ST1301 to ST1304 in FIG. 12 are obtained by replacing a communication partner of the UE from the base station to the DU in Steps ST803 to ST806 in FIG. 8, respectively. In Step ST1305, the DU transfers, to the CU, the PDCP PDU with the PDCP sequence number n that has been received in Step ST1304. Steps ST1307 and ST1308 are obtained by replacing the communication partner of the UE from the base station to the DU in Steps ST807 and ST808 in FIG. 8, respectively.

Since Steps ST1106 to ST1111 in FIG. 12 are the same as those in FIG. 10, the description thereof is omitted.

In the first modification of the first embodiment, the DU may notify the CU of information on Ack/Nack of the MAC signaling indicating activation of the packet duplication which has been notified from the UE. This can facilitate the system control in the CU, for example, upon occurrence of irregularities including the excess of the number of HARQ retransmissions.

The DU may notify only information on Ack which has been received from the UE. This can reduce the amount of signaling in the interface between the CU and the DU. The DU may notify only information on Nack. This can expedite the system control in the CU. The DU may notify information on both of Ack and Nack. The CU can promptly obtain information on the whole system. Alternatively, the information on Ack to be notified from the DU to the UE may be only the Ack initially received. The Ack initially received may be used, for example, when the MAC signaling is communicated through a plurality of HARQ processes. This can further reduce the amount of signaling in the interface between the CU and the DU.

The method described in the first modification of the first embodiment may be applied to deactivation of the packet duplication. The base station with the CU-DU split can activate and deactivate the packet duplication.

The DU may set the RLC layer for duplicated packets. The DU may make the setting immediately after determining to activate the packet duplication. Alternatively, the DU may make the setting immediately after the CU notifies the DU of activation of the packet duplication. The DU can promptly activate the packet duplication even when the time to the specified timing is short.

The DU may set the RLC layer for duplicated packets after receiving Ack from the UE in response to the MAC signaling for notifying the UE to activate the packet duplication. This can minimize the time to allocate memory with the RLC setting as necessary.

The CU may instruct the DU to initialize the RLC layer. The DU may initialize the RLC in response to the instruction. The CU may issue the instruction, for example, after finishing receiving, in the PDCP layer of the CU, the PDCP PDUs up to the PDCP sequence number indicating the timing to deactivate the packet duplication. The instruction may include, for example, an identifier of an RLC entity to be initialized, or an identifier of a logical channel that uses the RLC entity. The initialization may be, for example, initialization of a buffer in the RLC PDU, initialization of a variable to be used in the RLC entity which is described in 7.1 of Non-Patent Document 17 (TS36.322 v14.0.0), or a combination of these two. This enables the PDCP layer of the CU to reliably receive the PDCP PDUs up to the PDCP sequence number indicating the timing.

Similarly to the first embodiment, the DU may change a carrier associated with a logical channel in the packet duplication by the UE according to the first modification of the first embodiment. For example, the MAC layer of the DU may make this change. The tolerance to fluctuation in the radio environment during an activated state of the packet duplication can be increased.

Similarly to the first embodiment, the DU may notify the UE of change in the carrier to be used for transmitting the logical channel. The notification may include combined information of a logical channel and a carrier being used. The DU may notify the UE via the MAC signaling or the L1/L2 signaling. This enables the DU to give a prompt notification to the UE.

The DU may notify the CU of change in the carrier to be used for transmitting the logical channel. The DU may notify the CU before, after, or simultaneously with the notification from the DU to the UE. The information included in the notification may be identical to that included in the notification from the DU to the UE. The DU may notify the CU through the interface between the CU and the DU, for example, the F1 interface. The CU may notify the DU of acknowledgement or negative acknowledgement of change in the carrier. The interface between the CU and the DU, for example, the F1 interface may be used for the notification of acknowledgement or negative acknowledgement. Using the notification of acknowledgement or negative acknowledgement, the DU may notify change in the carrier to be used for transmitting a logical channel from the DU to the UE. Alternatively, the DU may change the carrier into another, restore it to the original carrier, or perform another process. Consequently, the CU can efficiently control the whole communication system.

The CU may change the carrier associated with the logical channel in the packet duplication. The CU may notify the UE of change in the carrier via the RRC signaling. Alternatively, the CU may notify the DU of change in the carrier. The information included in the notification may be identical to that included in the notification from the DU to the UE. The DU may transmit the notification to the UE. The transmission may be performed via the MAC signaling or the L1/L2 signaling. Consequently, the CU can efficiently control the whole communication system.

Similarly to the first embodiment, the UE may enable a signaling for associating a logical channel with a transmission carrier which is to be transmitted from the base station. The UE may enable the signaling when the signaling includes an SCell that is not found in the SCell list to be used by the UE. The operations of the UE when enabling the signaling may be identical to those according to the first embodiment. This can produce the same advantages as those of the first embodiment.

Similarly to the first embodiment, the UE may notify the DU of information on the SCell that is not found in the SCell list. The DU may notify the CU of the information. The DU may notify the CU via the interface between the CU and the DU. The information included in the notification to the CU may be identical to that according to the first embodiment.

Similarly to the first embodiment, the UE may disable the signaling for associating a logical channel with a transmission carrier which is to be transmitted from the base station. The UE may disable the signaling when the signaling includes the SCell that is not found in the SCell list to be used by the UE. The operations of the UE when disabling the signaling may be identical to those according to the first embodiment. This can produce the same advantages as those of the first embodiment.

Similarly to the first embodiment, the UE may notify the DU that the signaling is disabled. The DU may notify the CU of the information. The DU may notify the CU via the interface between the CU and the DU. The information included in the notification to the CU may be identical to that according to the first embodiment.

Since the first modification of the first embodiment enables the gNB with the CU-DU split to receive the duplicated uplink packets, the reliability for transmitting the packets is enhanced.

The Second Embodiment

The MC (including the DC) is used as another method of the packet duplication described in the first embodiment (see Non-Patent Document 9 (3GPP TR38.804 V14.0.0)).

However, none discloses switching between the packet duplication with the CA and the packet duplication with the DC. Thus, for example, when the UE that has set the packet duplication with the CA to activation moves to a cell edge, the UE has problems of failing to switch to the packet duplication with the DC, thus failing to ensure the reliability of communication.

The second embodiment discloses a method for solving such problems.

The base station and the UE can mutually switch between the packet duplication with the CA and the packet duplication with the DC.

The base station and the UE may switch between the bearer configurations. The patterns described in Non-Patent Document 22 (R2-1704001) may be used for switching between the bearer configurations. The base station and the UE may switch, for example, from the master cell group (MCG) bearer to the MCG split bearer. This enables the base station and the UE to switch from the packet duplication with the CA to the packet duplication with the DC. The opposite pattern may be used, which enables the base station and the UE to switch from the packet duplication with the DC to the packet duplication with the CA.

As another example, the base station and the UE may switch from the secondary cell group (SCG) bearer to the SCG split bearer. This enables the base station and the UE to switch from the packet duplication with the CA to the packet duplication with the DC. The opposite pattern may be used, which enables the base station and the UE to switch from the packet duplication with the DC to the packet duplication with the CA.

Patterns that are not described in Non-Patent Document 22 may be used. For example, the base station and the UE may switch from the SCG bearer to a bearer in which an SCG is split into the other SCGs as anchor base stations (may be hereinafter referred to as an SCG-dedicated split bearer). The opposite pattern may be used. These patterns can increase the flexibility in selecting a base station in the packet duplication with the DC.

As another example, the base station and the UE may switch from the MCG bearer to the SCG split bearer or the SCG-dedicated split bearer. The opposite pattern may be used. Switching between the base stations using the PDCP layers, that is, switching between the anchor base stations simultaneously with switching between configurations for the packet duplication can reduce the amount of signaling.

As another example, the base station and the UE may switch from the MCG split bearer to the SCG bearer. The opposite pattern may be used. Switching between the base stations using the PDCP layers, that is, switching between the anchor base stations simultaneously with switching between the configurations for the packet duplication can reduce the amount of signaling.

The base station and the UE may switch between logical channels. The base station and the UE may, for example, maintain one of the two logical channels to be used for the packet duplication. The logical channel to be maintained may be, for example, a logical channel in which the same base station performs radio communication with the UE even after the packet duplication with the CA is switched to the packet duplication with the DC. Maintaining one of the logical channels can ensure the continuity in the communication using the logical channel.

The other logical channel may be released. This can reduce the memory usage in the base station and the UE. Alternatively, the other logical channel may be maintained. For example, when the packet duplication with the original configuration is resumed due to the re-switching of the packet duplication, the maintained logical channel may be used. This can reduce the amount of signaling in the re-switching of the packet duplication.

As another example, the base station and the UE may release both of the two logical channels to be used for the packet duplication. The base station and the UE may set a new logical channel. The use resources when the packet duplication is switched can be flexibly set.

Alternatively, the logical channel need not be switched. The base station and the UE may maintain the two logical channels to be used for the packet duplication. The base station may be switched to another to use one of the logical channels as it is. This can reduce the amount of signaling.

To maintain the logical channels, the base station and the UE may maintain the RLC layers. The base station and the UE may maintain the MAC layers. The base station and the UE may maintain both the RLC layers and the MAC layers. This can reduce the amount of signaling for the packet duplication.

Alternatively, the base station and the UE may release the RLC layers. The base station and the UE may release the MAC layers. The base station and the UE may release both the RLC layers and the MAC layers. The RLC and/or the MAC can be flexibly set.

To release the logical channels, the base station and the UE may release the RLC layers. The base station and the UE may release the MAC layers. The base station and the UE may release both the RLC layers and the MAC layers. This can reduce the memory usage.

The base station and the UE may release the association between a logical channel and a carrier being used in the packet duplication. This release may be used for switching from the packet duplication with the CA to the packet duplication with the DC. In switching the packet duplication from the CA to the DC, the flexibility in the carrier being used can be improved.

The base station and the UE may specify the association between a logical channel and a carrier being used, in the packet duplication. This specification may be used for switching from the packet duplication with the DC to the packet duplication with the CA. The switching of the packet duplication from the DC to the CA can be smoothly performed.

The base station and the UE may set a packet duplication operation to being activated. The packet duplication operation may be an operation immediately before switching of the packet duplication. The packet duplication operation may be an operation immediately after switching of the packet duplication. The packet duplication operations may be operations before and after switching of the packet duplication. This can prevent an interruption in transmission/reception data before and after the packet duplication.

The base station and the UE may set a packet duplication operation to being deactivated. The packet duplication operation may be an operation immediately before switching of the packet duplication. The packet duplication operation may be an operation immediately after switching of the packet duplication. The packet duplication operations may be operations before and after switching of the packet duplication. This can save the radio resources before and after the packet duplication.

The base station and the UE may maintain an activation/deactivation state of the packet duplication. The base station and the UE may maintain the state before and after the packet duplication. For example, when the packet duplication is being activated before the packet duplication is switched, the packet duplication may be set to being activated even after the packet duplication is switched. This enables smooth transmission and reception of the user data and/or the control data.

The operation of the packet duplication in switching of the packet duplication may be predefined in a standard. Alternatively, the base station may notify the UE of the operation. The notification may be given via the RRC signaling, the MAC signaling, or the L1/L2 signaling. The RRC signaling may be, for example, the RRC signaling to be used for switching the packet duplication. The MAC signaling may be, for example, the MAC signaling for activating/deactivating the packet duplication which is described in the first embodiment and the first modification of the first embodiment. This can increase the flexibility in operations when the packet duplication is switched.

In the second embodiment, the master base station or the secondary base station may activate switching of the packet duplication. Alternatively, an anchor base station may activate switching of the packet duplication. Activation of the switching of the packet duplication by the anchor base station enables application to the SCG-dedicated split bearer.

Figure 13:
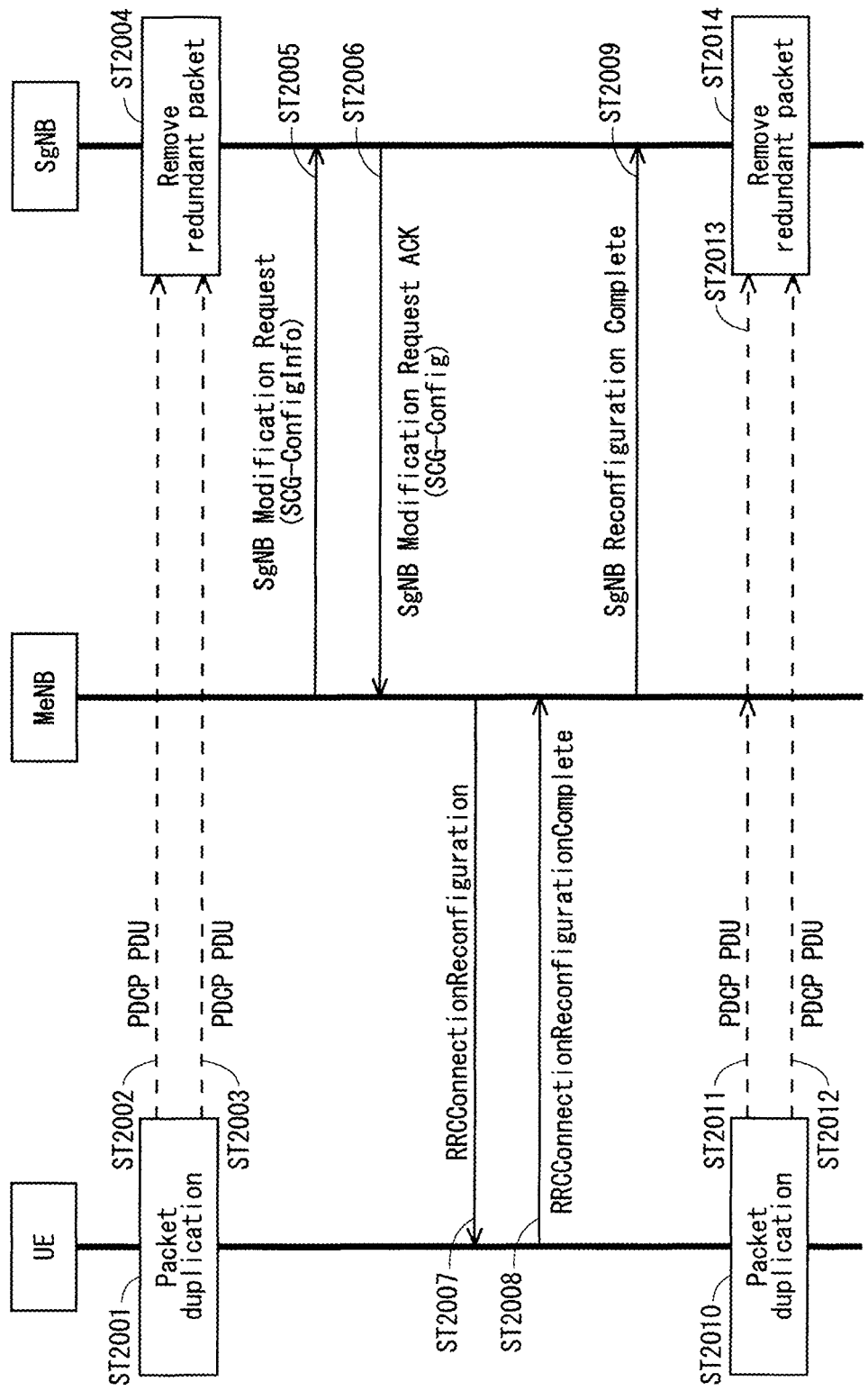
FIG. 13 is a sequence diagram when a master base station activates switching of the packet duplication according to the second embodiment.

FIG. 13 is a sequence diagram when the master base station activates switching of the packet duplication. FIG. 13 illustrates an example of switching from the packet duplication with the CA in the SCG bearer to the packet duplication with the DC in the SCG split bearer. In FIG. 13, the MeNB represents an eNB that operates as the master base station, and the SgNB represents a gNB that operates as the secondary base station.

In Step ST2001 of FIG. 13, the UE duplicates a packet with the CA. In Steps ST2002 and ST2003, the UE transmits duplicated packets to the SgNB using different carriers. In Step ST2004, the SgNB detects and removes a redundant packet.

In Step ST2005 of FIG. 13, the MeNB transmits an SgNB modification request to the SgNB. The SgNB modification request may include information indicating a type of the packet duplication. The information indicating the type of the packet duplication may be included in the SgNB modification request included in, for example, SCG-ConfigInfo.

In Step ST2006 of FIG. 13, the SgNB transmits an SgNB modification request acknowledgement to the MeNB. The SgNB modification request acknowledgement may include information on change in the RRC parameter of the UE. The information on change in the RRC parameter of the UE may be included in the SgNB modification request acknowledgement included in, for example, SCG-Config.

Although FIG. 13 illustrates an example acknowledgement in response to the SgNB modification request, the acknowledgement may be replaced with a negative acknowledgement. For example, the SgNB may transmit an SgNB modification request rejection to the MeNB. The SgNB modification request rejection may include a cause for rejection. Alternatively, the SgNB modification request rejection may include information on a bearer, for example, an identifier of the bearer. The bearer may be a bearer that causes the SgNB to reject the request. In response to the negative acknowledgement, the MeNB may change the setting parameter, and notify the SgNB modification request again. This enables, for example, the MeNB to perform smooth processes when the SgNB cannot satisfy the request from the MeNB.

In Step ST2007 of FIG. 13, the MeNB notifies the UE of the RRC connection reconfiguration (RRCConnectionReconfiguration). The UE switches the packet duplication and changes the RRC parameter to correspond to the switching, using Step ST2007. In Step ST2008, the UE gives the MeNB the RRC connection reconfiguration complete (RRCConnectionReconfigurationComplete) notification. In Step ST2009, the MeNB gives the SgNB the SgNB reconfiguration complete notification.

In Step ST2010 of FIG. 13, the UE duplicates a packet with the DC. In Steps ST2011 and ST2012, the UE transmits the duplicated packets to the MeNB and the SgNB, respectively. In Step ST2013, the MeNB transmits, to the SgNB, the packet received in Step ST2011. In Step ST2014, the SgNB detects and removes a redundant packet.

Although FIG. 13 exemplifies that the master base station is the eNB and the secondary base station is the gNB, the master base station may be a gNB. The secondary base station may be an eNB. Both the master and secondary base stations may be the gNBs or the eNBs.

Figure 14:
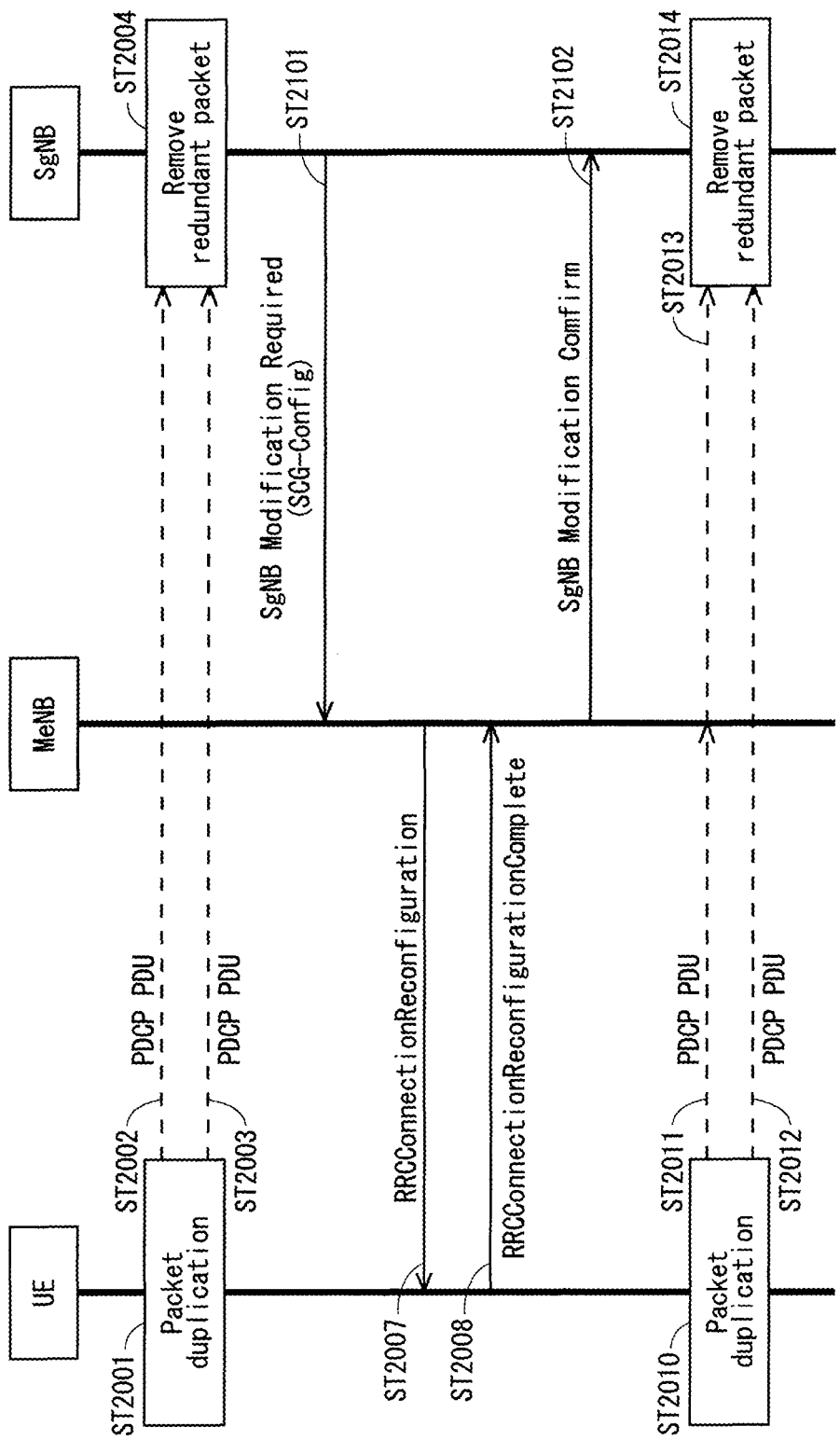
FIG. 14 is a sequence diagram when a secondary base station activates switching of the packet duplication according to the second embodiment.

FIG. 14 is a sequence diagram when the secondary base station activates switching of the packet duplication. FIG. 14 illustrates an example of switching from the packet duplication with the CA in the SCG bearer to the packet duplication with the DC in the SCG split bearer. In FIG. 14, the MeNB represents an eNB that operates as a master base station, and the SgNB represents a gNB that operates as a secondary base station. Since FIG. 14 includes the same steps as those of the sequence illustrated in FIG. 13, the same step numbers are applied to the same Steps and the common description thereof is omitted.

In Step ST2101 of FIG. 14, the SgNB transmits an SgNB modification required notification to the MeNB. The notification may include the information indicating the type of the packet duplication. The notification may include the information on change in the RRC parameter of the UE. The information indicating the type of the packet duplication and/or the information on change in the RRC parameter of the UE may be included in the notification included in, for example, SCG-Config.

Although FIG. 14 exemplifies that the MeNB acknowledges the SgNB modification required notification from the SgNB, the MeNB may refuse it. For example, the MeNB may transmit an SgNB modification refusal to the SgNB. The SgNB modification refusal may include a cause for the refusal. Alternatively, the SgNB modification refusal may include information on a bearer, for example, an identifier of the bearer. The bearer may be a bearer that causes the MeNB to refuse the request. For example, in response to the negative acknowledgement, the SgNB may change the setting parameter and notify the SgNB modification request again. This enables, for example, the SgNB to perform smooth processes when the MeNB cannot satisfy the request from the SgNB.

In Step ST2102 of FIG. 14, the MeNB notifies the SgNB of an SgNB modification confirmation.

Similarly to FIG. 13, the master base station may be the gNB in FIG. 14. The secondary base station may be the eNB. Both the master and secondary base stations may be the gNBs or the eNBs.

The SgNB modification request to be transmitted from the master base station to the secondary base station may include the information indicating the type of the packet duplication. The type of the packet duplication may be, for example, the packet duplication with the CA or the packet duplication with the DC. The information indicating the type of the packet duplication may be information indicating a type after the packet duplication is switched.

The master base station may include the information indicating the type of the packet duplication, into items for setting additional bearers. The items for setting additional bearers may be, for example, equivalent to setting items of the SCG bearer and the split bearer in "E-RABs To Be Added Item" in 9.1.3.5 of Non-Patent Document 23 (3GPP TS36.423 v14.3.0). Inclusion in the items for setting additional bearers enables, for example, switching from the packet duplication with the CA in the MCG bearer to the packet duplication with the DC.

As another example, the master base station may include the information indicating the type of the packet duplication, into items for setting modified bearers. The items for setting modified bearers may be, for example, equivalent to setting items of the SCG bearer and the split bearer in "E-RAB s To Be Modified Item" in 9.1.3.5 of Non-Patent Document 23 (3GPP TS36.423 v14.3.0). Inclusion in the items for setting modified bearers enables, for example, switching from the packet duplication with the CA in the SCG bearer to the packet duplication with the DC in the SCG split bearer.

As another example, the master base station may include the information indicating the type of the packet duplication, into items for setting released bearers. The items for setting released bearers may be, for example, equivalent to setting items of the SCG bearer and the split bearer in "E-RABs To Be Released Item" in 9.1.3.5 of Non-Patent Document 23 (3GPP TS36.423 v14.3.0). Inclusion in the items for setting released bearers enables, for example, switching from the packet duplication with the DC to the packet duplication with the CA in the MCG bearer.

The secondary base station may determine whether to duplicate the packet, using the information indicating the type of the packet duplication. For example, the secondary base station may determine not to duplicate the packet when the information is not included. Alternatively, a value indicating no packet duplication may be added to the information. Since this enables collective handling whether to duplicate the packet, the amount of processing can be reduced.

Setting items on the PDU session to be added or setting items on the radio bearer to be added may replace "E-RABs To Be Added Item". The setting items on the PDU session to be added and/or the setting items on the radio bearer to be added may be newly added. The same may apply to "E-RABs To Be Modified Item" and "E-RABs To Be Released Item". The methods described in the second embodiment are applicable even when the master base station is the MgNB. The flexible settings are possible for each PDU session and/or for each radio bearer.

The setting items in the split bearer may be setting items in the MCG split bearer, setting items in the SCG split bearer, or a combination of these two. The setting items in the split bearer may include information indicating a type of the split bearer. The type of the split bearer may be the MCG split bearer, the SCG split bearer, or the SCG-dedicated split bearer. The complexity of design in the interface between the base stations can be avoided.

Alternatively, the setting items in the split bearer may be split into (a) the setting items in the MCG split bearer, (b) the setting items in the SCG split bearer, and (c) the setting items in the SCG-dedicated split bearer. Batch processing on the bearers of the same type can reduce the amount of processing.

The SgNB modification request to be transmitted from the master base station to the secondary base station may include an identifier of a radio bearer. The identifier of the radio bearer may be included in the items for setting additional bearers, the items for setting modified bearers, or the items for setting released bearers. The secondary base station can uniquely identify a bearer, which can prevent the malfunctions.

The SgNB modification request to be transmitted from the master base station to the secondary base station may include an identifier indicating maintaining or releasing of a logical channel, an identifier indicating a logical channel to be maintained, and an identifier indicating a logical channel to be released. This enables flexible switching of the packet duplication for each logical channel.

The SgNB modification request to be transmitted from the master base station to the secondary base station may include a cause for modification. The cause may include information indicating the packet duplication. The information indicating the packet duplication may be information indicating setting start of the packet duplication, information indicating setting change in the packet duplication, or information indicating release of the packet duplication. The information may be added to the list of causes described in 9.2.6 of Non-Patent Document 23 (3GPP TS36.423 v14.3.0). The information may be added to, for example, Radio Network Layer in the list of causes or another part. This enables the secondary base station to smoothly perform processes for the packet duplication.

The SgNB modification request acknowledgement to be transmitted from the secondary base station to the secondary base station may include an identifier of a bearer. The identifier of the bearer may be a bearer on switching the packet duplication.

Similarly to the SgNB modification request, the secondary base station may include the identifier of the bearer in the items for setting additional bearers, the items for modified bearers, or the items for released bearers. The items for setting additional bearers, the items for modified bearers, and the items for released bearers may be, for example, equivalent to setting items of the SCG bearer and the split bearer in "E-RAB s Admitted To Be Added Item", and "E-RABs Admitted To Be Modified Item", and "E-RABs Admitted To Be Released Item", respectively, in 9.1.3.6 of Non-Patent Document 23 (3GPP TS36.423 v14.3.0). This enables a bearer to be identified in switching the packet duplication.

Alternatively, the secondary base station may include the identifier of the bearer in a list of non-admitted bearers. The list of non-admitted bearers may be, for example, equivalent to "E-RABs Not Admitted List" in 9.1.3.6 of Non-Patent Document 23 (3GPP TS36.423 v14.3.0). A list of non-admitted PDU sessions or a list of non-admitted radio bearers may replace the "E-RABs Not Admitted List". Consequently, the master base station can control the non-admitted bearers.

The setting items on the PDU session to be added or the setting items on the radio bearer to be added may replace the "E-RABs Admitted To Be Added Item". The setting items on the PDU session to be added and/or the setting items on the radio bearer to be added may be newly added. The same may apply to the "E-RABs Admitted To Be Modified Item" and the "E-RABs Admitted To Be Released Item". The method described in the second embodiment is applicable even when the master base station is the MgNB. The flexible settings are possible for each PDU session and/or for each radio bearer.

The setting items in the split bearer may be the setting items in the MCG split bearer, the setting items in the SCG split bearer, or a combination of these two. The setting items in the split bearer may include information indicating a type of the split bearer. The type of the split bearer may be the MCG split bearer, the SCG split bearer, or the SCG-dedicated split bearer. The complexity of design in the interface between the base stations can be avoided.

Alternatively, the setting items in the split bearer may be split into (a) the setting items in the MCG split bearer, (b) the setting items in the SCG split bearer, and (c) the setting items in the SCG-dedicated split bearer. Batch processing on the bearers of the same type can reduce the amount of processing.

The secondary base station may include information on the packet duplication in the SgNB modification request acknowledgement. The information on the packet duplication may be included in a part identical to that of the identifier of the bearer, or a part indicating a setting item for the UE, for example, SCG-Config.

The information on the packet duplication may be information indicating whether to duplicate the packet, the information indicating the type of the packet duplication, or combined information of the two. For example, the information indicating the type of the packet duplication may include information indicating no packet duplication.

Alternatively, the information on the packet duplication may include information on logical channels, information on the RLC setting, or information on radio carriers. The information on the packet duplication may be combined information of at least two of these pieces of information.

The information on the packet duplication may be included in information on radio bearers. The information on the packet duplication may be included in a list of bearers to be added/modified in Non-Patent Document 24 (3GPP TS36.331 v14.3.0), for example, a part equivalent to DRB-ToAddModListSCG-r12. The part may include an identifier of a logical channel and the information on the RLC setting in combination, as, for example, packetdupListSCG. The combination may include the information on radio carriers. This enables the packet duplication with the CA.

The number of combinations included in the packetdupListSCG may be one. The combination may include an identifier of a logical channel and the information on the RLC setting. The combination may be the setting of the secondary base station side in the packet duplication with the DC. Alternatively, the number of combinations included in the packetdupListSCG may be two. The combination may include an identifier of a logical channel, the RLC setting, and the information on radio carriers. The combination may be applied to the packet duplication with the CA in the SCG bearer.

Alternatively, the information on the packet duplication may be included in a list of bearers to be released in Non-Patent Document 24 (3GPP TS36.331 v14.3.0), for example, a part equivalent to DRB-ToReleaseListSCG-r12. This enables, for example, switching from the packet duplication with the DC to the packet duplication with the CA in the MCG bearer.

Alternatively, information on a combination of a logical channel and a radio carrier may be included in items for setting the MAC, for example, a part equivalent to MAC-MainConfig in Non-Patent Document 24 (3GPP TS36.331 v14.3.0). This can reduce the amount of processing in the MAC layer.

The information on the packet duplication may be information on the packet duplication in the SRBs. For example, the information on the packet duplication in the SRBs may be included in the SCG-Config. This can enhance the reliability of communication in the C-Plane.

Information included in the SgNB modification required notification to be transmitted from the secondary base station to the master base station may be identical to that included in the SgNB modification request acknowledgement. The complexity of design on the switching of the packet duplication can be avoided.

Information included in the SgNB reconfiguration complete notification to be transmitted from the master base station to the secondary base station may be identical to that included in the SgNB modification request acknowledgement. The SCG-Config in the SgNB modification request acknowledgement may be read as the SCG-ConfigInfo. The complexity of design on the switching of the packet duplication can be avoided.

Information included in the SgNB modification confirmation notification to be transmitted from the master base station to the secondary base station may be identical to that included in the SgNB reconfiguration complete notification previously described. The complexity of design on the switching of the packet duplication can be avoided.

The RRC connection reconfiguration to be transmitted from the master base station to the UE may include the information on the packet duplication. The information on the packet duplication may be identical to that included in the SgNB modification request acknowledgement. The master base station may add the RRC setting on the communication with the master base station, to the information on the packet duplication. The RRC setting on the communication with the master base station may be the setting on the packet duplication using the master base station.

The master base station may include the information on the packet duplication as, for example, the packetdupList-SCG previously described. The number of combinations included in the packetdupListSCG may be two. Each of the combinations may include an identifier of a logical channel and the information on the RLC setting. Each of the combinations may include the information on radio carriers. Inclusion of the information on radio carriers enables the packet duplication with the CA. Both of the pieces of the information included in the combination may have the setting in the communication between the UE and the master base station. This enables the packet duplication with the CA in the MCG bearer. One of the pieces of the information may have the setting in the communication between the UE and the master base station, whereas the other of the information may have the setting in the communication between the UE and the secondary base station. This enables the packet duplication with the DC. Alternatively, both of the pieces of the information may have the setting in the communication between the UE and the secondary base station. This enables the packet duplication with the CA in the SCG bearer.

The method for switching the packet duplication which is described in the second embodiment may be applied to the setting or releasing of the packet duplication. The use of the shared signaling on the packet duplication can avoid the design complexity.

The method for switching the packet duplication which is described in the second embodiment may be applied to the multi-connectivity. This can enhance the reliability in transmission and reception with the multi-connectivity.

In the packet duplication with the multi-connectivity, a split bearer that routes two base stations may be used. The RRC connection reconfiguration to be notified from the master base station to the UE may include the information on the packet duplication. The information may include information for identifying the SCG. An identifier of the SCG may be newly provided or an identifier of the secondary base station may be used, as the information. The UE may identify the SCG from an identifier of a cell belonging to the SCG. The identifier of the cell may be, for example, an identifier of the PSCell, or an identifier of the SCell in the SCG.

In the packet duplication with the multi-connectivity, a split bearer that routes three or more base stations may be used. The RRC connection reconfiguration to be notified from the master base station to the UE may include the information on the packet duplication. The information may include the information for identifying the SCG. The information on the packet duplication may include three or more combinations each consisting of an identifier of a logical channel and the information on the RLC setting. For example, the information may include three or more combinations included in the packetdupListSCG. Each of the combinations may include a logical channel and the RLC setting which are used in each base station.

In the packet duplication with the multi-connectivity, the UE may activate/deactivate the packet duplication via the MAC signaling from any of the base stations. The MAC signaling may include information on a logical channel to be activated/deactivated. Information on a base station using the logical channel may be used. The information on the base station may be an identifier of the base station, for example, a gNB-ID, an identifier of the PCell or the PSCell, an MCG-ID, or an SCG-ID. An MCG-ID and/or an SCG-ID may be newly provided. This facilitates activation/control of the packet duplication in the UE.

Alternatively, the base station using each logical channel may dedicatedly notify the UE to activate/deactivate the logical channel via the MAC signaling. This can reduce the amount of MAC signaling.

The information on a logical channel need not be included in the second embodiment. The information on a logical channel need not be included, for example, in the setting of the packet duplication with the DC or in switching the setting to the packet duplication with the DC. This can reduce the size of the signaling.

In the second embodiment, the UE may receive signals from all the base stations that configure the DC/MC. The signals may be, for example, the MAC signaling. This facilitates the packet duplication control.

The UE may receive signals from all the carriers which the UE uses in each base station. The signals may be, for example, the MAC signaling. This can increase the flexibility of the scheduling in the base station. Alternatively, the UE may receive a signal from a part of the carriers which the UE uses in each base station, for example, the MAC signaling. The part of the carriers may be, for example, the PCell or the PSCell. The base station and the UE may transmit and receive the MAC signaling through the PCell and/or the PSCell. The power consumption of the UE can be reduced.

Alternatively, the UE may receive a signal from the base station that transmits a packet during an activated state of the packet duplication, for example, the MAC signaling in the second embodiment. The power consumption of the UE can be reduced.

The UE may receive the signals from all the carriers which the UE uses in each base station, for example, the MAC signaling. This can increase the flexibility of the scheduling in the base station. Alternatively, the UE may receive the signals from a part of the carriers which the UE uses in each base station, for example, the MAC signaling. The part of the carriers may be, for example, the PCell or the PSCell. The base station and the UE may transmit and receive the MAC signaling through the PCell and/or the PSCell. The power consumption of the UE can be further reduced.

Alternatively, the UE may receive a signal from the master base station, for example, the MAC signaling in the second embodiment. This can reduce the power consumption in the UE, and facilitates the control in the master base station.

The UE may receive the signals from all the carriers which the UE uses in the master base station, for example, the MAC signaling. This can increase the flexibility of the scheduling in the master base station. Alternatively, the UE may receive the signals from some of the carriers which the UE uses in the master base station, for example, the MAC signaling. Some of the carriers may be, for example, the PCell. The base station and the UE may transmit and receive the MAC signaling through the PCell. The power consumption of the UE can be further reduced.

The second embodiment enables the switching between the packet duplication with the CA and the packet duplication with the DC. For example, the reliability in the communication when the UE is moving can be ensured. Moreover, the throughput can be increased.

The Third Embodiment

When the packet duplication is deactivated, clearing data in the RLC layer has been proposed (see Non-Patent Document 20 (R2-1704836)). It has been proposed that in the downlink packet duplication, the base station does not control activation/deactivation of the UE (see Non-Patent Document 21 (R2-1702753)).

In the RLC-AM, the RLC entities in the transmitter and the receiver are integrated (see Non-Patent Document 17 (TS36.322 v14.0.0)).

However, in the packet duplication using the RLC-AM, for example, the packet duplication in the SRBs, deactivation of the uplink packet duplication causes a problem of clearing a buffer of the RLC layer in the downlink packet duplication.

The third embodiment discloses a method for solving such a problem.

The UE clears only the buffer at the transmitter in the RLC-AM. The base station clears only the buffer at the transmitter in the RLC-AM. The UE and/or the base station may clear the buffer upon deactivation of the uplink packet duplication.

The UE may clear a variable and a transmission window at the transmitter in the RLC-AM.

As an alternative method, the base station simultaneously controls the packet duplication in the downlink and the uplink. The simultaneous control of the downlink and the uplink may be applied to the packet duplication using the RLC-UM and/or the RLC-TM.

This method described in the third embodiment can prevent the deactivation of the uplink packet duplication from clearing the buffer in the downlink packet duplication. This can ensure the continuity in the data.

The Fourth Embodiment

In NR, an RRC_INACTIVE state has been newly introduced as a state of the UE (see Non-Patent Document 9 (3GPP TR38.804 V14.0.0)). In NR, supporting small data transmission from the UE in the RRC_INACTIVE state has been proposed (see Non-Patent Document 9 (3GPP TR38.804 V14.0.0)).

However, regarding the small data transmission from the UE in the RRC_INACTIVE state, whether the packet duplication described in the first and second embodiments is supported has not yet been discussed. Thus, when the UE that performs transmission with the packet duplication transitions to the RRC_INACTIVE state, the UE does not know the small data transmission method and has a problem of failing to transmit data to the base station.

The fourth embodiment discloses a method for solving such a problem.

The UE does not support the packet duplication in the RRC_INACTIVE state.

The UE may retain the setting of the packet duplication. The UE may retain the setting when transitioning to the RRC_INACTIVE state. The setting may be the setting on the packet duplication with the DC or the setting on the packet duplication with the CA. When transitioning to RRC_CONNECTED again, the UE can promptly resume the packet duplication.

The UE may deactivate the packet duplication. The UE may deactivate the packet duplication when transitioning to the RRC_INACTIVE state. The UE may autonomously deactivate the packet duplication. Alternatively, the base station or the master base station may instruct the UE to deactivate the packet duplication. The MAC signaling for deactivating the packet duplication which is described in the first embodiment may be applied to the instruction. Alternatively, the instruction may be included in an instruction for transitioning to the RRC_INACTIVE state from the base station or the master base station to the UE.

The UE may release the setting of the packet duplication. The UE may release the setting when transitioning to the RRC_INACTIVE state. The UE may autonomously release the setting. Alternatively, the base station or the master base station may instruct the UE to release the setting. The UE may release the setting on the packet duplication simultaneously when releasing the setting of the DC or the setting of the CA. This can reduce the memory usage of the UE in the RRC_INACTIVE state.

As another example, the base station or the master base station may notify the UE to maintain/release the setting of the packet duplication. The base station or the master base station may include the notification of maintaining/releasing of the setting, in the instruction for the UE to transition to the RRC_INACTIVE state. For example, an identifier indicating whether to maintain or release the setting of the packet duplication may be included in the instruction. Consequently, the base station or the master base station can, for example, make flexible settings according to a radio channel state.

The base station or the master base station may set, for each bearer, whether to maintain or release the setting of the packet duplication. This enables flexible operations of the packet duplication for each bearer.

The following four examples (1) to (4) are disclosed as methods for notifying, from the base station or the master base station to the UE, whether to maintain or release the setting of the packet duplication for each bearer:

(1) determined in a standard;
(2) common signaling;
(3) dedicated signaling; and
(4) combinations of (1) to (3) above.

In (1), for example, whether to maintain or release the setting may be determined for each bearer type. For example, the setting of the packet duplication may be maintained in the SRBs, and the setting of the packet duplication may be released in the DRBs. Alternatively, for example, the setting of the packet duplication may be maintained in the SRB0 and the SRB2, and the setting of the packet duplication may be released in the SRB1, the SRB3, and the DRBs. This can reduce the amount of signaling.

In (2), the base station or the master base station may notify whether to maintain or release the setting, using system information. This can reduce the amount of signaling.

In (3), the base station or the master base station may notify whether to maintain or release the setting, using, for example, the RRC-dedicated signaling. The RRC-dedicated signaling may be an instruction for the UE to transition to the RRC_INACTIVE state, or another RRC-dedicated signaling. The RRC-dedicated signaling may include an identifier of a bearer for maintaining the setting of the packet duplication, an identifier of a bearer for releasing the setting of the packet duplication, or both of the identifiers. Whether to maintain or release the packet duplication can be flexibly set for each bearer.

In (3), whether to maintain or release the setting of the packet duplication may be notified for each bearer type. The details on whether to maintain or release the packet duplication for each bearer type may be similar to those described above (1). The flexible setting is possible for each bearer type.

In (4), whether to maintain or release the setting of the packet duplication, for example, in each of the SRBs may be defined in a standard. The base station or the master base station may dedicatedly notify the UE of whether to maintain or release the setting of the packet duplication in each of the DRBs. This can increase the flexibility of the setting for each of the DRBs as well as reducing the amount of signaling.

The UE may perform the small data transmission using the packet duplication. The UE may perform the small data transmission after transitioning to the RRC_CONNECTED state. The UE may maintain the setting of the packet duplication. The UE may maintain the setting after transitioning to the RRC_INACTIVE state. This facilitates the control over the UE on transmission of data.

The UE may activate the packet duplication. The UE may activate the packet duplication after transitioning to the RRC_CONNECTED state. The UE may autonomously activate the packet duplication. For example, the UE may activate the packet duplication using information indicating an activation/deactivation state of the packet duplication which is described in the first embodiment. Alternatively, the UE may activate the packet duplication, using an instruction for activating the packet duplication from the base station or the master base station. The instruction for activating the packet duplication may be included in an instruction for transitioning to RRC_CONNECTED from the base station or the master base station to the UE or notified separately from the instruction for transitioning to RRC_CONNECTED. The base station or the master base station may notify the UE of the instruction for activating the packet duplication via the MAC signaling described in the first embodiment.

The UE may release the setting of the packet duplication upon reselection of a cell. Alternatively, the UE may release the setting of the packet duplication upon transitioning to an RRC_IDLE state. The UE may release the setting autonomously or using an instruction from the base station or the master base station. This can reduce the memory usage of the UE upon reselection of a cell and/or in the RRC_IDLE state.

The fourth embodiment can prevent an operating error in the UE on the small data transmission during an INACTIVE time.

The Fifth Embodiment

In transmission of data to the secondary base station in the RRC_INACTIVE state which is described in the fourth embodiment, adding the SCG after restoration from the RRC_INACTIVE state and then transmitting the data to the secondary base station has been proposed (see Non-Patent Document 25 (R2-1704425)). As an alternative method, an early SCG bearer configuration for adding the SCG simultaneously with restoration from the RRC_INACTIVE state has been proposed (see Non-Patent Document 26 (R2-1704420)).

The two methods, however, cause a problem of delay in starting to transmit data from the UE to the secondary base station, because the UE waits for the SCG being added and then transmits the data to the secondary base station.

The fifth embodiment discloses a method for solving such a problem.

The UE transmits data to the secondary base station through the master base station. The data may be data to be transmitted using the SCG split bearer. The master base station transfers the data to the secondary base station. The master base station may transfer the data through an interface between the base stations, for example, the X2 interface.

In the fifth embodiment, the master base station may switch from the SCG bearer to the SCG split bearer. The master base station may notify the secondary base station of a request for the switching. The secondary base station may notify the master base station of a response to the request. The master base station may perform the switching simultaneously when instructing the UE to transition to the RRC_INACTIVE state or separately from the instruction for transitioning the state. The master base station may include the switching instruction, in the instruction for the UE to transition to the RRC_INACTIVE state. The switching instruction may include an identifier of the SCG bearer. This enables the UE to promptly transmit data to the secondary base station also in the SCG bearer.

Figure 15:
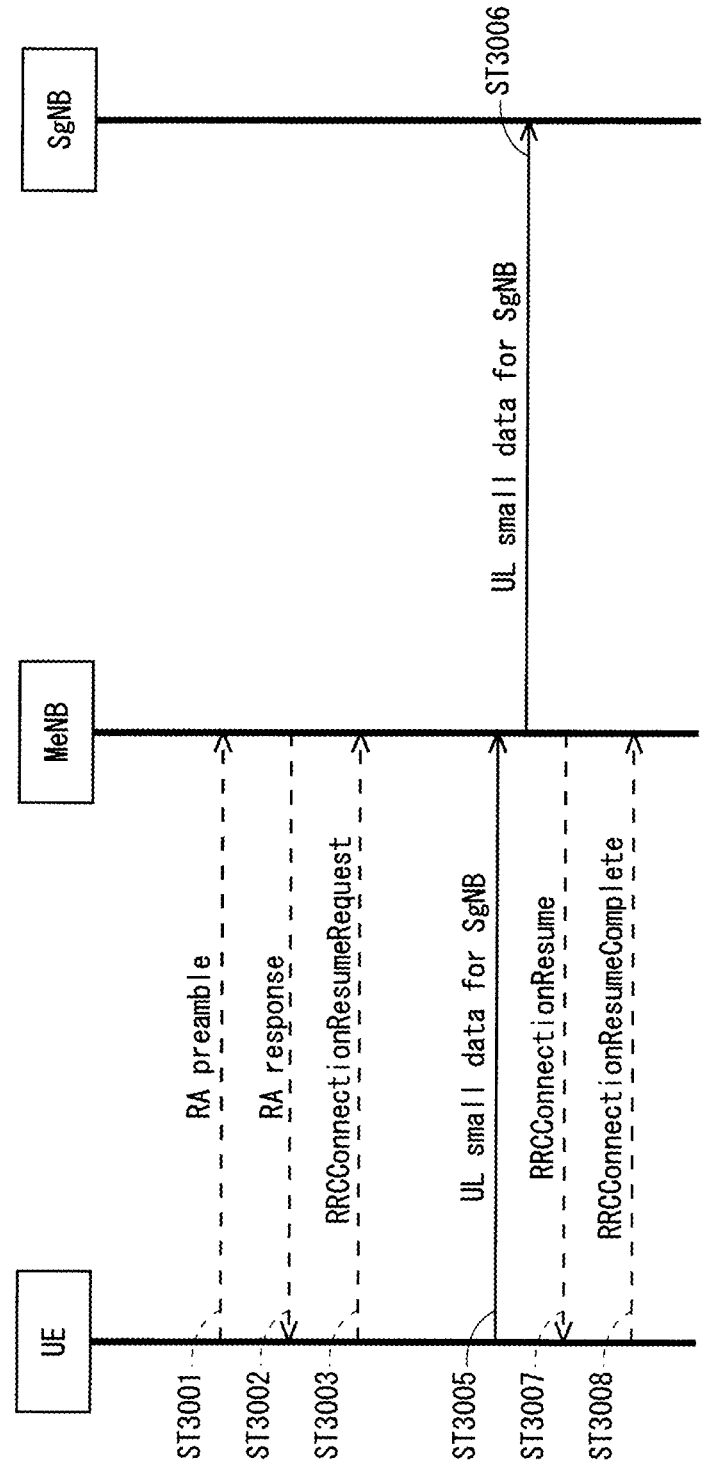
FIG. 15 is a sequence diagram illustrating small data transmission from the UE to the secondary base station according to the fifth embodiment.

FIG. 15 is a sequence diagram illustrating the small data transmission from the UE in the RRC_INACTIVE state to the secondary base station. FIG. 15 exemplifies that the master base station is the eNB and the secondary base station is the gNB. The master base station may be the gNB. The secondary base station may be the eNB. Although FIG. 15 exemplifies that the UE transitions to the RRC_CONNECTED state after the small data transmission, the UE may maintain the RRC_INACTIVE state.

In Step ST3001 of FIG. 15, the UE in the RRC_INACTIVE state starts a random access procedure for the master base station. In Step ST3001, the UE transmits a random access preamble (RA preamble) to the master base station. In Step ST3002, the master base station transmits a random access response (RA response) to the UE. The response includes an uplink grant to the UE.

In Step ST3003 of FIG. 15, the UE transmits the RRC connection resume request (RRCConnectionResumeRequest) to the master base station.

In Step ST3005 of FIG. 15, the UE transmits, to the master base station, the uplink data for the secondary base station. In Step ST3006, the master base station transmits the uplink data to the secondary base station.

In Step ST3007 of FIG. 15, the master base station gives the UE the RRC connection resumption (RRCConnectionResume) notification. In Step ST3008, the UE gives the master base station the RRC connection resumption complete (RRCConnectionResumeComplete) notification. The UE transitions to the RRC_CONNECTED state in Step ST3008.

The method disclosed in the fifth embodiment enables the UE in the INACTIVE state to promptly transmit data to the secondary base station.

The Sixth Embodiment

The MC has been proposed as the 5G technology in the 3GGP (see Non-Patent Document 27 (R2-167583)). Configuring the connection of one UE to one master base station and a plurality of secondary base stations has been discussed as the MC. Moreover, support of the MCG split bearer and the SCG bearer has been proposed as the MC. A group of MeNB cells is referred to as the MCG. A group of SgNB cells is referred to as the SCG.

However, none discloses, in the MC using two or more secondary base stations, architecture including a high-level NW device (hereinafter also referred to as a high-level NW) and a method for setting the MC, for example, how to set the two or more secondary base stations. The sixth embodiment discloses an architecture including the high-level NW, and a method for setting the MC.

Figure 16:
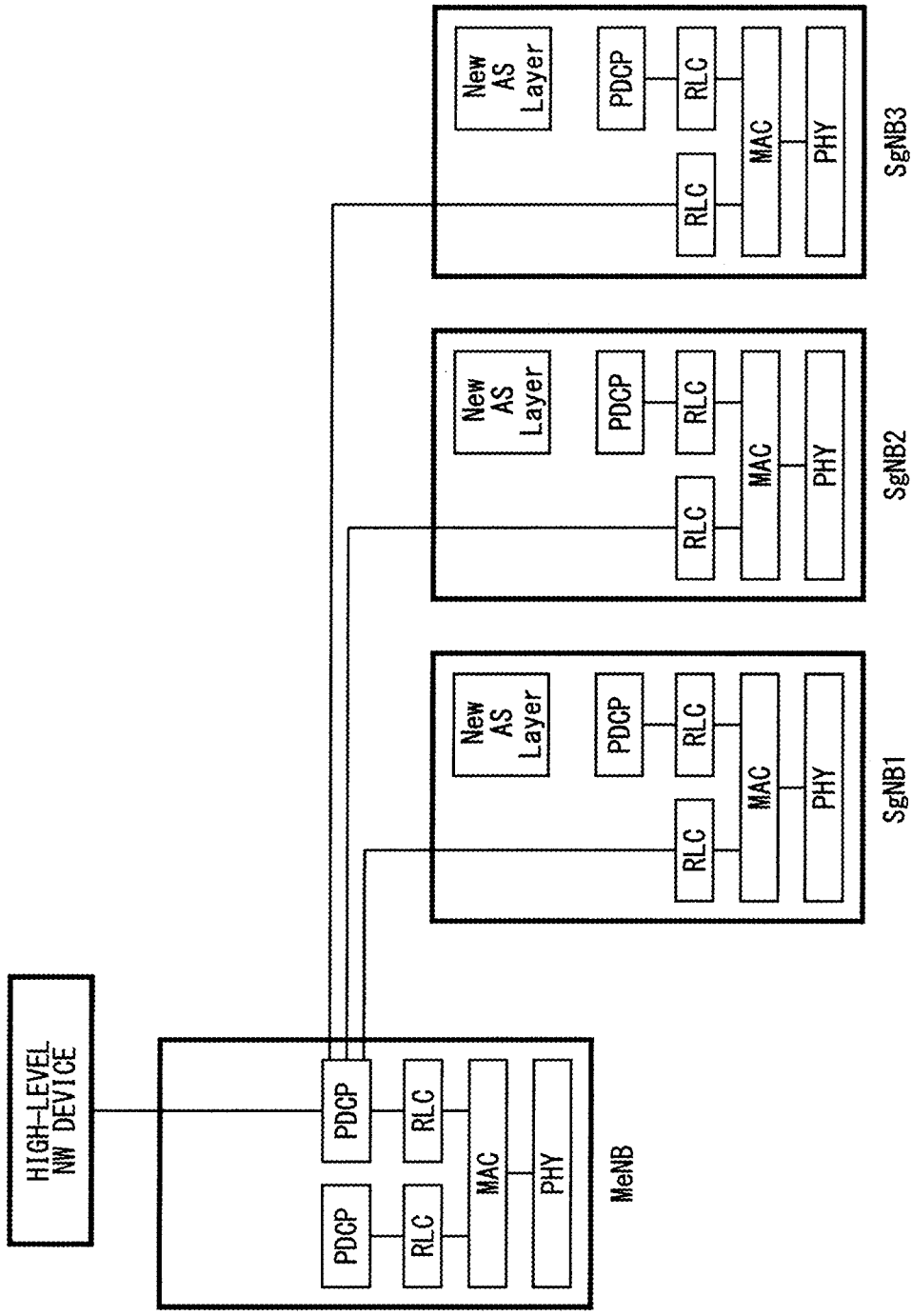
FIG. 16 illustrates an architecture of the MC according to the sixth embodiment.

FIG. 16 illustrates an architecture of the MC. FIG. 16 illustrates that the high-level NW is an EPC, the master base station is a base station in the LTE (eNB), and the secondary base stations are base stations in NR (gNBs). The master base station in the LTE is referred to as the MeNB, and the secondary base stations in NR are referred to as the SgNBs. The protocol configuration of the eNB includes the PDCPs, the RLCs, the MAC, and the PHY. The protocol configuration of the gNB consists of the New AS sublayer, the PDCP, the RLCs, the MAC, and the PHY. The New AS sublayer is set higher than the PDCP.

Although FIG. 16 illustrates the architecture on the base station side, the architecture on the UE side is identical to that on the base station side except for the high-level NW. One UE includes the RLC, the MAC, and the PHY for the MeNB, the RLC, the MAC, and the PHY for each of SgNBs set for the MC, and the PDCP.

FIG. 16 illustrates the use of the MCG split bearer. The high-level NW is connected to the MeNB, and the SgNBs for the MC are connected to the MeNB. The PDCPs of the MeNB process the downlink data. Even when the number of SgNBs is more than one, the PDCPs assign one serial sequence number (SN) to each data. The data to which the SN is assigned is split into the MeNB and the SgNBs. The pieces of split data are transmitted to the RLCs in the MeNB and the SgNBs, processed by the RLCs, the MACs, and the PHYs in the MeNB and SgNBs, and transmitted to the UE.

The pieces of data received by the UE from the MeNB and the SgNBs are processed by the PHYs, the MACs, and the RLCs for the MeNB and the SgNBs, and then transferred to the PDCP. The PDCP performs reordering based on the SNs assigned to the pieces of the data transferred from layers for the MeNB and the SgNBs, and transfers the pieces of data to the upper layer.

The PDCP in the UE processes the pieces of data from the upper layer as the uplink data. Similarly in the downlink, even when the number of SgNBs is more than one, the PDCP assigns one serial sequence number (SN) to each data in the uplink. The data to which the SN is assigned is split into the RLCs for the MeNB and the SgNBs to be transferred. The pieces of transferred data are processed by the RLCs, the MACs, and the PHYs for the MeNB and the SgNBs, and transmitted to the MeNB and the SgNBs.

The pieces of data received by the MeNB and the SgNBs from the UE are processed by the PHYs, the MACs, and the RLCs for the MeNB and the SgNBs, and then transferred to the PDCP of the MeNB. The PDCP of the MeNB performs reordering based on the SNs assigned to the pieces of data, and transfers the pieces of data to the high-level NW.

A method for setting a plurality of SCGs for the MC is disclosed. The MeNB sets, to the UE, the SCGs for the MC. A radio bearer for performing the MC is set in the setting of the SCGs. The setting should be notified via the RRC signaling.

The SCGs are set one by one. The settings of the plurality of SCGs for the MC are made using one setting of the SCG. The one setting of the SCG should be made as many as the number of the SCGs for the MC. The signaling for setting the SCG is performed as many as the number of the SCGs which the MeNB sets to the UE. Since the number of the SCGs to be connected in the DC is only one, the SCG previously set needs to be released when the other SCGs are connected while the one SCG is set. Aside from this, an additional setting of the SCG is made without releasing the SCG previously set. This enables the MeNB to set a plurality of SCGs to the UE.

Information indicating the additional SCG setting while the previous SCG setting is maintained may be provided. The MeNB notifies the UE of the information. The MeNB may include the information in the SCG setting to be notified. As an alternative method, a signaling for the additional SCG setting while the previous SCG setting is maintained may be provided. In the presence of the one SCG setting by the MeNB with the additional signaling, the UE can recognize the setting as the additional SCG setting while the previous SCG setting is maintained.

For example, the RRCConnectionReconfiguration for setting the RRC connection may be used as the RRC signaling. For example, SCG-ConfigPartSCG in the signaling may include an SCG configuration, and a bearer configuration for performing the MC. Examples of the bearer configuration include a bearer identifier, and an AS setting for the bearer.

In the DC, the MCG and only one SCG are set per bearer. When a plurality of SCGs are set in the MC, the plurality of SCGs may be set per bearer. In the settings of the SCG configurations from the second time onward, the bearer set with the previous SCG configurations may be used. The same bearer identifier may be set. Consequently, the UE can recognize that a plurality of SCG configurations are set to the bearer.

The setting of the bearer may differ for each SCG for the MC. When the bearer identifier set with the previous SCG configurations is set in the settings of the SCG configurations from the second time onward, one or a plurality of parameters of AS setting for the bearer with the bearer identifier previously set may be omitted. When the parameters are omitted, the parameter of the AS setting for a bearer with the same bearer identifier is used.

SCG identifiers may be provided. The SCG identifiers may be included as information on the SCG configuration for the SCG setting. The SCGs with the same AS parameter for bearer may be set using the SCG identifiers. For example, the SCG identifiers are included in the bearer configuration. This enables the UE to recognize that the bearer configuration set to the SCGs is the bearer configuration set to the SCGs indicated by the SCG identifiers. Consequently, the AS parameter for bearer which is set to the SCGs can be identical to the AS parameter for bearer which is set to an arbitrary SCG.

Consequently, when the AS parameters for bearer to be set to the respective SCGs for the MC are the same, the parameters can be omitted or set with less amount of information. The radio resources necessary for the MeNB to notify the UE can be reduced.

Although the assignment of the SCG identifier is disclosed, an SgNB identifier may be assigned. An identifier indicating a pair of SCGs or SgNBs may be assigned. Assignment of such an identifier enables the UE to recognize the setting not for each cell but for each SgNB or each SgNB pair when the MC is set to many SgNBs. This is effective when the setting is changed for each SgNB or for each SgNB pair. This reduces information to be notified from the MeNB to the UE.

Figure 17:
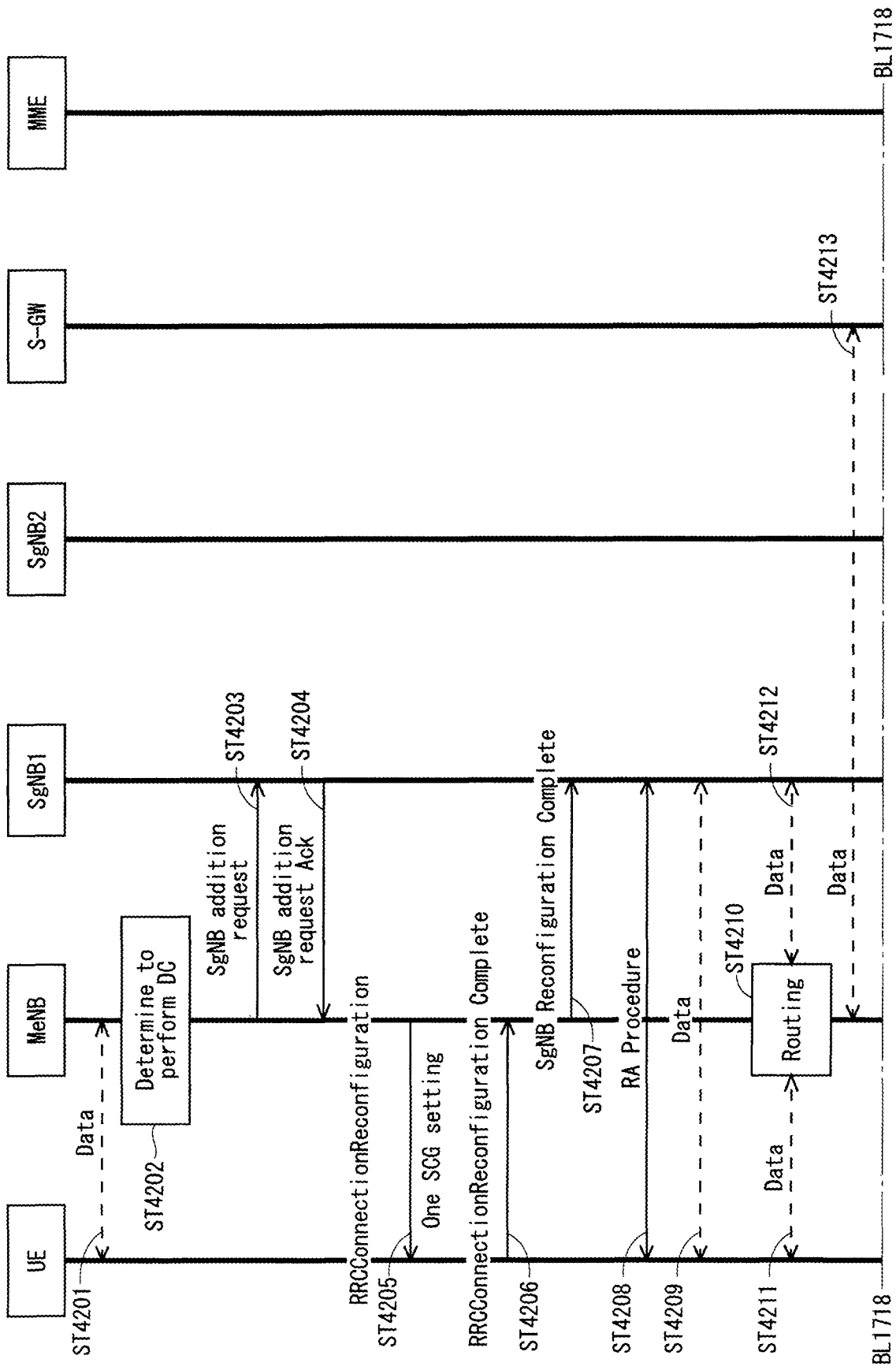
FIG. 17 illustrates an example sequence for setting the MC according to the sixth embodiment.
Figure 18:
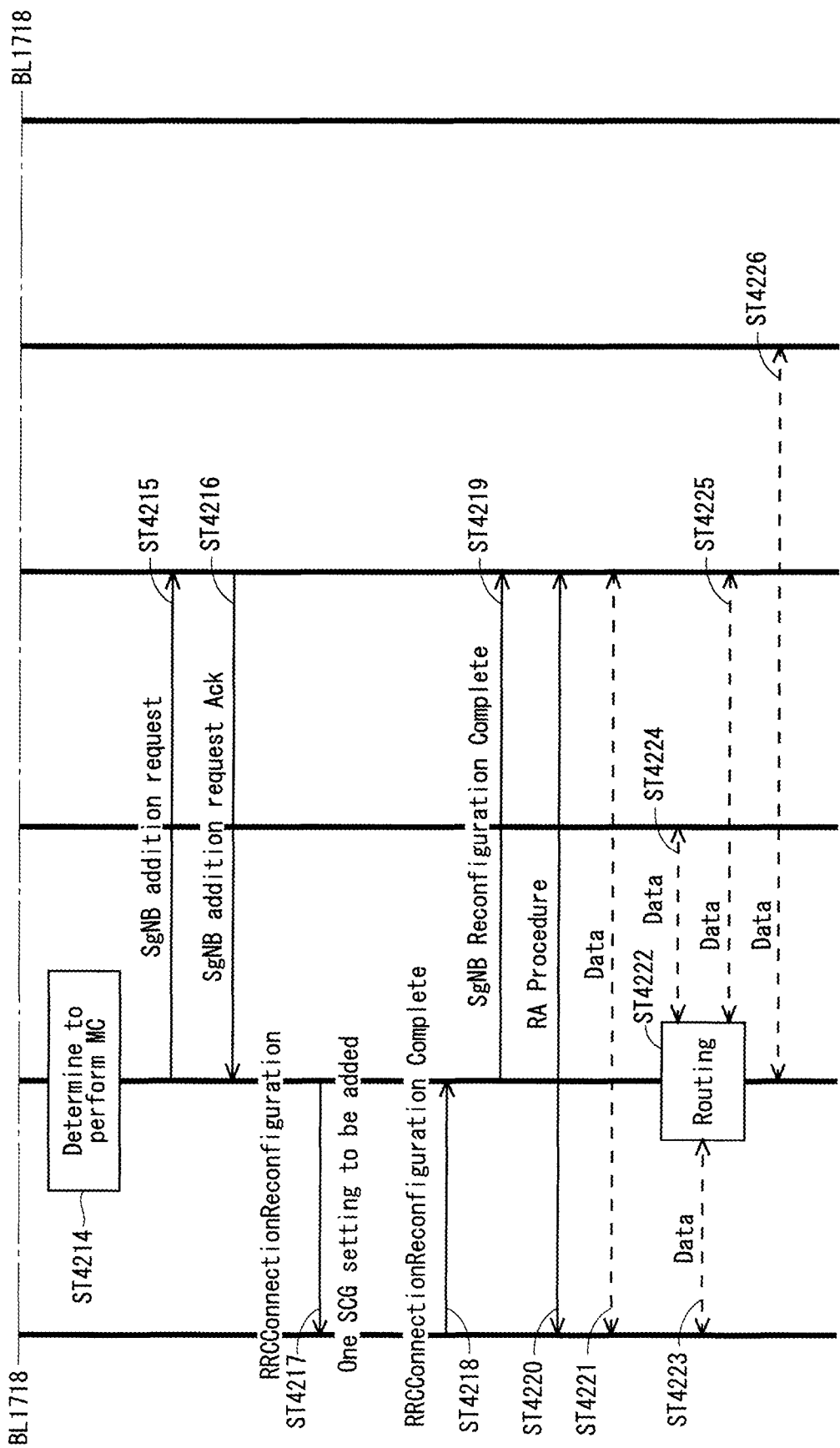
FIG. 18 illustrates the example sequence for setting the MC according to the sixth embodiment.

FIGS. 17 and 18 illustrate an example sequence for setting the MC. FIGS. 17 and 18 are connected across a location of a border BL 1718. FIGS. 17 and 18 illustrate the use of the MeNB and two SgNBs (SgNB 1 and SgNB 2). FIGS. 17 and 18 illustrate the use of the MCG split bearer. In Step ST4201, data is communicated between the UE and the MeNB. In Step ST4202, the MeNB determines to perform the DC for the UE. The method disclosed in Non-Patent Document 1 (TS36.300) should be applied to DC setup processing. Steps ST4203 to ST4213 illustrate the DC setup processing.

In Step ST4210, the MeNB routes data into its own MeNB and the SgNB 1 to which the DC has been set. Since the number of secondary base stations to be connected is one, data from the high-level NW is processed by the PDCP of the MeNB, and split into its own MeNB and the SgNB 1 to be transferred, similarly to the conventional DC. Data received by its own MeNB and the SgNB 1 from the UE is transferred to the MeNB, processed by the PDCP of the MeNB, and transferred to the high-level NW.

The same applies to the UE side.

In Step ST4214, the MeNB determines to set the MC to the UE. The MeNB determines to connect the UE to the SgNB 2 while maintaining the connection of the UE to the SgNB 1. In Step ST4215, the MeNB notifies the SgNB 2 of an SgNB addition request. Step ST4203 in the DC setup processing may be applied to this signaling. The MeNB may make the bearer setting of the SgNB 2 which is requested to be added, identical to the bearer setting of its own eNB (MeNB). Alternatively, the MeNB may determine the bearer setting of the SgNB 2 in consideration of the bearer settings of its own eNB (MeNB) and the SgNB 1. The bearer for performing the MC should be set so that the QoS set by the high-level NW is satisfied.

The SgNB 2 determines the AS setting according to the bearer setting indicated by the SgNB addition request from the MeNB. In Step ST4216, the SgNB 2 notifies the MeNB of the determined AS setting. In Step ST4217, the MeNB notifies the UE of the settings of the MC. As the settings of the MC, the MeNB notifies the SCG configuration of the SgNB 2 to be added and the bearer configuration for performing the MC. The RRCConnectionReconfiguration for setting the RRC connection may be used as the signaling.

In Step ST4217, the MeNB may notify the UE of the information indicating the additional SCG setting while the previous SCG setting of the SgNB 1 is maintained. With the information specified, the UE can clearly recognize the setting for connection to the SgNB 2 with the connection to the SgNB 1 maintained. The malfunctions in the UE can be reduced.

Upon receipt of the additional SCG setting of the SgNB 2 in Step ST4217, the UE sets the MC not only to the MeNB and the SgNB 1 but also to the SgNB 2 according to the setting. In Step ST4218, the UE gives the MeNB the RRC connection reconfiguration complete (RRCConnectionReconfigurationComplete) notification including completion of the settings of the MC.

Upon recognizing that the UE has completed the settings of the MC, the MeNB notifies the SgNB 2 of the signaling indicating completion of the additional SCG setting of the SgNB 2 in Step ST4219. The SgNB 2 recognizes completion of the connection setting with the UE for the MC.

In Step ST4220, the UE starts the RA procedure with the SgNB 2. The setting for the RA procedure with the SgNB 2 is notified in the AS setting from the SgNB 2 through Steps ST4216 and ST4217. The UE, which has been synchronized by the RA procedure, starts data communication with the SgNB 2 in Step ST4221.

The MeNB should have routing functions for a plurality of SgNBs. Since the number of the SgNBs to be connected in the DC is one, data split into the SgNB side has only to be transferred to one SgNB as it is. However, since the MeNB is connected to a plurality of the SgNBs in the MC, the MeNB needs to determine which SgNB the data split into the SgNB side is transferred to. Thus, the MeNB is provided with the routing functions of determining the SgNB to which data is transferred and transferring the data to the determined SgNB.

The routing functions should include a function of transferring, to the PDCP of the MeNB, data received by its own MeNB from the UE and data received by a plurality of SgNBs and transferred to the MeNB.

The routing functions may be provided in the PDCP of the MeNB. The routing functions may be provided as the lowest functions among the functions of the PDCP. Alternatively, the routing functions may be provided separately from the PDCP. Although providing the routing functions separately from split functions is disclosed, the routing functions may be provided as a part of the split functions as an alternative method. The functions may be not functions of splitting data and then routing the data, but functions of splitting data between the MeNB and a plurality of SgNBs.

The routing functions may be performed for each data. The routing is performed to the SgNBs for each data. Alternatively, the same routing may be performed for a predetermined duration. Pieces of data for the predetermined duration are routed to the same SgNB. This enables flexible routing. The routing appropriate for a communication quality state of each SgNB is possible.

The same applies to the UE side.

In Step ST4222, the MeNB routes data into its own MeNB, and the SgNB 1 and the SgNB 2 to which the MC has been set. Since the number of secondary base stations to be connected is two, data from the high-level NW is processed by the PDCP of the MeNB, and then split into its own MeNB and the SgNB to be transferred. The data split into the SgNB side is routed to the SgNB 1 and the SgNB 2 with the routing functions, and then transferred to the SgNB 1 and the SgNB 2.

The data received by the SgNB 1 and the SgNB 2 from the UE is transferred to the MeNB, and then transferred to the PDCP of the MeNB with the routing functions together with the data received in its own MeNB. The data transferred to the PDCP is processed by the PDCP, and then transferred to the high-level NW.

This enables the MC using a plurality of SgNBs. The MeNB can set the MC to the UE using the plurality of SgNBs. The UE can perform the MC through connecting with the MeNB and the plurality of set SgNBs.

When the setting of the SgNBs is canceled, the SCG configurations of the SgNBs to which the MC has been set should be canceled one by one.

Setting or canceling the secondary base stations to which the MC is set one by one can set, to the UE, the SgNBs appropriate according to radio propagation situations of the MeNB and the respective SgNBs. This can provide the UE with high throughput.

Even upon occurrence of a failure in the additional setting of the SgNBs for the MC on the way, setting or canceling the secondary base stations to which the MC is set one by one enables execution of the MC using the settings of the SgNBs while the successful settings of the SgNBs for the MC until then are maintained. The additional setting for the next SgNB can be made again from the successful setting of the SgNBs for the MC. Even upon occurrence of a failure in the additional setting of the SgNBs, a robust and stable system can be built.

Another method for setting a plurality of SCGs for the MC is disclosed. The MeNB sets, to the UE, the SCGs for the MC. A radio bearer for performing the MC is set in the setting of the SCGs. The setting should be notified via the RRC signaling.

A plurality of SCGs are set. A plurality of SCGs for the MC are set with a one-time setting. The MeNB signals the UE for a plurality of SCG settings. The signaling for the plurality of SCG settings may be provided for the MC. This enables the MeNB to set a plurality of SCGs to the UE.

When the DC is previously set, a plurality of SCG settings for the MC may be set with the one-time setting after the previous DC setting is released. When the MC is previously set and is then performed using the SCGs of different SgNB s, a new MC setting should be made with the one-time setting after the previous MC setting is released.

The previous DC setting or the previous MC setting may be released separately from the signaling for setting the plurality of the SCG settings for the MC. As an alternative method, the previous DC setting or the previous MC setting may be released via the same signaling as that for setting the plurality of the SCG settings for the MC. This can reduce the amount of signaling and the control latency.

For example, the RRCConnectionReconfiguration for setting the RRC connection may be used as the RRC signaling. The signaling should include, for example, information on a plurality of SCGs to be set. A list may be used as information on the plurality of SCGs. For example, a list of a plurality of SCGs to be set should be provided, which should include pieces of the configuration information of the SCGs as many as the set SCGs. The pieces of the configuration information of the SCGs may be set, for example, in the SCG-ConfigPartSCG previously described.

Identifiers may be provided to groups of the SCGs to be set. Identifiers may be provided to groups of SgNBs to be set. For example, when a plurality of SCG settings for the MC are collectively canceled, inclusion of the identifier of the group of the SCGs which have been assigned in the setting, into the signaling for canceling the SCGs can reduce the amount of information for the setting.

The UE may store the identifier of the group of the SCGs in association with the SCGs of the SgNBs included in the group of the SCGs. The UE may discard the stored records when a state with the base station goes into idle state. The UE should maintain the stored records when a state with the MeNB goes into connected and inactive state, a connected state, or an inactive state.

For example, when the additional setting of a plurality of SCGs for the MC is collectively made again after the setting for the MC is canceled, the identifier of the group of the SCGs that is previously set is included in the signaling for the additional setting. The UE can recognize the SCG configurations of the SgNBs included in the group of the SCGs, from the identifier of the group of the SCGs that is previously notified from the MeNB. Consequently, the amount of information for the additional setting can be reduced.

The SCG configuration and a bearer configuration for performing the MC may be included as information on each of a plurality of SCGs to be set for the MC. Examples of the bearer configuration include a bearer identifier, and an AS setting for the bearer. The bearer should be set in the method described above. Each of the SCGs may include SCG identifier information as previously described. This enables the MeNB to set, to the UE, the SCG configurations of a plurality of SgNBs for the MC at one time.

Figure 19:
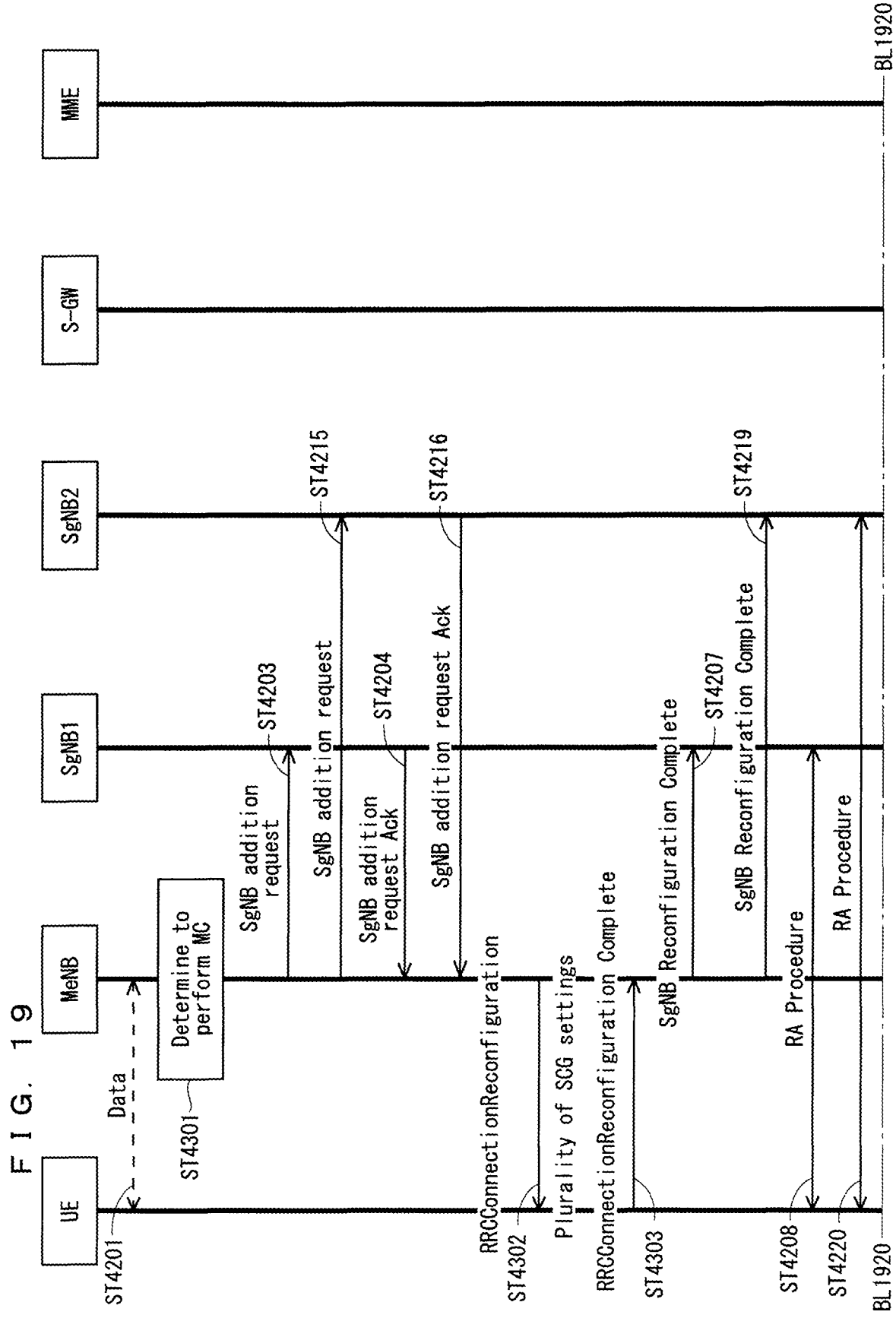
FIG. 19 illustrates an example sequence for setting the MC according to the sixth embodiment.
Figure 20:
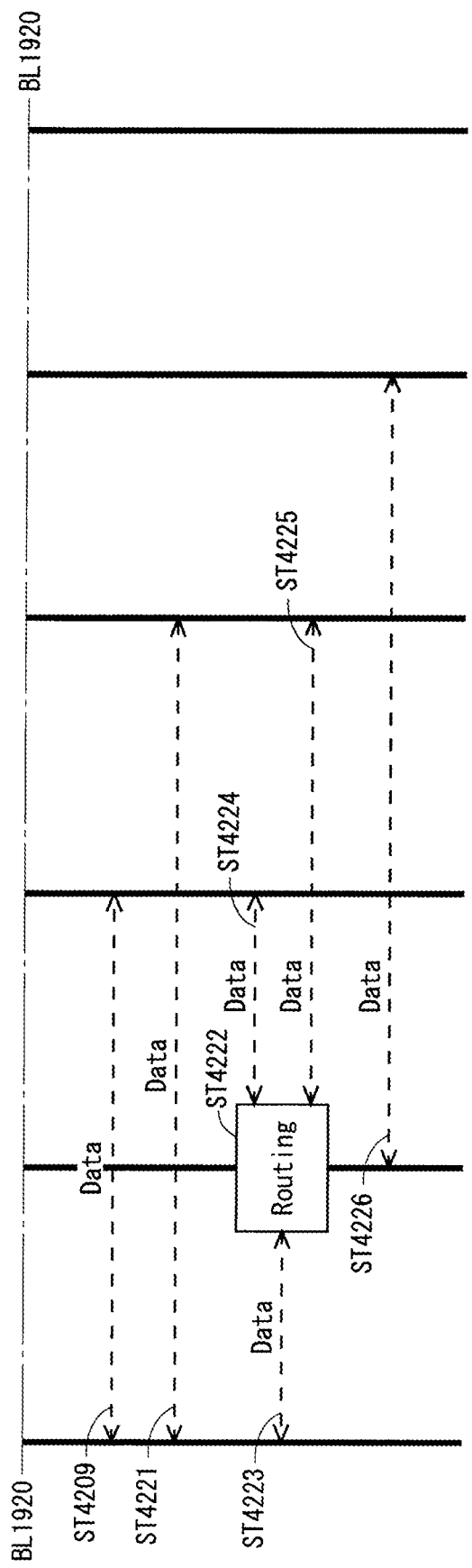
FIG. 20 illustrates the example sequence for setting the MC according to the sixth embodiment.

FIGS. 19 and 20 illustrate an example sequence for setting the MC. FIGS. 19 and 20 are connected across a location of a border BL 1920. FIGS. 19 and 20 illustrate the use of the MeNB and two SgNBs (SgNB 1 and SgNB 2). FIGS. 19 and 20 illustrate the use of the MCG split bearer. FIGS. 19 and 20 illustrate a method for setting the SCG of a plurality of SgNBs for the MC at one time. Since the sequence illustrated in FIGS. 19 and 20 includes the same steps as those of the sequence illustrated in FIGS. 17 and 18, the same step numbers are applied to the same Steps and the common description thereof is omitted.

In Step ST4301, the MeNB determines to perform the MC using a plurality of SgNBs for the UE. Here, the MeNB determines to perform the MC using the SgNB 1 and the SgNB 2. In Steps ST4203 and ST4215, the MeNB notifies the SgNB 1 and the SgNB 2, respectively, of SgNB addition requests. In Steps ST4204 and ST4216, the SgNB 1 and the SgNB 2, respectively, notify the MeNB of the AS settings determined in response to the addition requests.

In Step ST4302, the MeNB notifies the UE of the settings of the MC. The MeNB notifies, as the settings of the MC, the SCG configurations of the plurality of SgNBs for the MC, and the bearer configuration for performing the MC. The RRCConnectionReconfiguration for setting the RRC connection may be used as the signaling.

In Step ST4302, the MeNB may notify the UE of release of the settings as well when the DC or the MC is previously set. The notification enables the collective SCG settings of the plurality of SgNBs for the MC. The UE can clearly recognize the settings for connection to the SgNB 1 and the SgNB 2 for the MC. The malfunctions in the UE can be reduced.

Upon receipt of the additional SCG settings of the SgNB 1 and the SgNB 2 in Step ST4302, the UE sets the MC to the MeNB, the SgNB 1, and the SgNB 2 according to the settings. In Step ST4303, the UE gives the MeNB the RRC connection reconfiguration complete (RRCConnectionReconfigurationComplete) notification including completion of the settings of the MC.

Upon recognizing that the UE has completed the settings of the MC, the MeNB notifies the SgNB 1 of the signaling indicating the completion of the additional SCG setting of each of the SgNBs in Step ST4207, and notifies the SgNB 2 of the signaling indicating the completion of the additional SCG setting of each of the SgNBs in Step ST4219. The SgNB 1 and the SgNB 2 recognize completion of the connection settings with the UE for the MC.

In Steps ST4208 and ST4220, the UE starts the RA procedures with the SgNB 1 and the SgNB 2, respectively. The setting for the RA procedure of the SgNB 1 is notified in the AS setting from the SgNB 1 through Steps ST4204 and ST4302. The setting for the RA procedure with the SgNB 2 is notified in the AS settings from the SgNB 2 through Steps ST4216 and ST4302. The UE, which has been synchronized by the RA procedure, starts data communication with the SgNB 1 and the SgNB 2 in Steps ST4209 and ST4221, respectively.

Since Steps ST4222 to ST4226 are the same processes as those in FIGS. 17 and 18, the description thereof is omitted.

This enables the MC using a plurality of SgNBs. The MeNB can set the MC using the plurality of SgNBs to the UE. The UE can perform the MC through connecting with the MeNB and the plurality of set SgNBs.

When the SCG settings of the plurality of SgNBs is canceled, all the SCG configurations of the SgNBs to which the MC has been set are collectively canceled. The signaling from the MeNB to the UE at one time cancels the SCG settings of the plurality of SgNBs.

As such, setting or canceling the secondary base stations to which the MC is set at one time enables reduction in the amount of signaling. Moreover, the setting or canceling of the MC can be controlled with low latency. Thus, an appropriate SgNB can be set to the UE according to the fast time variation in the radio propagation situations of the MeNB and the SgNBs. This can provide the UE with high throughput.

As methods for setting or canceling a plurality of SCGs for the MC, the method for setting or canceling the SCGs one by one, and the method for setting or canceling the plurality of SCGs for the MC with the one-time setting are disclosed. These methods may be appropriately combined. For example, a plurality of SCGs may be set instead of setting the SCGs one by one. A plurality of SCGs are set to the same bearer. The method for setting the plurality of SCGs for the MC with the one-time setting may be applied to a method for setting the plurality of SCGs.

Information indicating whether or not the setting is the additional SCG setting while the previous SCG setting is maintained may be included. The UE can recognize that the setting of a plurality of SCGs for the MC that has been made with the one-time setting is the additional SCG setting that maintains the previous SCG setting.

In such a case, information for canceling the setting for the MC may be separately provided from information for canceling settings of one or more SCGs. The information for canceling the setting for the MC may be information for canceling the current bearer format. Such information may be used, for example, for canceling the MCG split bearer. The information for canceling settings of one or more SCGs may be information for canceling the settings of one or more SCGs from the MC, that is, information for eliminating an SCG from the SCGs of the SgNBs performing the MC. The SCG may be identified using an identifier of the SCG.

The MeNB should appropriately use the information according to a situation. The MeNB sets the information to the UE according to whether the setting for the MC or the settings of one or more SCGs are canceled. Upon receipt of the information, the UE can determine whether the setting for the MC or the settings of one or more SCGs are canceled.

For example, when notified of the cancelation of the setting for the MC with a plurality of SCGs being set, the UE cancels all the settings of the SCGs to cancel the setting for the MC. The UE cancels the bearer format to which the MC has been set. For example, when notified of the cancelation of the settings of one or more SCGs with a plurality of SCGs set, the UE cancels the settings of the SCGs. However, the UE does not cancel the setting for the MC. The UE does not cancel the bearer format in which the MC has been set. The UE continues the MC using the rest of the SCGs.

Consequently, the SCGs for the MC can be flexibly set. The MC can be flexibly set using appropriate SgNBs according to a state such as a moving speed of the UE and a service to be provided, a position of the base station, change in the radio propagation environment between the UE and the base station, and other conditions. The throughput can be increased.

Another method for setting a plurality of SCGs for the MC is disclosed. The MeNB sets a radio bearer for performing the MC to the UE. The MeNB sets the SCGs for the MC in the setting of the radio bearer. The MeNB should notify the setting via the RRC signaling.

The MeNB sets, to the UE, the SCGs of one or more SgNBs for a radio bearer for performing the MC. Since the SCGs of many SgNBs can be set to one or more bearers at one time when the number of secondary base stations that can be connected to the UEs for the MC is large, the amount of signaling can be reduced.

For example, the RRCConnectionReconfiguration for setting the RRC connection may be used as the RRC signaling. For example, the signaling should include information on one or more radio bearers to which the MC is set. A list may be used as information on the one or more radio bearers. For example, a list of the one or more radio bearers to which the MC is set should be provided to include, in the list, SCG configurations corresponding to the radio bearers and bearer configurations corresponding to the SCGs as many as the number of the radio bearers to which the MC is set. Information on the SCG configurations of the radio bearers and the bearer configurations may be set, for example, in the SCG-ConfigPartSCG previously described.

Identifiers of the radio bearers may be included as information on the one or more radio bearers to be set in a list. Here, the SCG-ConfigPartSCG may be prevented from including the identifiers of the radio bearers. Alternatively, the identifiers of the radio bearers need not be included as the information on the one or more radio bearers to be set in a list. Here, the identifiers of the radio bearers should be included in the SCG-ConfigPartSCG. Assigning the identifiers of the radio bearers can facilitate the settings of the radio bearers for performing the MC.

SCG identifiers with the same bearer configuration may be included as the bearer configuration information for each of the SCGs. When the SCG identifiers are included as the bearer configuration information notified from the MeNB, the UE can determine that the same configuration as the bearer configuration of the SCGs with the SCG identifiers is applied. When a part of the bearer configuration is different, the SCG identifier and information on only the different bearer configuration may be included as the bearer configuration information. The same information as the bearer configuration information on the SCG identifiers may be applied as information on the bearer configuration that is not included as information.

Since the entirety of the bearer configuration information need not be included as the bearer configuration information for each of the SCGs to be notified from the MeNB to the UE, the amount of information necessary for signaling can be reduced.

In the previous example, the SCG configuration information and the bearer configuration information of each radio bearer to which the MC is set are set in the SCG-ConfigPartSCG. As an alternative method, the SCG configuration information and the bearer configuration information may be separately set. For example, the bearer configuration information in the SCG-ConfigPartSCG is set separately from the SCG-ConfigPartSCG. The pieces of the bearer configuration information of the one or more radio bearers may be set in a list. The SCG configuration information is set in the SCG-ConfigPartSCG.

This method may be used when the SCGs of all the SgNBs to which the MC is set have the same bear setting. This can omit the setting of the bearer configuration information to each of the SCGs, and reduce the amount of information necessary for the signaling.

The MeNB sets the radio bearer for performing the MC to the UE. The aforementioned sequence is applicable to a sequence for setting the SCGs for the MC in the settings of the radio bearer. For example, in Step ST4302 of the sequence illustrated in FIGS. 19 and 20, the MeNB gives the UE a notification including information on the one or more radio bearers to which the MC is set, as a replacement for the SCG settings of one or more SgNBs to which the MC is set.

For example, a list of one or more radio bearers to which the MC is set is provided as one or more pieces of radio bearer information to include, in the list, SCG configurations corresponding to the radio bearers and bearer configurations corresponding to the SCGs as many as the number of the radio bearers to which the MC is set. Information on the SCG configurations of the radio bearers and the bearer configurations may be set, for example, in the SCG-ConfigPartSCG previously described. Here, information on the SCG configurations and the bearer configurations of the SgNBs 1 and 2 is set.

Upon receipt of the one or more pieces of radio bearer information in Step ST4302, the UE sets the MC to the MeNB, the SgNB 1, and the SgNB 2 according to the settings. In Step ST4303, the UE gives the MeNB the RRC connection reconfiguration complete (RRCConnectionReconfigurationComplete) notification including completion of the settings of the MC.

Since such a method enables the SCGs of many SgNBs to be set at one time to one or more bearers, the amount of signaling can be reduced. With the setting at one time, the MC can be controlled with low latency. The setting for each bearer requires only the setting of a target bearer to be changed or modified when the bearer format is changed or modified for each bearer, which can avoid complexity in the control. For example, the amount of processing in the UE can be reduced.

When data is communicated between the MeNB and each of the SgNB s, an SgNB identifier may be assigned to the data. Also, each of the SgNBs should notify the MeNB of a downlink data transmission state from its own SgNB to the UE. For example, each of the SgNBs notifies the highest PDCP PDU SN at which transmission to the UE has been successful, among the PDCP PDUs transferred from the MeNB. For example, each of the SgNBs notifies the buffer volume of its own SgNB for the bearer to which the MC is set. The SgNB may notify the amount of data required for satisfying the QoS set as the buffer volume. The SgNB may notify information for each bearer to which the MC is set.

For example, each of the SgNBs notifies the buffer volume of its own SgNB for the UE to which the MC is set. The buffer volume to be notified may be the minimal amount of data required. For example, each of the SgNBs notifies information on a packet lost by its own SgNB among pieces of data transferred from the MeNB. An identifier of each of the SgNBs may be assigned to the downlink data transmission state from its own SgNB to the UE which is to be notified from the SgNB to the MeNB.

Assigning the identifier of each of the SgNBs enables the SgNB to check whether the notification is given to its own SgNB, and enables the MeNB to identify which SgNB the notification has been received from. The MeNB should determine, for example, whether to set, modify, change, or cancel the SgNB for the MC, using the downlink data transmission state from each of the SgNBs. The MeNB may determine which SgNB a packet is routed to, using the downlink data transmission state from each of the SgNBs. The setting of the MC or the routing according to a data transmission state between each of the SgNBs and the UE is possible.

A data split method with the MC in the uplink is disclosed. The MeNB assigns a plurality of thresholds for transmission to the SgNBs, and notifies the UE of the plurality of thresholds. Since a plurality of SgNBs for the MC are set in the MC, not limited to a single threshold but a plurality of thresholds are set according to the number of SgNBs to be set.

For example, thresholds should be assigned as many as the number of SgNBs to be set for the MC. Alternatively, groups each consisting of one or more SgNBs may be formed, and thresholds may be assigned as many as the number of the SgNB groups. The MeNB assigns the plurality of thresholds and notifies the UE of the thresholds. The MeNB may give the notification via the RRC signaling.

For example, when three SgNBs are set for the MC, the MeNB assigns three thresholds and notifies the UE of the thresholds. The thresholds are denoted as TH1, TH2, and TH3. When the buffer volume of the uplink data of the UE is smaller than or equal to TH1, the UE performs uplink transmission only to the MeNB. When the buffer volume of the uplink data of the UE is larger than TH1 and smaller than or equal to TH2, the UE performs uplink transmission to the MeNB and one of the SgNBs. When the buffer volume of the uplink data of the UE is larger than TH2 and smaller than or equal to TH3, the UE performs uplink transmission to the MeNB and two of the SgNBs. When the buffer volume of the uplink data of the UE is larger than TH3, the UE performs uplink transmission to the MeNB and the three SgNBs.

As such, gradually increasing or decreasing the number of the SgNBs to be used for the uplink transmission can prevent, when the amount of uplink data is less, the UE from transmitting the data to many SgNBs. This can suppress increase in the power consumption of the UE.

A method for setting a plurality of thresholds may be setting one threshold, and then setting, as the other thresholds, values obtained by multiplying the set threshold by predetermined numbers. For example, only TH1 is set, and TH2=TH1×2 and TH3=TH1×3 are calculated. As another example, TH2=TH1×1.5 and TH3=TH1×2 may be available. The predetermined numbers may be determined in advance in, for example, a specification. Alternatively, the predetermined numbers may be semi-statically notified to the UE via the RRC signaling. This can reduce the amount of signaling to be notified to the UE.

The MeNB may set, to the UE, which SgNB the uplink transmission is performed to when the buffer volume of the uplink data exceeds a threshold. For example, priorities may be assigned to the use orders of the SgNBs. The MeNB notifies the UE of the priorities. For example, when three SgNBs are set for the MC, the SgNB 1, the SgNB 2, and the SgNB 3 are set in descending order of the priorities. The MeNB may notify the UE of the identifiers of the respective SgNB s and the priorities in association with one another.

When the buffer volume of the uplink data of the UE is smaller than or equal to TH1, the UE performs uplink transmission only to the MeNB. When the buffer volume of the uplink data of the UE is larger than TH1 and smaller than or equal to TH2, the UE performs uplink transmission to the MeNB and the SgNB 1. When the buffer volume of the uplink data of the UE is larger than TH2 and smaller than or equal to TH3, the UE performs uplink transmission to the MeNB, the SgNB 1, and the SgNB 2. When the buffer volume of the uplink data of the UE is larger than TH3, the UE performs uplink transmission to the MeNB, the SgNB 1, the SgNB 2, and the SgNB 3.

The MeNB may notify the priorities together with a threshold. Alternatively, the MeNB may notify the priorities separately from the threshold. The priorities of the SgNB s may be changed. Changing the priorities of the SgNBs according to a communication state between each of the SgNBs and the UE can increase the throughput of the uplink communication.

The previous example discloses that the UE performs uplink transmission first to the MeNB when the buffer volume of the uplink data of the UE is smaller than or equal to a predetermined threshold. As another example, the UE may perform the transmission to an SgNB when the buffer volume of the uplink data of the UE is smaller than or equal to the predetermined threshold, and perform the transmission to the MeNB when the buffer volume of the uplink data of the UE is larger than the threshold. The MeNB may set, to the UE, which one of the MeNB and the SgNBs the uplink transmission is performed to when the buffer volume of the uplink data is smaller than or equal to a threshold and exceeds the threshold. The priorities may be assigned including the MeNB, and notified to the UE. Using the SgNBs at an early stage increases the throughput of the uplink data.

When the MC using a plurality of SgNBs is set to the MeNB, the UE may route data from the upper layer between the MeNB and all the SgNBs. The previous method should be appropriately applied to the routing functions. Alternatively, with application of the data split method in the uplink, routing may be performed between the use MeNB and the use SgNBs. The SgNBs into which data is split can be flexibly set.

A method for starting transmission of the uplink data from the UE to the base station side is disclosed. The UE notifies the base station side of a scheduling request (SR). The UE may notify the base station side of a Buffer Status Report (BSR).

The UE notifies the SgNB that performs uplink transmission of the SR or the BSR. Consequently, the SR or the BSR can be processed in a lower layer in each of the SgNBs.

As an alternative method, the UE may notify the MeNB of the SR or the BSR addressed to the SgNB that performs uplink transmission. The notification should include information indicating which SgNB the SR or the BSR is addressed to. The information may be an SgNB identifier. Upon receipt of the SR or the BSR addressed from the UE to the SgNB, the MeNB notifies the SgNB to which the SR or the BSR is addressed of information indicating the reception of the SR or the BSR and information indicating details of the SR or the BSR. Upon receipt of these pieces of information, the SgNB performs uplink scheduling for the UE according to the details.

This enables the MeNB to perform the uplink scheduling for the UE to correspond to the SR or the BSR addressed to each of the SgNBs.

As an alternative method, the UE may notify the MeNB of the SR or the BSR as uplink transmission of a bearer to which the MC is set. The UE notifies not each of the SgNBs but the MeNB of the SR or the BSR as the uplink transmission of the bearer to which the MC is set. Upon receipt of the notification, the MeNB determines which SgNB is made to perform uplink scheduling using the assigned threshold. The MeNB should notify the SgNB which is made to perform the uplink scheduling of a request for starting the uplink scheduling.

The MeNB may notify the SgNB of the details of the SR or the BSR that have been notified from the UE. Alternatively, the MeNB may compute the data capacity required for the SgNB to perform the uplink scheduling to notify the SgNB of a result of the computation. The UE need not notify the SR or the BSR for each SgNB. The UE should notify the MeNB of the SR or the BSR as the uplink transmission of the bearer to which the MC is set. Thus, the power consumption of the UE can be reduced.

The eNBs that are base stations in the LTE may be used as secondary base stations for the MC. The secondary base stations may include an eNB and a gNB. The method disclosed in the sixth embodiment should be appropriately applied thereto. Since the secondary base stations do not use the New AS sublayer in the sixth embodiment, the eNBs can be used as the secondary base stations.

The method disclosed in the sixth embodiment can configure the connection of one UE to one master base station and a plurality of secondary base stations. This can increase the throughput of communication to be provided for the UE. Moreover, the connection to a plurality of base stations can enhance the reliability.

The First Modification of the Sixth Embodiment

In 3GPP, setting a New AS sublayer protocol as a protocol in NR has been proposed (see Non-Patent Document 9 (TR38.804 V.14.0.0)). The New AS sublayer protocol is also referred to as a Service Data Adaptation Protocol (SDAP). This Description may denote the New AS sublayer as a New AS layer. In the New AS sublayer, PDU session data is mapped to a DRB.

The following has been proposed as a QoS architecture in an NG-CN and NR. One PDU session can be mapped to one or more DRBs. A different PDU session is mapped to a different DRB. A plurality of QoS flows are configured for one PDU session. One or more QoS flows can be mapped to one DRB.

A high-level device puts a QoS marker to PDU session data according to the QoS. The use of a QoS flow identifier as a QoS marker has been proposed. The gNB establishes a DRB according to the QoS of the PDU session data to map the PDU session data to the DRB and vice versa according to the QoS flow identifier in the New AS sublayer.

FIG. 21 illustrates an architecture and a dataflow when the high-level NW is an NG-CN and the base station is a gNB in NR. In 3GPP, the 5G core network is referred to as a "Next Generation Core Network" (abbreviated as "NG-CN"). The NG-CN includes an Access & Mobility management Function (AMF), a Session Management Function (SMF), and a User Plane Function (UPF) of the User Plane (U-Plane).

The AMF and the gNB are connected through the N2 interface. The UPF and the SMF are connected through the N3 interface. The SMF and the UPF are connected through the N4 interface. The AMF and the SMF may be connected through the N11 interface.

The gNB includes the New AS layers as well as the PDCPs, the RLCs, the MAC, and the PHY. The New AS layer of the gNB is connected to the high-level NW for each PDU session. FIG. 21 illustrates cases where one DRB is configured for one PDU session and two DRBs are configured for one PDU session.

FIG. 21 exemplifies association between QoS flows when the two DRBs are configured for the one PDU session. In FIG. 21, three QoS flows, namely, a QoS flow 1, a QoS flow 2, and a QoS flow 3 are present for the one PDU session. The gNB sets the DRB 1 to the QoS flow 1 and the QoS flow 2, and maps the QoS flow 1 and the QoS flow 2 to the DRB 1 in the New AS layer. The gNB sets the DRB 2 to the QoS flow 3, and maps the QoS flow 3 to the DRB 2 in the New AS layer.

In the gNB, data of the QoS flow 1 and the QoS flow 2 is processed with the setting of the DRB 1, and data of the QoS flow 3 is processed with the setting of the DRB 2.

The DC in the presence of the New AS sublayer protocol has been discussed (see "10.2.2 MR-DC with 5GC" in Non-Patent Document 28 (TS37.340 V0.2.0 (2017-06)). However, the details of the MC in the presence of the New AS sublayer protocol have not yet been discussed. The first modification of the sixth embodiment discloses a method for performing the MC in the presence of the New AS sublayer protocol. The method with the MCG split bearer is described.

Figure 22:
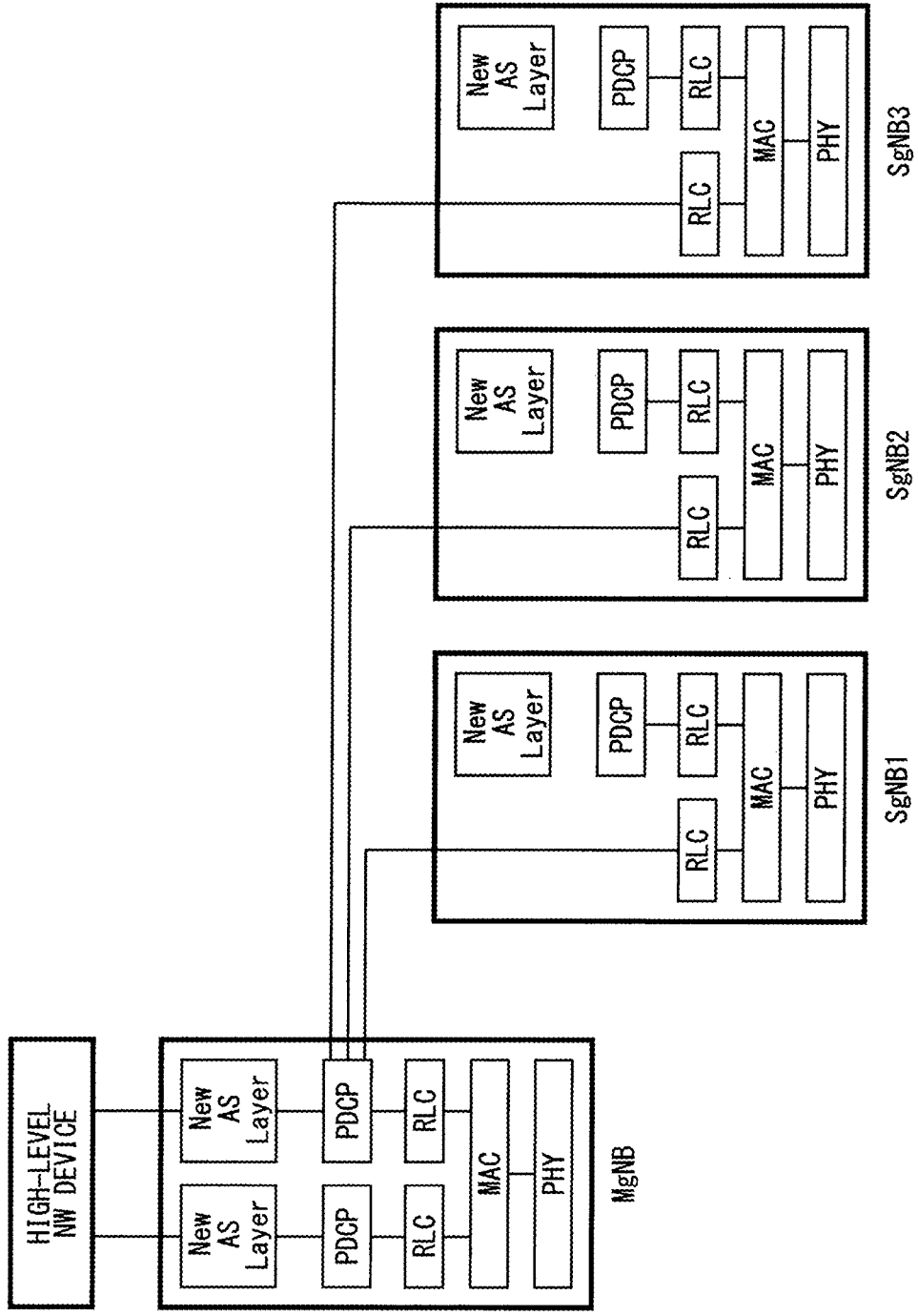
FIG. 22 illustrates an architecture of the MC according to the first modification of the sixth embodiment.

FIG. 22 illustrates an architecture of the MC. FIG. 22 illustrates that the high-level NW is an NG-CN, the master base station is a base station in NR (gNB), and the secondary base stations are base stations in NR (gNBs). The master base station in NR is referred to as the MgNB, and the secondary base stations in NR are referred to as the SgNBs. The protocol configuration of the gNB includes the New AS sublayer, the PDCP, the RLCs, the MAC, and the PHY. The New AS sublayer is set higher than the PDCP.

Although the master base station is the gNB in NR in FIG. 22, the master base station may be an eNB obtained by adding the New AS sublayer to a base station in the LTE.

Although FIG. 22 illustrates the architecture on the base station side, the architecture on the UE side is identical to that on the base station side except for the high-level NW. One UE includes the RLC, the MAC, and the PHY for the MgNB, the RLC, the MAC, and the PHY for each of SgNBs set for the MC, the New AS sublayer, and the PDCP.

FIG. 22 illustrates the use of the MCG split bearer. The high-level NW is connected to the MgNB, and the SgNBs for the MC are connected to the MgNB. The New AS sublayers of the MgNB map downlink data to a DRB according to a QoS flow identifier. The PDCP processes the downlink data for each of the mapped DRBs. Even when the number of SgNBs is more than one, the PDCP assigns one serial sequence number (SN) to each data. The data to which the SN is assigned is split into the MgNB and the SgNBs. The pieces of split data are transmitted to the RLC in each of the MgNB and the SgNBs, processed by the RLC, the MAC, and the PHY in each of the MgNB and the SgNBs, and transmitted to the UE.

The pieces of data received by the UE from the MgNB and the SgNBs are processed by the PHYs, the MACs, and the RLCs for the MgNB and the SgNBs, and then transferred to the PDCP. The PDCP performs reordering based on the SNs assigned to the pieces of the data transferred from layers for the MgNB and the SgNBs, and transfers the pieces of data to the New AS sublayer. The New AS sublayer separates the data into the QoS flows according to the QoS flow identifiers, and transfers the pieces of data to the upper layer.

In the UE, the New AS sublayer maps, as the uplink data, the pieces of data from the upper layer to DRBs according to the QoS flow identifiers. Then, the PDCP processes the pieces of data for each of the mapped DRBs. Similarly in the downlink, even when the number of SgNBs is more than one, the PDCP assigns one serial sequence number (SN) to each data in the uplink. The data to which the SN is assigned is split into the RLCs for the MgNB and the SgNBs to be transferred. The pieces of the transferred data are processed by the RLCs, the MACs, and the PHYs for the MgNB and the SgNBs, and then transmitted to the MgNB and the SgNBs.

The pieces of data received from the UE by the MgNB and the SgNBs are processed by the PHYs, the MACs, and the RLCs for the MgNB and the SgNBs, and then transferred to the PDCP of the MgNB. The PDCP of the MgNB performs reordering based on the SNs assigned to the pieces of data, and transfers the pieces of data to the New AS sublayer. The New AS sublayer separates the pieces of data into the QoS flows according to the QoS flow identifiers, and transfers the pieces of data to the high-level NW.

A method for setting the MC is disclosed. The MC is set for each DRB. The MC is set with the MCG split bearer for each DRB.

Figure 23:
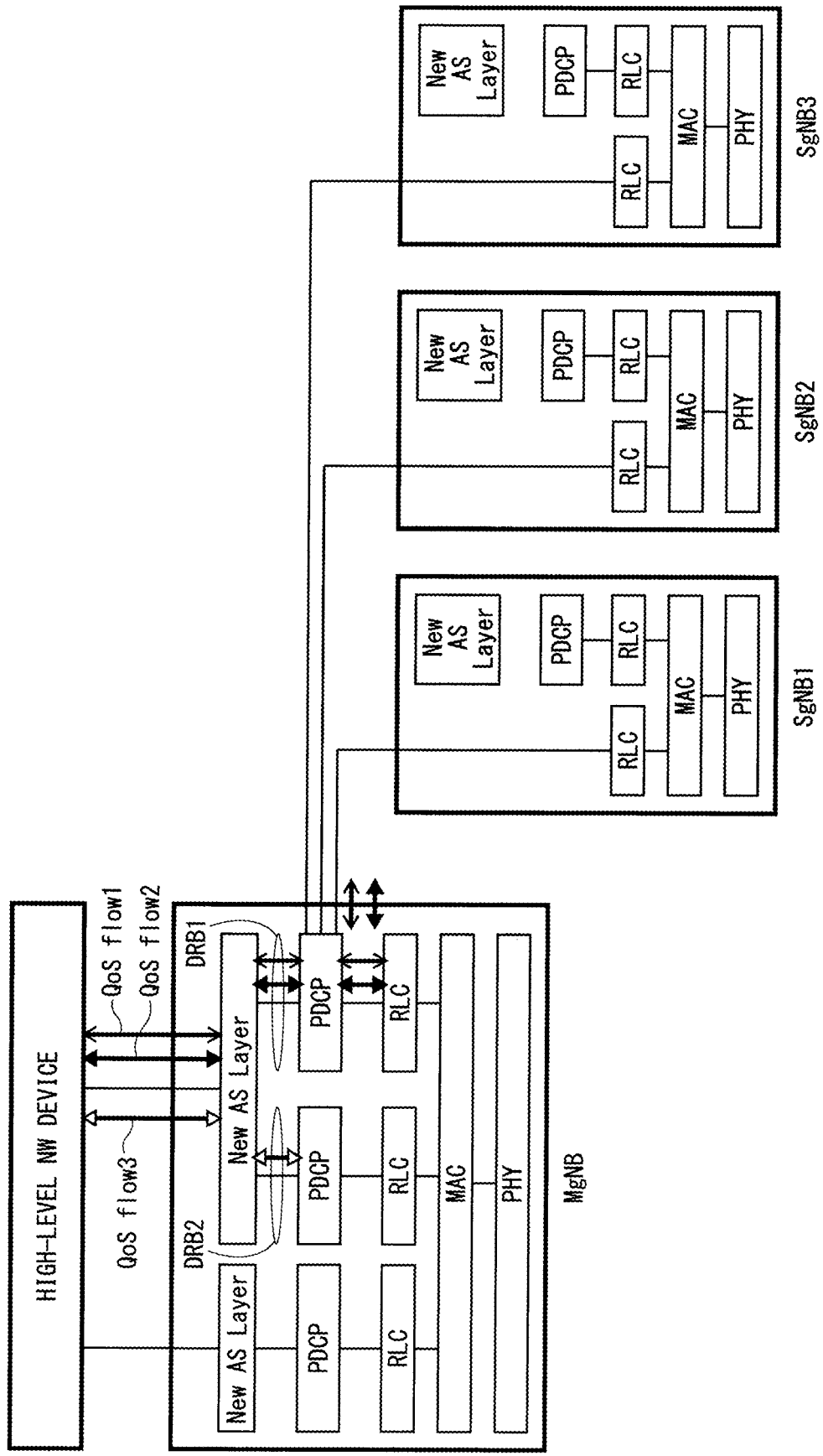
FIG. 23 is a conceptual diagram illustrating a dataflow when the MC is set for each DRB according to the first modification of the sixth embodiment.

FIG. 23 is a conceptual diagram illustrating a dataflow when the MC is set for each DRB. Assume a DRB to which the MC is set as the DRB 1. Assume QoS flows to be mapped to the DRB 1 as the QoS flow 1 and the QoS flow 2. The MC is performed on the DRB 1 with the MCG split bearer, using the MgNB, the SgNB 1, the SgNB 2, and the SgNB 3.

The PDCP splits and routes data of the QoS flow 1 and the QoS flow 2 that are mapped to the DRB 1, to the MgNB and the SgNBs. Similarly in the downlink, the PDCP splits and routes the data of the QoS flow 1 and the QoS flow 2 that are mapped to the DRB 1 by the UE, into the RLCs for the MgNB and the SgNBs as the uplink data.

Not the DRB 1 set in the downlink but a default DRB may be used in the uplink. In such a case, the PDCP should split and route the data of the QoS flow 1 and the QoS flow 2 for which the UE uses the default DRB, to the RLCs for the MgNB and the SgNBs. In the MgNB, the PDCP reorders the pieces of data from the MgNB and the SgNBs using the SNs. The New AS layer separates the pieces of data for each of the QoS flows using the QoS flow identifiers, and transfers the pieces of separated data to the high-level NW.

Setting the MC for each DRB enables the settings of the MC without changing a mapping relationship between the DRBs and the QoS flows which is set without performing the MC. This can avoid complexity in the control over the MC.

The sequence disclosed in the sixth embodiment is applicable to a sequence when the MC is set for each DRB. For example, the MeNB may notify each of the SgNBs to which the MC is set of QoS flow characteristics information, in the SgNB addition requests in Steps ST4203 and ST4215 of the sequence illustrated in FIGS. 19 and 20.

Six examples of the QoS flow characteristics information are disclosed below:
  (1) a bearer identifier;
  (2) a bearer configuration;
  (3) QoS flow identifiers;
  (4) a QoS profile of each QoS flow;
  (5) a PDU session identifier; and
  (6) combinations of (1) to (5) above.

The MgNB may notify each of the SgNBs to which the MC is set of a QoS profile of each QoS flow to be requested from the SgNB. The MgNB may determine a QoS profile setting for each of the SgNBs to which the MC is set to satisfy the QoS profile of the QoS flow on which the MC is performed.

The MgNB may notify each of the SgNBs to which the MC is set of the bearer configuration to be requested from the SgNB. The MgNB may set the bearer configuration identical to that of its own MgNB. Alternatively, the MgNB may determine bearer configurations so that the bearer configuration of its own MgNB and the bearer configuration of the SgNBs to which the MC is set satisfy the QoS profile of the QoS flow on which the MC is performed.

Upon receipt of the SgNB addition request from the MgNB, the SgNB determines the AS setting of the bearer to which the MC is set, using the QoS flow characteristics information included in the addition request. Each of the SgNBs notifies the MgNB of the determined AS setting.

Consequently, the MgNB can set the MC to the UE for each DRB when the New AS sublayer is necessary. Thus, the MC for each bearer can be performed, with the MCG split bearer, between the MgNB and the UE and between each of the SgNBs and the UE.

The method disclosed in the sixth embodiment should be appropriately applied to a data split method with the MC in the uplink.

The method disclosed in the sixth embodiment should be appropriately applied to the method for starting transmission of the uplink data from the UE to the base station side. The SR or the BSR for each QoS flow may be provided and notified from the UE to the base station side.

Another method for setting the MC is disclosed. The MC is set for each QoS flow. The MC with the MCG split bearer is performed on one or more of the QoS flows to be mapped to the DRB s by the New AS sublayer.

FIG. 24 is a conceptual diagram illustrating a dataflow when the MC is set for each QoS flow. Assume the QoS flow on which the MC is performed as the QoS flow 1. The MgNB splits and routes only the QoS flow 1 in the DRB 1.

A method for identifying data to be split is disclosed. The MgNB determines whether to split data according to a QoS flow identifier assigned to the data. Similarly, the UE determines whether to split uplink data according to a QoS flow identifier assigned to the data.

For example, when data from the PDCP includes an identifier of the QoS flow 1 in the MgNB, the MgNB determines to split the data into the SgNBs, and splits and routes the data into the SgNBs. The same applies to the uplink data. When data from the PDCP includes the identifier of the QoS flow 1 in the UE, the UE determines to split the data into the RLCs for the SgNBs, and splits and routes the data into the RLCs of the SgNBs.

This enables the MC with the MCG split bearer for each QoS flow.

Information indicating whether to split data may be separately provided as an alternative method. The New AS layer may add the information to data from the high-level NW or the upper layer. Alternatively, the PDCP layer may add the information. A QoS flow identifier may be used. Information indicating that data is split is added to data with a QoS flow identifier which is to be split. Information indicating that data is not split is added to data with a QoS flow identifier which is not to be split.

Only information indicating whether or not to split data may be added to the data. Consequently, the split or routing functions can determine data to be split and routed, using the information which is added to the data and indicates whether or not to split data.

By adding the information indicating whether or not to split data by the New AS layer or the PDCP layer in the MgNB or the UE, the information indicating whether or not to split data can be used as information to be used in the RAN. Consequently, the split or routing functions need not read the QoS flow identifier assigned by the high-level NW or the upper layer. This can simplify the processing.

The sequence when the MC is set for each DRB is applicable to a sequence when the MC is set for each QoS flow. The MgNB needs to notify the UE to set the MC for each QoS flow. Thus, the MgNB notifies the QoS flow to which the MC is set in Step ST4302 of the sequence illustrated in FIGS. 19 and 20. The MgNB should notify the QoS flow identifier for setting the MC. Similarly, the MgNB should notify the UE of the SCG configuration and the bearer configuration.

Consequently, the MgNB can set the MC to the UE for each QoS flow. Thus, the MC for each QoS flow can be performed, with the MCG split bearer, between the MgNB and the UE and between each of the SgNBs and the UE.

Another method for performing the MC for each QoS flow is disclosed. A DRB for the QoS flow on which the MC is performed is additionally set. The QoS flow on which the MC is performed is mapped to the additionally set DRB. Through setting the MC to the additionally set DRB, the MC can be set to the QoS flow mapped to the DRB.

FIG. 25 is a conceptual diagram illustrating a dataflow in additionally setting a DRB to which the QoS flow, on which the MC is performed, is mapped. Assume the QoS flow on which the MC is performed as the QoS flow 1.

Assume that the mapping relationship between the QoS flows and the DRBs before the MC is set is the same one illustrated in FIG. 21. Before the MC is set, the QoS flow 1 and the QoS flow 2 are mapped to the DRB 1.

As illustrated in FIG. 25, the MgNB additionally sets a DRB X1 for mapping the QoS flow 1 to set the QoS flow 1 to the MC. The New AS sublayer maps the QoS flow 1 to the DRB X1. The New AS sublayer maps the QoS flow 2 to the DRB 1 similarly before the MC is set.

Consequently, the QoS flow on which the MC is performed can be mapped to the DRB X1. The MgNB sets the MC to the DRB X1. Consequently, the MC is performed on the QoS flow 1 to be mapped to the DRB X1. The MgNB should split and route data of the QoS flow 1 to perform the MC with the MCG split bearer.

The DRB configuration to be added should be set using the QoS profile of the QoS flow to be split. The QoS profile of the QoS flow to be notified from the high-level NW may be used. The MgNB additionally sets the DRB X1, and the New AS sublayer maps the data of the QoS flow 1 to the DRB X1. The New AS sublayer determines which DRB data is mapped to, according to the QoS flow identifier which the high-level NW assigns to the data.

The MgNB sets the DRB X1 to the MC using the MCG split bearer, splits data of the QoS flow 1 into the SgNB side to be used for the MC, and routes the data into the SgNB 1, the SgNB 2, and the SgNB 3.

The MgNB should notify the UE of the configuration of the DRB X1 additionally set for the MC. For example, the method for notifying the configuration of the DRB for performing the MC from the MgNB to the UE, which is disclosed in the sixth embodiment, should be applied to this notification.

The MgNB should notify the UE of the mapping relationship between the QoS flows and the DRBs in the New AS layer. The MgNB should associate, for example, identifiers of the DRBs and the configuration information on the DRBs with identifiers of the QoS flows and QoS profiles, and notify them. Here, the MgNB notifies information indicating a mapping relationship with the QoS flow 1 to be mapped to the DRB X1. This enables the UE to map the QoS flow 1 to the DRB X1 in the New AS sublayer.

Consequently, the UE can additionally set the DRB corresponding to the QoS flow on which the MC is performed, and set the MC to the DRB and perform the MC on the DRB. The same applies to the uplink data.

The New AS sublayer maps data of the QoS flow 2 to the DRB 1. The configuration of the DRB 1 need not be changed. Since the configuration of the DRB 1 supports the QoS flow 2 before the MC is set, it can support the QoS flow 2 without any change. Since the MC is not set to the DRB 1, the MC is not performed on the data of the QoS flow 2. Thus, communication is performed using only the MgNB.

The MgNB may notify the UE of information on the QoS flow to be mapped to the DRB 1. With the additional setting of the DRB X1, the QoS flow to be mapped to the DRB 1 is changed from the QoS flow 1 and the QoS flow 2 before the MC is set, into the QoS flow 2. A notification of change or reconfiguration of the QoS flow from the MgNB to the UE enables the UE to recognize the QoS flow to be mapped to the DRB 1.

The RRC signaling should be used for notifying the change or reconfiguration of the QoS flow to be mapped to the DRB. The notification may be given via the same signaling as that for additionally setting the DRB X1.

The MgNB may reconfigure the DRB 1. The MgNB should reconfigure the DRB 1 so that, for example, the DRB 1 has a DRB configuration appropriate for the QoS flow 2 to be mapped to the DRB 1 after the MC is set. The MgNB should set the DRB 1 using the QoS profile of the QoS flow 2. The MgNB reconfigures the DRB 1, and the New AS sublayer maps the data of the QoS flow 2 to the DRB 1.

The MgNB should notify the UE of the configuration of the reconfigured DRB 1. For example, the method for notifying the configuration of the DRB from the MgNB to the UE, which is disclosed in the sixth embodiment, should be applied to this notification. The UE can reconfigure the configuration of the DRB 1. The same applies to the uplink data. Consequently, the DRB configuration appropriate for change in the QoS flow to be mapped is possible.

The aforementioned additional setting and removal of the DRB may be applied to a method for reconfiguring the DRB to which the QoS flow is mapped. Consequently, the DRB configuration appropriate for change in the QoS flow to be mapped is possible.

Figure 27:
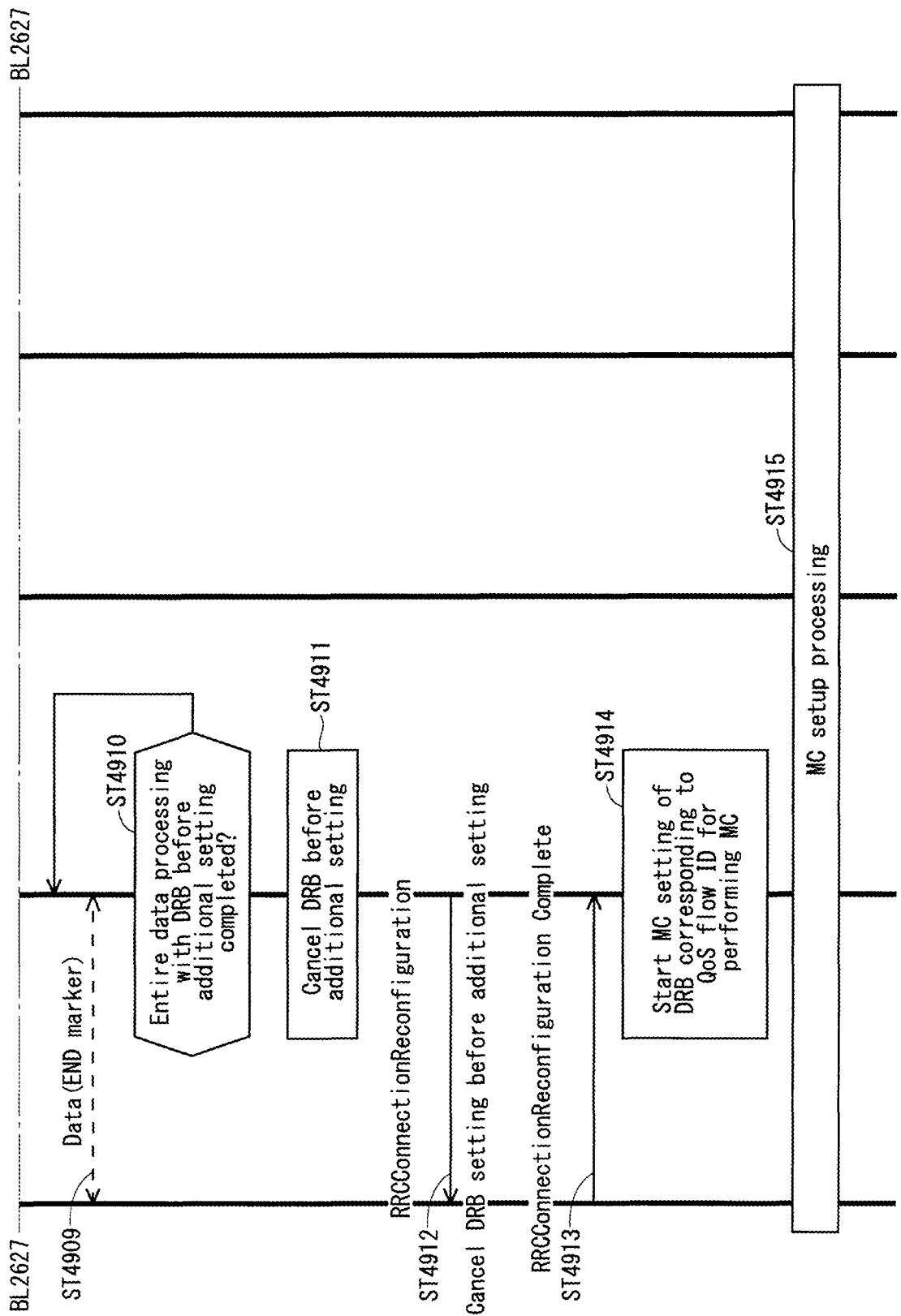
FIG. 27 illustrates the example sequence for setting the MC for each QoS flow according to the first modification of the sixth embodiment.

FIGS. 26 and 27 illustrate an example sequence for setting the MC for each QoS flow. FIGS. 26 and 27 are connected across a location of a border BL 2627. FIGS. 26 and 27 illustrate that the MgNB additionally sets the DRB including the QoS flow on which the MC is performed. In Step ST4901, data is communicated between the UE and the MgNB. In Step ST4902, the MgNB determines to perform the MC for each QoS flow for the UE. In Step ST4903, the MgNB determines to additionally set the DRB to which the QoS flow on which the MC is performed is mapped. In Step ST4904, the MgNB determines and adds the configuration of the DRB for the QoS flow on which the MC is performed.

In Step ST4905, the MgNB notifies the UE of the added DRB configuration and the QoS flow identifier to be mapped to the added DRB. The MgNB may notify a QoS profile of the QoS flow. The MgNB may also notify an instruction for aborting transmission of new data of the QoS flow with the DRB to which the QoS flow has been mapped before the additional setting. The MgNB should give the instruction via the RRC signaling. For example, these pieces of information may be included in the RRC connection reconfiguration to be notified.

The UE makes a setting using information received from the MgNB, and notifies the MgNB of completion of the setting in Step ST4906. The UE may notify the completion of the setting via the signaling for the RRC connection reconfiguration complete notification.

In Step ST4907, the UE aborts transmission of new data of the QoS flow with the DRB to which the QoS flow has been mapped before the additional setting. The UE also makes the additional setting using the DRB configuration notified from the MgNB, maps, to the additional DRB, the QoS flow to be mapped to the additional DRB, and starts transmitting data. In Step ST4908, the MgNB maps, to the additional DRB, the QoS flow to be mapped to the additional DRB and starts transmitting data.

The DRB before the additional setting is still maintained even if there is no QoS to be mapped. With the DRB before the additional setting maintained, data can be processed before aborting transmission of the data. For example, a retransmission process, etc., in a lower layer is possible. The UE should insert a marker at the end of data to be transmitted with the DRB before the additional setting. The UE may last transmit data corresponding to the marker. This marker is referred to as an end marker.

In Step ST4909, data of the QoS flow is communicated between the UE and the MgNB with the DRB additional set. In Step ST4909, the data of the QoS flow is also communicated with the DRB before the additional setting. In Step ST4910, the MgNB determines whether or not the data processing with the DRB before the additional setting has been completed. The MgNB should make the determination using the end marker. When the data processing is not completed, the MgNB returns to Step ST4909 to perform the data processing. When the data processing is completed, the DRB setting before the additional setting is canceled in Step ST4911.

In Step ST4912, the MgNB notifies the UE to cancel the DRB setting before the additional setting. The MgNB should notify the cancellation via the RRC signaling. For example, the cancellation should be included in the RRC connection reconfiguration to be notified. Upon receipt of the cancellation of the DRB setting before the additional setting, the UE cancels the DRB setting before the additional setting.

The MgNB may insert an end marker at the end of data to be transmitted with the DRB before the additional setting. The UE may cancel the DRB setting upon receipt of the end marker. When not receiving the end marker, the UE may wait for the cancellation of the DRB setting until receiving the end marker, and cancel the DRB setting after receiving the end marker.

Although the example of canceling the DRB before the additional setting is disclosed, the DRB before the additional setting need not be canceled when the QoS to be mapped to the DRB before the additional setting exists. The MgNB should notify the UE of the reconfigured DRB configuration when the DRB before the additional setting is reconfigured.

For example, the New AS sublayer may insert an end marker as a protocol stack of inserting an end marker. One end marker may be inserted into all the QoS flows to be mapped to the DRB to be additionally set. This facilitates the control. Alternatively, the end marker may be inserted for each QoS flow. The control for each QoS flow can be flexibly performed, and the malfunctions can be reduced.

In Step ST4914, the MgNB starts the MC setting of the DRB that has been additionally set for the QoS flow on which the MC is performed. In Step ST4915, the MgNB, the SgNB 1 and the SgNB 2 that are to be used for the MC, and the UE mutually perform the MC setup processing. The method disclosed in the sixth embodiment should be applied to this MC setup processing. Since the radio bearer is set for the QoS flow on which the MC is performed, the method for setting the MC to the radio bearer can be applied thereto.

Disclosed is a method, when the MC is set for each QoS flow, for additionally setting the DRB for the QoS flow to which the MC is set. Here, a piece of data via the DRB before the additionally setting and a piece of data via the additionally set DRB are transferred to the New AS sublayer per QoS flow. Although the PDCP reorders the pieces of data in the DRBs, it does not reorder the pieces of packet data later.

Thus, when orders of the piece of data of the DRB before the additionally setting and the piece of data of the additionally set DRB from the PDCP are different, the New AS sublayer has a problem of failing to rearrange the pieces of data, that is, a problem of failing to ensure the in-sequence pieces of data.

A method for solving such a problem is disclosed. The New AS sublayer assigns a sequence number to data. The sequence number should be defined for each QoS flow to be assigned to the data. Upon receipt of the pieces of the data from the PDCP, the New AS sublayer should perform reordering using the sequence numbers.

Another method is disclosed. The end marker is used. The pieces of data via the additionally set DRB from the PDCP between additionally setting of the DRB and reception of the end marker are stored. A buffer for storing the pieces of data should be provided. The pieces of data ranging from the DRB before the additional setting to an end marker should be processed to be transferred to the high-level NW or the upper layer. Then, when the end marker appears, data via the additionally set DRB from the PDCP should be processed and transferred to the high-level NW or the upper layer.

Consequently, correct orders of the pieces of packet data can be ensured.

A buffer for storing data may be provided in the New AS sublayer, and the New AS sublayer may perform these processes.

The method disclosed in the sixth embodiment should be appropriately applied to the data split method with the MC in the uplink. The method should be applied to the MgNB, and the SgNBs to which the MC is set for each QoS flow.

The method disclosed in the sixth embodiment should be appropriately applied to the method for starting transmission of the uplink data from the UE to the base station side. The method should be applied to the MgNB, and the SgNBs to which the MC is set for each QoS flow. The SR or the BSR for each QoS flow may be provided and notified from the UE to the base station side.

The MgNB can perform the MC on the UE for each QoS flow with such a method. Since the MC can be performed for each QoS flow, the MC can be controlled with QoS precision finer than that of the MC for each bearer.

The sixth embodiment discloses providing the MgNB with the routing functions for the SgNB s to which the MC is set. Such provision of the routing functions to the MgNB should be applied to the first modification of the sixth embodiment. A function of performing routing to a different SgNB for each QoS flow may be provided. In the presence of a plurality of QoS flows on which the MC is performed, the MgNB performs routing to a different SgNB for each of the QoS flows. The MgNB should determine which SgNB routing is performed into, using a QoS flow identifier.

The MgNB should define association between the QoS flows and the SgNBs into which the routing is performed. The MgNB should notify the UE of the association. The MgNB should give the notification via the RRC signaling. For example, the MgNB may include the association in the RRC connection reconfiguration to notify the association. The MgNB may notify the association when the MC is set to the UE. Consequently, the association between the QoS flows and the SgNBs to which data is transmitted can be set to the UE.

The UE may define the association between the QoS flows and the SgNBs into which the routing is performed. The UE should notify the MgNB of the association. The UE should give the notification via the RRC signaling. For example, the UE may include the association in the RRC connection reconfiguration to notify the association. The UE can request, from the MgNB, which SgNB is used for each QoS flow.

When performing the routing to a different SgNB for each of the QoS flow, the MgNB may notify a QoS profile of the corresponding QoS flow in an additional request to the SgNB. Each SgNB may use the DRB setting corresponding to the notified QoS profile. Each SgNB notifies the MgNB of the DRB setting corresponding to the QoS profile. The MgNB may notify the UE of the DRB setting received from the SgNB as the DRB setting for the MC. The MgNB should notify the UE via the RRC signaling. For example, the MgNB may notify the DRB setting corresponding to the QoS profile with the RRC connection reconfiguration.

Consequently, the DRB configuration of the SgNB into which the routing is performed for each QoS flow can be set appropriate for the QoS of the QoS flow to be routed. Thus, the MC using the SgNBs with the DRB configuration appropriate for each QoS flow can be set.

The eNBs that are base stations in the LTE may be used as secondary base stations for the MC. The secondary base stations may include an eNB and a gNB. The method disclosed in the first modification of the sixth embodiment should be appropriately applied thereto. Since the secondary base stations do not use the New AS sublayer in the first modification, the eNBs can be used as the secondary base stations.

The method disclosed in the first modification of the sixth embodiment can configure the connection of one UE to one master base station and a plurality of secondary base stations even when the high-level NW is the NG-CN. This can increase the throughput of communication to be provided for the UE. Moreover, the connection to a plurality of base stations can enhance the reliability.

The Seventh Embodiment

As previously described, Non-Patent Document 27 (R2-167583) proposes the support of the MC with the SCG bearer. The MC with the SCG bearer requires an architecture and the setting method including the high-level NW, such as a method of connection to the high-level NW. For example, when a plurality of SgNBs are used for the MC, problems arise including what type of the bearer configuration should be used and how to distribute data to the plurality of SgNBs.

However, the disclosure of Non-Patent Document 27 and the conventional technology do not clarify which architecture or setting method should be used. The seventh embodiment discloses an architecture and a setting method of the MC with the SCG bearer.

Figure 28:
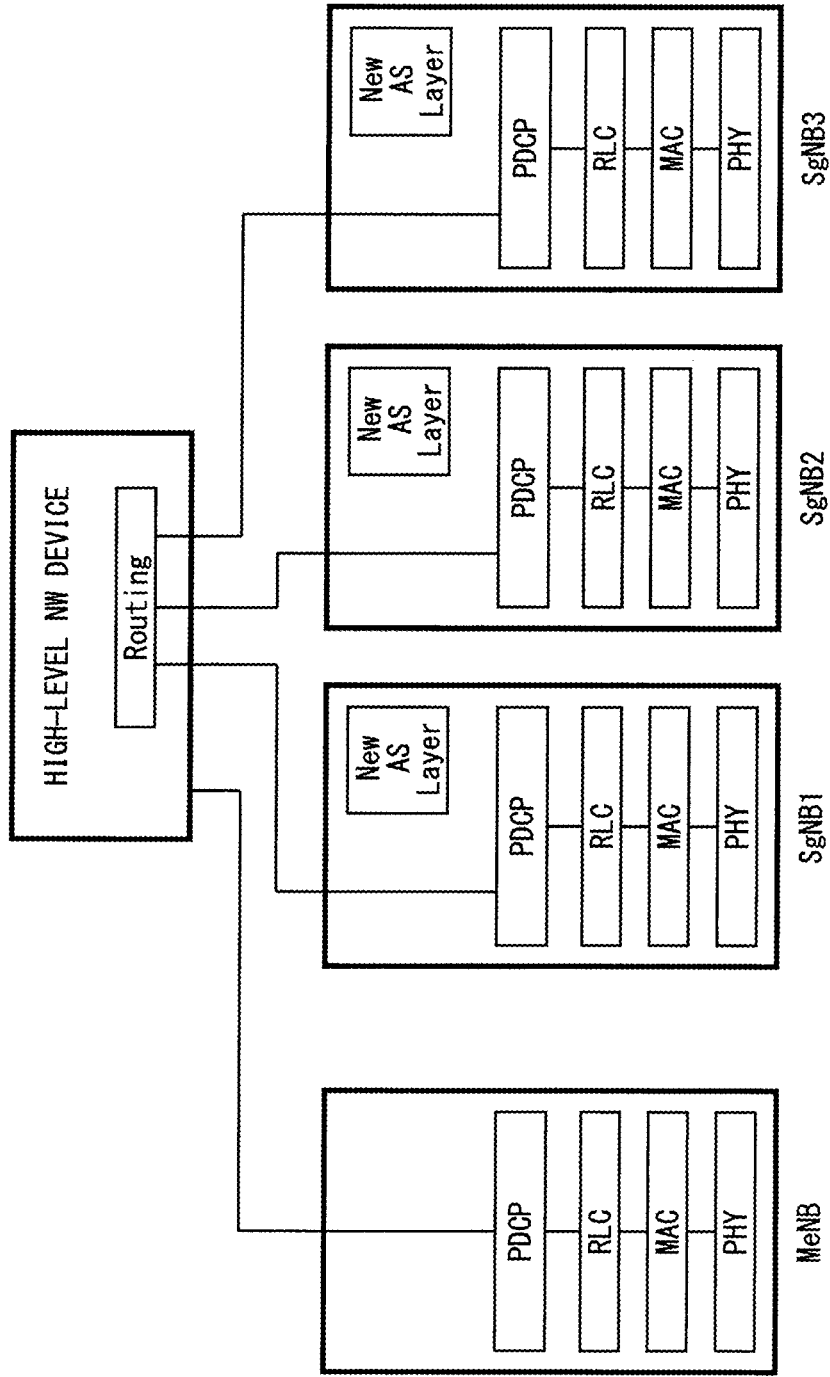
FIG. 28 illustrates an architecture of the MC according to the seventh embodiment.

FIG. 28 illustrates an architecture of the MC. FIG. 28 illustrates that the high-level NW is an EPC, the master base station is a base station in the LTE (eNB), and the secondary base stations are base stations in NR (gNBs). Although FIG. 28 illustrates the architecture on the base station side, the architecture on the UE side is identical to that on the base station side except for the high-level NW. One UE includes the PDCPs, the RLCs, the MACs, and the PHYs for the MeNB and the SeNBs that are set for the MC.

FIG. 28 illustrates the use of the SCG split bearer. The high-level NW is connected to the SgNBs for the MC. The high-level NW routes the downlink data into the SgNBs for the MC to transfer the data. The high-level NW transfers the downlink data to the PDCPs without routing through the New AS sublayers of the SgNBs. Although data from the high-level NW may enter the New AS sublayers of the SgNBs, the data is not processed by the New AS sublayers but passes through the New AS sublayers.

In each of the SgNBs, the data is processed by the PDCP, the RLC, the MAC, and the PHY, and then transmitted to the UE.

The data received by the UE from each of the SgNBs for the MC is processed by the PHY, the MAC, the RLC, and the PDCP for the SgNB, and then transferred to the upper layer.

The UE routes the data from the upper layer into the SgNBs as the uplink data, and then transfers the data to the PDCPs for the SgNBs. The data is processed by the PDCP, the RLC, the MAC, and the PHY for each of the SgNBs, and then transmitted to the SgNB.

Disclosed is that the high-level NW routes data into the SgNBs for the MC. Thus, the high-level NW is provided with the routing functions for the SgNBs. The S-GW of the U-plane functioning as the high-level NW may be provided with the routing functions. The routing function may be added as one function of the S-GW. The high-level NW is connected to a plurality of SgNBs to perform the MC without changing the E-RAB bearer that is set between the high-level NW and the UE.

The routing functions should support both the downlink and the uplink. The routing functions may include a function of adding sequence numbers to pieces of packet data. The routing functions should perform reordering using the sequence numbers.

FIG. 28 discloses providing the S-GW with the routing functions between the S-GW and a plurality of SgNBs. As an alternative method, nodes different from the S-GW may be provided with the routing functions. This makes the functional extension in the S-GW unnecessary.

The base station side may have the routing functions between the S-GW and the plurality of SgNBs. The routing function of any one of the SgNBs for the MC may be used. Data is communicated between the S-GW and the routing function of the one of the SgNBs. With the routing function of the one of the SgNBs, data is routed into the other SgNBs.

This makes the functional extension in the S-GW unnecessary. The functional extension of the base station side suffices. Thus, the system is easily built.

A method for setting the MC with the SCG bearer is disclosed. The methods disclosed in the sixth embodiment should be applied to the additional request process from the MeNB to the SgNBs to be used for the MC and the MC setting from the MeNB to the UE.

A data forwarding method from the MeNB to the SgNBs is disclosed. The problem is which SgNB the data forwarding is performed to because a plurality of SgNBs are set in the MC. To solve this problem, the MeNB should determine a SgNB as a data forwarding destination. The MeNB transfers an SN status of the PDCP PDU to the determined SgNB to start the data forwarding. The data forwarding is possible until path switch from the MeNB to the SgNB to be used for the MC is performed.

An SgNB as a data forwarding destination is set. When the MC is performed using a plurality of SgNBs, the MeNB presets a predetermined SgNB. The MeNB transfers the SN status and performs the data forwarding, to the set SgNB. The MeNB may notify, in the SgNB addition request for the MC, the set SgNB that its own SgNB is an SgNB subject to data forwarding. Since the SgNB can recognize the data forwarding from the MeNB, the malfunctions can be reduced.

The MeNB may notify the UE of information on the predetermined SgNB that is set to a data forwarding destination. The MeNB may include the information in the settings of the MC to notify the information to the UE. The UE recognizes which SgNB the forwarded data is transmitted from. The UE may process the data from the SgNB earlier than the data on which the high-level NW has performed the routing function with the settings of the MC, and transfer the data to the upper layer. This can correct the orders of the pieces of packet data.

Another data forwarding method is disclosed. The MeNB may determine a SgNB as a data forwarding destination for each packet data. Then, the MeNB similarly transfers the SN status of the PDCP PDU and performs the data forwarding, to the determined SgNB. For example, assume that the MeNB has transmitted data up to the PDCP PDU whose SN is n−1. When transferring the next packet data to the SgNB 1, the MeNB transfers the SN status n and the next packet data to the SgNB 1. The SgNB 1 performs the PDCP process on the packet data. Here, the PDCP assigns n as the SN.

When transferring the next packet to the SgNB 2, the MeNB transfers the SN status n+1 and the next packet data to the SgNB 2. The SgNB 2 performs the PDCP process on the packet data. Here, the PDCP assigns n+1 as the SN. Although the MeNB transfers n as the SN status after completion of the transmission up to n−1, the MeNB may transfer n−1 as the SN status. Upon receipt of the SN status, the SgNB should set n as the SN of the PDCP PDU. Such transferring of the SN for each packet data enables the MeNB to transfer data to a plurality of SgNBs for each packet data. The PDCP ensures the continuity of the SNs.

The MeNB may transfer a contiguous sequence of pieces of packet data to the SgNB, not for each packet data. The MeNB transfers only the first SN of the contiguous sequence of pieces of packet data to the SgNB. The MeNB counts the number of the pieces of packet data transferred to the SgNB, and calculates the SN of the next packet data to be transferred to another SgNB, using the counted value. The MeNB transfers the calculated SN status and the packet data to the other SgNB. This enables the MeNB to transfer the plural pieces of packet data to the SgNB continuously. The information to be communication between the base stations can be reduced more than that when the SN is transferred for each packet.

The UE may reorder pieces of packet data, using the SN of each PDCP. The UE may reorder the pieces of packet data, using the SNs of the PDCPs of the MeNB and each SgNB and transfer the pieces of packet data to the high-level NW. Alternatively, the UE may notify the high-level NW of information on the SNs from the PDCPs of the MeNB and each SgNB. Then, the high-level NW may reorder the pieces of packet data using the SN information. Since the unified SNs are assigned to the MeNB and each SgNB, the orders of the pieces of packet data can be corrected.

A path switch method from the MeNB to the SgNB is disclosed. The MeNB notifies the MME of the path switch information for the MC. Eleven examples of the MC path switch information are hereinafter disclosed:

(1) bearer information for performing the path switch;
(2) identifiers of a plurality of SgNBs to which the MC is set;
(3) addresses of the plurality of SgNBs to which the MC is set;
(4) a path switch request;
(5) an identifier of a node with the routing function;
(6) an address of the node with the routing function;
(7) a request for activating the routing function;
(8) an identifier of the UE to which the MC is set;
(9) an identifier of its own MeNB;
(10) an address of its own MeNB; and
(11) combinations of (1) to (10) above.

In (1), information on the E-RAB bearer corresponding to the DRB to which the MC is set may be used as the bearer information for performing the path switch. The information on the E-RAB bearer may include an identifier of the E-RAB bearer. The MME can recognize the E-RAB bearer to which the MC is set.

In (2) and (3), the SgNBs to be path switch destinations may be used as the plurality of SgNBs to which the MC is set. Upon receipt of the path switch request of (4), the S-GW or the node with the routing function performs the path switch to the SgNBs as the path switch destinations.

The MME notifies the S-GW of the MC path switch information received from the MeNB. The S-GW may notify the node with the routing function of the MC path switch information. When the S-GW is provided with the path switch function, the MC path switch information need not be notified to the S-GW. Upon receipt of the MC path switch information, the S-GW or the node with the routing function performs the path switch from the MeNB to a plurality of SgNBs to which the MC is set, and then starts the routing into the plurality of SgNBs.

When a predetermined SgNB is provided with the routing function, the MeNB may directly notify the predetermined SgNB of the MC path switch information. The MeNB should give the notification simultaneously with the notification of the MC path switch information to the S-GW through the MME. The MC path switch information to be notified from the MeNB to the S-GW through the MME may include the identifier or the address of the node with the routing function in (5) and (6) and the path switch request in (4). In response to the path switch request in (4), the S-GW performs the path switch from the MeNB to the node with the routing function.

The path switch information to be directly notified from the MeNB to the predetermined SgNB may include the identifiers or the addresses of the plurality of SgNBs to which the MC is set in (2) and (3), and the request for activating the routing function in (7). The predetermined SgNB routes the data received from the S-GW, into the plurality of SgNBs to which the MC is set and which include its own SgNB.

The MC path switch information to be notified from the MeNB to the MME and from the MME to the S-GW may be included in the signaling for modifying the E-RAB to which the MC is set. Conventional messages should be extendedly used, which does not require a new message. The control can be simplified.

As an alternative method, the path switch which the MeNB sets to the MME and the MME sets to the S-GW may be set one by one to the SgNBs for the MC. The path switch destination via the conventional signaling for modifying the E-RAB is one SgNB, which may be used. The conventional messages should be used, which can simplify the control.

When the path switch is set one by one to the SgNBs for the MC, an SgNB should be additionally set in response to a new path switch request while the SgNBs that are path switch destinations set in response to a previous path switch request are maintained. Information indicating whether the SgNBs previously set as the path switch destinations are maintained may be provided as information for the path switch. The MeNB can set the path switch to a plurality of the SgNBs by notifying the information to the S-GW through the MME.

Figure 29:
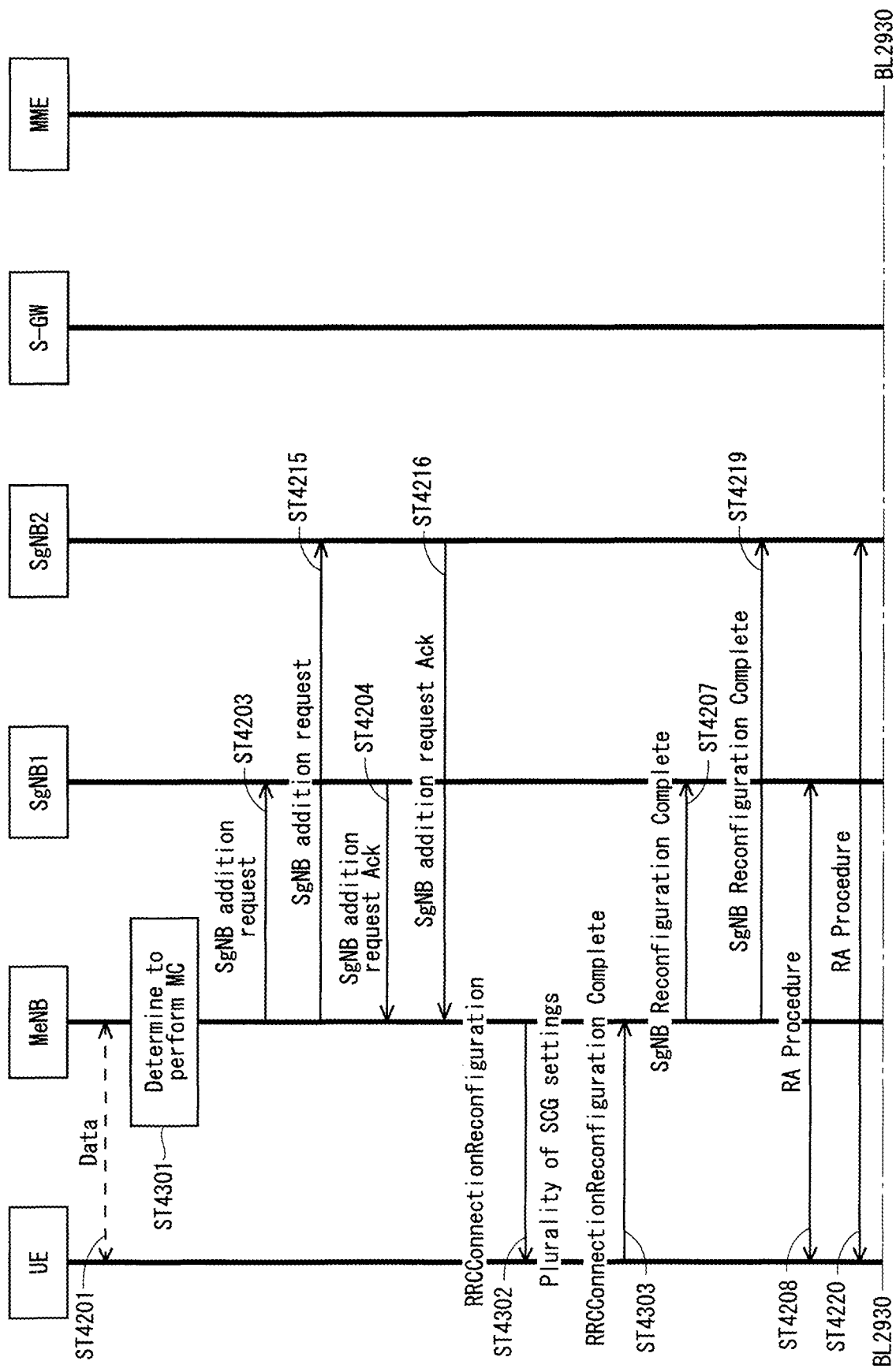
FIG. 29 illustrates an example sequence for setting the MC with the SCG bearer according to the seventh embodiment.
Figure 30:
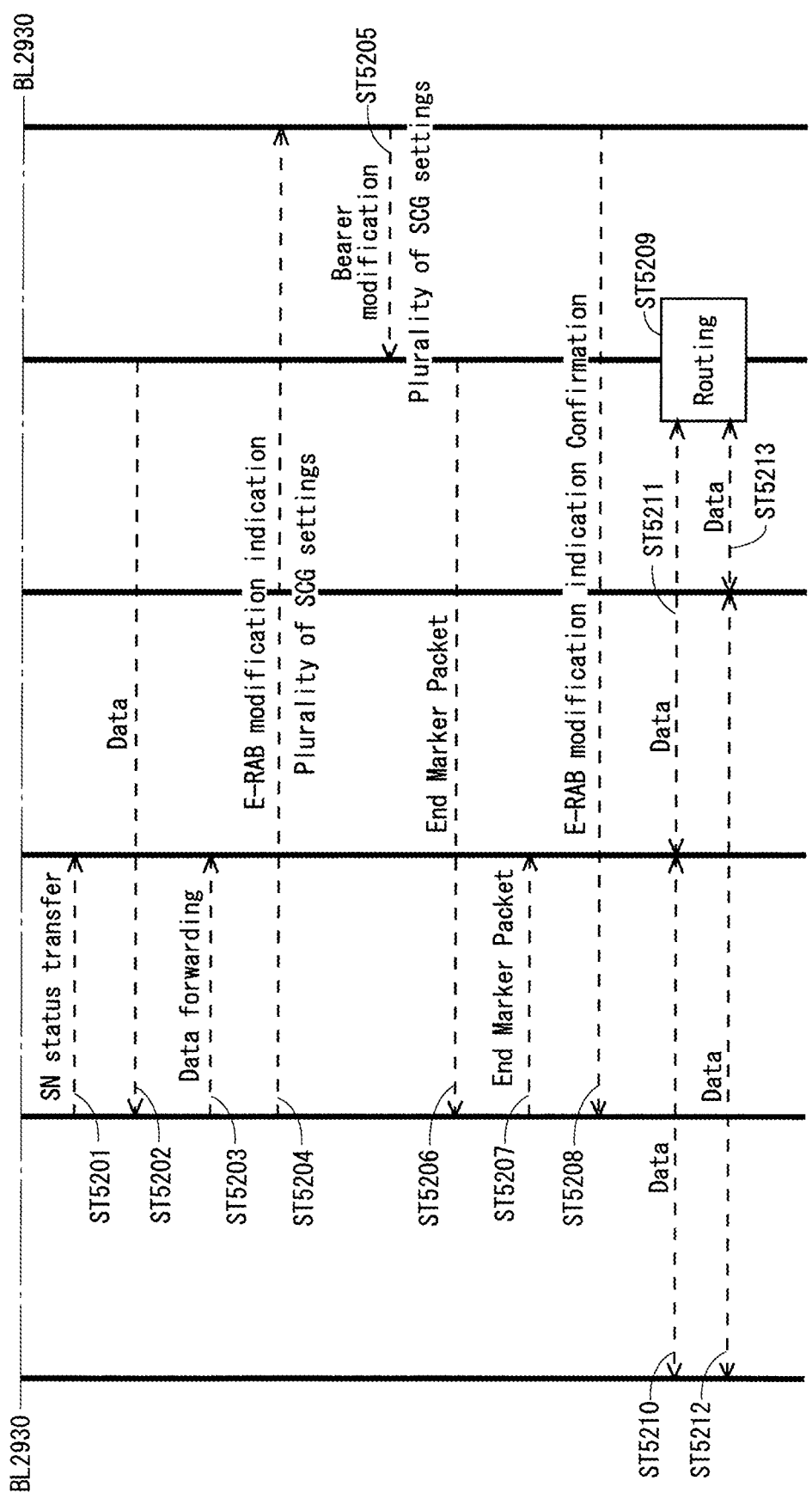
FIG. 30 illustrates the example sequence for setting the MC with the SCG bearer according to the seventh embodiment.

FIGS. 29 and 30 illustrate an example sequence for setting the MC with the SCG bearer. FIGS. 29 and 30 are connected across a location of a border BL 2930. FIGS. 29 and 30 illustrate the use of the MeNB and two SgNBs (SgNB 1 and SgNB 2). FIGS. 29 and 30 illustrate a method for setting the SCGs of a plurality of SgNBs for the MC at one time. FIGS. 29 and 30 illustrate that the S-GW is provided with the routing function.

Since the sequence illustrated in FIGS. 29 and 30 includes the same steps as those of the sequence illustrated in FIGS. 19 and 20, the same step numbers are applied to the same Steps and the common description thereof is omitted.

After transmitting the SgNB reconfiguration completion notifications for the MC to the SgNB 1 and the SgNB 2 in Steps ST4207 and ST4219, respectively, the MeNB transfers the SN status for transferring data to the SgNB 1 in Step ST5201, and starts transferring, to the SgNB 1, data from the S-GW through Steps ST5202 and ST5203.

Although the MeNB transfers data only to the SgNB 1 in FIGS. 29 and 30, it may transfer data to the SgNB 1 and the SgNB 2 for each data in the disclosed method.

In Step ST5204, the MeNB notifies the MME of the signaling for modifying the E-RAB. The MeNB includes the MC path switch setting information in the signaling for modifying the E-RAB to notify the information. In Step ST5205, the MME notifies the S-GW of bearer modification signaling including the MC path switch setting information. Consequently, the S-GW can recognize a plurality of SgNBs as path switch destinations.

The MME that has notifies the S-GW of the MC path switch setting information in Step ST5205 notifies the MeNB of the signaling indicating completion of modification of the E-RAB. Consequently, the MeNB recognizes that the path switch has been set to the SgNB 1 and the SgNB 2 for the MC.

Upon receipt of the MC path switch setting information in Step ST5205, the S-GW transmits a packet indicating the end marker as the last packet data to the MeNB to activate the path switch in Step ST5206. In Step ST5207, the MeNB transfers the end marker to the SgNB 1. Consequently, the SgNB 1 recognizes termination of data from the MeNB.

In Step ST5209, the S-GW starts routing data into the SgNB 1 and the SgNB 2 to which the MC is set. This enables data communication among the UE, the SgNB 1, and the SgNB 2 and among the SgNB 1, the SgNB 2, and the S-GW. The UE and the plurality of SgNBs for the MC perform the MC with the SCG bearer.

Disclosed is providing the plurality of SgNBs to be used for the MC with the routing functions. Information for routing may be provided as information for the routing functions to determine which SgNB data should be transmitted to. For example, the information may be a downlink data transmission state from each SgNB to the UE to be notified from its own SgNB to the MeNB, which is disclosed in the sixth embodiment.

The method disclosed in the sixth embodiment should be appropriately applied to the data split method with the MC in the uplink. The method should be applied to the SgNBs for the MC.

The method disclosed in the sixth embodiment should be appropriately applied to the method for starting transmission of the uplink data from the UE to the base station side. The method should be applied to the MeNB or the SgNBs for the MC.

The MeNB determines to perform the routing. Each SgNB notifies the MeNB of information for performing the routing. The MeNB calculates, for example, the amount of data to be routed to each SgNB, using the information. The amount of data may be a data rate. The amount of data to be calculated may be an amount of data to be transmitted to each SgNB with respect to the amount of total data. The MeNB notifies the MME of the amount of data to be routed to each SgNB. The MME notifies the S-GW of the amount of data to be routed to each SgNB. The S-GW notifies the routing function of the information. The routing function performs the routing using the amount of data.

This can adjust the amount of data to be routed to each SgNB. Moreover, each SgNB notifies the MeNB of the downlink data transmission state from its own SgNB to the UE. Thus, the MeNB can use the downlink data transmission state.

As an alternative method, the MME may determine to perform the routing. Each SgNB notifies the MeNB of information for performing the routing. Then, the MeNB notifies the MME of the information. Alternatively, each SgNB may notify the MME of the information for performing the routing. Similarly as described above, the MME calculates, for example, the amount of data to be routed to each SgNB using the information, and notifies the S-GW of the calculated amount of data. The S-GW notifies the routing function of the information. The routing function performs the routing using the amount of data.

This can adjust the amount of data to be routed to each SgNB. The MME, which is a high-level device, determines to perform the routing. This can facilitate the control when the MME and the S-GW are configured in the same device.

As an alternative method, the S-GW may determine to perform the routing. Each SgNB notifies the MeNB of information for performing the routing. Then, the MeNB notifies the information to the MME, and the MME notifies it to the S-GW. Alternatively, each SgNB may notify the MME of the information for performing the routing. Then, the MME may notify the S-GW of the information. Alternatively, each SgNB may notify the S-GW of the information for performing the routing.

Similarly as described above, the S-GW calculates, for example, the amount of data to be routed to each SgNB, using the information. The S-GW notifies the routing function of the information. The routing function performs the routing using the amount of data.

This can adjust the amount of data to be routed to each SgNB. The S-GW, which is a high-level device in the U-plane, determines to perform the routing. This can control the routing of data in the U-plane.

As an alternative method, the node with the routing function may determine to perform the routing. Each SgNB notifies the MeNB of the information for performing the routing. Then, the information is notified from the MeNB to the MME, from the MME to the S-GW, and from the S-GW to the node with the routing function. Alternatively, each SgNB may notify the MME of the information for performing the routing. Then, the information may be notified from the MME to the S-GW and from the S-GW to the node with the routing function. Alternatively, each SgNB may notify the S-GW of the information for performing the routing. Then, the S-GW may notify the node with the routing function of the information. Alternatively, each SgNB may notify the node with the routing function of the information for performing the routing.

Similarly as described above, the node with the routing function calculates, for example, the amount of data to be routed to each SgNB, using the information. The node with the routing function performs the routing using the amount of data.

This can adjust the amount of data to be routed to each SgNB. The node with the routing function determines to perform the routing. This can facilitate the control over the routing of data, and reduce the malfunctions.

The routing function may be performed for each data. The routing is performed to the SgNB s for each data. Alternatively, the same routing may be performed for a predetermined duration. The data for the predetermined duration is routed to the same SgNB. This enables flexible routing. The routing appropriate for a communication quality state of each SgNB is possible.

The eNBs that are base stations in the LTE may be used as secondary base stations for the MC. The secondary base stations may include an eNB and a gNB. The method disclosed in the seventh embodiment should be appropriately applied thereto. Since the secondary base stations do not use the New AS sublayer in the seventh embodiment, the eNBs can be used as the secondary base stations.

The method disclosed in the seventh embodiment can configure the connection of one UE to a plurality of secondary base stations. This can increase the throughput of communication to be provided for the UE. Moreover, the connection to a plurality of base stations can enhance the reliability. Since the MC with the SCG bearer can be set, the communication without routing through the MeNB can be provided. This can increase the throughput of communication to be provided for the UE.

The First Modification of the Seventh Embodiment

The details of the MC with the SCG bearer in the presence of the New AS sublayer protocol have not yet been discussed. The first modification of the seventh embodiment discloses a method for performing the MC with the SCG bearer in the presence of the New AS sublayer protocol.

Figure 31:
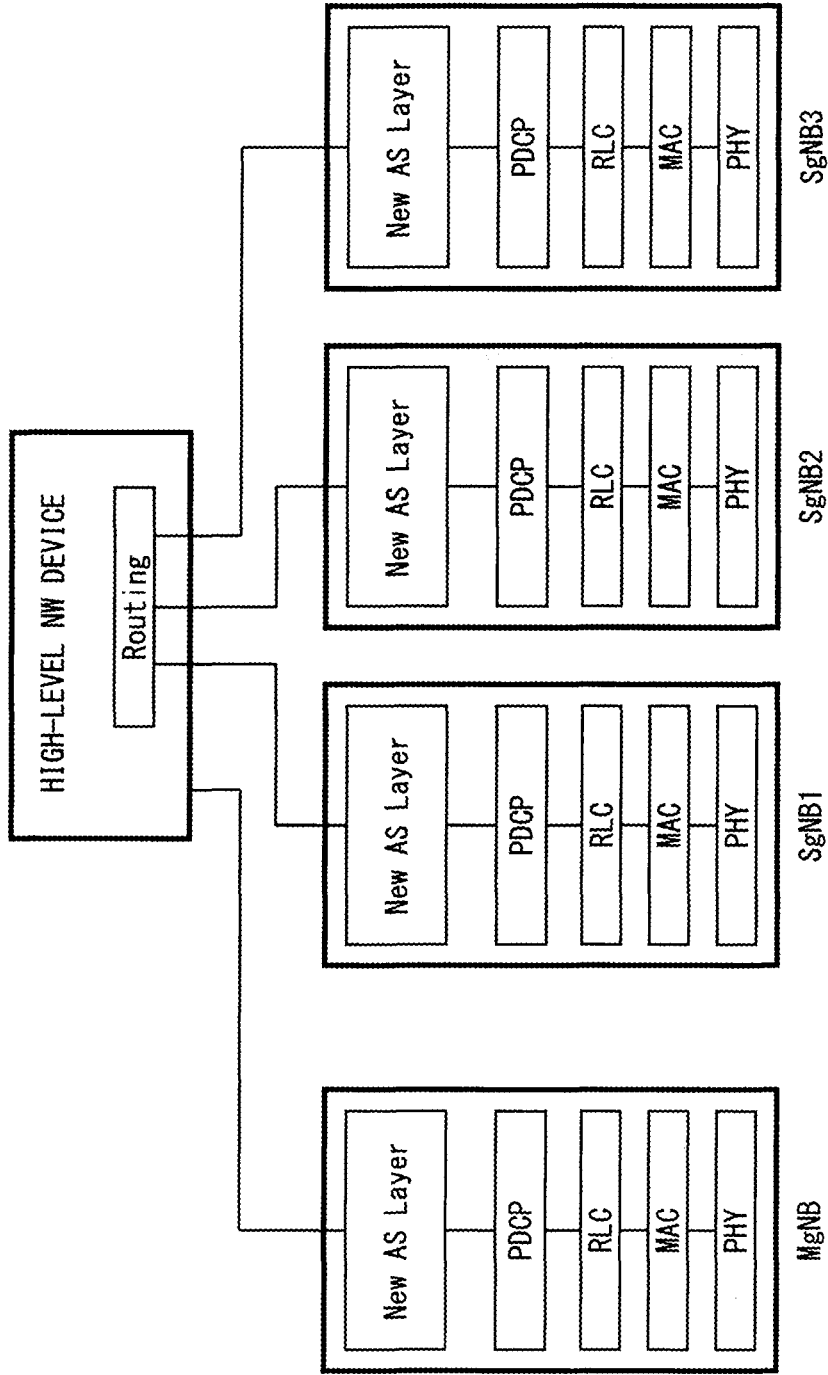
FIG. 31 illustrates an architecture of the MC with the SCG bearer according to the first modification of the seventh embodiment.

FIG. 31 illustrates an architecture of the MC with the SCG bearer. FIG. 31 illustrates that the high-level NW is an NG-CN, the master base station is a base station in NR (gNB), and the secondary base stations are base stations in NR (gNBs). The master base station in NR is referred to as the MgNB, and the secondary base stations in NR are referred to as the SgNBs. The protocol configuration of the gNB includes the New AS sublayer, the PDCP, the RLC, the MAC, and the PHY. The New AS sublayer is set higher than the PDCP.

Although the master base station is the gNB in NR in FIG. 31, the master base station may be an eNB obtained by adding the New AS sublayer to a base station in the LTE.

Although FIG. 31 illustrates the architecture on the base station side, the architecture on the UE side is identical to that on the base station side except for the high-level NW. In one UE, the RLC, the MAC, and the PHY for the MgNB, the RLC, the MAC, and the PHY for each of the SgNBs set for the MC, the New AS sublayer, and the PDCP are configured.

FIG. 31 illustrates the use of the SCG bearer. The high-level NW is connected to the SgNBs. The high-level NW routes the downlink data into the SgNBs for the MC to transfer it. The New AS sublayer of the SgNB maps the data to a DRB according to a QoS flow identifier. The PDCP processes the data for each of the mapped DRBs.

In each of the SgNBs, the data is processed by the PDCP, the RLC, the MAC, and the PHY for each of the DRBs, and then transmitted to the UE.

The data received by the UE from each of the SgNBs for the MC is processed by the PHY, the MAC, the RLC, the PDCP, and the New AS sublayer for the SgNB. The New AS sublayer separates the data into the QoS flows according to the QoS flow identifiers, and then transfers the pieces of data to the upper layer.

In the UE, the New AS sublayer for the SgNB maps, as the uplink data, the pieces of data from the upper layer to DRBs according to the QoS flow identifiers. Then, the PDCP, the RLC, the MAC, and the PHY process the pieces of data for each of the mapped DRBs, and then transmit the pieces of data to each of the SgNBs.

The data received by each of the SgNBs from the UE is processed by the PHY, the MAC, the RLC, and the PDCP, and then transferred to the New AS sublayer. The New AS sublayer separates the pieces of data into the QoS flows according to the QoS flow identifiers, and then transfers the pieces of data to the high-level NW.

A method for setting the MC with the SCG bearer is disclosed. The MC is set for each DRB. The MC is set with the SCG bearer for each DRB. When the high-level NW sets the MC with the SCG bearer in the NG-CN, the following problems mainly occur.

Conventionally, one PDU session tunnel (may be referred to as an N3 tunnel) is set between the UPF and the gNB per PDU session, through which communication is performed between the UPF and the gNB. However, when the SCG bearer is used, the high-level NW needs to communicate not only with the MgNB but also with the SgNB. When the MC with the SCG bearer is performed, the high-level NW needs to communicate not only with the MgNB but also with a plurality of SgNBs. In such a case, how to deal with the PDU session tunnel is a problem.

Moreover, the following other problems occur. The routing has to be performed to the plurality of SgNBs for the MC. Where the routing function is installed and which function is provided as the routing function are problems.

Moreover, following another problem occurs. The SgNB needs to set a DRB necessary for the MC. What to do with a method for the SgNB to set the DRB necessary for the MC and a mapping method from the New AS sublayer of the SgNB is a problem.

The first modification of the seventh embodiment discloses a method for solving such problems.

A plurality of PDU session tunnels can be set per PDU session between the NG-CN and the RAN. The MgNB determines to set a plurality of PDU session tunnels. For example, when the MgNB to be connected to the NG-CN performs the MC with the SCG bearer, the MgNB determines to set the plurality of PDU session tunnels.

The MgNB notifies the high-level NW of a request for adding the PDU session tunnels. The request should include PDU session tunnel addition information. The MgNB notifies the request to the UPF as a node of the high-level NW. The MgNB may notify the request to the AMF or the SMF as a node of the high-level NW. Then, the AMF or the SMF may notify the request to the UPF. Nine examples of the PDU session tunnel addition information are disclosed below:

(1) a PDU session identifier;
(2) PDU session tunnel identifiers (may be the N3 tunnel identifiers);
(3) QoS flow identifiers to which the MC is set;
(4) an identifier of the SgNB to which the MC is set;
(5) an address of the SgNB to which the MC is set;
(6) an identifier of a node with the routing function;
(7) an address of the node with the routing function;
(8) information for requesting maintaining of the mapping method from a QoS profile to a QoS flow; and
(9) combinations of (1) to (8) above.

(1) may be any information for identifying the PDU session. Information for identifying the PDU session which the high-level NW has notified in establishing the PDU session may be used. This can indicate which PDU session the PDU session tunnel is to be added to.

(2) may be any information for identifying the PDU session tunnels that have already been set. Information for identifying the PDU session tunnels which the high-level NW has notified in establishing the PDU session may be used. This can specify the PDU session tunnels that have already been set.

In (3), the number of the QoS flows on which the MC is performed may be one or more. (3) can indicate which QoS flow in the PDU session is migrated to the PDU session tunnel.

(4) may be any information for identifying a SgNB to which the high-level NW sets the PDU session tunnel. For example, when the UPF is provided with the routing function, the PDU session tunnel can be set for a SgNB with the notified identifier.

(5) may be any information indicating the address of the SgNB to which the high-level NW sets the PDU session tunnel. For example, when the UPF is provided with the routing function, the PDU session tunnel can be set for the SgNB with the notified address.

(6) may be any information for identifying the node with the routing function to which the high-level NW sets the PDU session tunnel. For example, when the node with the routing function is provided on the RAN side, the PDU session tunnel can be set for the node with the routing function having the notified identifier.

(7) may be any information for identifying the address of the node with the routing function to which the high-level NW sets the PDU session tunnel. For example, when the node with the routing function is provided on the RAN side, the PDU session tunnel can be set for the node with the routing function having the notified address.

(8) may be any information indicating that the mapping method from a QoS profile to a QoS flow which migrates to the additionally set PDU session tunnel is identical to the method before the additional setting. The high-level NW may map the QoS profile to the QoS flow using the information. The high-level NW may determine whether the mapping method is set identical to that before the additional setting. The setting appropriate for a state of the high-level NW is possible.

The high-level NW may notify the MgNB that the mapping method is identical to that before the additional setting if it is so. The MgNB can map, for the SgNB to be used for the MC, a QoS flow identifier to a DRB in the New AS sublayer with the same setting as that before the additional setting. This facilitates the setting of the SgNBs to which the MC is set.

When the mapping method is set different from that before the additional setting, the high-level NW notifies the MgNB of information on a reconfigured mapping relationship between the QoS profile and the QoS flow. The high-level NW should notify the information by associating the QoS flow identifier with the QoS profile of the QoS flow. The MgNB notifies the SgNB to be used for the MC of the information. The SgNBs can set, using the information, the mapping from the QoS flow identifier to the DRB in the New AS sublayer.

When the PDU session tunnel addition information does not include the information of (8), the high-level NW may determine whether the mapping method is set identical to that before the additional setting. When the PDU session tunnel addition information includes the information of (8), the high-level NW may set the mapping method identical to that before the additional setting according to the information of (8).

The timing at which the PDU session tunnel is additionally set is disclosed. For example, upon receipt of the SgNB addition request response from the SgNB to be used for the MC, the MgNB notifies the high-level NW of a request for adding the PDU session tunnel. Since the MgNB can give the notification upon finalization of the SgNB to be used for the MC, an unnecessary PDU session tunnel is not set.

For example, the MgNB notifies the high-level NW of a request for adding a PDU session tunnel together with a path switch request. The path switch request may include the PDU session tunnel addition information. Since the signaling for the path switch request can be used, the amount of signaling can be reduced.

The timing at which the PDU session tunnel is additionally set is not limited to this. The PDU session tunnel should be additionally set after the MgNB determines to perform the MC using the SgNBs and before the high-level NW performs the path switch.

In response to the request for adding the PDU session tunnel from the MgNB, the high-level NW notifies the MgNB of a response to the request for adding the PDU session tunnel. The high-level NW should also notify PDU session tunnel addition request response information. Twelve examples of the PDU session tunnel addition request response information are disclosed below:
   (1) completion of the additional setting;
   (2) rejection of the additional setting;
   (3) a cause for rejection of the additional setting;
   (4) a PDU session identifier;
   (5) PDU session tunnel identifiers before the additional setting;
   (6) a PDU session tunnel identifier additionally set;
   (7) association information between the added PDU session tunnel and the SgNB;
   (8) association information between the added PDU session tunnel and the QoS flow;
   (9) a QoS profile of the QoS flow;
   (10) an identifier of the UPF;
   (11) an address of the UPF; and
   (12) combinations of (1) to (11) above.
   (6) may be any information for enabling the MgNB to identify the additionally set PDU session tunnel.

The additionally set PDU session tunnel may be set as PDU session sub-tunnels associated with the PDU session tunnel before the additional setting. One or more PDU session sub-tunnels are set to a PDU session tunnel. This need not set a plurality of PDU session tunnels to one PDU session. The conventional setting of one PDU session with one PDU session tunnel can be maintained.

When the PDU session sub-tunnels are set, PDU session sub-tunnel identifiers should be used as a replacement for the PDU session tunnel identifier additionally set in the examples of the PDU session tunnel addition request response information. The PDU session tunnel identifier before the additional setting may be notified as well. The PDU session tunnel before the additional setting and the PDU session sub-tunnel identifiers additionally set should be notified in association with one another.

A PDU session tunnel identifier may be used as a PDU session sub-tunnel identifier. For example, a combination of a PDU session tunnel identifier and a sub-number may be used as a PDU session sub-tunnel identifier. For example, a PDU session sub-tunnel identifier=a PDU session tunnel identifier+a sub-number may hold. The sub-number has only to be notified as information for identifying a PDU session sub-tunnel, which can reduce the amount of information.

When many SgNBs are used for the MC, the SgNBs should be provided with the respective PDU session sub-tunnels. Thus, the number of the PDU session tunnel identifiers need not be increased.

When the MgNB notifies the high-level NW of a request for adding a PDU session tunnel together with a path switch request, the high-level NW may include the PDU session tunnel addition request response information in a response to the path switch request to notify the information. This can reduce the amount of signaling.

With application of such a method, the PDU session tunnel is additionally set between the high-level NW and the SgNB to be used for the MC. Use of the additionally set PDU session tunnel enables the communication between the high-level NW and the SgNB. Thus, the MC with the SCG bearer can be performed.

The routing functions are necessary for a plurality of SgNBs for the MC. The routing function disclosed in the seventh embodiment should be appropriately applied to a position at which the routing function is installed and the routing function. Although the high-level NW is the EPC in the seventh embodiment, the high-level NW should be the NG-CN in the first modification of the seventh embodiment.

Since the high-level NW is the EPC, the seventh embodiment discloses that the high-level NW is connected to a plurality of SgNBs without changing the E-RAB bearer setting. Since the high-level NW is the NG-CN in the first modification of the seventh embodiment, the high-level NW and the RAN use not the E-RAB bearer setting but the setting with the QoS flow.

The high-level NW side may be provided with the routing functions. For example, the UPF may be provided with the routing function. Alternatively, the routing function may be provided for a function of the UPF. When the UPF is provided with the routing function, a PDU session tunnel should be additionally set between the UPF and the SgNBs for the MC. The method for additionally setting the PDU session tunnel should be applied thereto.

The routing function may be provided separately from the high-level NW. The routing function may be provided as a node on the RAN side. The routing function may be provided in the node on the RAN side. For example, the routing function may be provided as one function of the SgNB. When the routing function is provided in the node on the RAN side, a PDU session tunnel should be additionally set between the UPF and the node on the RAN side. Even when the MC is performed using a plurality of SgNBs, one PDU session tunnel should be additionally set.

This enables data to be transferred between the UPF and the node on the RAN side which has the routing function. Mere addition of one PDU session tunnel can simplify the configuration of a system including the high-level NW.

An interface between the base stations should be used for transferring data between the node on the RAN side which has the routing function and the SgNB to be used for the MC. The interface is, for example, Xn.

A routing function should be provided above the New AS sublayer, that is, between the New AS sublayer and the high-level NW, as a method for providing the node on the RAN side with the routing function. Data from the high-level NW is routed in a phase of packet data before the data is processed by the New AS sublayer. The pieces of packet data from the New AS layers of the SgNBs for the MC are reordered based on the SNs assigned by the routing function, and transferred to the high-level NW.

Another method for providing the node on the RAN side with the routing function may be providing the routing function between the New AS sublayer and the PDCP. The data from the high-level NW is routed into the PDCPs of the SgNBs for the MC in a phase after the data is processed by the New AS sublayer. The pieces of data from the PDCPs of the SgNBs for the MC are reordered based on the SNs assigned by the routing function and transferred to the high-level NW.

The DRB may be set for each SgNB for the MC. For example, the DRB can be set according to a load state of the SgNB. As an alternative method, the SgNB that performs the routing function may be provided with one DRB. Each SgNB for the MC performs data communication within this DRB. The DRB configuration of each SgNB should be set so that QoS profiles of all the SgNBs for the MC are set to the DRB for the SCG bearer or to a desired QoS of the QoS flow.

When the routing function is provided in the node on the RAN side, which gNB the routing function is provided to is a problem. This is because the gNB having the routing function is not necessarily used as the SgNB for the MC. Thus, a gNB should be provided with the routing function in advance. On and Off of the routing function should be installed.

A method for setting the SgNB that turns ON the routing function is disclosed. The SgNB that turns ON the routing function may be referred to as an R-SgNB.

The high-level NW determines the R-SgNB. The AMF or the SMF functioning as a high-level NW may determine the R-SgNB. The AMF or the SMF may determine the R-SgNB, for example, when the PDU session tunnel is additionally set. The AMF determine the R-SgNB to be connected to the UPF, using the SgNB identifier for the MC that is included in the PDU session tunnel addition information to be notified from the MgNB to the AMF. The AMF notifies the MgNB of an identifier of the R-SgNB. The AMF may include the identifier of the R-SgNB in the PDU session tunnel addition request response information to notify the identifier.

The MgNB notifies the R-SgNB of the PDU session tunnel addition request response information. Upon receipt of the notification, the R-SgNB can be connected to the UPF through the PDU session tunnel added to the PDU session including the QoS flow on which the MC is performed. The MgNB should notify the R-SgNB of a request for performing the routing between the UPF and the SgNB for the MC. The request may include information on its own SgNB and information on the SgNB for the MC.

The information on its own SgNB includes an identifier and an address of its own SgNB. The information on the SgNB for the MC includes an identifier and an address of the SgNB for the MC. Upon receipt of the request, the R-SgNB turns ON the routing function, and routes data of the QoS flow to be communicated through the PDU session tunnel, into the SgNB for the MC.

The MgNB may collectively notify the R-SgNB of the PDU session tunnel addition request response information and the request for performing the routing between the UPF and the SgNB for the MC. Alternatively, a notification of the PDU session tunnel addition request response information, and a notification of the information on its own SgNB and the information on the SgNB for the MC may be regarded as the request for performing the routing between the UPF and the SgNB for the MC. Since the notifications can be made via one signaling, the amount of signaling can be reduced.

The AMF includes at least one of the identifier and the address of the R-SgNB in the PDU session tunnel addition information to notify the UPF of the information. This enables the UPF to be connected to the R-SgNB through the PDU session tunnel added to the PDU session including the QoS flow on which the MC is performed. Thus, communication between the R-SgNB and the UPF is possible. The information may be included in the path switch request to be notified from the AMF to the UPF to be notified.

Although the notification from the AMF to the UPF is disclosed, the notification may be given from the AMF to the UPF through the SMF. The notification should be given, for example, in the absence of a direct interface between the AMF and the UPF.

The AMF may notify the MgNB to deactivate the R-SgNB. The AMF also notifies the UPF to deactivate the R-SgNB. The MgNB notifies the R-SgNB of a request for deactivating the routing between the UPF and the SgNB for the MC. Upon receipt of the deactivating request, the R-SgNB turns OFF the routing function to deactivate the routing.

The R-SgNB may be reconfigured. The AMF determines to change the R-SgNB to be connected to the UPF. The AMF notifies the MgNB to change the R-SgNB. The notification for setting the R-SgNB may be used for this notification. The R-SgNB after change should be notified as a setting target. Information on the R-SgNB before change may be notified as well.

The MgNB notifies the R-SgNB before change of the request for deactivating the routing between the UPF and the SgNB for the MC. Upon receipt of the deactivating request, the R-SgNB turns OFF the routing function to deactivate the routing. The MgNB notifies the R-SgNB after change of the request for performing the routing between the UPF and the SgNB for the MC. The notification of the request for performing the routing which is given to the R-SgNB may be used for this notification. Upon receipt of the request, the R-SgNB turns ON the routing function to perform the routing.

The AMF also notifies the UPF to change the R-SgNB. The notification of adding the PDU session tunnel for the R-SgNB may be used for this notification. The R-SgNB after change should be notified as a setting target. Information on the R-SgNB before change may be notified as well. The UPF can change the connection from the R-SgNB before change to the R-SgNB after change, using the target PDU session tunnel. This enables the communication between the R-SgNB after change and the UPF.

The RAN side may have a function of deactivating the routing to a part of the SgNBs. The MgNB may notify the R-SgNB of the request for deactivating the routing between the UPF and the SgNB for the MC, together with information on an SgNB to which the routing is deactivated or information on an SgNB to which the routing is continued. Upon receipt of the deactivating request, the R-SgNB deactivates the routing to the SgNB subject to the deactivation.

The MgNB may determine the R-SgNB. The MgNB should notify the high-level NW of information on the determined R-SgNB. The MgNB should notify at least one of an identifier and an address of the SgNB to which the routing function is set, as the information on the R-SgNB. The MgNB may include the information in the PDU session tunnel addition request information to notify the information.

The disclosed methods for the high-level NW to determine the R-SgNB should be appropriately applied to the notification from the MgNB to the determined R-SgNB, and the notification of the information on the R-SgNB to be given from the AMF to the UPF.

The MgNB may also determine to deactivate the routing function of the R-SgNB and reconfigure the R-SgNB. The aforementioned methods should be appropriately applied thereto.

The MgNB may notify the UE to implement, deactivate, or reconfigure the routing function. The UE is provided with the routing function between the upper layer and the New AS sublayer or between the upper layer and the PDCP. The routing function should be identical to that on the NW side.

The MgNB should set and perform the data routing for each UE. This enables the NW side to recognize which SgNB is to be used. Alternatively, the UE may set and perform the data routing. Which SgNB data is routed to can be determined according to the power consumption or a load state of the UE.

A function of mapping the QoS flow to the SgNB for the MC may be provided as the routing function. The high-level NW device may determine the mapping. This is effective, for example, when the high-level NW, e.g., the UPF is provided with the routing function. The AMF functioning as a high-level NW may determine the mapping. The AMF notifies the UPF of the mapping. The UPF maps the QoS flow to the SgNB using the notified mapping.

The AMF may notify the MgNB of the mapping. The MgNB may notify the UE of the mapping. This enables the UE to map the QoS flow to the SgNB for the MC also in the uplink communication.

A RAN node may determine the mapping. This is effective, for example, when the RAN-side node is provided with the routing function. The MgNB functioning as the RAN node may determine the mapping. The MgNB notifies the R-SgNB of the mapping. The SgNB maps the QoS flow to the SgNB, using the notified mapping.

The MgNB may notify the UE of the mapping. This enables the UE to map the QoS flow to the SgNB for the MC and vice versa also in the uplink communication.

Consequently, the SgNB can be set for each QoS flow. The packet data of a predetermined QoS flow can be communicated through a predetermined SgNB. The throughput can be increased with the setting appropriate for a load state or the processing capability of the SgNB.

A method for the SgNB to establish the DRB necessary for the MC and a mapping method from the New AS sublayer of the SgNB are disclosed.

The MgNB notifies each SgNB for the MC of information on the DRB setting. Nine examples of the information on the DRB setting are listed below:

(1) a DRB identifier subject to the MC;
(2) a DRB configuration subject to the MC;
(3) QoS flow identifiers mapped to the DRB subject to the MC;
(4) a QoS profile for each QoS flow;
(5) a PDU session identifier subject to the MC;
(6) a PDU session tunnel identifier additionally set;
(7) an identifier of a high-level device that establishes a PDU session tunnel;
(8) an address of the high-level device that establishes the PDU session tunnel; and
(9) combinations of (1) to (8) above.

Each SgNB sets the DRB for the MC, using the notified information on the DRB setting. Each SgNB sets the mapping to the DRB set from the New AS sublayer, according to the notified information. The settings of the DRB s in the SgNB s may be different from one another. The DRB identifiers may also be different. The MgNB may notify each SgNB for the MC of the information on the DRB setting, via the SgNB reconfiguration complete signaling.

The MgNB may notify each SgNB for the MC of a request for establishing the PDU session tunnel. The information on the DRB setting may be appropriately applied to information on the request for establishing the PDU session tunnel. The information on the DRB setting and the information for establishing the PDU session tunnel may be notified together. The notifications may be given via one signaling. This can reduce the amount of signaling.

Each SgNB notifies the MgNB of DRB setting response information. Eight examples of the DRB setting response information are listed below:

(1) an identifier of its own SgNB;
(2) an address of its own SgNB;
(3) acceptance of the DRB setting;
(4) rejection of the DRB setting;
(5) a cause for rejection of the DRB setting;
(6) a DRB configuration set by its own SgNB;
(7) a DRB identifier set by its own SgNB; and
(8) combinations of (1) to (7) above.

The MgNB sets the MC to the UE. The MgNB may notify a result of the DRB setting from each SgNB for the MC as settings of the MC. The first modification of the sixth embodiment should be appropriately applied to methods for setting the MC and notifying the setting from the MgNB to the UE. Although the MCG split bearer is disclosed as a type of bearer in the first modification of the sixth embodiment, the SCG bearer may be applied in the first modification of the seventh embodiment.

Such methods enable the high-level NW to set the MC with the SCG bearer in the NG-CN. The settings of the MC can be made for each DRB. The MC can be performed between the UE and the MgNB and between the UE and each SgNB for the MC. This can increase the throughput of the DRB to which the MC is set.

Figure 32:
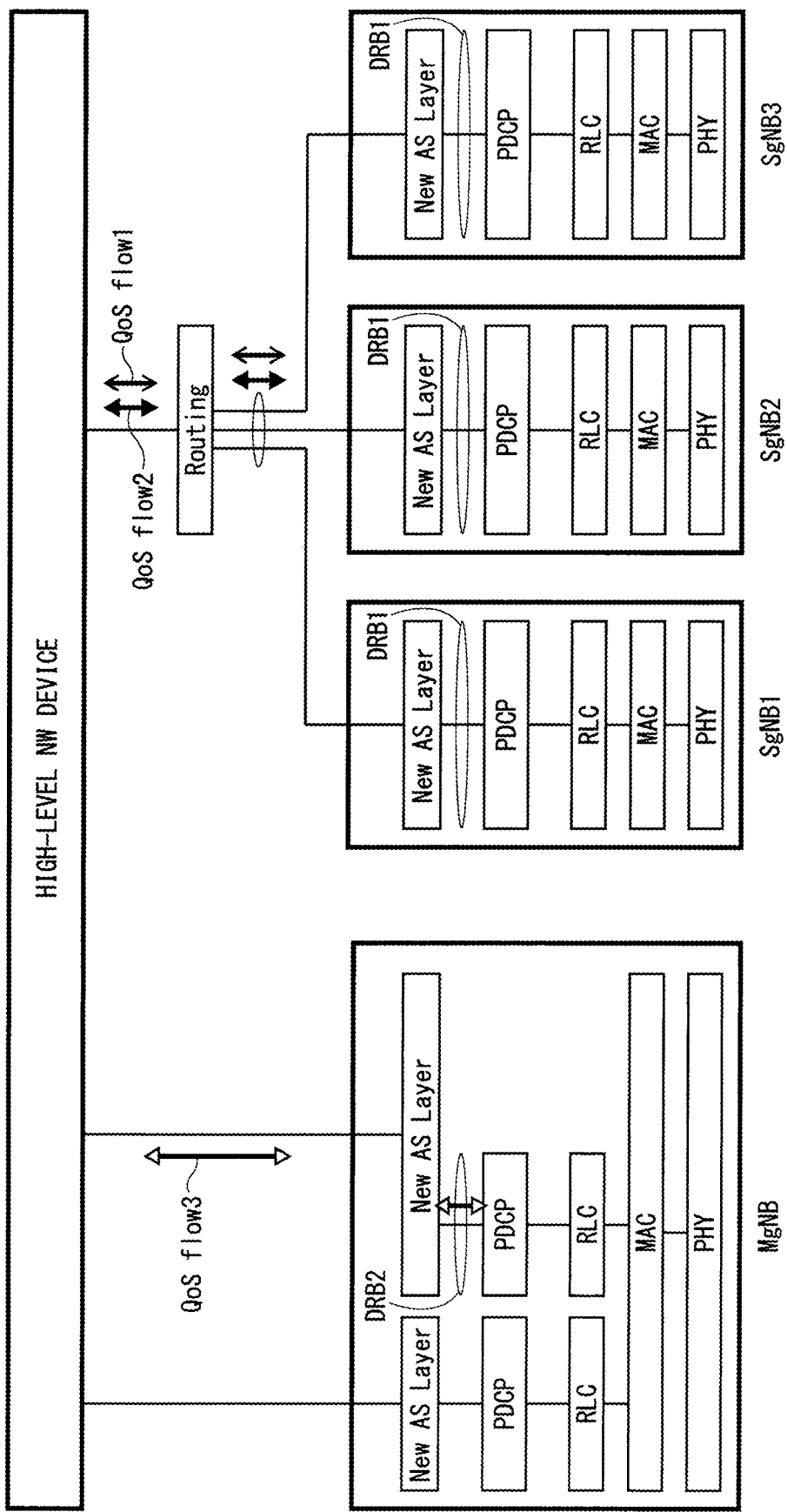
FIG. 32 is a conceptual diagram illustrating a dataflow when the MC with the SCG bearer is set for each DRB according to the first modification of the seventh embodiment.

FIG. 32 is a conceptual diagram illustrating a dataflow when the MC with the SCG bearer is set for each DRB. Assume that the mapping relationship between the QoS flows and the DRBs before the MC is set is the one illustrated in FIG. 21. Assume a DRB on which the MC is performed as the DRB 1. The QoS flow 1 and the QoS flow 2 are mapped to the DRB 1.

As illustrated in FIG. 32, the MgNB additionally sets a PDU session tunnel on the SgNB side for the MC to set the DRB 1 to the MC with the SCG bearer. FIG. 32 illustrates that the node with the routing function is provided separately from the high-level NW. Thus, the PDU session tunnel is additionally set between the high-level NW and the node with the routing function. When the routing function is provided in the high-level NW, the PDU session tunnel is additionally set between the high-level NW and the SgNBs for the MC.

The QoS flow 1 and the QoS flow 2 which are mapped to the DRB to which the MC is set are communicated through the added PDU session tunnel. The packet data which the high-level NW maps to the QoS flow 1 and the QoS flow 2 is communicated through the added PDU session tunnel.

The node with the routing function routes data into the SgNBs for the MC. Each of the SgNBs sets the DRB for the MC, using information on the DRB 1 to which the MC is set, where the information is notified from the MgNB. FIG. 32 illustrates the use of the same setting in each SgNB as that of the DRB 1 set by the MgNB. FIG. 32 illustrates the case of the DRB identifier identical to that set by the MgNB.

The data mapped to the QoS flow 1 and the QoS flow 2 is transferred to the New AS sublayer of each of the SgNBs, and mapped to the DRB 1 in the New AS sublayer. This enables each of the SgNBs for the MC to process the QoS flow mapped to the DRB 1 to which the MC is set.

The MgNB should notify a configuration of each of the SgNBs on which the MC is performed and the DRB configuration set to the SgNB. For example, the method for notifying the DRB configuration from the MgNB to the UE, which is disclosed in the sixth embodiment, should be applied to this notification. The UE can set the DRB configuration set to each of the SgNBs. The same applies to the uplink data. This can implement the MC for each DRB.

Figure 33:
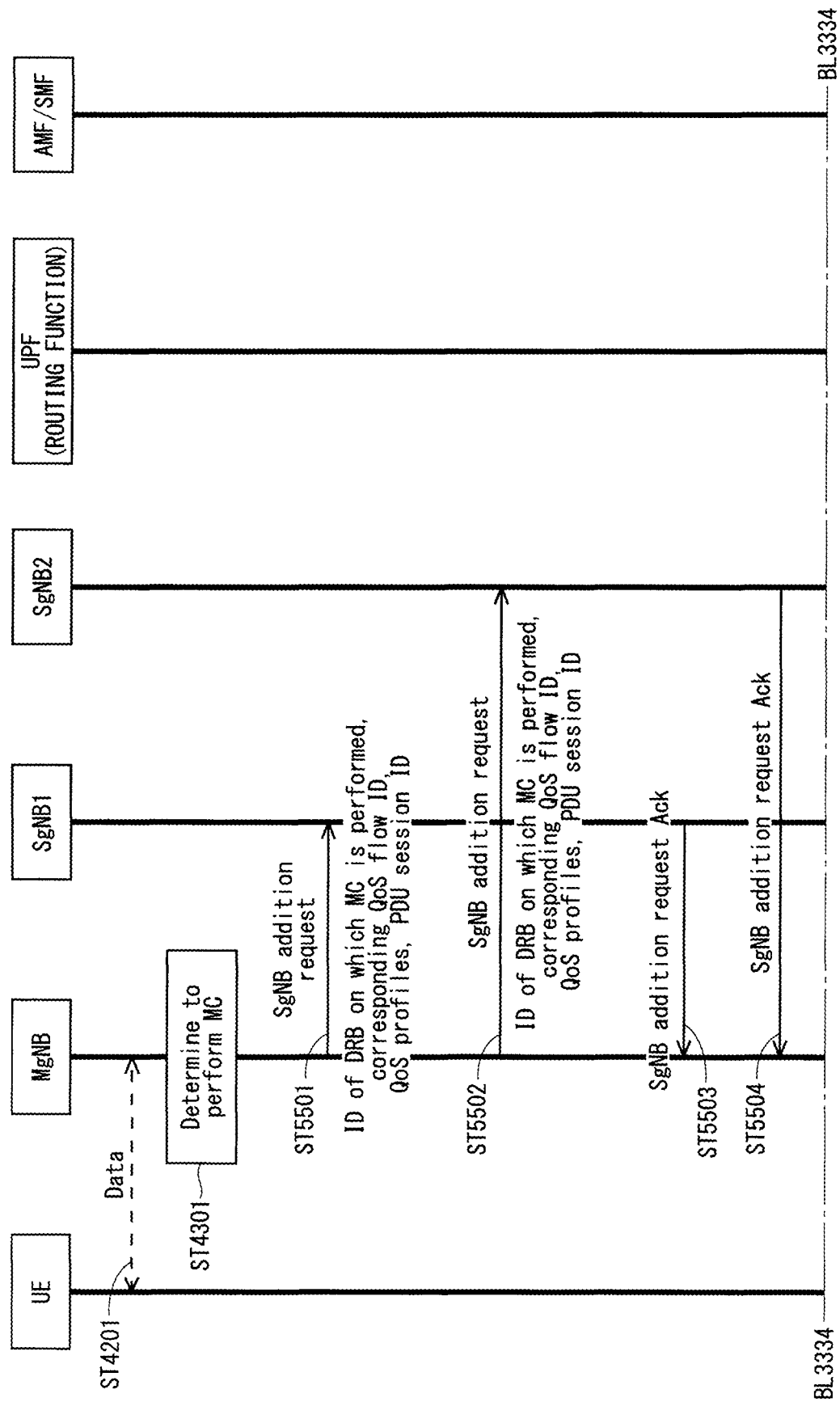
FIG. 33 illustrates an example sequence for setting the MC with the SCG bearer when the high-level NW is the NG-CN according to the first modification of the seventh embodiment.
Figure 34:
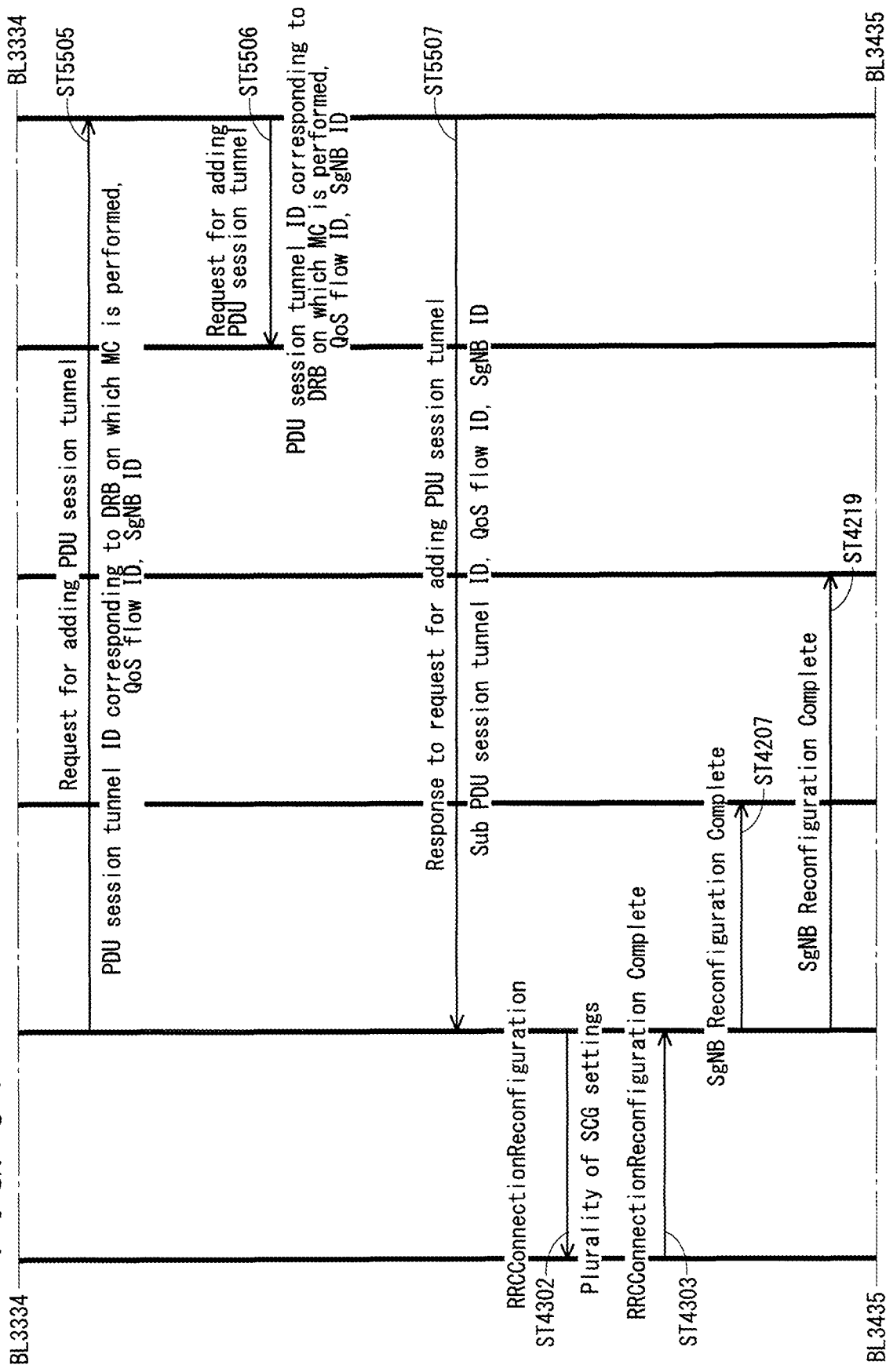
FIG. 34 illustrates the example sequence for setting the MC with the SCG bearer when the high-level NW is the NG-CN according to the first modification of the seventh embodiment.

FIGS. 33 to 35 illustrate an example sequence for setting the MC with the SCG bearer when the high-level NW is the NG-CN. FIGS. 33 to 35 are connected across locations of borders BL3334 and BL3435. FIGS. 33 to 35 illustrate the use of the MgNB and two SgNBs (SgNB 1 and SgNB 2). Since the sequence illustrated in FIGS. 33 to 35 includes the same steps as those of the sequences illustrated in FIGS. 19 and 20 and FIGS. 29 and 30, the same step numbers are applied to the same Steps and the common description thereof is omitted.

In Steps ST5501 and ST5502, the MgNB notifies the SgNB 1 and the SgNB 2, respectively, of the SgNB addition requests. The signaling for addition request should include the information on the DRB setting. Examples of the information on the DRB setting include an identifier and a configuration of a DRB subject to the MC, an identifier of the QoS flow mapped to the DRB subject to the MC, a QoS profile for each QoS flow, and a PDU session identifier subject to the MC.

The MgNB may determine a QoS profile setting for each of the SgNBs to which the MC is set to satisfy the QoS profile of the QoS flow on which the MC is performed.

The MgNB may notify each of the SgNBs to which the MC is set of the DRB configuration to be requested from the SgNB. The MgNB may set the DRB configuration identical to the DRB configuration before the setting. Alternatively, the MgNB may determine a bearer configuration so that the bearer configuration of the SgNB to which the MC is set satisfies the QoS profile of the QoS flow on which the MC is performed.

Upon receipt of the information on the DRB settings from the MgNB, the SgNB 1 and the SgNB 2 set the DRBs for mapping the QoS flows subject to the MC. In Steps ST5503 and ST5504, the SgNB 1 and the SgNB 2, respectively, notify the MgNB of addition request responses to the addition requests. The signaling for addition request response should include the DRB setting response information. The addition request response is, for example, the DRB setting acceptance. Examples of the DRB setting response information include the DRB identifier and its configuration that are set by its own SgNB, and the identifier and the address of its own SgNB. The SgNB 1 and the SgNB 2 may notify the AS settings set by its own SgNBs.

Upon receipt of the signaling for SgNB addition request response from each of the SgNBs to be used for the MC, the MgNB notifies the high-level NW of a request for adding the PDU session tunnel to set the MC with the SCG bearer in Step ST5505. The MgNB should include the PDU session tunnel addition information in the signaling for the request for adding the PDU session tunnel to notify the information. Examples of the PDU session tunnel addition information include a PDU session identifier subject to the MC, a PDU session tunnel identifier subject to the MC, a QoS flow identifier subject to the MC, and an identifier and an address of the SgNB for the MC.

In Step ST5506, the AMF/SMF notifies the UPF of a PDU session tunnel addition request. Similarly as described above, the AMF/SMF should include the PDU session tunnel addition information in the signaling for the request for adding the PDU session tunnel to notify the information.

Upon receipt of the notification of the PDU session tunnel addition request and the PDU session tunnel addition information in Step ST5506, the UPF additionally sets the PDU session tunnel for the SgNBs to be used for the MC.

In Step ST4302, the MgNB notifies the UE of the settings of the MC. The MgNB notifies, as the settings of the MC, the SCG configuration of each of the SgNBs for the MC and the DRB configuration set by the SgNB. The RRCConnection-Reconfiguration for setting the RRC connection may be used as the signaling. The MgNB may notify the SCG bearer as a type of bearer.

Upon receipt of the SCG configurations and the DRB configurations of the SgNB 1 and the SgNB 2 in Step ST4302, the UE sets the MC to the MgNB, the SgNB 1, and the SgNB 2 according to the settings. In Step ST4303, the UE gives the MgNB the RRC connection reconfiguration complete (RRCConnectionReconfigurationComplete) notification including completion of the settings of the MC.

Upon recognizing that the UE has completed the settings of the MC, the MgNB notifies the signaling indicating the completion of the additional setting of the SCG of each of the SgNBs to the SgNB 1 in Step ST4207 and to the SgNB 2 in Step ST4219. The SgNB 1 and the SgNB 2 recognize completion of the connection setting with the UE for the MC.

The MgNB may notify the SgNB 1 and the SgNB 2 of requests for establishing the PDU session tunnels, using the signalings for completion of the additional setting of the SCG in Step ST4207 and ST4219, respectively. The information on the DRB setting should be included in the signaling for completion of the additional setting of the SCG as the information on the request for establishing the PDU session tunnel.

Examples of the information on the DRB setting include the identifier of the DRB subject to the MC, the identifier of the QoS flow mapped to the DRB subject to the MC, the PDU session identifier subject to the MC, the PDU session tunnel identifier additionally set, and the identifier and the address of the high-level device that establishes the PDU session tunnel.

Consequently, the PDU session tunnel is additionally set between the AMF/SMF and the SgNBs to be used for the MC. This enables data communication between the SgNBs for the MC with the SCG bearer and the high-level NW.

In Steps ST4208 and ST4220, the UE performs the RA procedures with the SgNB 1 and the SgNB 2, respectively, to establish synchronization therewith. In Steps ST5201 to ST5203, the MgNB transfers the SN status and data to the SgNB 1. The method disclosed in the seventh embodiment should be appropriately applied to the transferring of data.

In Step ST5508, the MgNB notifies the AMF/SMF of a PDU session tunnel switching request. The MgNB requests the AMF/SMF to change the QoS flow included in the DRB subject to the MC from the PDU session tunnel before setting the MC to the PDU session tunnel additionally set for the SgNBs to be used for the MC. The signaling for the PDU session tunnel switching request should include information for switching the PDU session tunnel.

Eight examples of the information for switching the PDU session tunnel will be described below:

(1) QoS flow identifiers mapped to the DRB subject to the MC;
(2) a PDU session identifier subject to the MC;
(3) a PDU session tunnel identifier additionally set;
(4) an identifier of a high-level device that establishes a PDU session tunnel;
(5) an address of the high-level device that establishes the PDU session tunnel;
(6) an identifier of the SgNB to be used for the MC;
(7) an address of the SgNB to be used for the MC; and
(8) combinations of (1) to (7) above.

Similarly as in Step ST5508, the AMF/SMF notifies the UPF of the PDU session tunnel switching request in Step ST5509. Upon receipt of the PDU session tunnel switching request, the UPF transmits a packet indicating the end marker as the last packet data to the MgNB in Step ST5206, and switches to the PDU tunnel additionally set for the SgNB to be used for the MC, using information notified in the PDU session tunnel switching request. In Step ST5207, the MgNB transfers the end marker to the SgNB 1. Consequently, the SgNB 1 recognizes termination of data from the MgNB.

The AMF/SMF, which has notified the UPF of the PDU session tunnel switching request in Step ST5509, notifies the MgNB of a PDU session tunnel switching request response. Consequently, the MgNB recognizes the switching to the PDU session tunnel additionally set for the SgNB 1 and the SgNB 2 for the MC.

Upon receipt of the MC path switch setting information in Step ST5509, the UPF transmits the packet indicating the end marker as the last packet data to the MgNB to activate the path switch in Step ST5206. In Step ST5207, the MgNB transfers the end marker to the SgNB 1. Consequently, the SgNB 1 recognizes termination of data from the MgNB.

In Step ST5210, the packet data is routed to each SgNB for the MC with the routing function provided in the UPF. In Steps ST5211 to ST5214, data is communicated between the SgNB 1, the SgNB 2, and the UPF.

This enables the MC with the SCG bearer when the high-level NW is the NG-CN. The MgNB can set the MC with the SCG bearer to the UE. The UE can perform the MC through connecting with a plurality of SgNBs for the MC.

The method disclosed in the sixth embodiment should be appropriately applied to the data split method with the MC in the uplink. The method should be applied to the SgNB for the MC.

The method disclosed in the sixth embodiment should be appropriately applied to the method for starting transmission of the uplink data from the UE to the base station side. The method should be applied to the MgNB and the SgNB for the MC.

A method for restoring the settings of the MC with the SCG bearer to the MCG bearer is disclosed. When the PDU session tunnel for the PDU session subject to the MC is set between the MgNB and the high-level NW, the MgNB should cancel the PDU session tunnel set with the SgNBs, and use the PDU session tunnel between the MgNB and the high-level NW for the QoS flow included in the DRB subject to the MC.

When the PDU session tunnel for the PDU session subject to the MC is not set between the MgNB and the high-level NW, the MgNB should set the PDU session tunnel between the MgNB and the high-level NW. The MgNB should cancel the PDU session tunnel set with the SgNBs, and use the PDU session tunnel set between the MgNB and the high-level NW for the QoS flow included in the DRB subject to the MC.

The MgNB should cancel the settings for the MC which are set between the SgNBs and the UE. The aforementioned methods should be appropriately applied to these methods.

Another method for setting the MC with the SCG bearer is disclosed. The MC is set for each QoS flow. The New AS sublayer performs the MC with the SCG bearer on one or more of the QoS flows that are mapped to the DRB.

When the high-level NW sets the MC with the SCG bearer for each QoS flow in the NG-CN, the following problems as well as the aforementioned problems occur.

When the MgNB maps a plurality of QoS flows to one DRB and sets the MC for each of the plurality of QoS flows, the QoS flows to be mapped still remain in the DRB even after the MC is set. In such a case, the PDCP processes data and assigns the SN to the data even after the MC is set.

When the connection with the UE migrates from the MgNB to the SgNB through the MC with the SCG bearer, data that is being processed by the MgNB needs to be transferred to the SgNB. In such a case, it is conventionally sufficient that the SN status is transferred and the PDCP of the SgNB sets the SN using the transferred SN. This enables the UE to reorder the PDCPs using the SNs.

However, when a plurality of QoS flows are mapped to a DRB to which the MC is set, not only pieces of data of QoS flows to which the MC is set but also pieces of data of QoS flows to which the MC is not set may be transferred to the SgNB. Since the PDCP of the SgNB processes the pieces of data of the QoS flows to which the MC is not set, a problem of failing to normally reorder the pieces of data of the QoS flows to which the MC is set occurs. The same applies to the uplink.

As a method for solving such a problem, a transferring process for each QoS flow is performed. Data to be transferred from the MgNB to the SgNB should be limited to the QoS flows to which the MC is set. The MgNB makes a determination using a QoS flow identifier added to data. The MgNB transfers, to the SgNB, the data of the QoS flow to which the MC is set, whereas the MgNB does not transfer the data of the QoS flow to which the MC is not set.

The SgNB processes the data of the QoS flow that has been transferred to the SgNB. The MgNB processes the data of the QoS flow that is not transferred to the SgNB. With such a transferring process for each QoS flow, the data in the SgNB can be normally processed.

An alternative method for solving such a problem is additionally setting a DRB for a QoS flow on which the MC is performed and mapping the QoS flow on which the MC is performed to the additionally set DRB. Through setting the MC to the additionally set DRB, the MC can be set to the QoS flow mapped to the DRB.

Consequently, the QoS flow mapped to the additionally set DRB does not remain after the MC is set. Thus, the pieces of data of the QoS flows on which the MC is performed and which is mapped to the additionally set DRB are transferred to the SgNB. Since the PDCP of the SgNB processes the pieces of data of the QoS flows on which the MC is performed, the pieces of data can be normally reordered. The same applies to the uplink.

The method for additionally setting the DRB for the QoS flow on which the MC is performed, which is disclosed in the first modification of the sixth embodiment, should be appropriately applied to a method for additionally setting the DRB for the QoS flow on which the MC is performed and mapping the QoS flow on which the MC is performed to the additionally set DRB.

Figure 36:
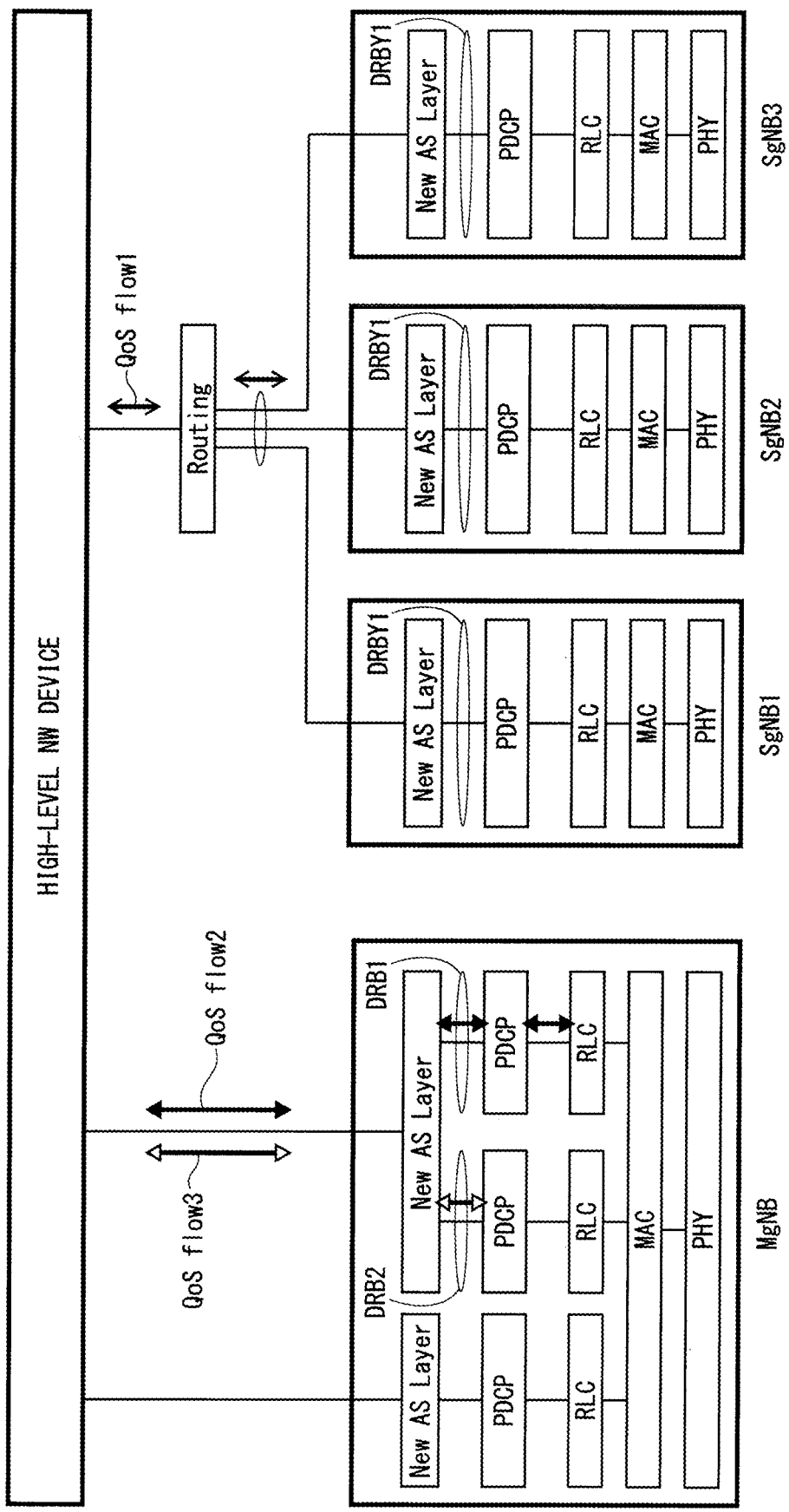
FIG. 36 is a conceptual diagram illustrating a dataflow when the MC with the SCG bearer is set for each QoS flow according to the first modification of the seventh embodiment.

FIG. 36 is a conceptual diagram illustrating a dataflow when the MC with the SCG bearer is set for each QoS flow. Assume that the mapping relationship between the QoS flows and the DRBs before the MC is set is the one illustrated in FIG. 21. Assume a DRB on which the MC is performed as the DRB 1. The QoS flow 1 and the QoS flow 2 are mapped to the DRB 1.

As illustrated in FIG. 36, the MgNB additionally sets a PDU session tunnel on the SgNB side for the MC to set the QoS flow 1 in the DRB 1 to the MC with the SCG bearer. FIG. 36 illustrates that the node with the routing function is provided separately from the high-level NW. Thus, the PDU session tunnel is additionally set between the high-level NW and the node with the routing function. When the routing function is provided in the high-level NW, the PDU session tunnel is additionally set between the high-level NW and the SgNBs for the MC.

The QoS flow 1 to which the MC is set is communicated through the added PDU session tunnel. The packet data which the high-level NW maps to the QoS flow 1 is communicated using the added PDU session tunnel.

The node with the routing function routes the data into the SgNBs for the MC. Each of the SgNBs sets a DRB for the MC, using information on the DRB 1 to which the MC is set, where the information is notified from the MgNB. Each of the SgNBs may set the DRB for the MC, using information on the QoS profile of the QoS flow 1 to which the MC is set, where the information is notified from the MgNB.

FIG. 36 illustrates the use of the setting different from that of the DRB 1 set by the MgNB to the SgNBs. FIG. 36 illustrates the use of a DRB identifier (DRBY 1) different from that set by the MgNB.

The data mapped to the QoS flow 1 is transferred to the New AS sublayer of each of the SgNBs, and mapped to the DRBY 1 in the New AS sublayer. This enables each of the SgNBs for the MC to process the QoS flow 1 to which the MC is set.

On the other hand, the MC is not set to the QoS flow 2 in the DRB 1, and the QoS flow 2 is communicated on the MgNB side. The MgNB maintains, in the DRB 1, the DRB on the MgNB side for the QoS flow 2. The MgNB may reconfigure the DRB 1. For example, the MgNB should reconfigure the DRB configuration appropriate for the QoS flow 2 after the MC is set.

FIG. 36 illustrates the use of the same setting as that of the DRB 1 set by the MgNB. FIG. 36 illustrates the use of the DRB identifier (DRBY 1) identical to that set by the MgNB.

The QoS flow 2 is communicated through the PDU session tunnel established between the high-level NW and the MgNB before the MC is set. The data which the high-level NW maps to the QoS flow 2 is transferred to the New AS sublayer of the MgNB, and mapped to the DRB 1 in the New AS sublayer. This enables the MgNB to process the QoS flow 2 to which the MC is not set.

The MgNB should notify the UE of the reconfigured DRB configuration. The MgNB should notify the configuration of each of the SgNBs to which the MC is set, and the DRB configuration set to the SgNB. For example, the method for notifying the DRB configuration from the MgNB to the UE, which is disclosed in the sixth embodiment, should be applied to this notification. The UE can reconfigure the DRB configuration set on the MgNB side, and set the DRB configuration to each of the SgNB s. The same applies to the uplink data. This can implement the MC for each QoS flow.

FIGS. 26 and 27 should be applied to a sequence for setting the MC with the SCG bearer for each QoS flow. Steps ST4902 to ST4913 should be performed for additionally setting the DRB for the QoS flow on which the MC is performed. The DRB for the QoS flow on which the MC is performed is additionally set, and the QoS flow on which the MC is performed is mapped to the additionally set DRB. Through setting the MC to the additionally set DRB, the MC can be set to the QoS flow mapped to the DRB.

Consequently, the QoS flow mapped to the additionally set DRB does not remain after the MC is set. Thus, the pieces of data of the QoS flows on which the MC is performed and which is mapped to the additionally set DRB are transferred to the SgNB. Since the PDCP of the SgNB processes the pieces of data of the QoS flows on which the MC is performed, the pieces of data can be normally reordered. The same applies to the uplink.

In Step ST4914, the MgNB starts the settings of the MC with the SCG bearer of the DRB that has been additionally set for the QoS flow on which the MC is performed. In Step ST4915, the MgNB, the SgNB 1 and the SgNB 2 that are to be used for the MC, the AMF/SMF, the UPF, and the UE mutually perform the MC setup processing with the SCG bearer. FIGS. 33 to 35 should be applied to this MC setup processing.

The method disclosed in the sixth embodiment should be appropriately applied to the data split method with the MC in the uplink. The method should be applied to the SgNBs to which the MC is set for each QoS flow.

The method disclosed in the sixth embodiment should be appropriately applied to the method for starting transmission of the uplink data from the UE to the base station side. The method should be applied to the MgNB, and the SgNBs to which the MC is set for each QoS flow. The SR or the BSR for each QoS flow may be provided and notified from the UE to the base station side.

This enables the MC with the SCG bearer when the high-level NW is the NG-CN. The MgNB can set the MC with the SCG bearer to the UE. The UE can perform the MC through connecting with a plurality of SgNBs for the MC.

The MgNB can perform the MC with the SCG bearer on the UE for each QoS flow. Since the MC can be performed for each QoS flow, the MC can be controlled with QoS precision finer than that of the MC for each bearer.

The eNBs that are base stations in the LTE may be used as base stations for the MC that are not connected to the high-level NW. The base stations may include an eNB and a gNB. The method disclosed in the first modification of the seventh embodiment should be appropriately applied thereto. Since the base stations for the MC that are not connected to the high-level NW do not use the New AS sublayer in the first modification, the eNBs can be used as the base stations.

The method disclosed in the first modification of the seventh embodiment can configure the connection of one UE to a plurality of secondary base stations even when the high-level NW is the NG-CN. This can increase the throughput of communication to be provided for the UE. Moreover, the connection to a plurality of base stations can enhance the reliability. Since the MC with the SCG bearer can be set, the communication without routing through the MgNB can be provided. This can increase the throughput of communication to be provided for the UE.

The Eighth Embodiment

The seventh embodiment discloses the MC with the SCG bearer. When the routing function is provided for the high-level NW in the MC using the SCG bearer, communication is performed between the high-level NW and each SgNB to be used for the MC. Enabling such communication requires notification of the setting of each SgNB to the high-level NW, which complicates the settings of the MC. This causes a problem of increasing the amount of signaling between the high-level NW and a base station.

Moreover, information necessary for the routing needs to be transmitted to the node with the routing function. This also causes the problem of increasing the amount of signaling between the high-level NW and the base station.

The eighth embodiment discloses a method for solving such a problem. An SCG split bearer for splitting data into the other SgNBs is provided.

With the conventional SCG split bearer, the SgNB is connected to the high-level NW device, and the SgNB splits data from the high-level NW into its own SgNB and the MeNB. The same applies to the uplink communication. In other words, the DC using the MeNB and one SgNB is performed.

With the SCG split bearer disclosed in the eighth embodiment, the SgNB is connected to the high-level NW device, and the SgNB splits data from the high-level NW into its own SgNB and the other SgNBs. Since the MeNB is used for communication in the C-Plane, etc., in this sense, the MC using the MeNB, the SgNB to be connected to the high-level NW, and the other SgNBs is performed. The same applies to the uplink communication. The number of the other SgNBs may be one or more. The SgNB to be connected to the high-level NW device may be referred to as a P-SgNB.

Figure 37:
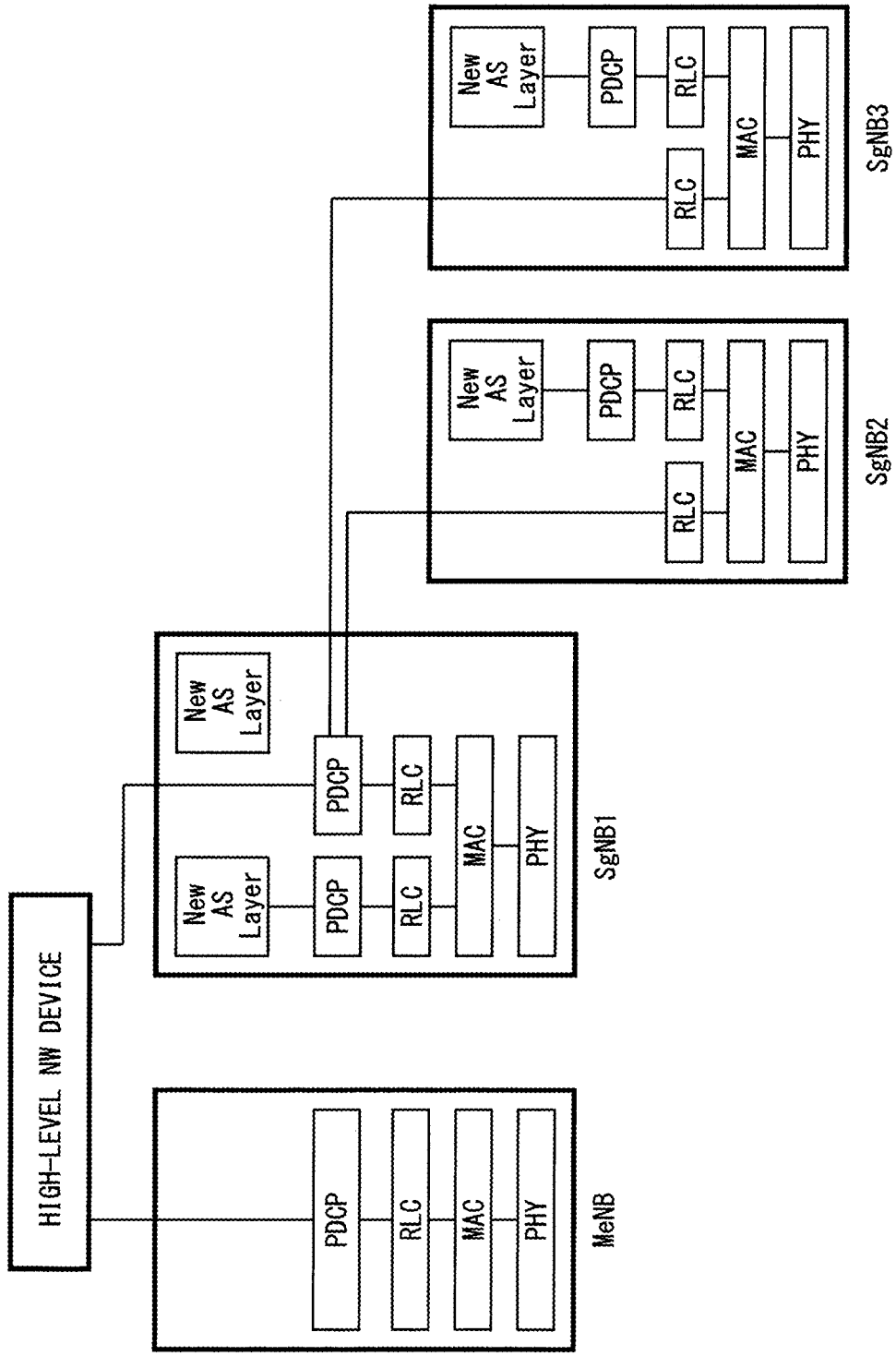
FIG. 37 illustrates an architecture of the MC according to the eighth embodiment.

FIG. 37 illustrates an architecture of the MC. FIG. 37 illustrates that the high-level NW is an EPC, the master base station is a base station in the LTE (eNB), and the secondary base stations are base stations in NR (gNBs). Although FIG. 37 illustrates the architecture on the base station side, the architecture on the UE side is identical to that on the base station side except for the high-level NW. One UE includes the RLC, the MAC, and the PHY for the MeNB, the RLC, the MAC, and the PHY for each of SgNBs set for the MC, and the PDCP.

FIG. 37 illustrates the use of the SCG split bearer. The high-level NW is connected to one SgNB (P-SgNB). The other SgNBs for the MC are connected to the P-SgNB. The high-level NW transfers the downlink data to the P-SgNB. The high-level NW transfers the downlink data to the PDCP without routing through the New AS sublayers of the P-SgNB. Although data from the high-level NW may enter the New AS sublayer of the P-SgNB, the data is not processed by the New AS sublayers but passes through the New AS sublayers.

The PDCP of the P-SgNB processes the downlink data. Even when the number of the other SgNBs is more than one, the PDCP assigns one serial sequence number (SN) to each data. The data to which the SN is assigned is split into its own P-SgNB and the other SgNBs. The pieces of split data are transmitted to the RLCs of its own P-SgNB and the other SgNBs to be processed by the RLCs, the MACs, and the PHYs of the P-SgNB and the other SgNBs, and then transmitted to the UE.

The pieces of data received by the UE from the P-SgNB and the other SgNBs are processed by the PHYs, the MACs, and the RLCs for the P-SgNB and the other SgNBs, and then transferred to the PDCP. The PDCP performs reordering based on the SNs assigned to the pieces of data transferred from layers for the P-SgNB and the other SgNBs, and transfers the pieces of data to the upper layer.

The PDCP in the UE processes the pieces of data from the upper layer as the uplink data. Similarly in the downlink, even when the number of the other SgNBs is more than one, the PDCP assigns one serial sequence number (SN) to each data in the uplink. The data to which the SN is added is split into the RLCs for the P-SgNB and the other SgNBs to be transferred. The transferred data is processed by the RLCs, the MACs, and the PHYs for the P-SgNB and the other SgNBs, and then transmitted to the P-SgNB and the other SgNBs.

The pieces of data received by the P-SgNB and the other SgNBs from the UE are processed by the PHYs, the MACs, and the RLCs for the P-SgNB and the other SgNBs, and then transferred to the PDCP of the P-SgNB. The PDCP of the P-SgNB reorders the pieces of data based on the SNs assigned thereto, and then transfers the pieces of data to the high-level NW.

The routing function for the split bearer may be provided in gNB. The routing function for the SgNB to be used for the MC is provided in the gNB. The routing function provided in the P-SgNB may be used for the MC with the SCG split bearer. The method disclosed in the sixth embodiment should be appropriately applied to the routing function.

A method for setting the MC with the SCG bearer is disclosed. The MeNB determines all the SgNBs to be used for the MC. The MeNB determines the P-SgNB and the other SgNBs to be used for the MC. The MeNB sets the bearer configuration of each of the SgNBs to be used for the MC, and then requests the SgNB to set the bearer configuration. The MeNB notifies each of the SgNBs of a request for setting the bearer configuration of the SgNB. The MeNB may notify a type of bearer as a bearer configuration. The MeNB may notify the SCG split bearer as a type of bearer. The MeNB may notify the SCG split bearer using the P-SgNB and the other SgNBs.

A method for additionally setting the SgNB is disclosed as the settings of the MC with the SCG split bearer. First, the MeNB sets the SCG bearer to the SgNB to be connected to the high-level NW (P-SgNB). Next, the MeNB sets the SCG split bearer to the P-SgNB and the other SgNBs to be used for the MC. The method for setting the DC with the SCG bearer should be applied to the initial setting of the SCG bearer to the P-SgNB.

A method for setting the SCG split bearer to the P-SgNB and the other SgNBs to be used for the MC is disclosed. The MeNB requests the other SgNBs to add an SgNB for the SCG split bearer. The MeNB includes information on adding the SgNB for the SCG split bearer in the request, and notifies the other SgNBs of the information. Seven examples of the information to be notified from the MeNB to the other SgNBs are described below:

(1) information indicating the setting of the SCG split bearer;
(2) an SCG split bearer configuration;
(3) information on the P-SgNB;
(4) information on the DRB to which the MC is set;
(5) a bearer configuration to be set to each SgNB, such as a QoS profile;
(6) information on the UE to which the MC is set; and
(7) combinations of (1) to (6) above.

The SCG split bearer configuration of (2) includes information indicating that the notified SgNB is one of the other SgNBs, and information indicating the split from the P-SgNB. The information on the P-SgNB of (3) includes the identifier and the address of the P-SgNB. The information may include information instructing connection with the P-SgNB. Alternatively, the request may indicate an instruction for connecting to the P-SgNB. The information on the DRB to which the MC is set in (4) may be an identifier of the DRB. The information may include the DRB configuration.

Upon receipt of these pieces of information, the SgNB recognizes that its own SgNB is one of the other SgNBs to be used for the MC with the SCG split bearer. The SgNB sets the SCG configuration and the DRB configuration of its own SgNB, based on, for example, the QoS profile of the bearer to which the MC is set. Also, the SgNB makes a setting of communication using the P-SgNB and the SCG split bearer.

The MeNB requests the P-SgNB to change to the SCG split bearer. The MeNB notifies the P-SgNB of the additional setting of the SgNB for the SCG split bearer. The request for changing to the SCG split bearer may include setting information of the SgNB to be added for the SCG split bearer. The MeNB includes information on adding the SgNB for the SCG split bearer in the request, and notifies the P-SgNB of the information. Nine examples of the information to be notified from the MeNB to the P-SgNB are described below:

(1) information indicating the setting of the SCG split bearer;
(2) information indicating the P-SgNB;
(3) the SCG split bearer configuration;
(4) information on a SgNB included in the SCG split bearer;
(5) information on the DRB to which the MC is set;
(6) a bearer configuration to be set to each SgNB, such as a QoS profile;
(7) information on the high-level NW;
(8) information on the UE to which the MC is set; and
(9) combinations of (1) to (8) above.

The information indicating the P-SgNB of (2) may be, for example, a flag. This can reduce the amount of information. The information may be, for example, a 1-bit flag. For example, 1 indicates the P-SgNB, and 0 indicates a non-P-SgNB. The information indicating the P-SgNB may be, for example, an identifier of the P-SgNB.

For example, parameters of the P-SgNB and the other SgNBs are defined. An identifier of a gNB to be the P-SgNB is included in the parameter of the P-SgNB, and identifiers of gNBs to be the other SgNBs are included in the parameters of the other SgNBs. Since this can integrate pieces of information to be notified to the P-SgNB and the other SgNBs, the complexity in setting the SCG split bearer can be avoided.

The information on the high-level NW of (7) may be an identifier and an address of the S-GW. Alternatively, the information may include an identifier and an address of the MME. This enables connection between the P-SgNB and the high-level NW.

Upon receipt of these pieces of information, the SgNB recognizes that its own SgNB is the P-SgNB to be used for the MC with the SCG split bearer. The SgNB changes the SCG bearer to the SCG split bearer using the other SgNBs. The SgNB sets the SCG configuration and the DRB configuration of its own SgNB, based on, for example, the QoS profile of the bearer to which the MC is set. The SgNB may maintain the SCG configuration and the DRB configuration that are used for the SCG bearer. The SgNB makes settings of communication with other SgNBs using the SCG split bearer.

The P-SgNB and other SgNBs each of which has set the SCG configuration and the DRB configuration of its own SgNB for the SCG split bearer notify the MeNB of responses to the requests. The responses may indicate acknowledgement or negative acknowledgement. When the response indicates acknowledgement, each SgNB should notify the MeNB of the SCG configuration and the DRB configuration of its own SgNB. When the response indicates negative acknowledgement, each SgNB should include a cause for the rejection in the response to notify the cause.

Although disclosed is that the MeNB may notify the P-SgNB of the information on an SgNB included in the SCG split bearer in requesting change to the SCG split bearer, the SgNB should be an SgNB that has received the acknowledgement. Consequently, the MC with the SCG split bearer can be set between the MeNB and each SgNB.

It is simultaneously possible to set the SCG bearer to the P-SgNB and change the setting of the P-SgNB to the SCG split bearer. It is also possible to initially set the SCG split bearer to the other SgNBs, and then set the SCG bearer to the P-SgNB and change the setting of the P-SgNB from the SCG bearer to the SCG split bearer. Such a setting may be applied, for example, when the MeNB recognizes that the SgNB is used as the P-SgNB or another SgNB. Thus, the setting can be simplified.

According to the disclosed method, the MeNB requests the other SgNBs to additionally set an SgNB for the SCG split bearer. The MeNB may additionally set the SgNB for the SCG split bearer to the other SgNBs through the P-SgNB. The MeNB notifies the P-SgNB of the request for additionally setting the SgNB for the SCG split bearer to the other SgNBs. Upon receipt of the request, the P-SgNB notifies the other SgNBs of the requests for additionally setting the SgNB for the SCG split bearer.

The other SgNBs may notify the MeNB of responses to the requests through the P-SgNB. The other SgNBs notifies the P-SgNB of the responses to the requests. The P-SgNB notifies the MeNB of the responses to the requests from the other SgNBs. The P-SgNB may recognize the details of the responses to the requests of the other SgNBs.

Consequently, the MeNB has only to communicate with the P-SgNB. Thus, the settings of the MC with the SCG split bearer can be simplified. The MeNB may notify, via the same signaling, the P-SgNB of change to the SCG split bearer and the other SgNBs of the request for additionally setting the SCG split bearer. This can reduce the amount of signaling.

Another method for additionally setting the SgNB is disclosed. The MeNB requests each SgNB to be used for the MC to set the SCG split bearer without requesting the P-SgNB to set the SCG bearer. The MeNB may request each SgNB to be used for the MC to change the setting from the MCG bearer to the SCG split bearer using the SgNB.

The MeNB should include the information on adding the SgNB for the SCG split bearer in the request to notify the information, as an example of the information to be included in the request. The MeNB includes, in the request, the information on adding the SgNB for the SCG split bearer, which is notified from the MeNB to the P-SgNB, to notify the P-SgNB of the information. The MeNB includes, in the request, the information on adding the SgNB for the SCG split bearer to be notified from the MeNB to the other SgNBs to notify the other SgNBs of the information.

Upon receipt of these pieces of information, the SgNB recognizes that its own SgNB is the P-SgNB or one of the other SgNBs to be used for the MC with the SCG split bearer. The SgNB changes the MCG bearer to the SCG split bearer with the SgNB. The SgNB sets the SCG configuration and the DRB configuration of its own SgNB, based on, for example, the QoS profile of the bearer to which the MC is set. The SgNB makes settings of communication using the SCG split bearer with the P-SgNB or the other SgNBs.

The P-SgNB and the other SgNBs each of which has set the SCG configuration and the DRB configuration of its own SgNB for the SCG split bearer notify the MeNB of responses to the requests. The responses may indicate acknowledgement or negative acknowledgement. When the response indicates acknowledgement, each SgNB should notify the MeNB of the SCG configuration and the DRB configuration of its own SgNB. When the response indicates rejection, each SgNB should include a cause for the rejection in the response to notify the cause.

The MeNB may additionally set an SgNB for the SCG split bearer to the other SgNBs through the P-SgNB. The aforementioned methods should be appropriately applied thereto. The same applies to the response to the additional setting request.

This enables the settings of the MC with the SCG split bearer without setting to the SCG bearer. Thus, changing the setting to the SCG split bearer can be simplified.

The MeNB may temporarily restore the SCG bearer set to the SgNB to the MCG bearer and change the MCG bearer to the SCG split bearer. The MeNB restores the setting of the SgNB to which the SCG bearer is set, from the SCG bearer to the MCG bearer. Next, the MeNB changes the setting of each SgNB to which the MC is set with the SCG split bearer, from the MCG bearer to the SCG split bearer. The aforementioned method should be applied thereto.

The MeNB notifies the UE to which the MC is set of the settings of all the SgNBs to be used for the MC with the SCG split bearer. The MeNB may include, in the settings, information indicating the SCG split bearer as a type of bearer to notify the information. The MeNB may include, in the settings, information indicating that the SCG split bearer is the SCG split bearer using the SgNB to notify the information. The MeNB may include information indicating which one among all the SgNBs is the P-SgNB in the settings to notify the information.

The method disclosed in the sixth embodiment should be appropriately applied to this setting method. With the information, the UE makes settings of communication with all the SgNBs to be used for the MC with the SCG split bearer. This enables the UE to communicate with all the SgNBs to be used for the MC with the SCG split bearer.

The P-SgNB may determine the other SgNBs for the SCG split bearer. Since the MeNB need not to make the determination, there is no need for each SgNB to notify the MeNB of information for the determination. This can reduce the amount of signaling.

The MeNB may notify the P-SgNB of an instruction for changing to the SCG split bearer. In response to the notification, the P-SgNB determines the other SgNBs for the SCG split bearer. The MeNB may simultaneously notify the P-SgNB of the additional setting of the SCG bearer and the instruction for changing to the SCG split bearer. The P-SgNB sets the SCG bearer and changes the SCG bearer to the SCG split bearer.

This enables the MeNB to determine the timing to activate changing to the SCG split bearer. The P-SgNB determines the SgNB to which the MC is set.

The MeNB may notify the P-SgNB that change to the SCG split bearer is permitted. In response to the notification, the P-SgNB can determine the other SgNBs for the SCG split bearer by its own decision. This enables the P-SgNB to determine the timing to activate changing to the SCG split bearer after the permission notification from the MeNB. The P-SgNB determines the SgNB to which the MC is set.

The P-SgNB may determine to change to the SCG split bearer. The P-SgNB can change to the SCG split bearer without any notification on its change from the MeNB. This enables the SgNB to which the SCG bearer is set to always determine the timing to activate changing to the SCG split bearer. The SgNB to which the SCG bearer is set functions as the P-SgNB, and determines the SgNB to which the MC is set.

When the P-SgNB changes to the SCG split bearer, the P-SgNB may notify the MeNB of information indicating the change. The MeNB can recognize whether the MC with the SCG split bearer is performed between the P-SgNB and the other SgNBs.

A method for the P-SgNB to set the SCG split bearer is disclosed. The P-SgNB requests the other SgNBs to be used for the MC one by one to additionally set the SgNB for the SCG split bearer. Alternatively, the P-SgNB may request, at one time, the other SgNBs to be used for the MC to additionally set the SgNB. The method disclosed in the sixth embodiment should be appropriately applied to both of the methods.

The MeNB notifies the P-SgNB of information on determining the SCG split bearer. Nine examples of the information are described below:

(1) information indicating the P-SgNB;
(2) information instructing the setting of the SCG split bearer;
(3) information indicating that the SCG split bearer may be set;
(4) information indicating that the P-SgNB may determine and perform the SCG split bearer;
(5) information on the DRB on which the MC is performed;
(6) a bearer configuration to be set to the P-SgNB, such as a QoS profile;
(7) information on the high-level NW;
(8) information on the UE to which the MC is set; and
(9) combinations of (1) to (8) above.

Upon receipt of the information, the P-SgNB can recognize that its own P-SgNB may determine the other SgNBs for the SCG split bearer. If the MeNB sets the SCG bearer in advance and the SCG bearer need not be changed to the bearer configuration at that time, the MeNB need not notify the bearer configuration to be set to the P-SgNB, such as a QoS profile in (6). Alternatively, the information may indicate the same setting. The P-SgNB can recognize the bearer configuration and the QoS profile that should be set with the SCG split bearer.

The P-SgNB notifies the other SgNBs for the SCG split bearer of a request for setting the SCG split bearer. Seven examples of information to be included in the request are described below:

(1) information indicating the setting of the SCG split bearer;
(2) the SCG split bearer configuration;
(3) information on the P-SgNB;
(4) information on the DRB to which the MC is set;
(5) a bearer configuration to be set to each SgNB, such as a QoS profile;
(6) information on the UE to which the MC is set; and
(7) combinations of (1) to (6) above.

Upon receipt of the information, the other SgNBs can recognize the setting of the SCG split bearer with the P-SgNB. The other SgNBs can set the SCG configuration and the DRB configuration of its own SgNB, using the bearer configuration to be set to the P-SgNB, such as a QoS profile in (5).

Each of the other SgNBs to which the P-SgNB additionally sets the SgNB for the SCG split bearer sets the SCG configuration and the DRB configuration of its own SgNB. The other SgNBs notifies the P-SgNB of responses to the request. The method for notifying the request response should be applied to this notification. Consequently, the P-SgNB can recognize the settings of the other SgNBs.

The P-SgNB notifies the UE to which the MC is set of the settings of all the SgNBs to be used for the MC with the SCG split bearer. The P-SgNB may include, in the settings, information indicating the SCG split bearer as a type of bearer to notify the information. The P-SgNB may include, in the settings, information indicating that the SCG split bearer is the SCG split bearer using the SgNB to notify the information. The P-SgNB may include which one among all the SgNBs is the P-SgNB in the settings to notify the information.

The method disclosed in the sixth embodiment should be appropriately applied to this setting method. With the information, the UE makes settings of communication with all the SgNBs to be used for the MC with the SCG split bearer. This enables the UE to communicate with all the SgNBs to be used for the MC with the SCG split bearer.

Such a method saves the MeNB from recognizing the SgNB to be used for the MC with the SCG split bearer. This makes the signaling between the MeNB and the other SgNBs unnecessary. Thus, the amount of signaling can be reduced.

The P-SgNB may notify the MeNB of the SCG configuration and the DRB configuration of its own P-SgNB, and the SCG configurations and the DRB configurations of the other SgNBs. The P-SgNB may notify these pieces of information as information associated with information on each of the SgNBs. The P-SgNB may notify these pieces of information as a response to an instruction for changing to the SCG split bearer from the MeNB or as a response to a notification from the MeNB which indicates that change to the SCG split bearer is possible.

Alternatively, the P-SgNB may notify these pieces of information via the signaling separately provided. These pieces of information may be included in a notification of a response to the setting of the SCG bearer. The P-SgNB may include, in these pieces of information, information indicating that the SCG bearer has been changed to the SCG split bearer to notify the information. Consequently, the MeNB can recognize the setting of each of the SgNBs.

When the MeNB can recognize the setting of each of the SgNBs, the MeNB may notify the UE to which the MC is set of the settings of all the SgNBs to be used for the MC with the SCG split bearer. The aforementioned pieces of information should be applied to information to be included in the notification. The method disclosed in the sixth embodiment should be appropriately applied to this setting method. With the information notified from the MeNB, the UE makes settings of communication with all the SgNBs to be used for the MC with the SCG split bearer. This enables the UE to communicate with all the SgNBs to be used for the MC with the SCG split bearer.

Consequently, the MeNB can notify the UE of the settings of all the SgNBs to be used for the MC with the SCG split bearer, similarly to the conventional DC. The MeNB can change the bearer type to be used for the MC, which can avoid complexity in the control over the MC.

The data forwarding should be performed for preventing the loss in data when the SCG split bearer is set. The method on the MC with the SCG bearer, which is disclosed in the seventh embodiment, should be appropriately applied to the data forwarding method. The MeNB should transfer the SN status and data to the P-SgNB.

When the MeNB initially sets the SCG bearer to the P-SgNB, the data forwarding should be performed with the setting. Since the P-SgNB is used for both the SCG bearer and the SCG split bearer, the data forwarding is unnecessary when the SCG bearer is changed to the SCG split bearer.

When the SCG split bearer is set, the MeNB notifies the high-level NW of a path switch request from the MeNB to the P-SgNB. The method disclosed in the seventh embodiment should be appropriately applied thereto. The path switch should be performed only to the P-SgNB. As disclosed in the seventh embodiment, the signaling for modifying the E-RAB may be used.

When the MeNB initially sets the SCG bearer to the P-SgNB, the path switch should be performed with the setting. Since the P-SgNB is used for both the SCG bearer and the SCG split bearer, the path switch is unnecessary when the SCG bearer is changed to the SCG split bearer.

The method disclosed in the sixth embodiment should be appropriately applied to information for routing data from the P-SgNB to the other SgNBs. The other SgNBs should notify the P-SgNB of the information. The P-SgNB performs the routing using the information to achieve the DRB configurations and the QoS profiles set to its own P-SgNB and the other SgNBs. When the P-SgNB cannot achieve them, the P-SgNB may request the MeNB to change the SCG split bearer.

This can set the MC with the SCG split bearer to the UE. The UE can perform the MC with the SCG split bearer between the P-SgNB and the other SgNBs.

Figure 38:
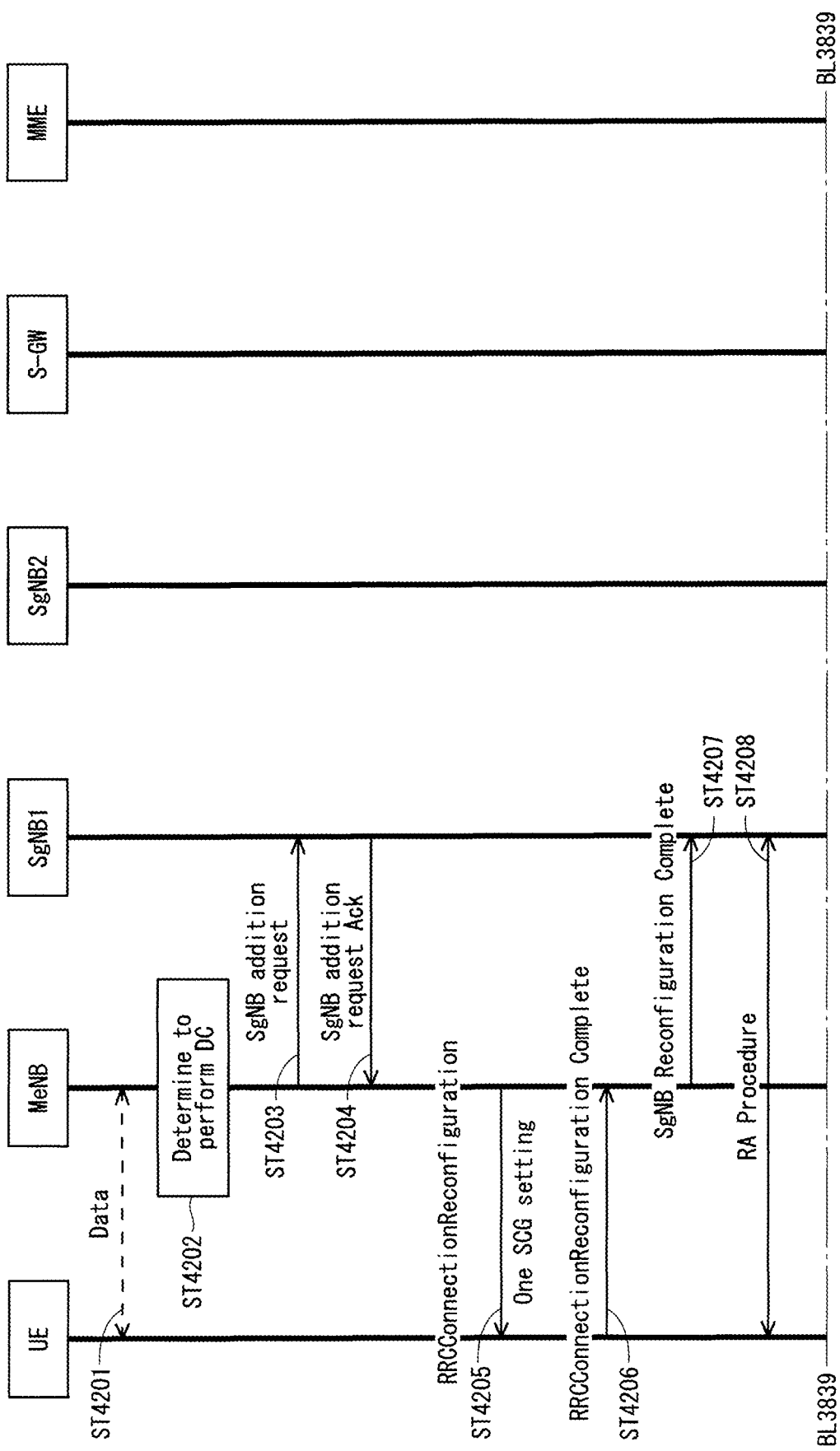
FIG. 38 illustrates an example sequence for setting the MC with the SCG split bearer according to the eighth embodiment.
Figure 39:
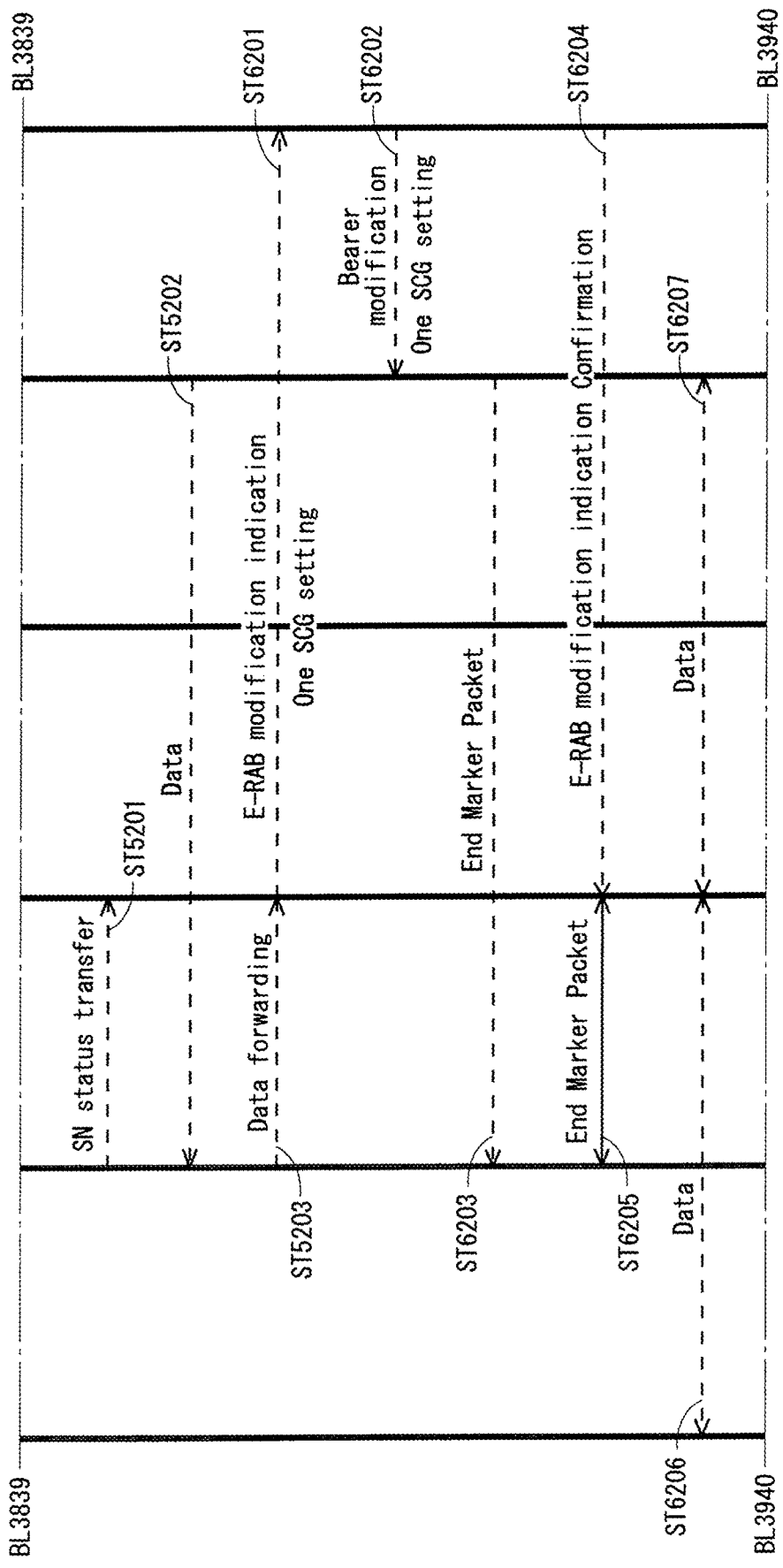
FIG. 39 illustrates the example sequence for setting the MC with the SCG split bearer according to the eighth embodiment.
Figure 40:
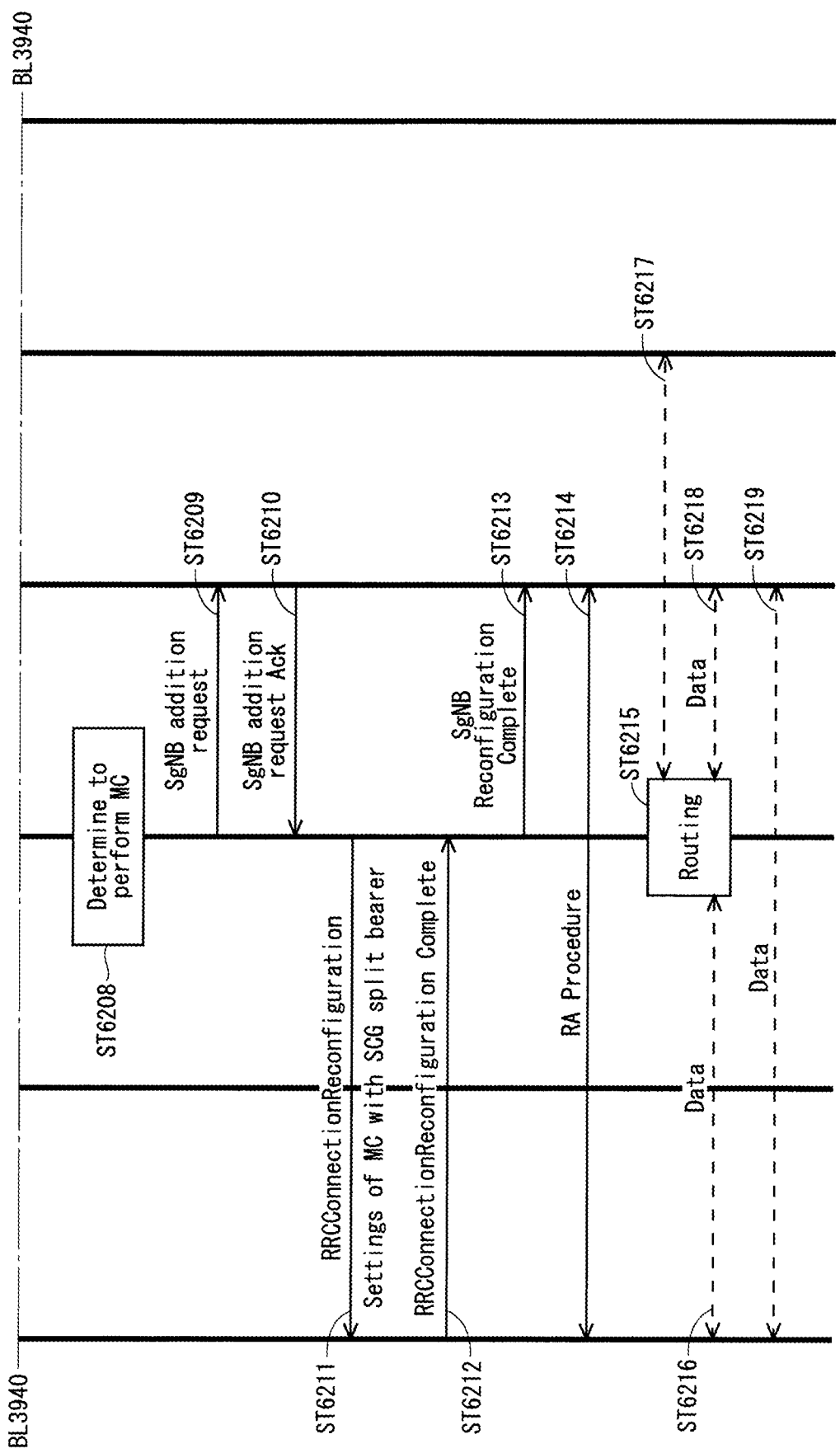
FIG. 40 illustrates the example sequence for setting the MC with the SCG split bearer according to the eighth embodiment.

FIGS. 38 to 40 illustrate an example sequence for setting the MC with the SCG split bearer. FIGS. 38 to 40 are connected across locations of borders BL3839 and BL3940. FIGS. 38 to 40 illustrate the use of the MeNB and two SgNBs (SgNB 1 and SgNB 2). FIGS. 38 to 40 illustrate a method for initially setting the SCG bearer and then changing the setting to the SCG split bearer. Since the sequence illustrated in FIGS. 38 to 40 includes the same steps as those of the sequences illustrated in FIGS. 17 and 18 and FIGS. 29 and 30, the same step numbers are applied to the same Steps and the common description thereof is omitted.

In Step ST4202, the MeNB determines to set the DC with the SCG bearer to the UE. In Steps ST4203 to ST4208, Steps ST5201 to ST5203, and Steps ST6201 to ST6207, the UE, the MeNB, the SgNB 1, the S-GW, and the MME set the DC with the SCG bearer.

In Step ST6208, the SgNB 1 determines to perform the MC using the SCG split bearer with the SgNB 2. The SgNB 1 functions as the P-SgNB. In Step ST6209, the SgNB 1 notifies the SgNB 2 of a request for additionally setting the SgNB for the SCG split bearer. The SgNB 1 includes, in the notification, information to be included in the request for setting the SCG split bearer which is notified from the P-SgNB to the other SgNBs for the SCG split bearer, to notify the information.

Upon receipt of the notification of the information in Step ST6209, the SgNB 2 sets the SCG configuration and the DRB configuration to its own SgNB and notifies the SgNB 1 functioning as the P-SgNB of a response to the request for additionally setting the SgNB for the SCG split bearer in Step ST6210. Here, the SgNB 2 notifies the acknowledgement. The response should include information on the SCG configuration and the DRB configuration that are set by its own SgNB.

In Step ST6211, the P-SgNB notifies the UE of the settings of the MC with the SCG split bearer. The settings of the MC should include information on the SCG configuration and the DRB configuration that are set by its own P-SgNB, and the SCG configurations and the DRB configurations that are set by the other SgNBs. The P-SgNB may give this notification via the signaling for the RRC connection reconfiguration.

The UE makes settings of communication with the SgNB 1 and the SgNB 2 using the settings of the MC with the SCG split bearer. In Step ST6212, the UE notifies the SgNB 1 of completion of the settings. The UE may give this notification via the signaling for the RRC connection reconfiguration complete notification. In Step ST6213, the SgNB 1 notifies the SgNB 2 of completion of the settings of the MC with the SCG split bearer.

In Step ST6214, the UE performs the RA procedure with the SgNB 2 to synchronize with the SgNB 2. This enables the UE to communicate with the SgNB 2. In Step ST6215, the SgNB 1 splits data between its own SgNB 1 and the SgNB 2. Although FIG. 40 illustrates the routing function, the split function may replace the routing function because the data is split into two SgNBs of the SgNB 1 and the SgNB 2.

Consequently, in Steps ST6216 to ST6219, the UE, the SgNB 1, the SgNB 2, and the S-GW perform data communication using the MC with the SCG split bearer. The UE, the MeNB, the SgNB 1, the SgNB 2, and the S-GW perform data communication using the MC with the SCG split bearer because the UE and the MeNB perform communication for setting the MC which is independent of the DRB.

The method disclosed in the sixth embodiment should be appropriately applied to the data split method with the MC in the uplink. The method may be applied to the P-SgNB and the other SgNBs. When the MeNB is configured as a replacement for one of the other SgNBs, the method may be applied to the P-SgNB, the MeNB, and the other SgNBs.

The method disclosed in the sixth embodiment should be appropriately applied to the method for starting transmission of the uplink data from the UE to the base station side. The method may be applied to the P-SgNB and the other SgNBs. When the MeNB is configured as a replacement for one of the other SgNBs, the method may be applied to the P-SgNB, the MeNB, and the other SgNBs.

The base stations to be split off from the P-SgNB for the MC may include the MeNB. The MeNB may be set as a replacement for one of the other SgNBs for the MC. The aforementioned method should be applied thereto. The use of the MeNB can reduce the number of the base stations to which the UE is connected.

The method disclosed in the eighth embodiment can set the MC with the SCG split bearer to the UE.

The method disclosed in the eighth embodiment can configure the connection of one UE to a plurality of secondary base stations. This can increase the throughput of communication to be provided for the UE. Moreover, the connection to a plurality of base stations can enhance the reliability. Since the MC with the SCG split bearer can be set, the high-level NW need not be connected to the plurality of secondary base stations. Thus, the complexity in the control between the high-level NW and the base stations can be avoided.

The First Modification of the Eighth Embodiment

The first modification of the seventh embodiment discloses the MC with the SCG bearer in the presence of the New AS sublayer protocol. In the MC with the SCG bearer, when the routing function for the SgNBs to be used for the MC is provided in the high-level NW, the PDU session tunnel needs to be established between the high-level NW and the SgNBs. This complicates the setting. The amount of information necessary for notifying the setting of the PDU session tunnel increases.

The first modification of the eighth embodiment discloses a method for solving such a problem. An SCG split bearer for splitting data into the other SgNBs is provided. The eighth embodiment should be appropriately applied to this method. The eighth embodiment differs from the first modification in that the high-level NW is the EPC in the eighth embodiment, whereas the high-level NW is the NG-CN in the first modification. This difference is mainly disclosed.

The PDU session tunnel is established between the P-SgNB and the high-level NW. The P-SgNB may be an SgNB that establishes the PDU session tunnel with the high-level NW. The number of the other SgNBs may be one or more. Similarly as in the eighth embodiment, the SgNB to be connected to the high-level NW may be referred to as the P-SgNB.

Figure 41:
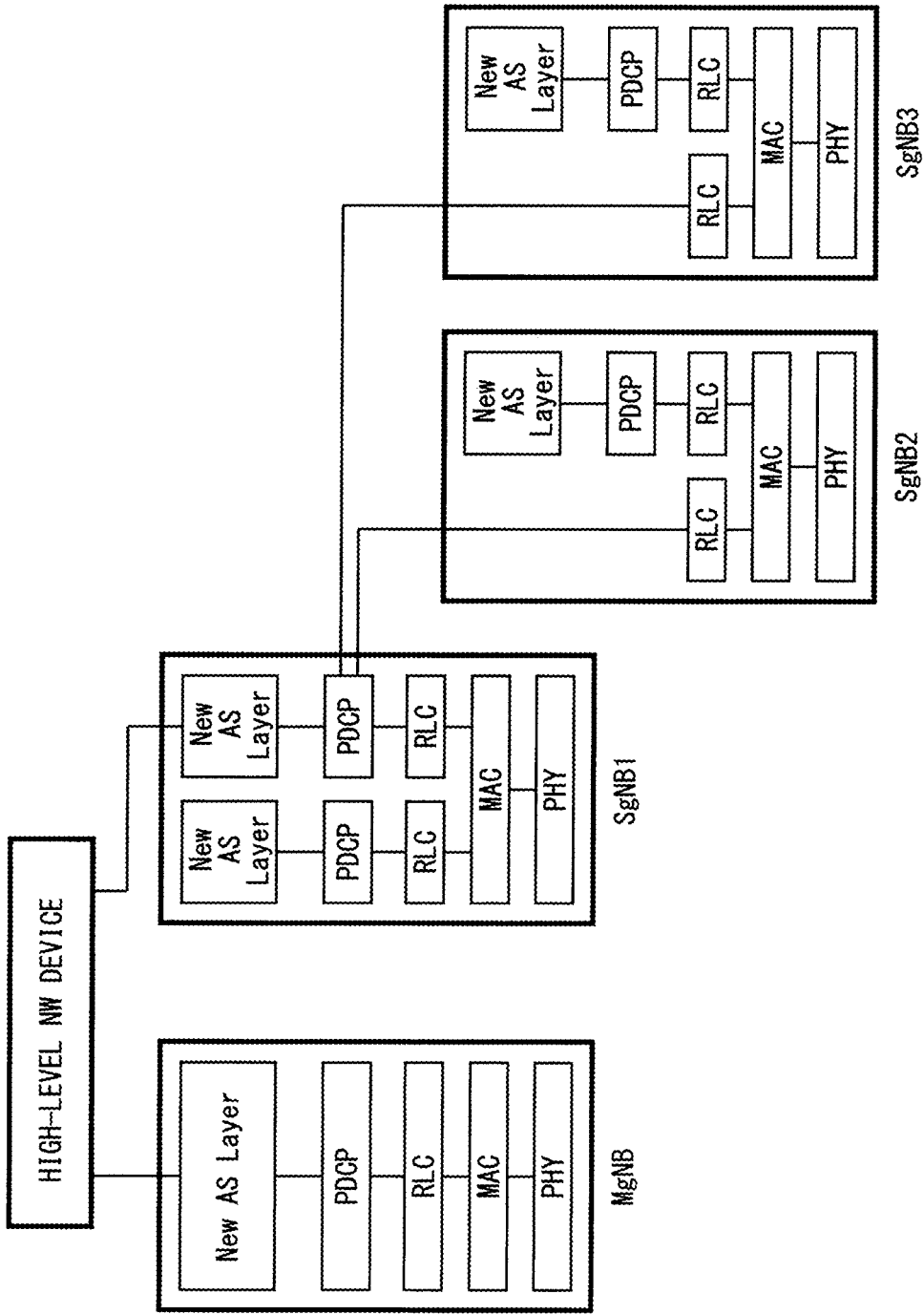
FIG. 41 illustrates an architecture of the MC according to the first modification of the eighth embodiment.

FIG. 41 illustrates an architecture of the MC. FIG. 41 illustrates that the high-level NW is an NG-CN, the master base station is a base station in NR (gNB), and the secondary base stations are base stations in NR (gNBs). Although the master base station is the gNB in NR in FIG. 41, the master base station may be an eNB obtained by adding the New AS sublayer to a base station in the LTE.

Although FIG. 41 illustrates the architecture on the base station side, the architecture on the UE side is identical to that on the base station side except for the high-level NW. One UE includes the New AS sublayer, the PDCP, the RLC, the MAC, and the PHY for the MgNB, the New AS sublayer, the PDCP, the RLC, the MAC, and the PHY for the P-SgNB set for the MC, and the RLCs, the MACs, and the PHYs for the other SgNBs.

FIG. 41 illustrates the use of the SCG split bearer. The high-level NW is connected to one SgNB (P-SgNB). The other SgNBs for the MC are connected to the P-SgNB. The high-level NW transfers the downlink data to the P-SgNB. The New AS sublayer of the P-SgNB maps the data to DRBs according to QoS flow identifiers. The data is transferred to the PDCP for each of the mapped DRBs, and then processed by the PDCP.

The PDCP of the P-SgNB processes the downlink data. Even when the number of the other SgNBs is more than one, the PDCP assigns one serial sequence number (SN) to each data. The data to which the SN is assigned is split into its own P-SgNB and the other SgNBs. The pieces of split data are transmitted to the RLCs of its own P-SgNB and the other SgNBs, and processed by the RLCs, the MACs, and the PHYs of the P-SgNB and the other SgNBs, and then transmitted to the UE.

The pieces of data received by the UE from the P-SgNB and the other SgNBs are processed by the PHYs, the MACs, and the RLCs for the P-SgNB and the other SgNBs, and then transferred to the PDCP. The PDCP performs reordering based on the SNs assigned to the pieces of data transferred from layers for the P-SgNB and the other SgNBs, and transfers the pieces of data to the New AS sublayer. The New AS sublayer separates the pieces of data into the QoS flows according to the QoS flow identifiers, and then transfers the pieces of data to the upper layer.

The UE processes the pieces of data from the upper layer as the uplink data in the New AS sublayers. The New AS sublayers map the pieces of data to DRBs according to QoS flow identifiers, and then transfer the pieces of data to the PDCPs for each of the mapped DRB s. Similarly in the downlink, even when the number of the other SgNBs is more than one, the PDCPs assign one serial sequence number (SN) to each data in the uplink.

The data to which the SN is assigned is split into the RLCs for the P-SgNB and the other SgNBs to be transferred. The transferred data is processed by the RLCs, the MACs, and the PHYs for the P-SgNB and the other SgNBs, and then transmitted to the P-SgNB and the other SgNBs.

The pieces of data received by the P-SgNB and the other SgNBs from the UE are processed by the PHYs, the MACs, and the RLCs for the P-SgNB and the other SgNBs, and then transferred to the PDCP of the P-SgNB. The PDCP of the P-SgNB reorders the pieces of data based on the SNs assigned thereto, and then transfers the pieces of data to the New AS sublayer. The New AS sublayer separates the pieces of data into the QoS flows according to the QoS flow identifiers, and then transfers the pieces of data to the high-level NW.

A method for setting the MC with the SCG split bearer is disclosed. The MC is set for each DRB. The MC with the SCG split bearer is set for each DRB. Since the P-SgNB needs the New AS sublayer, the method for setting the MC with the SCG bearer which is disclosed in the first modification of the seventh embodiment should be appropriately applied to the setting of the P-SgNB. The method for setting the MC with the MCG split bearer, which is disclosed in the first modification of the sixth embodiment, should be appropriately applied to the settings of the other SgNBs.

The first modification of the seventh embodiment describes the occurrence of mainly three problems when the MC with the SCG bearer is set, and discloses the method for solving such problems. The SCG split bearer also causes problems of how to deal with the PDU session tunnel, and what to do with the method for the SgNB to set the DRB necessary for the MC and the mapping method.

The method disclosed in the first modification of the seventh embodiment should be appropriately applied to how to deal with the PDU session tunnel with the SCG split bearer. The PDU session tunnel should be additionally set between the P-SgNB and the high-level NW. Since the other SgNBs are connected through the P-SgNB, the PDU session tunnel need not be additionally set to the other SgNB s.

The method disclosed in the first modification of the seventh embodiment should be appropriately applied also to the problem on the mapping method from the New AS sublayer of the P-SgNB. The setting of the DRB necessary for the MC and the mapping from the New AS sublayer should be performed on the P-SgNB using the new AS sublayer. These processes are unnecessary for the other SgNBs.

The first modification of the sixth embodiment discloses, in the settings of the MC using the MCG split bearer, the splitting and routing methods for a plurality of SgNB s. The SCG split bearer also requires the splitting and routing methods which the P-SgNB applies to the other SgNBs. The method disclosed in the first modification of the sixth embodiment should be appropriately applied to these methods. This enables the splitting and routing from the P-SgNB to the other SgNBs.

For example, the method for splitting and routing all the QoS flows in the DRB, the method for splitting and routing a predetermined QoS flow in the DRB, and the method for performing routing to a predetermined SgNB for each of the QoS flows should be appropriately applied thereto. The methods produce the same advantages. The method disclosed in the eighth embodiment should be appropriately applied to information for the routing. The P-SgNB can determine to perform the routing for the other SgNBs.

Such methods enable the settings of the MC with the SCG split bearer when the high-level NW is the NG-CN. The settings of the MC can be made for each DRB. The MC can be performed among the UE, the P-SgNB, and the other SgNBs. This can increase the throughput of the DRB to which the MC is set.

Figure 42:
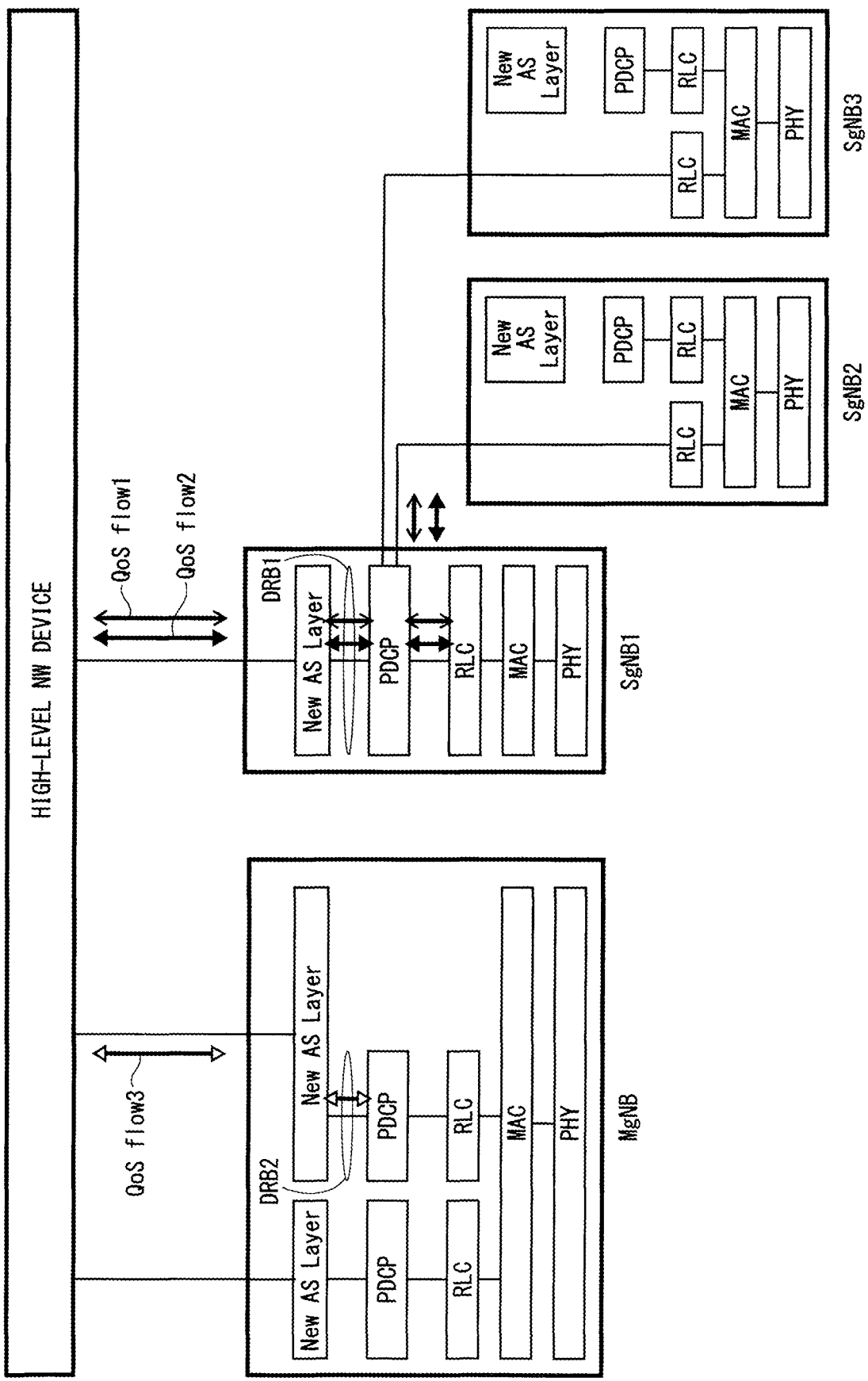
FIG. 42 is a conceptual diagram illustrating a dataflow when the MC with the SCG split bearer is set for each DRB according to the first modification of the eighth embodiment.

FIG. 42 is a conceptual diagram illustrating a dataflow when the MC with the SCG split bearer is set for each DRB. Assume that the mapping relationship between the QoS flows and the DRBs before the MC is set is the one illustrated in FIG. 21. Assume a DRB on which the MC is performed as the DRB 1. The QoS flow 1 and the QoS flow 2 are mapped to the DRB 1.

As illustrated in FIG. 42, the MgNB additionally sets a PDU session tunnel to the SgNB 1 to be connected to the high-level NW in order to set the MC with the SCG split bearer to the DRB 1. The PDU session tunnel should be additionally set between the high-level NW and the SgNB 1 (P-SgNB). The PDU session tunnel need not be additionally set between the other SgNBs (SgNB 2, SgNB 3) and the high-level NW.

The QoS flow 1 and the QoS flow 2 which are mapped to the DRB to which the MC is set are communicated through the added PDU session tunnel. The packet data which the high-level NW maps to the QoS flow 1 and the QoS flow 2 is communicated through the added PDU session tunnel.

FIG. 42 illustrates the use of the same setting as that of the DRB 1 set by the MgNB to the P-SgNB. FIG. 42 illustrates the use of the DRB identifier identical to that set by the MgNB.

The data mapped to the QoS flow 1 and the QoS flow 2 is transferred to the New AS sublayer of the P-SgNB, and mapped to the DRB 1 in the New AS sublayer. This enables the P-SgNB to process the QoS flows mapped to the DRB 1 to which the MC is set.

The PDCP of the P-SgNB splits and routes the data of the QoS flow 1 and the QoS flow 2 that are mapped to the DRB 1 into its own P-SgNB and the other SgNBs. Similarly in the downlink, the PDCP splits and routes the data of the QoS flow 1 and the QoS flow 2 mapped to the DRB 1 in the New AS sublayer of the UE as the uplink data to the RLCs for the P-SgNB and the other SgNBs.

Not the DRB 1 set in the downlink but a default DRB may be used in the uplink. In such a case, the PDCP should split and route the data of the QoS flow 1 and the QoS flow 2 for which the UE uses the default DRB to the RLCs for the P-SgNB and the other SgNBs. In the P-SgNB, the PDCP reorders the pieces of data from the P-SgNB and the other SgNBs using the SNs. The New AS layer separates the pieces of data according to the QoS flow identifiers for each of the QoS flows, and then transfers the pieces of separated data to the high-level NW.

Setting the MC for each DRB enables the settings of the MC without changing the mapping relationship between the DRBs and the QoS flows which is set without performing the MC. This can avoid complexity in the control over the MC.

Figure 43:
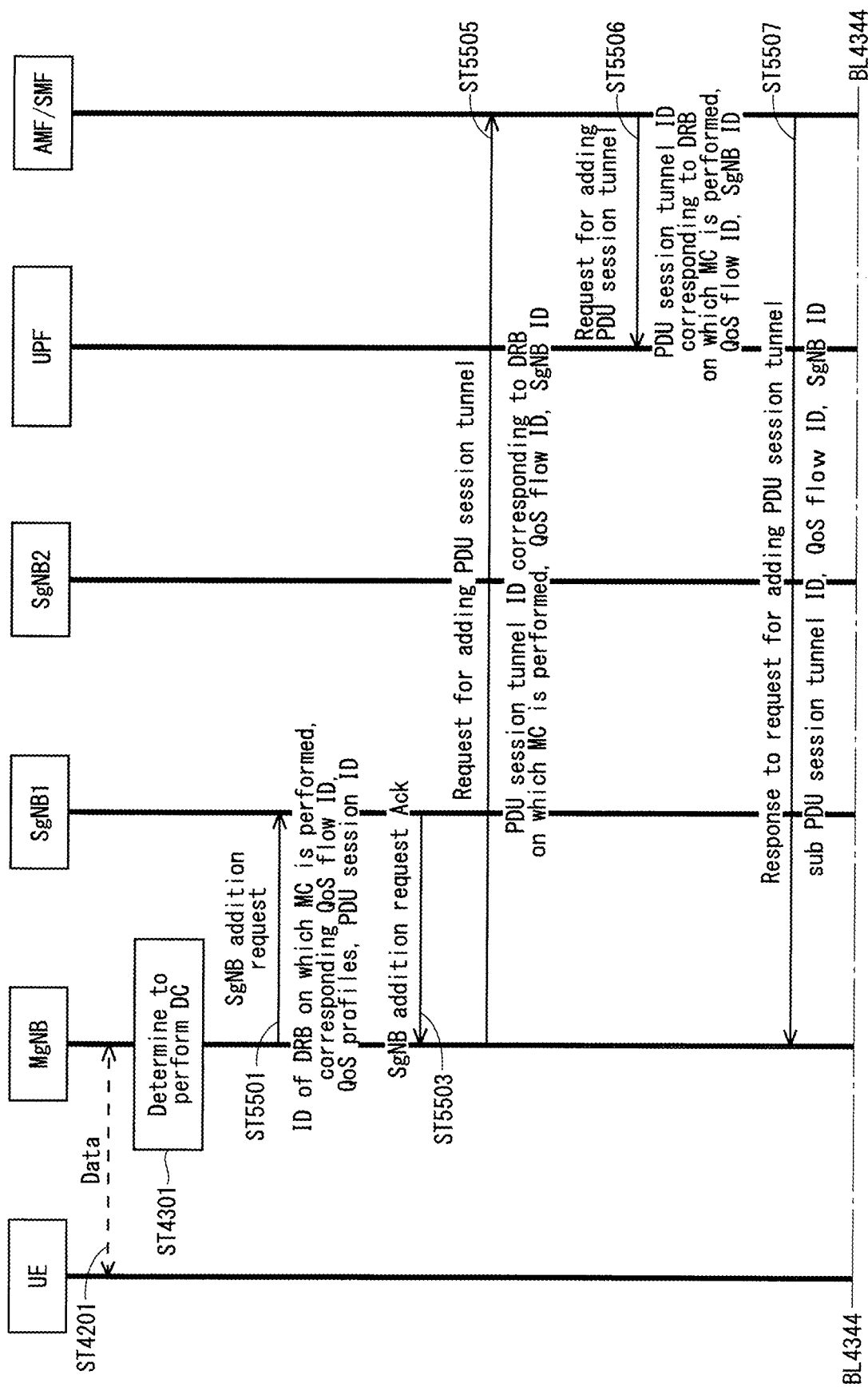
FIG. 43 illustrates an example sequence for setting the MC with the SCG split bearer according to the first modification of the eighth embodiment.
Figure 44:
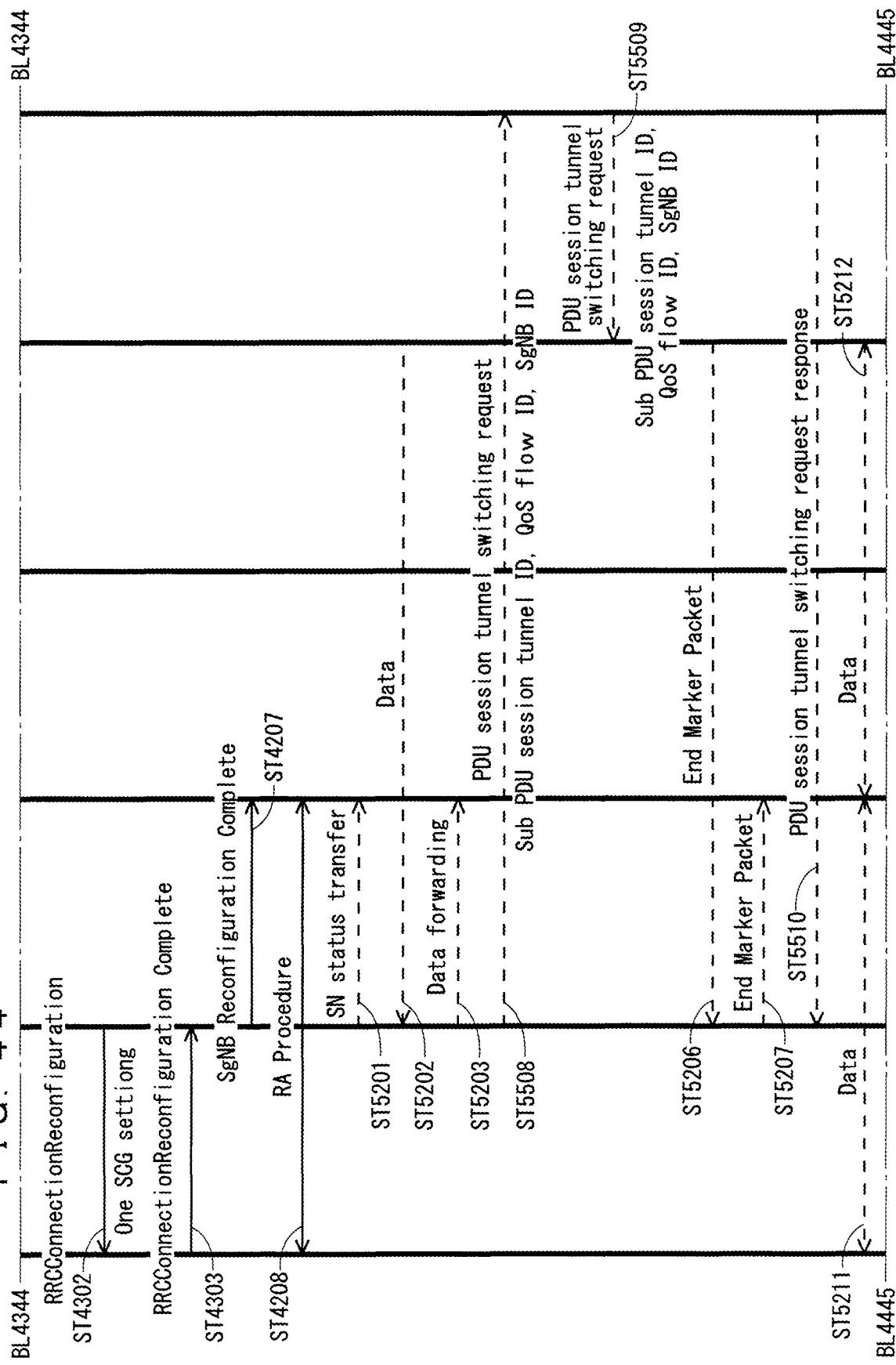
FIG. 44 illustrates the example sequence for setting the MC with the SCG split bearer according to the first modification of the eighth embodiment.
Figure 45:
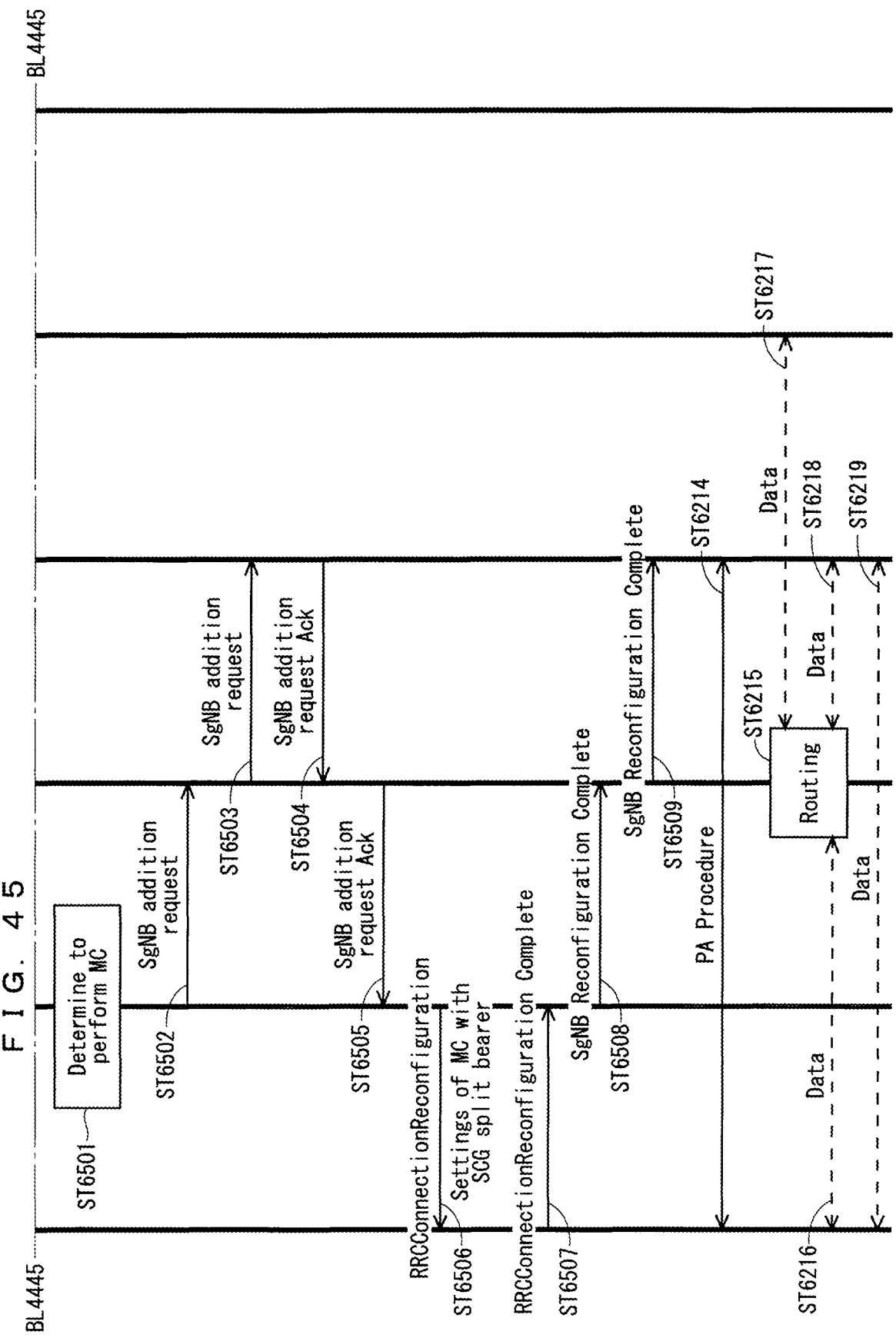
FIG. 45 illustrates the example sequence for setting the MC with the SCG split bearer according to the first modification of the eighth embodiment.

FIGS. 43 to 45 illustrate an example sequence for setting the MC with the SCG split bearer. FIGS. 43 to 45 are connected across locations of borders BL4344 and BL4445. FIGS. 43 to 45 illustrate the use of the MgNB and two SgNBs (SgNB 1 and SgNB 2). FIGS. 43 to 45 illustrate a method for initially setting the SCG bearer and then changing the setting to the SCG split bearer, similarly to the method disclosed in the eighth embodiment. Since the sequence illustrated in FIGS. 43 to 45 includes the same steps as those of the sequences illustrated in FIGS. 33 to 35 and FIGS. 38 to 40, the same step numbers are applied to the same Steps and the common description thereof is omitted.

In Step ST4301, the MgNB determines whether to set the DC to the UE, and first determines to set the DC with the SCG bearer to the UE. Alternatively, the MgNB may determine whether to set the DC with the SCG bearer to the UE. In Steps ST5501 and ST5503, Steps ST5505 to ST5507, Steps ST4302 and ST4303, Steps ST4207 and ST4208, and Steps ST5201 to ST5212, the UE, the MgNB, the SgNB 1, the UPF, and AMF/SMF set the DC with the SCG bearer.

In Step ST6501, the MgNB determines to set the MC using the SCG split bearer with the SgNB 1 and the SgNB 2 to the UE. Assume that the SgNB 1 is the P-SgNB and the SgNB 2 is another SgNB. In Step ST6502, the MgNB notifies the SgNB 1 of a request for additionally setting the SgNB for the SCG split bearer. The MgNB includes, in the notification, information to be included in the request for setting the SCG split bearer to be notified from the MgNB to the SgNB, which is disclosed in the eighth embodiment, to notify the information.

Upon receipt of the notification of the information in Step ST6502, the SgNB 1 notifies the SgNB 2 of the request for additionally setting the SgNB for the SCG split bearer in Step ST6503. The SgNB 1 includes, in the notification, information to be included in the request for setting the SCG split bearer to be notified from the P-SgNB to the other SgNBs for the SCG split bearer, which is disclosed in the eighth embodiment, to notify the information.

Upon receipt of the information in Step ST6503, the SgNB 2 sets the SCG configuration and the DRB configuration to its own SgNB, and notifies the SgNB 1 functioning as the P-SgNB of a response to the request for additionally setting the SgNB for the SCG split bearer in Step ST6504. Here, the SgNB 2 notifies the acknowledgement. The response should include information on the SCG configuration and the DRB configuration that are set by its own SgNB.

Upon receipt of the information in Step ST6504, the SgNB 1 sets the SCG configuration and the DRB configuration to its own SgNB. In Step ST6505, the SgNB 1 notifies the MgNB of information on the SCG configuration and the DRB configuration that are set by its own P-SgNB and on the SCG configuration and the DRB configuration that are set by another SgNB (SgNB 2).

In Step ST6506, the MgNB notifies the UE of the settings of the MC with the SCG split bearer. The settings of the MC should include the information on the SCG configuration and the DRB configuration that are set by its own P-SgNB and on the SCG configuration and the DRB configuration that are set by the other SgNB. The MgNB may give this notification via the signaling for the RRC connection reconfiguration. For example, the method for notifying the DRB configuration from the MgNB to the UE, which is disclosed in the sixth embodiment, should be applied to this notification. The UE can set the DRB configuration set to each of the SgNBs.

The UE makes settings of communication with the SgNB 1 and the SgNB 2 using the settings of the MC with the SCG split bearer. In Step ST6507, the UE notifies the MgNB of completion of the settings. The UE may give this notification via the signaling for the RRC connection reconfiguration complete notification. In Step ST6508, the MgNB notifies the SgNB 1 of completion of the settings of the MC with the SCG split bearer. In Step ST6509, the SgNB 1 notifies the SgNB 2 of completion of the settings of the MC with the SCG split bearer.

In Step ST6214, the UE performs the RA procedure with the SgNB 2 to synchronize with the SgNB 2. This enables the UE to communicate with the SgNB 2. Consequently, the UE, the SgNB 1, the SgNB 2, and the UPF perform data communication with the MC using the SCG split bearer. In other words, the UE, the MgNB, the SgNB 1, the SgNB 2, and the UPF perform data communication using the MC with the SCG split bearer because the UE and the MgNB perform communication for setting the MC which is independent of the DRB.

The method disclosed in the sixth embodiment should be appropriately applied to the data split method with the MC in the uplink. The method may be applied to the P-SgNB and the other SgNBs. When the MgNB is configured as a replacement for one of the other SgNBs, the method may be applied to the P-SgNB, the MgNB, and the other SgNBs.

The method disclosed in the sixth embodiment should be appropriately applied to the method for starting transmission of the uplink data from the UE to the base station side. The method may be applied to the P-SgNB and the other SgNBs. When the MgNB is configured as a replacement for one of the other SgNBs, the method may be applied to the P-SgNB, the MgNB, and the other SgNBs.

These methods can set the MC with the SCG split bearer to the UE for each DRB even when the high-level NW is the NG-CN, which increases the throughput.

Another method for setting the MC with the SCG split bearer is disclosed. The MC is set for each QoS flow. The MC with the SCG split bearer is set for each QoS flow. When the MC with the SCG bearer is set for each QoS flow, the first modification of the seventh embodiment describes the occurrence of mainly one problem in addition to the problems in setting the MC for each DRB. The problem is failing to normally reorder the pieces of data of the QoS flows to which the MC is set. The SCG split bearer also causes this problem.

To solve such a problem, the method disclosed in the first modification of the seventh embodiment should be appropriately applied thereto. For example, the DRB for the QoS flow on which the MC is performed is additionally set, and the QoS flow on which the MC is performed is mapped to the additionally set DRB. Through setting the MC to the additionally set DRB, the MC can be set to the QoS flow mapped to the DRB. This can set the MC for each QoS flow.

Figure 46:
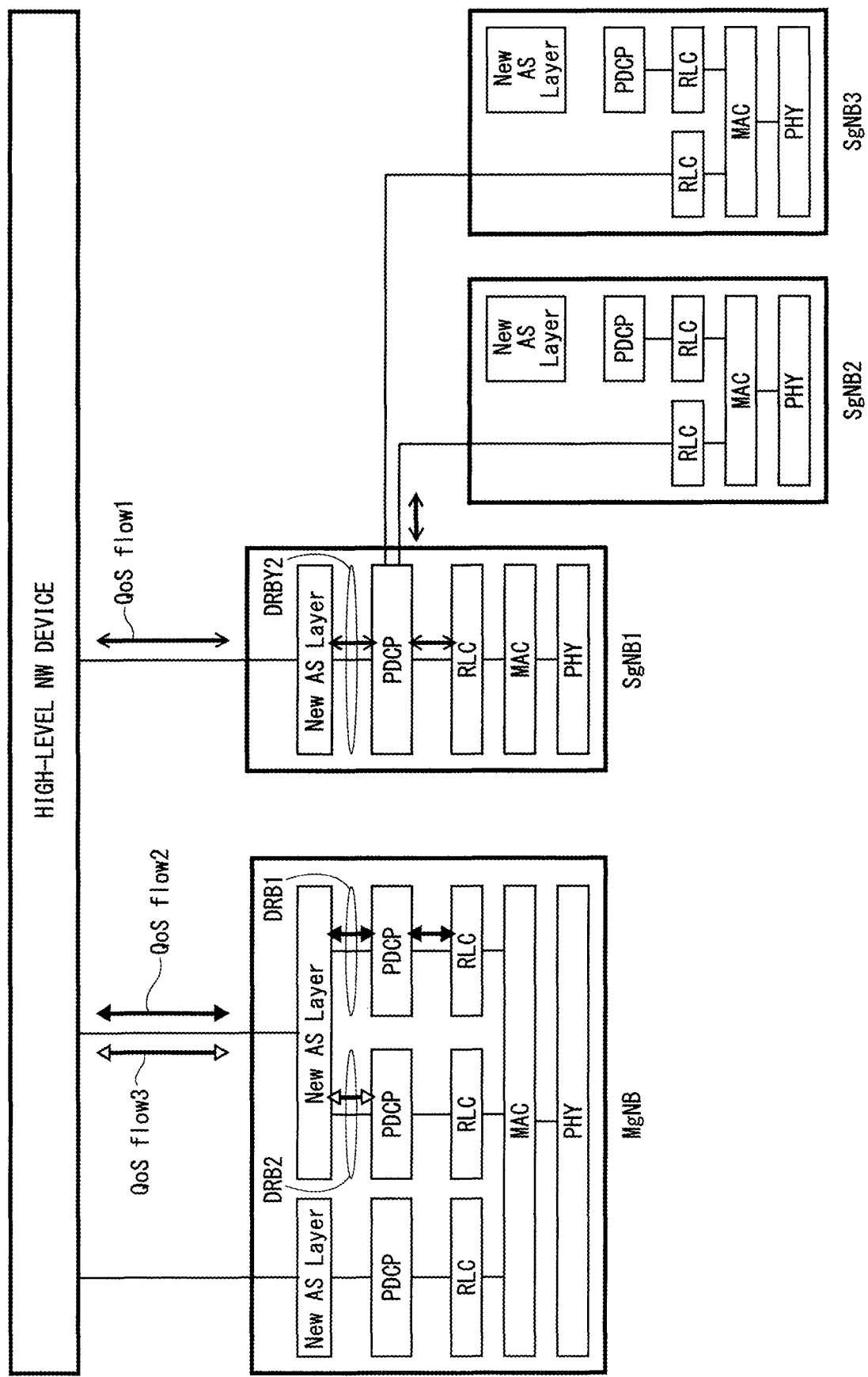
FIG. 46 is a conceptual diagram illustrating a dataflow when the MC with the SCG split bearer is set for each QoS flow according to the first modification of the eighth embodiment.

FIG. 46 is a conceptual diagram illustrating a dataflow when the MC with the SCG split bearer is set for each QoS flow. Assume that the mapping relationship between the QoS flows and the DRBs before the MC is set is the one illustrated in FIG. 21. Assume a DRB on which the MC is performed as the DRB 1. The QoS flow 1 and the QoS flow 2 are mapped to the DRB 1.

As illustrated in FIG. 46, the MgNB additionally sets a PDU session tunnel to the SgNB 1 to be connected to the high-level NW in order to set the MC with the SCG bearer to the QoS flow 1 in the DRB 1. The PDU session tunnel should be additionally set between the high-level NW and the SgNB 1 (P-SgNB). The PDU session tunnel need not be additionally set between the other SgNBs (SgNB 2, SgNB 3) and the high-level NW.

The QoS flow 1 to which the MC is set is communicated through the added PDU session tunnel. The packet data which the high-level NW maps to the QoS flow 1 is communicated through the added PDU session tunnel.

The data mapped to the QoS flow 1 is transferred to the New AS sublayer of the P-SgNB, and mapped to a DRBY 2 in the New AS sublayer. This enables the P-SgNB to process the QoS flow 1 to which the MC is set.

The PDCP of the P-SgNB splits and routes the data of the QoS flow 1 mapped to the DRB 2, into its own P-SgNB and the other SgNBs. Similarly in the downlink, the PDCP splits and routes the data of the QoS flow 1 mapped to the DRBY 2 in the New AS sublayer of the UE into the RLCs for the P-SgNB and the other SgNBs as the uplink data.

In the P-SgNB, the PDCP reorders the pieces of data from the P-SgNB and the other SgNBs using the SNs. The New AS layer separates the pieces of data according to the QoS flow identifiers for each of the QoS flows, and then transfers the pieces of separated data to the high-level NW.

On the other hand, the MC is not performed on the QoS flow 2 in the DRB 1, and the QoS flow 2 is communicated on the MgNB side. The MgNB maintains, on the MgNB side, the DRB in the DRB 1 for the QoS flow 2. The MgNB may reconfigure the DRB 1. The MgNB should, for example, reconfigure the DRB configuration appropriate for the QoS flow 2 after the MC is set.

FIG. 46 illustrates the use of the same setting as that of the DRB 1 set by the MgNB. FIG. 46 illustrates the use of the DRB identifier (DRB 1) identical to that set by the MgNB.

The QoS flow 2 is communicated through the PDU session tunnel established between the high-level NW and the MgNB before the MC is set. The data which the high-level NW maps to the QoS flow 2 is transferred to the New AS sublayer of the MgNB, and then mapped to the DRB 1 in the New AS sublayer. This enables the MgNB to process the QoS flow 2 to which the MC is not set.

Not the DRB 1 or the DRBY 2 set in the downlink but a default DRB may be used in the uplink. When not the DRBY 2 but the default DRB is used, the PDCP in the UE splits and routes the data of the QoS flow 1 using the default DRB, into the RLCs for the P-SgNB and the other SgNBs.

When not the DRB 1 but the default DRB is used, the PDCP, the RLC, the MAC, and the PHY for the MgNB in the UE process the data of the QoS flow 2 using the default DRB.

The MgNB should notify the UE of the reconfigured DRB configuration. The UE can reconfigure the DRB configuration set on the MgNB side. The MgNB may notify the configuration of the SgNB on which the MC is performed, and the DRB configuration set to each SgNB. For example, the method for notifying the configuration of the DRB from the MgNB to the UE, which is disclosed in the sixth embodiment, should be applied to this notification. The UE can set the DRB configuration set to each SgNB. The same applies to the uplink data. This can implement the MC for each QoS flow.

FIGS. 26 and 27 should be applied to the sequence for setting the MC with the SCG split bearer for each QoS flow. Steps ST4902 to ST4913 should be performed for additionally setting the DRB for the QoS flow on which the MC is performed. The DRB for the QoS flow on which the MC is performed is additionally set, and the QoS flow on which the MC is performed is mapped to the additionally set DRB. Through setting the MC to the additionally set DRB, the MC can be set to the QoS flow mapped to the DRB.

In Step ST4914, the MgNB starts the MC setting with the SCG split bearer as the DRB that has been additionally set for the QoS flow on which the MC is performed. In Step ST4915, the MgNB, the SgNB 1 and the SgNB 2 to be used for the MC, the AMF/SMF, the UPF, and the UE mutually perform the MC setup processing using the SCG split bearer. FIGS. 43 to 45 should be applied to this MC setup processing.

The method disclosed in the sixth embodiment should be appropriately applied to the data split method with the MC in the uplink. The method should be applied to the P-SgNB and the other SgNBs to each of which the MC is set for each QoS flow. When the MgNB is configured as a replacement for one of the other SgNBs, the method may be applied to the P-SgNB, the MgNB, and the other SgNBs.

The method disclosed in the sixth embodiment should be appropriately applied to the method for starting transmission of the uplink data from the UE to the base station side. The method should be applied to the P-SgNB and the other SgNBs to each of which the MC is set for each QoS flow. When the MgNB is configured as a replacement for one of the other SgNBs, the method may be applied to the P-SgNB, the MgNB, and the other SgNBs. The SR or the BSR for each QoS flow may be provided and notified from the UE to the base station side.

This enables the MC with the SCG split bearer when the high-level NW is the NG-CN. The MgNB can set the MC with the SCG split bearer to the UE. The UE can perform the MC through connecting with a plurality of SgNBs for the MC.

The MgNB can perform the MC with the SCG split bearer on the UE for each QoS flow. Since the MC can be performed for each QoS flow, the MC can be controlled with QoS precision finer than that of the MC for each bearer.

The base stations to be split off from the P-SgNB for the MC may include the MgNB. The MgNB may be set as a replacement for one of the other SgNBs for the MC. The aforementioned method should be applied thereto. The use of the MgNB can reduce the number of the base stations to which the UE is connected.

The method disclosed in the first modification of the eighth embodiment can configure the connection of one UE to a plurality of secondary base stations even when the high-level NW is the NG-CN. This can increase the throughput of communication to be provided for the UE. Also, the connection to a plurality of base stations can enhance the reliability. Moreover, since the MC with the SCG split bearer can be set, the high-level NW need not be connected to the plurality of secondary base stations. The complexity in the control between the high-level NW and the base stations can be avoided.

The Ninth Embodiment

In 3GPP, introduction of a unified split bearer has been discussed as one method for performing the DC. Unifying the PDCP of the MeNB and the PDCPs of the SgNBs into a unified split bearer has been proposed. However, none discloses an architecture including the high-level NW or a method for setting the MC with the unified split bearer.

Thus, for example, which base station the PDCP is provided to be used in and which base station the high-level NW is connected to are unknown. For another example, which base station the parameter of the PDCP is provided in is unknown. The ninth embodiment discloses a method for solving such problems.

The high-level NW is connected to a unified PDCP. The unified PDCP may be referred to as a common PDCP. The high-level NW may be the MME or the S-GW. The S-GW may be connected to the common PDCP to be dedicated to the U-plane. The common PDCP is provided for a DRB.

Figure 47:
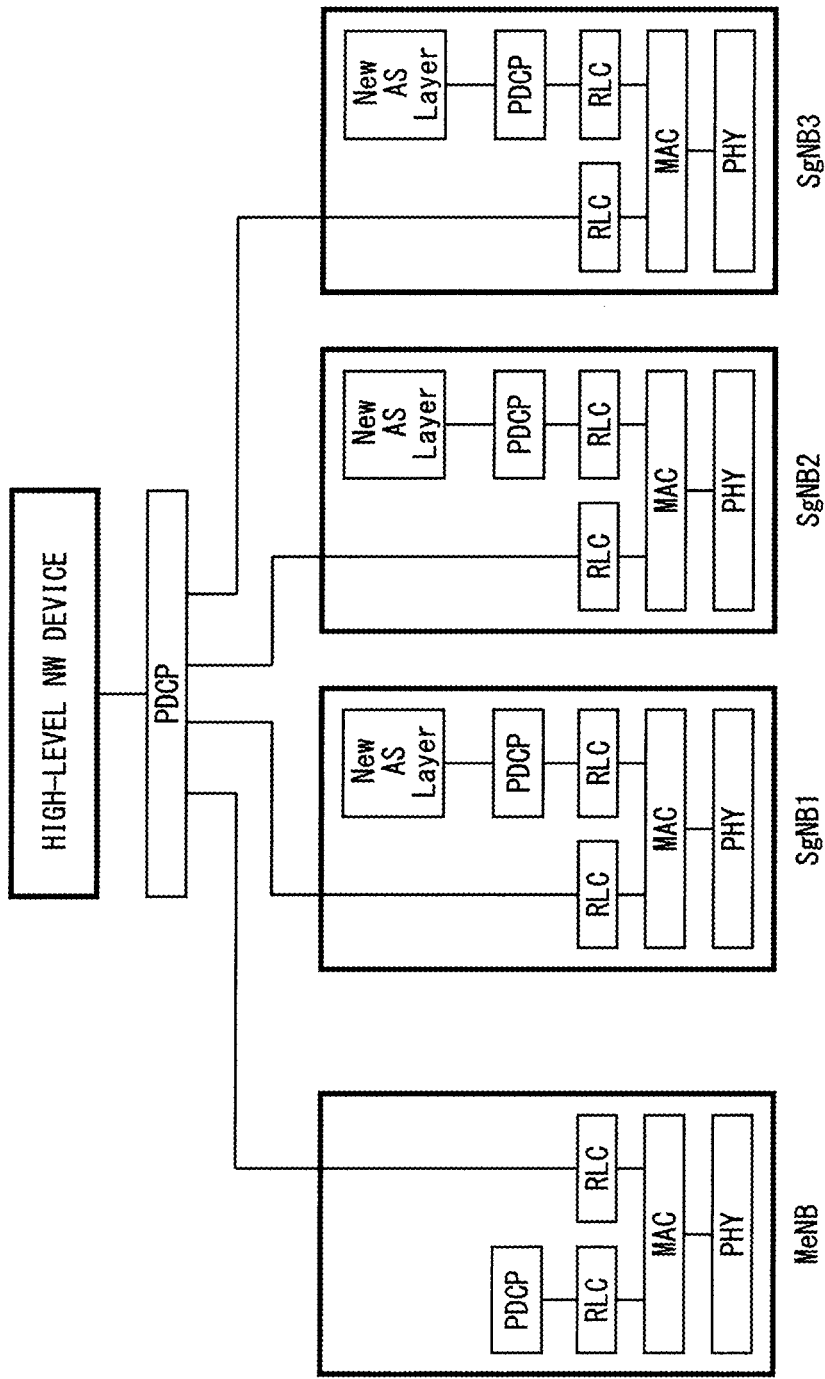
FIG. 47 illustrates an architecture of the MC according to the ninth embodiment.

FIG. 47 illustrates an architecture of the MC. FIG. 47 illustrates that the high-level NW is an EPC, the master base station is a base station in the LTE (eNB), and the secondary base stations are base stations in NR (gNBs). Although FIG. 47 illustrates the architecture on the base station side, the architecture on the UE side is identical to that on the base station side except for the high-level NW. One UE includes the common PDCP, and the RLCs, the MACs, and the PHYs for the MeNB and the SgNBs.

FIG. 47 illustrates the use of the unified split bearer. The high-level NW is connected to the common PDCP, and the common PDCP is connected to the MeNB and the SgNBs for the MC. The downlink data is transferred from the high-level NW to the common PDCP, and processed by the common PDCP. The PDCP assigns one serial sequence number (SN) to each data.

The data to which the common PDCP assigns the SN is split and routed to the MeNB and the SgNBs for the MC. The pieces of data split and routed are transmitted to the MeNB and the SgNBs, processed by the RLCs, the MACs, and the PHYs, and transmitted to the UE.

The pieces of data received by the UE from the MeNB and the SgNBs are processed by the PHYs, the MACs, and the RLCs for the MeNB and the SgNBs, and then transferred to the common PDCP. The common PDCP reorders the pieces of data transferred from those for the MeNB and the SgNBs, based on the SNs assigned thereto, and then transfers the pieces of data to the upper layer.

The common PDCP in the UE processes the pieces of data from the upper layer as the uplink data. Similarly in the downlink, the common PDCP assigns one serial sequence number (SN) to each data in the uplink. The data to which the SN is assigned is split into the RLCs for the MeNB and the SgNBs to be transferred. The pieces of transferred data are processed by the RLCs, the MACs, and the PHYs for the MeNB and the SgNBs, and then transmitted to the MeNB and the SgNBs.

The pieces of data received by the MeNB and the SgNBs from the UE are processed by the PHYs, the MACs, and the RLCs for the MeNB and the SgNBs, and then transferred to the common PDCP. The common PDCP reorders the pieces of data based on the SNs assigned thereto, and then transfers the pieces of data to the high-level NW.

The common PDCP may be provided in one independent node. Alternatively, the common PDCP may be provided in a base station. For example, the common PDCP may be provided in the MeNB or the SgNB. Alternatively, the common PDCP may be provided in the high-level NW. The common PDCP has only to include a PDCP function uniform between the base stations to be connected. The common PDCP may be provided in any node.

Examples of the parameter to be used in the PDCP include a parameter related to header compression, and a cipher-related parameter. The parameter of the common PDCP should be a parameter dedicated to the common PDCP. The MeNB should set the parameter. The MeNB notifies the UE of the parameter of the common PDCP. The MeNB may give this notification via the RRC signaling. The MeNB sets the parameter of the common PDCP, and then notifies a node with the common PDCP of the parameter.

The UE sets the parameter notified from the MeNB as the parameter used in the common PDCP to perform processes in the common PDCP. The MeNB may notify the UE to set the MC using the common PDCP. The MeNB may give this notification via the RRC signaling. This notification may include the parameter for the common PDCP.

Although disclosed is that the MeNB sets the parameter, the SgNB may set the parameter. Alternatively, the high-level NW may set the parameter. The node with the common PDCP function may set the parameter. The node that has set the parameter notifies the MeNB of the parameter. The MeNB should notify the UE of the parameter.

The use of the parameter dedicated to the common PDCP can make a distinction from the PDCP parameters of the MeNB and the SgNB.

As an alternative method, the parameter to be used in the common PDCP may be a parameter of the PDCP set by the MeNB. The parameter may be a parameter of the PDCP that is configured by the MeNB before setting the MC. The MeNB notifies the UE of the parameter of the common PDCP. The MeNB notifies the parameter to the node with the common PDCP.

The common PDCP may be a PDCP before the MC is set. The PDCP before the MC is set may be set to the common PDCP by setting the MC. In such a case, the use of a PDCP parameter before the MC is set as the parameter for the common PDCP can ensure the continuity in the PDCP parameter. This makes the parameter setting and the signaling for the common PDCP unnecessary.

As an alternative method, the parameter to be used in the PDCP may be a parameter of the PDCP of the SgNB. The parameter may be a parameter of the PDCP that is configured by the SgNB by setting the MC. The SgNB notifies the UE of the parameter of the common PDCP. The SgNB may notify the UE of the parameter through the MeNB.

The common PDCP may be provided in the SgNB to be connected to the high-level NW. For example, when the SCG bearer is changed to the unified split bearer, the use of the parameter of the PDCP of the SgNB as the parameter for the common PDCP can make the parameter setting and the signaling for the common PDCP unnecessary.

Which one of the methods for setting the common PDCP is used may be configurable. The high-level NW may determine which method is used, and notify the method to a node or a base station that includes the common PDCP. Alternatively, the MeNB may determine which method is used, and notify the method to a node or a base station that includes the common PDCP. The MeNB may notify the UE of the setting method. The MeNB may notify the UE of the setting method as well as information on the node or the base station that includes the common PDCP.

An indicator for determining which method is used may be, for example, capability for processing the PDCP by each base station. The PDCP of a base station with high capability for processing the PDCP is used as the common PDCP. This can suppress, for example, reduction in the processing speed in an overloaded state caused by the processing of the common PDCP, and an abnormal end of the processing.

The methods disclosed in the sixth and eighth embodiments should be appropriately applied to the method for setting the MC with the unified split bearer.

When a parameter is set as the parameter for the common PDCP, the PDCP before the MC is set differs from the PDCP after the MC is set. The processing on the DRB to which the MC is set is changed from processing performed by the PDCP of the MeNB to processing performed by the common PDCP. The method for changing into the SCG split bearer, which is disclosed in the eighth embodiment, should be appropriately applied to the changing method. The common PDCP should be used to replace the PDCP of the P-SgNB. The setting of each SgNB should be used to replace the settings of the other SgNB s. One of the other SgNBs may be the MeNB.

When the MeNB exists as one of the SgNBs, the settings of the RLC or lower in the MeNB may be identical to those before the MC is set. The DRB configuration before the MC is set can gain a desired QoS even without any change.

The SN status of the PDCP of the MeNB and data should be transferred as the data forwarding method when the MC is set. The method for changing into the SCG split bearer, which is disclosed in the eighth embodiment, should be appropriately applied as the transferring method. The common PDCP should be used to replace the PDCP of the P-SgNB.

As a method for the MeNB to set the MC to the UE, the MeNB notifies the UE of the setting of the common PDCP and the setting of each SgNB. The method for changing into the split bearer, which is disclosed in the eighth embodiment, should be appropriately applied as the setting method. This can set the MC with the unified split bearer to the UE.

When the PDCP parameter of the MeNB is used as the parameter of the common PDCP, the PDCP parameter before the MC is set is identical to the PDCP parameter after the MC is set. The method for changing into the MCG split bearer, which is disclosed in the sixth embodiment, should be appropriately applied to the method for setting the MC. As a method for the MeNB to set the MC to the UE, the MeNB notifies the UE of the settings of the MC with the MCG split bearer.

When the PDCP parameter of the SgNB is used as the parameter of the common PDCP, the setting of the SCG split bearer disclosed in the eighth embodiment should be appropriately applied. The MeNB determines of which SgNB the PDCP parameter is used. The disclosed method on the SCG split bearer should be appropriately applied to the method for determining the SgNB. The method for determining the P-SgNB should be applied thereto.

The processing on the DRB to which the MC is set should be changed from processing performed by the PDCP of the MeNB to processing performed by the PDCP of the SgNB. The method for changing into the SCG split bearer, which is disclosed in the eighth embodiment, should be appropriately applied as the changing method. A predetermined SgNB should be appropriately used to replace the P-SgNB. The setting of each SgNB should be appropriately used to replace the settings of the other SgNBs. One of the other SgNB s may be the MeNB.

The SN status of the PDCP of the MeNB and data should be transferred as the data forwarding method. The method for changing into the SCG split bearer should be appropriately applied as the transferring method. The PDCP of a predetermined SgNB should be appropriately used to replace the PDCP of the P-SgNB.

As a method for the MeNB to set the MC to the UE, the MeNB notifies the UE of the setting of the P-SgNB and the settings of the other SgNBs. The method for changing into the SCG split bearer should be appropriately applied as the setting method.

The method disclosed in the sixth embodiment should be appropriately applied to the data split method with the MC in the uplink. The method may be applied to the gNB or the eNB to which the MC is set.

The method disclosed in the sixth embodiment should be appropriately applied to the method for starting transmission of the uplink data from the UE to the base station side. The method may be applied to the gNB or the eNB to which the MC is set.

This saves distinguishing the state of the MC with the MCG split bearer from the state of the MC with the SCG split bearer.

The eNBs that are base stations in the LTE may be used as base stations for the MC. The base stations may include an eNB and a gNB. Since the base stations for the MC do not use the New AS sublayer, the eNBs can be used as the base stations.

The method disclosed in the ninth embodiment can configure the connection of one UE to a plurality of base stations. This can increase the throughput of communication to be provided for the UE. Moreover, the connection to a plurality of base stations can enhance the reliability. Since the MC with the unified split bearer can be set, the split bearer can be controlled and managed in one state. Thus, the complexity in the control and management with the MC can be avoided.

The First Modification of the Ninth Embodiment

The first modification discloses a method for setting the MC with the unified split bearer when the high-level NW is an NG-CN. In the ninth embodiment, the common PDCP is the PDCP obtained by unifying the PDCP of the MeNB and the PDCPs of the SgNBs. Since the high-level NW is the NG-CN in the first modification, the common PDCP is the PDCP obtained by unifying the PDCPs of the SgNBs, and the PDCP of the MgNB or the MeNB that can be connected to the NG-CN.

The New AS sublayer is provided between the common PDCP and the NG-CN. The high-level NW is connected to the New AS sublayer, and the New AS sublayer is connected to the common PDCP. The high-level NW may be the AMF or the UPF. The UPF may be connected to the New AS sublayer to be dedicated to the U-plane.

The New AS sublayer maps a QoS flow from the high-level NW to a DRB according to the QoS flow identifier. The common PDCP is provided for the DRB.

Figure 48:
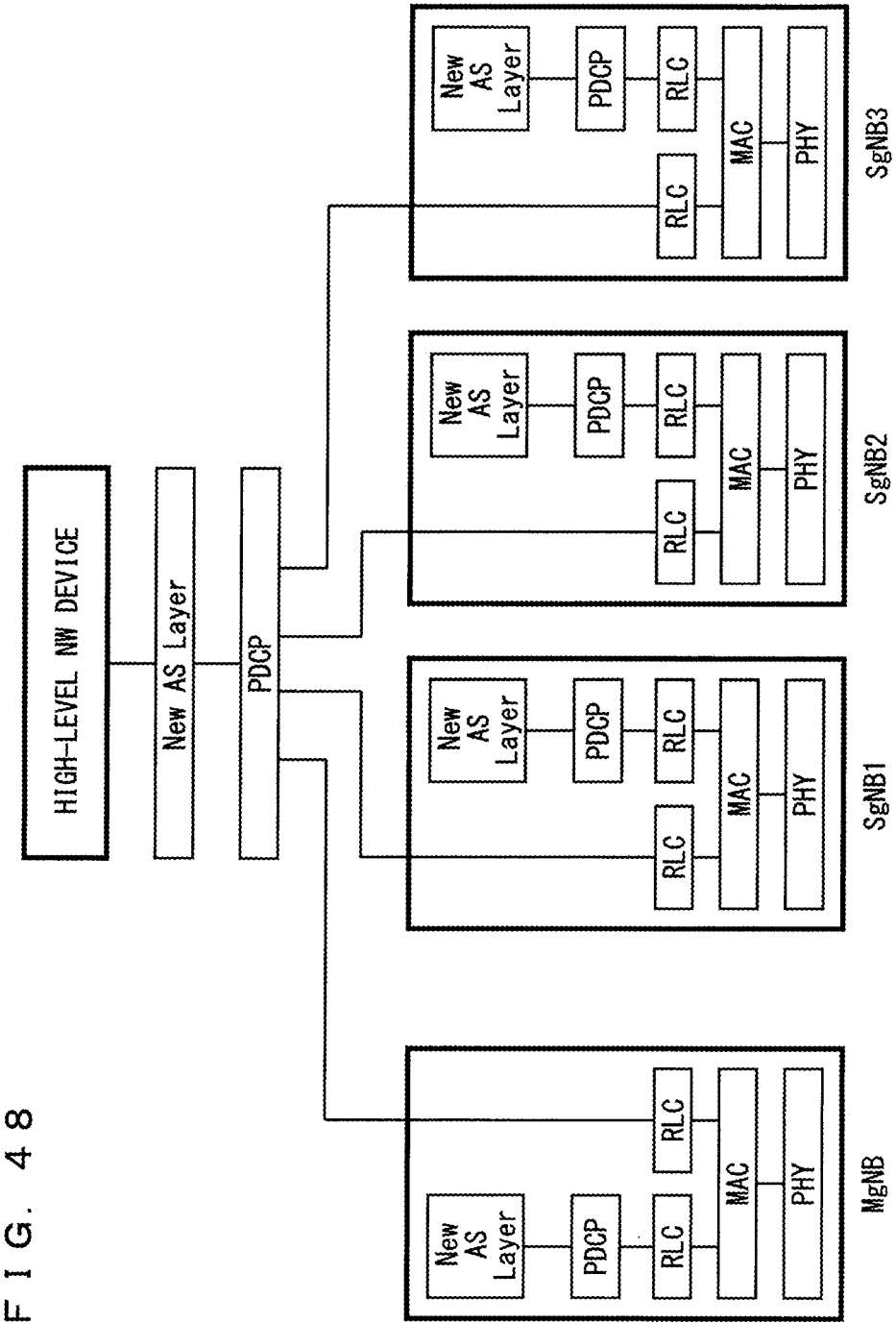
FIG. 48 illustrates an architecture of the MC according to the first modification of the ninth embodiment.

FIG. 48 illustrates an architecture of the MC. FIG. 48 illustrates that the high-level NW is the NG-CN, the master base station is a base station in NR (gNB), and the secondary base stations are base stations in NR (gNBs). Although FIG. 48 illustrates the architecture on the base station side, the architecture on the UE side is identical to that on the base station side except for the high-level NW. One UE includes the New AS sublayer, the common PDCP, and the RLCs, the MACs, and the PHYs for the MgNB and the SgNBs.

FIG. 48 illustrates the use of the unified split bearer. The high-level NW is connected to the New AS sublayer, and the New AS sublayer is connected to the common PDCP. The common PDCP is connected to the MgNB and the SgNBs for the MC. The high-level NW maps the downlink data to the QoS flow, and then transfers the downlink data to the New AS sublayer.

The New AS sublayer maps the downlink data from the QoS flow to a DRB, and then transfers the downlink data to the common PDCP configured with the DRB. Then, the common PDCP processes the downlink data. The PDCP assigns one serial sequence number (SN) to each data.

The data to which the common PDCP assigns the SN is split and routed to the MgNB and the SgNBs for the MC. The pieces of data split and routed are transmitted to the MgNB and the SgNBs, then processed by the RLCs, the MACs, and the PHYs, and then transmitted to the UE.

The pieces of data received by the UE from the MgNB and the SgNBs are processed by the PHYs, the MACs, and the RLCs for the MgNB and the SgNBs, and then transferred to the common PDCP. The common PDCP reorders the pieces of data transferred from those for the MgNB and the SgNBs, based on the SNs assigned thereto, and then transfers the pieces of data to the New AS sublayer. The New AS sublayer separates the pieces of data according to the QoS flow identifiers for each of the QoS flows, and then transfers the pieces of separated data to the upper layer.

As for the uplink data, the New AS layer of the UE maps the pieces of data from the upper layer, from the QoS flow to the DRB. The pieces of data mapped to the DRB are transferred to the common PDCP, and processed by the common PDCP. Similarly in the downlink, the common PDCP assigns one serial sequence number (SN) to each data in the uplink.

The data to which the SN is assigned is split into the RLCs for the MgNB and the SgNBs to be transferred. The pieces of transferred data are processed by the RLCs, the MACs, and the PHYs for the MgNB and the SgNBs, and then transmitted to the MgNB and the SgNBs.

The pieces of data received by the MgNB and the SgNBs from the UE are processed by the PHYs, the MACs, and the RLCs for the MgNB and the SgNBs, and then transferred to the common PDCP. The common PDCP reorders the pieces of data based on the SNs assigned thereto, and then transfers the pieces of data to the New AS sublayer. The New AS sublayer separates the pieces of data according to the QoS flow identifiers for each of the QoS flows, and then transfers the pieces of separated data to the high-level NW.

The common PDCP may be provided in one independent node, and the New AS sublayer may be provided in another independent node. Alternatively, the common PDCP and the New AS sublayer may be provided in the same node. Such provision in the same node facilitates transfer from the New AS sublayer to the PDCP. The common PDCP and the New AS sublayer may be provided in a base station. For example, the common PDCP and the New AS sublayer may be provided in the MgNB or the SgNB. Alternatively, the common PDCP and the New AS sublayer may be provided in the high-level NW.

The method disclosed in the ninth embodiment should be appropriately applied to the PDCP parameter of the common PDCP. The MgNB may replace the MeNB.

The methods disclosed in the first modifications of the sixth and eighth embodiments should be appropriately applied to the method for setting the MC with the unified split bearer, similarly to the settings of the MC for each DRB and the settings of the MC for each QoS flow in the ninth embodiment.

The method disclosed in the sixth embodiment should be appropriately applied to the data split method with the MC in the uplink. The method may be applied to the gNB or the eNB to which the MC is set.

The method disclosed in the sixth embodiment should be appropriately applied to the method for starting transmission of the uplink data from the UE to the base station side. The method may be applied to the gNB or the eNB to which the MC is set.

This saves distinguishing the state of the MC with the MCG split bearer from the state of the MC with the SCG split bearer even when the high-level NW is the NG-CN. The split bearer can be controlled and managed in one state. Thus, the complexity in the control and management with the MC can be avoided.

When a parameter set as a parameter dedicated to the common PDCP is used in the common PDCP, each SgNB or the MgNB configures the layers lower than the RLC. Thus, when the gNB and the eNB have the same layers lower than the RLC layers, there is no need to distinguish between the gNB and the eNB.

When base stations do not include the common PDCP, the eNBs that are base stations in the LTE may be used as the base stations for the MC. The base stations may be eNBs and gNBs. Since the base stations for the MC do not use the New AS sublayer, the eNBs can be used as the base stations.

Alternatively, when a base station includes the common PDCP along with the New AS sublayer, the eNBs that are base stations in the LTE may be used as base stations for the MC, except for the base station including the common PDCP and the New AS sublayer. The base stations may include an eNB and a gNB. Since the base stations for the MC do not use the New AS sublayer, the eNBs can be used as the base stations.

Coexistence of the gNB and the eNB as the base stations to be used for the MC enables flexible setting of the base stations to be used for the MC. Thus, the MC can be set using appropriate base stations according to, for example, positions of the base stations and situations such as load states of the base stations, which increases the throughput.

The method disclosed in the first modification of the ninth embodiment can configure the connection of one UE to a plurality of base stations even when the high-level NW is the NG-CN. This can increase the throughput of communication to be provided for the UE. Moreover, the connection to a plurality of base stations can enhance the reliability. Since the MC with the unified split bearer can be set, the split bearer can be controlled and managed in one state. Thus, the complexity in the control and management with the MC can be avoided.

The Tenth Embodiment

The sixth, seventh, eighth, and ninth embodiments disclose the methods for configuring the MC. The tenth embodiment discloses modifying and releasing a MC configuration.

The MeNB may activate modifying the MC configuration. The modification of the MC configuration may be, for example, a modification of the configuration in the SgNB (an SgNB modification). The modification of the configuration may mean, for example, addition, modification, and removal of a bearer that passes through the SgNB. The addition of the bearer that passes through the SgNB may mean a setting of a new bearer, or addition of the SgNB as a branch destination of the existing bearer. The same may apply to removal of a bearer.

The MeNB may notify the SgNB of an SgNB modification request. The MeNB may notify the SgNB modification request only to an SgNB whose configuration is to be modified among the SgNBs that configure the MC. The MeNB may notify the SgNB modification request through the Xn interface.

The SgNB modification request may include an identifier of a bearer. The identifier of the bearer may be an identifier of a bearer to be added, modified, or removed. The SgNB modification request may include a type of the bearer. The type of the bearer may be, for example, the MCG split bearer, the MCG bearer, the SCG split bearer, the SCG bearer, or the unified bearer described in the ninth embodiment. The type of the bearer should be a type after modification. This can flexibly modify the type of the bearer.

The SgNB modification request may include the setting of a bearer. The setting of the bearer may be, for example, a parameter on the QoS or parameters on protocols such as the RLC and the MAC. The setting can flexibly change the setting of the bearer that passes through the SgNB.

Alternatively, the SgNB modification request may include information necessary for routing from the SgNB to the other SgNBs. The information may be the one described in the eighth embodiment. Alternatively, the SgNB modification request may include information indicating whether the routing is performed. Whether the routing from the SgNB to the other SgNBs is performed can be flexibly switched.

The SgNB may transmit an SgNB modification request acknowledgement to the MeNB. The SgNB may transmit the SgNB modification request acknowledgement after receiving the SgNB modification request.

The SgNB modification request acknowledgement may include an identifier of a bearer. The identifier of the bearer may be an identifier of a bearer to be added, modified, or removed. Alternatively, the SgNB modification request acknowledgement may include the AS setting from the SgNB to the UE, for example, the RRC parameter and the setting for the RA procedure.

For example, the SgNB may transmit an SgNB modification request rejection to the MeNB. The SgNB may transmit the SgNB modification request rejection as a rejection response to the SgNB modification request transmitted from the MeNB to the SgNB. Information included in the SgNB modification request rejection may be identical to that according to the second embodiment.

The MeNB may notify the UE to modify the MC configuration. In response to the notification, the UE may modify the MC configuration. The MeNB notifies the UE of the SCG setting as a modification of the MC configuration. The MeNB may notify the UE of the SCG setting after receiving the SgNB modification request acknowledgement. The MeNB may give the notification via the RRC signaling. Similarly to the sixth embodiment, the RRC connection reconfiguration (RRCConnectionReconfiguration) may be used as the RRC signaling. Similarly to the sixth embodiment, the MeNB may give the notification by, for example, including an SCG configuration in SCG-ConfigPartSCG in the signaling. Alternatively, the notification may include a configuration of a bearer to which the MC is set. Examples of the configuration of the bearer include a bearer identifier, and the AS setting for the bearer.

The RRC connection reconfiguration may include information on a bearer that releases the SCG. The bearer that releases the SCG may be, for example, a bearer that releases the SCG from a branch destination of its own bearer. The number of pieces of the information on the bearer may be one or more. A list including the pieces of information on the bearer may be provided. The information on the bearer may be included in, for example, the SCG-ConfigPartSCG described in the sixth embodiment. The same may apply to the list. For example, the list may be newly provided in the SCG-ConfigPartSCG (e.g., drb-ToReleaseListSCG). For example, a bearer to be used as a branch destination can be promptly changed for each SCG.

Alternatively, information on one or more radio bearers to which the MC is set may be included in the RRC connection reconfiguration. Similarly to the sixth embodiment, the radio bearer information may include the information on the SCG to be used by the radio bearers. The radio bearer information may be identical to that described in the sixth embodiment. Consequently, the radio bearer for performing the MC can be easily changed.

Alternatively, the radio bearer information may include information on the SCG to be released from the radio bearer. The number of pieces of the information on the SCG may be one or more. A list including the pieces of information on the SCG may be provided. Consequently, the UE can promptly change the SCG at a branch destination for each bearer.

The RRC connection reconfiguration may include information on a bearer to be removed. The information may be, for example, an identifier of a bearer. The number of the bearers to be removed may be one or more. A list including information on the bearers to be removed may be provided. This can reduce the amount of signaling for removing the bearer.

The UE may notify the MeNB of a response to modification of the MC configuration. The UE may give the notification, for example, after receiving the RRC connection reconfiguration. The UE may give the notification via the RRC signaling, for example, using the RRC connection reconfiguration complete (RRCConnectionReconfiguration-Complete) notification. The MeNB can smoothly perform a process for modifying the MC configuration by receiving the response to modification of the MC configuration from the UE.

The MeNB may transmit, to the SgNB, a notification indicating the completion of the modification of the MC configuration. The MeNB may give the notification through the Xn interface. The MeNB may give the notification after receiving the response to modification of the MC configuration from the UE. The MeNB may give the notification via, for example, the SgNB reconfiguration complete notification. The information included in the notification may be identical to that included in the SgNB modification request.

Similarly to the sixth embodiment, the MeNB may set, to the UE, modification of the MC configuration for each SCG. The sequence for modifying the MC configuration may be identical to, for example, that illustrated in FIGS. 17 and 18. Even upon occurrence of a failure in changing the SgNB for the MC on the way, the MC can be performed while successful change in the SgNB for the MC until then is maintained.

Alternatively, the MC configuration can be modified collectively for the SCGs. The sequence for modifying the MC configuration may be identical to, for example, that illustrated in FIGS. 19 and 20. This can reduce the amount of signaling.

Alternatively, the MC configuration can be modified for each bearer or collectively for the bearers. This can reduce the amount of signaling.

In the tenth embodiment, the SgNB may activate modifying the MC configuration.

The SgNB may transmit a SgNB modification required notification to the MeNB. Information included in the notification may be identical to that included in the SgNB modification request acknowledgement.

The MeNB may transmit the SgNB modification refusal to the SgNB. The MeNB may transmit the SgNB modification refusal as a refusal response to the SgNB modification required notification transmitted from the SgNB to the MeNB. Information included in the SgNB modification refusal may be identical to that according to the second embodiment.

The MeNB may notify the UE to modify the MC configuration. The MeNB may notify the UE after receiving the SgNB modification required notification from the SgNB. The MeNB may give the notification of modifying the MC configuration using, for example, the RRC connection reconfiguration as previously described. Information included in the notification of modifying the MC configuration may be identical to that previously described.

The UE may give the MeNB the RRC connection reconfiguration complete (RRCConnectionReconfigurationComplete) notification as previously described.

The MeNB may notify the SgNB of the SgNB modification confirmation. The MeNB may give the notification through the interface between the base stations, for example, the Xn interface. Information included in the notification may be identical to that included in the SgNB modification request.

The method identical to that for modifying the MC configuration may be applied to intra-MeNB handover (HO) involving SCG change in the MC configuration. The design complexity in the communication system can be avoided.

The sequence similar to that for modifying the MC configuration may be applied to release of the SgNB in the MC configuration. The design complexity in the communication system can be avoided.

However, in the RRC signaling for the RRC connection reconfiguration, information on releasing the SCGs is limited to an identifier indicating whether to release the SCGs. As a result of releasing the SgNB through a sequence similar to that for modifying the MC configuration, the UE cannot recognize which SCG is to be released and may malfunction.

Thus, the RRC connection reconfiguration may include information on the SCG to be released. The information on the SCG to be released may be identical to that described in the sixth embodiment, for example, an identifier of the SCG. The number of pieces of the information on the SCG to be released may be one or more. This can reduce the amount of signaling for releasing a plurality of SCGs. A new list including information on the SCGs to be released may be provided.

Alternatively, all the SCGs configuring the MC may be released using information on only the identifier indicating whether or not to release the SCGs. This can reduce the amount of signaling for collectively releasing the SCGs.

Consequently, the MgNB can specify the SgNB to be released for the UE, which can prevent the UE from malfunctioning when the SCG is released.

The method described in the sixth embodiment may be combined with the release of the SgNB, to be applied to change of the SgNB in the MC configuration. The design complexity in the communication system can be avoided.

The handover request described in 9.1.1.1 of Non-Patent Document 23 (3GPP TS36.423 v14.3.0) may be combined with the release of the SgNB, to be applied to the handover from the MeNB to the eNB (MeNB to eNB Change) in the MC configuration. The design complexity in the communication system can be avoided.

The handover request described in 9.1.1.1 of Non-Patent Document 23 (3GPP TS36.423 v14.3.0) may be combined with the method described in the sixth embodiment, to be applied to the handover from the eNB to the MeNB (eNB to MeNB Change) in the MC configuration. The design complexity in the communication system can be avoided.

The handover request described in 9.1.1.1 of Non-Patent Document 23 (3GPP TS36.423 v14.3.0) may be combined with the method described in the sixth embodiment and the release of the SgNB, to be applied to the inter-MeNB handover (HO) without SgNB change in the MC configuration. The design complexity in the communication system can be avoided.

However, since nothing but information on one SgNB can be notified via the signaling for the handover request, the target MeNB cannot obtain information on SgNBs other than the one SgNB indicated by the notification. As a result, a problem of failure in the MeNB handover without SgNB change occurs in the MC.

Thus, the signaling for the handover request may include a plurality of pieces of information on an SgNB.

Alternatively, the source MeNB may notify the target MeNB of the signaling for the handover request a plurality of times. The source MeNB may include information on different SgNBs in the notification given a plurality of times to notify the information.

The target MeNB may notify the source MeNB of the Handover Request Acknowledgement described in 9.1.1.2 of Non-Patent Document 23 (3GPP TS36.423 v14.3.0). The target MeNB may transmit the Handover Request Acknowledgement in response to each signaling for the handover request, or transmit the Handover Request Acknowledgement once upon receipt of the signaling for the handover request a plurality of times.

Consequently, the target MeNB can obtain information on a plurality of SgNBs in the MC configuration. Thus, the MeNB handover without SgNB change is possible in the MC.

Since the tenth embodiment enables the modification and release of the MC configuration, the optimal communication system can be built according to a communication state of the whole system.

The First Modification of the Tenth Embodiment

The tenth embodiment may be applied to the MC configuration using the New AS layer.

Similarly to the tenth embodiment, the MgNB may activate modifying the MC configuration. The modification of the MC configuration may be, for example, modification of a configuration in a secondary base station (SN Modification). The modification of the configuration may be, for example, addition, modification, and removal of a bearer that passes through the secondary base station or addition, modification, and removal of a QoS flow that passes through the secondary base station.

The MgNB may notify the secondary base station of a secondary base station modification request (SN Modification Request). The MgNB may notify the secondary base station modification request only to a secondary base station whose configuration is to be modified, among secondary base stations configuring the MC. The MgNB may notify the secondary base station modification request through the Xn interface.

The secondary base station modification request may include the same as those included in the SgNB modification request described in the tenth embodiment. The same advantages as those described in the tenth embodiment are given.

Alternatively, the secondary base station modification request may include information indicating a QoS flow. The information may be, for example, an identifier of the QoS flow. The information may be included in, for example, information on a bearer through which the QoS flow passes. This can set whether data is split into the secondary base station for each QoS flow.

The secondary base station may transmit a secondary base station modification request acknowledgement (SN Modification Request Acknowledge) to the MgNB. The secondary base station may transmit the secondary base station modification request acknowledgement, similarly to the SgNB modification request acknowledgement in the tenth embodiment.

The secondary base station modification request acknowledgement may include the same as those included in the SgNB modification request acknowledgement described in the tenth embodiment. The same advantages as those described in the tenth embodiment are given.

Alternatively, the secondary base station modification request acknowledgement may include information indicating a QoS flow. The information may be, for example, an identifier of the QoS flow. The information may be included in, for example, information on a bearer through which the QoS flow passes. This enables the MgNB to properly perform control for each QoS flow.

The secondary base station may transmit a secondary base station modification request rejection (SN Modification Request Reject) to the MgNB. The secondary base station may transmit the secondary base station modification request rejection as a rejection response to the secondary base station modification request transmitted from the MgNB to the secondary base station. Information included in the secondary base station modification request rejection may be identical to that included in the SgNB modification rejection response described in the tenth embodiment. Alternatively, the information may include information on a QoS flow, for example, an identifier of the QoS flow. The QoS flow may be a QoS flow that causes the secondary base station to reject the request. This enables, for example, the MgNB to smoothly perform a process for changing the secondary base station per QoS flow.

Similarly to the tenth embodiment, the MgNB may notify the UE to modify the MC configuration. In response to the notification, the UE may modify the MC configuration. The MgNB may give the notification via the RRC signaling, for example, using the RRC connection reconfiguration (RRCConnectionReconfiguration).

Information included in the notification may be identical to that according to the tenth embodiment. The same advantages as those described in the tenth embodiment are produced.

Alternatively, the notification of modifying the MC configuration, for example, the RRC connection reconfiguration may include information indicating a QoS flow. The notification may include, for example, an identifier of the QoS flow as the information. The notification may include, for example, information on a bearer through which the QoS flow passes, for example, the identifier of the QoS flow. The notification may include an identifier of the MCG and/or the SCG as a split destination of the QoS flow. Thus, a base station and/or a bearer as a split destination for each QoS flow from the MgNB to the UE can be flexibly set.

Alternatively, the notification of modifying the MC configuration, for example, the RRC connection reconfiguration may include information on a QoS flow to be removed. The information may be, for example, an identifier of the QoS flow. The number of QoS flows to be removed may be one or more. A list including information on the QoS flows to be removed may be provided. This can reduce the amount of signaling for removing the QoS flows.

Similarly to the tenth embodiment, the MgNB may set, to the UE, the modification of the MC configuration for each SCG. The MgNB may set a bearer to be used for each SCG. The MgNB may set a QoS flow for each bearer or for each SCG. For example, in the signaling for the RRC connection reconfiguration, information on the setting of the SCG may include information on a bearer to be used. The information on the bearer may include information on a QoS flow to be used. The information on the setting of the SCG may include information on a QoS flow to be used. The setting for each SCG may be collectively performed for the SCGs. This can reduce the amount of signaling for changing the SCG.

Alternatively, the MgNB may set the modification of the MC configuration to the UE for each bearer similarly to the tenth embodiment. For example, the MgNB may set the QoS flow to be used for each bearer. The MgNB may set the MCG and/or the SCG for each QoS flow or for each bearer. For example, in the signaling for the RRC connection reconfiguration, information on the setting of the bearer may include information on a QoS flow to be used. The information on the QoS flow or the information on the setting of the bearer may include information on the MCG and/or the SCG to be used. The setting for each bearer may be collectively performed for the bearers. This can reduce the amount of signaling for changing the bearer.

Alternatively, the MgNB may set the modification of the MC configuration to the UE for each QoS flow. For example, the MgNB may set a bearer to be used for each QoS flow. The MgNB may set the MCG and/or the SCG for each bearer. Alternatively, the MgNB may set the MCG and/or the SCG for each QoS flow. The MgNB may set a bearer for each MCG and/or for each SCG. The MgNB may set the MCG and/or the SCG for each bearer. For example, in the signaling for the RRC connection reconfiguration, information on the setting of the QoS flow may include information on a bearer to be used. The information on the bearer may include information on the MCG and/or the SCG to be used. Alternatively, the information on the setting of the QoS flow may include the information on the MCG and/or the SCG to be used. The information on the MCG and/or the SCG may include the information on a bearer to be used. The setting for each QoS flow may be collectively performed for the QoS flows. This can reduce the amount of signaling for changing the QoS flow.

The UE may notify the MgNB of a response to modification of the MC configuration. Similarly to the tenth embodiment, the UE may give the notification using the RRC connection reconfiguration complete (RRCConnectionReconfigurationComplete) notification. The same advantages as those described in the tenth embodiment are produced.

The MgNB may transmit, to the secondary base station, a notification indicating the completion of the modification of the MC configuration. The MgNB may give the notification, for example, using the secondary base station reconfiguration complete (SN Reconfiguration Complete) notification. The MgNB may transmit the notification in the same manner as the SgNB reconfiguration completion notification described in the tenth embodiment. The same advantages as those described in the tenth embodiment are produced.

Similarly to the tenth embodiment, the MgNB may set, to the UE, the modification of the MC configuration for each SCG. The sequence for modifying the MC configuration may be identical to, for example, that illustrated in FIGS. 17 and 18. Even upon occurrence of a failure in changing the SgNB for the MC on the way, the MC can be performed while successful change in the SgNB for the MC until then is maintained.

Alternatively, the MC configuration may be collectively modified for the SCGs. The sequence for modifying the MC configuration may be identical to, for example, that illustrated in FIGS. 19 and 20. This can reduce the amount of signaling.

Alternatively, modification of the MC configuration may be set for each bearer or in a batch of the bearers. This can reduce the amount of signaling.

Alternatively, the modification of the MC configuration may be set for each QoS flow or in a batch of the QoS flows. This can reduce the amount of signaling.

Alternatively, the secondary base station may activate modifying the MC configuration similarly to the tenth embodiment.

The secondary base station may transmit a secondary base station modification required (SN Modification Required) notification to the MgNB. Information included in the notification may be identical to that included in the SgNB modification request acknowledgement described in the tenth embodiment.

The MgNB may transmit a secondary base station modification refusal (SN Modification Refuse) to the secondary base station. The MgNB may transmit the secondary base station modification refusal as a refusal response to the secondary base station modification required notification transmitted from the secondary base station to the MgNB. Information included in the secondary base station modification refusal may be identical to that included in the SgNB modification refusal described in the tenth embodiment. Alternatively, the information may include information on a QoS flow, for example, an identifier of the QoS flow. The QoS flow may be a QoS flow that causes the MgNB to refuse the request. This enables, for example, the secondary base station to smoothly perform the process for changing the secondary base station per QoS flow.

The MgNB may notify the UE to modify the MC configuration. The MgNB may notify the UE after receiving the secondary base station modification required notification from the secondary base station. The MgNB may give the notification of modifying the MC configuration using, for example, the RRC connection reconfiguration as previously described. Information included in the notification of modifying the MC configuration may be identical to that previously described.

The UE may give the MgNB the RRC connection reconfiguration complete (RRCConnectionReconfigurationComplete) notification as previously described.

The MgNB may notify the secondary base station of a secondary base station modification confirmation (SN Modification Confirm). The MgNB may give the notification through the interface between the base stations, for example, the Xn interface. Information included in the notification may be identical to that included in the secondary base station modification request (SN Modification Request).

The method identical to that for modifying the MC configuration using the New AS layer may be applied to intra-MgNB (MN) handover (HO) involving SCG change, in the MC configuration using the New AS layer. The design complexity in the communication system can be avoided.

The sequence identical to that for releasing the SgNB (SgNB Release), which is described in the tenth embodiment, may be applied to release of the secondary base station (SN Release) in the MC configuration using the New AS layer. The design complexity in the communication system can be avoided.

The method described in the first modification of the sixth embodiment may be combined with the release of the secondary base station (SN Release), to be applied to change of the secondary base station (Change of SN) in the MC configuration using the New AS layer. The design complexity in the communication system can be avoided.

The handover request described in 9.1.1.1 of Non-Patent Document 29 (3GPP TS38.423 v0.1.1) may be combined with the release of the secondary base station (SN Release), to be applied to the handover from the MgNB to the gNB (MN to gNB Change) in the MC configuration using the New AS layer. The design complexity in the communication system can be avoided.

The handover request described in 9.1.1.1 of Non-Patent Document 29 (3GPP TS38.423 v0.1.1) may be combined with the method described in the first modification of the sixth embodiment, to be applied to the handover from the gNB to the MgNB (gNB to MN Change) in the MC configuration using the New AS layer. The design complexity in the communication system can be avoided.

The sequence identical to that for the inter-MeNB handover (HO) without SgNB change in the MC configuration, which is described in the tenth embodiment, may be applied to the inter-MgNB handover (HO) without secondary base station (SN) change in the MC configuration using the New AS layer. The design complexity in the communication system can be avoided.

Since the first modification of the tenth embodiment enables the modification and release of the MC configuration using the New AS layer, the optimal communication system can be built according to a communication state of the whole system.

The embodiments and the modifications are merely illustrations of the present invention, and can be freely combined within the scope of the present invention. Any constituent elements of the embodiments and the modifications can be appropriately modified or omitted.

For example, the subframe in the embodiments and the modifications is an example time unit of communication in the fifth generation base station communication system. The subframe may be set per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES 200 communication system, 202 communication terminal device, 203 base station device.

The invention claimed is:

1. A communication system comprising:
a user apparatus; and
a base station including a distributed unit (DU) configured to wirelessly communicate with the user apparatus and a central unit (CU) connected to the distributed unit, wherein
the base station including the CU and the DU supports packet duplication, and the DU notifies the user apparatus of starting the packet duplication.

2. The communication system according to claim 1, wherein the CU notifies the DU of information related to starting the packet duplication, and the DU notifies the user apparatus of starting the packet duplication by using a MAC signaling.

3. The communication system according to claim 1, wherein the DU notifies the CU of information related to a cell load and information related to a scheduling state.

4. The communication system according to claim 1, wherein the CU notifies the DU of information related to whether or not the packet duplication is performed.

5. A user apparatus in a communication system comprising the user apparatus; and a base station including a distributed unit (DU) configured to wirelessly communicate with the user apparatus and a central unit (CU) connected to the distributed unit, wherein
the base station including the CU and the DU supports packet duplication, and the user apparatus is notified of starting the packet duplication from the DU.

6. A base station in a communication system comprising a user apparatus; and the base station including a distributed unit (DU) configured to wirelessly communicate with the user apparatus and a central unit (CU) connected to the distributed unit, wherein
the base station including the CU and the DU supports packet duplication, and the DU notifies the user apparatus of starting the packet duplication.

\* \* \* \* \*